US012791973B2

(12) United States Patent
Kubo et al.

(10) Patent No.: US 12,791,973 B2
(45) Date of Patent: Nov. 10, 2026

(54) SHEET PROCESSING APPARATUS AND IMAGE FORMING SYSTEM

(71) Applicant: CANON FINETECH NISCA INC., Saitama (JP)

(72) Inventors: Mamoru Kubo, Yamanashi (JP); Kakeru Aoki, Yamanashi (JP); Junya Nakajima, Yamanashi (JP); Yusuke Mitsui, Yamanashi (JP)

(73) Assignee: Canon Finetech Nisca Inc., Saitama (JP)

( * ) Notice: Subject to any disclaimer, the term of this patent is extended or adjusted under 35 U.S.C. 154(b) by 0 days.

(21) Appl. No.: 19/283,729

(22) Filed: Jul. 29, 2025

(65) Prior Publication Data

US 2025/0355396 A1 Nov. 20, 2025

Related U.S. Application Data

(63) Continuation of application No. PCT/JP2024/002932, filed on Jan. 30, 2024.

(30) Foreign Application Priority Data

Jan. 31, 2023 (JP) ................................ 2023-012822
Jan. 26, 2024 (JP) ................................ 2024-010596

(51) Int. Cl.
*G03G 15/00* (2006.01)
*B65H 37/04* (2006.01)

(52) U.S. Cl.
CPC ......... *G03G 15/6544* (2013.01); *B65H 37/04* (2013.01); *G03G 15/6552* (2013.01);
(Continued)

(58) Field of Classification Search
CPC ........... G03G 15/6544; G03G 15/6552; G03G 15/6573; B65H 2301/163; B65H 2404/2693; B65H 37/04
See application file for complete search history.

(56) References Cited

U.S. PATENT DOCUMENTS 6,997,451 B2 2/2006 Yoshimura et al.
10,048,636 B2 8/2018 Obuchi et al.
(Continued)

FOREIGN PATENT DOCUMENTS

JP 2003-335451 A 11/2003
JP 2015-016970 A 1/2015
(Continued)

*Primary Examiner* — Joseph S Wong
(74) *Attorney, Agent, or Firm* — Venable LLP

(57) ABSTRACT

In a sorting discharge process, an unbound first sheet bundle is stacked by repeating a plurality of times a process in which, after a sheet is conveyed in a first conveyance direction by a first conveyance portion, the sheet is moved in a shift direction without conveying the sheet in a second conveyance direction by a second conveyance portion, and the sheet is discharged to a shift position on a stacking portion by a discharge portion one by one, and an unbound second sheet bundle is stacked by repeating a plurality of times a process in which the sheet conveyed by the first conveyance portion is discharged one by one to a position displaced upstream in the shift direction from the shift position on the stacking portion by the discharge portion without being conveyed the sheet in the second conveyance direction by the second conveyance portion.

10 Claims, 89 Drawing Sheets

(52) U.S. Cl.
CPC ... *G03G 15/6573* (2013.01); *B65H 2301/163* (2013.01); *B65H 2701/18292* (2013.01)

(56) References Cited

U.S. PATENT DOCUMENTS

| | | | | |
|---|---|---|---|---|
| 10,662,020 | B2 | 5/2020 | Takaba | |
| 12,371,295 | B2 | 7/2025 | Kubo | |
| 12,410,032 | B2 | 9/2025 | Katsumata | |
| 12,441,577 | B2 | 10/2025 | Nakajima | |
| 2015/0165809 | A1 * | 6/2015 | Komiyama ........ | B65H 31/3081 412/38 |
| 2016/0340143 | A1 * | 11/2016 | Maenishi ............... | B65H 31/38 |
| 2024/0025679 | A1 | 1/2024 | Kubo | |
| 2024/0228212 | A1 * | 7/2024 | Noso ...................... | B65H 37/04 |
| 2025/0002288 | A1 | 1/2025 | Kubo | |
| 2025/0002289 | A1 | 1/2025 | Kanda | |

FOREIGN PATENT DOCUMENTS

| | | | |
|---|---|---|---|
| JP | 2019-099295 | A | 6/2019 |
| JP | 2022-095204 | A | 6/2022 |
| WO | 2016/157590 | A1 | 10/2016 |

* cited by examiner

FIG.12

| No | MOTOR | DRIVEN PART | OPERATION | NORMAL ROTATION DIRECTION | REVERSE ROTATION DIRECTION |
|---|---|---|---|---|---|
| 1 | CONVEYANCE MOTOR MT11 (HB) | UPSTREAM (INLET) ROLLER | ROTATION | CONVEYANCE DIRECTION | NO ROTATION |
| 2 | | PRE-PROCESSING ROLLER | ROTATION | CONVEYANCE DIRECTION | NO ROTATION |
| 3 | | RAKE-IN PADDLE | ROTATION | RAKE-IN DIRECTION | NO ROTATION |
| 4 | | RETURNING MEMBER (KNURLED) | ROTATION | RAKE-IN DIRECTION | NO ROTATION |
| 5 | PROCESSING UPPER MOTOR MT12 (PM) | RAKE-IN PADDLE | ASCENT/DESCENT | DESCENT | ASCENT |
| 6 | | TRAILING END DROPPING MEMBER | ASCENT/ DESCENT | DESCENT | ASCENT |
| 7 | | UPPER DISCHARGE ROLLER (NIPPING MEMBER) | ASCENT/ DESCENT | ASCENT | DESCENT |
| 8 | RETURNING LIFTING/ LOWERING MOTOR MT13 (PM) | RETURNING MEMBER (KNURLED) | ASCENT/ DESCENT | ASCENT | DESCENT |
| 9 | DISCHARGE ROLLER MOTOR MT14 (PM) | UPPER DISCHARGE ROLLER | ROTATION | CONVEYANCE DIRECTION | RAKE-IN DIRECTION |
| 10 | RAKE-IN MOTOR MT15 (PM) | DISCHARGED SHEET RAKE-IN PADDLE | ROTATION | CONVEYANCE DIRECTION | NO ROTATION |
| 11 | F-SIDE ALIGNMENT PLATE MOVING MOTOR MT16 (PM) | FRONT ALIGNMENT PLATE | LATERAL MOVEMENT | INWARD IN PROCESSING PORTION | OUTWARD IN PROCESSING PORTION |
| 12 | R-SIDE ALIGNMENT PLATE MOVING MOTOR MT17 (PM) | REAR ALIGNMENT PLATE | LATERAL MOVEMENT | INWARD IN PROCESSING PORTION | OUTWARD IN PROCESSING PORTION |
| 13 | STP MOVING MOTOR MT18 (PM) | STP | LATERAL MOVEMENT | MOVEMENT TO R-SIDE | MOVEMENT TO F-SIDE |
| 14 | STP MOTOR MT19 (DC) | STP | CLINCHING | ARM DESCENT (STAPLING) | ARM ASCENT |
| 15 | STACKING TRAY LIFTING/LOWERING MOTOR MT20 (DC) | STACKING TRAY | ASCENT/ DESCENT | ASCENT | DESCENT |

FIG.48

| No | MOTOR | CLUTCH | DRIVEN PART | OPERATION | NORMAL ROTATION | | REVERSE ROTATION | | REMARKS |
|---|---|---|---|---|---|---|---|---|---|
| | | | | | CLUTCH PRESENCE/ABSENCE/ON/OFF | DIRECTION | CLUTCH PRESENCE/ABSENCE/ON/OFF | DIRECTION | |
| 1 | CONVEYANCE MOTOR MT1 (HB) | - | CONVEYANCE ROLLER | ROTATION | ABSENT | CONVEYANCE DIRECTION | ABSENT | NO ROTATION | |
| 2 | | - | PRE-PROCESSING ROLLER | | | | | | |
| 3 | | - | RETURNING (KNURLED) | | | RAKE-IN DIRECTION | | | |
| 4 | CONVEYANCE MOTOR MT2 (HB) | - | RAKE-IN (BELT) | ROTATION | ABSENT | RAKE-IN DIRECTION | ABSENT | BUNDLE DISCHARGE DIRECTION | |
| 5 | | PRESENT | BUNDLE DISCHARGE BELT (ROLLER) | | OFF | STOP | ON | | |
| 6 | | | RAKE-IN (DISCHARGE) | | | | | | |
| 7 | LIFTING/LOWERING MOTOR MT3 (PM) | - | NIPPING MEMBER | ASCENT/DESCENT | ABSENT | DESCENT | ABSENT | ASCENT | |
| 8 | | - | PRE-PROCESSING ROLLER (UPPER: DRIVEN) | | | ASCENT (PRESSURE REDUCTION) | | DESCENT (RETURN TO ORIGINAL PRESSURE) | NIP PRESSURE CHANGES DEPENDING ON LIFTING/LOWERING MECHANICAL CONFIGURATION OF NIPPING MEMBER |
| 9 | | PRESENT | RAKE-IN & TRAILING END DROPPING | | WHEN ON | DESCENT | WHEN ON | ASCENT | |
| 10 | | | | | WHEN OFF | STOP (OR RETURN TO HP POSITION) | WHEN OFF | STOP (OR RETURN TO HP POSITION) | MOVED UP (RETURN TO HP POSITION) BY TENSION SPRING WHEN CLUTCH IS TURNED OFF WHEN RAKE-IN IS AT LOWER LIMIT POSITION |
| 11 | LIFTING/LOWERING MOTOR MT4 (PM) | - | RETURNING MEMBER | ASCENT/DESCENT | ABSENT | DESCENT | ABSENT | ASCENT | |
| 12 | ALIGNMENT PLATE MOVING MOTOR MT5 (PM) | - | FRONT ALIGNMENT PLATE | LATERAL MOVEMENT | ABSENT | INWARD IN PROCESSING PORTION | ABSENT | OUTWARD IN PROCESSING PORTION | |
| 13 | ALIGNMENT PLATE MOVING MOTOR MT6 (PM) | - | REAR ALIGNMENT PLATE | LATERAL MOVEMENT | ABSENT | INWARD IN PROCESSING PORTION | ABSENT | OUTWARD IN PROCESSING PORTION | |
| 14 | STP MOVING MOTOR MT7 (PM) | - | STP | LATERAL MOVEMENT | ABSENT | MOVEMENT TO R-SIDE | ABSENT | MOVEMENT TO F-SIDE | |
| 15 | STP CLINCHING MOTOR MT8 (DC) | - | STP | CLINCHING | ABSENT | ARM DESCENT (STAPLING) | ABSENT | ARM ASCENT | |
| 16 | LIFTING/LOWERING MOTOR MT9 (DC) | - | STACKING TRAY | ASCENT/DESCENT | ABSENT | ASCENT | ABSENT | DESCENT | |

SHEET PROCESSING APPARATUS AND IMAGE FORMING SYSTEM

CROSS-REFERENCE TO RELATED APPLICATIONS

This application is a Continuation of International Patent Application No. PCT/JP2024/002932, filed Jan. 30, 2024, which claims the benefit of Japanese Patent Application No. 2023-12822, filed Jan. 31, 2023, and Japanese Patent Application No. 2024-010596, filed Jan. 26, 2024, which are hereby incorporated by reference herein in their entirety.

BACKGROUND

Field of the Technology

The present disclosure relates to a sheet processing apparatus that performs a predetermined process on a sheet, and an image forming system including the sheet processing apparatus.

Description of the Related Art

For a sheet processing apparatus, a configuration provided with a function to perform a binding discharge process of discharging a sheet bundle onto a stacking tray after performing a process such as a binding process thereon on a processing tray, and perform a sorting discharge process of discharging an unbound sheet bundle not to be subjected to the binding process onto the stacking tray after moving each sheet bundle in a shift direction intersecting with a conveyance direction is conventionally known (for example, Japanese Patent Application Laid-Open No. 2015-16970).

The sorting discharge process is a process to, in the case of discharging sheets on which images have been formed by an image forming apparatus onto a stacking tray, sort a plurality of copies of sheet bundles by performing discharge such that the sheet bundles each constituted by a plurality of sheets are stacked in the state of being displaced from each other. For example, in the case of discharging ten copies of sheet bundles each constituted by five sheets, the second sheet bundle is stacked on the first sheet bundle in a displaced state, the third sheet bundle is stacked on the second sheet bundle in the state of being displaced in an opposite direction, and the ten copies of the sheet bundles can be discharged onto the stacking tray in a sorted state by repeating this ten times.

In the binding discharge process, a sheet conveyed to the processing tray is temporarily conveyed (reverse conveyance) in a direction away from the stacking tray, width alignment is performed by using an alignment plate in a state in which the trailing end of the sheet is caused to abut a trailing end regulating plate, a binding process is performed on a sheet bundle formed on the processing tray by repeating this, and the sheet bundle subjected to the binding process is discharged onto the stacking tray.

In contrast, in the sorting discharge process, a sheet conveyed to the processing tray is conveyed in the reverse direction, the sheet is moved in a shift direction by using the alignment plate in a state in which the trailing end of the sheet is caused to abut the trailing end regulating plate, and a first sheet bundle moved in the shift direction by repeating this is discharged onto the stacking tray. Next, a second sheet bundle is discharged to a position different from the first sheet bundle in the shift direction on the stacking tray by moving the sheets in a direction opposite to the shift direction on the processing tray. Then, a plurality of copies of sheet bundles are sorted and discharged onto the stacking tray by repeating this operation.

SUMMARY

In a conventional sheet processing apparatus, in the case of performing the sorting discharge process, the sheets are moved in the shift direction after being conveyed in the reverse direction on the processing tray, and therefore time for the reverse conveyance is required.

The present disclosure provides a configuration capable of improving the productivity of the sorting discharge process.

According to a first aspect of the present disclosure, a sheet processing apparatus includes a first conveyance portion configured to convey a sheet in a first conveyance direction, a placement portion on which the sheet conveyed by the first conveyance portion is placed, an abutment portion that an upstream edge in the first conveyance direction of the sheet on the placement portion is caused to abut, a second conveyance portion configured to convey the sheet in a second conveyance direction in which the upstream edge in the first conveyance direction of the sheet on the placement portion moves toward the abutment portion, a shifting portion configured to move in a shift direction intersecting with the first conveyance direction in a state of abutting one edge following the first conveyance direction of the sheet conveyed by the first conveyance portion, and thus move, in the shift direction, the sheet conveyed by the first conveyance portion, a driving portion configured to drive the shifting portion to move the shifting portion in the shift direction, a processing portion configured to perform a binding process on a plurality of sheets that are positioned at a binding position by being conveyed in the second conveyance direction by the second conveyance portion to cause a downstream edge thereof in the second conveyance direction to abut the abutment portion and then being moved in the shift direction by the shifting portion, a stacking portion that is disposed downstream of the placement portion in the first conveyance direction and on which the sheet conveyed by the first conveyance portion is stacked, and, a discharge portion configured to discharge, onto the stacking portion, the sheet conveyed by the first conveyance portion. The sheet processing apparatus is capable of executing: a binding discharge process in which the binding process is performed on the plurality of sheets by the processing portion and the plurality of sheets subjected to the binding process are discharged onto the stacking portion by the discharge portion, the plurality of sheets being positioned at the binding position by repeating a process in which, after the sheet is conveyed in the first conveyance direction by the first conveyance portion, the sheet conveyed by the first conveyance portion is conveyed in the second conveyance direction on the placement portion by the second conveyance portion to cause a downstream edge of the sheet in the second conveyance direction to abut the abutment portion, and the sheet is moved in the shift direction and positioned at the binding position by driving the shifting portion by the driving portion, and, a sorting discharge process including stacking an unbound first sheet bundle by repeating a plurality of times a process in which, after the sheet is conveyed in the first conveyance direction by the first conveyance portion, the sheet conveyed by the first conveyance portion is moved in the shift direction by the shifting portion by driving the shifting portion by the driving portion without conveying the sheet in the second conveyance direction by the second conveyance portion, and the sheet moved in the shift direction by the shifting portion is discharged to a shift position on the stacking portion by the discharge portion one by one, and, stacking an unbound second sheet bundle by repeating a plurality of times a process in which the sheet conveyed by the first conveyance portion is discharged one by one to a position displaced upstream in the shift direction from the shift position on the stacking portion by the discharge portion without being conveyed the sheet in the second conveyance direction by the second conveyance portion.

According to a second aspect of the present disclosure, an image forming system includes an image forming apparatus including an image forming portion configured to form an image on a sheet, and, the sheet processing apparatus. The sheet processing apparatus includes a first conveyance portion configured to convey a sheet in a first conveyance direction, a placement portion on which the sheet conveyed by the first conveyance portion is placed, an abutment portion that an upstream edge in the first conveyance direction of the sheet on the placement portion is caused to abut, a second conveyance portion configured to convey the sheet in a second conveyance direction in which the upstream edge in the first conveyance direction of the sheet on the placement portion moves toward the abutment portion, a shifting portion configured to move in a shift direction intersecting with the first conveyance direction in a state of abutting one edge following the first conveyance direction of the sheet conveyed by the first conveyance portion, and thus move, in the shift direction, the sheet conveyed by the first conveyance portion, a driving portion configured to drive the shifting portion to move the shifting portion in the shift direction, a processing portion configured to perform a binding process on a plurality of sheets that are positioned at a binding position by being conveyed in the second conveyance direction by the second conveyance portion to cause a downstream edge thereof in the second conveyance direction to abut the abutment portion and then being moved in the shift direction by the shifting portion, a stacking portion that is disposed downstream of the placement portion in the first conveyance direction and on which the sheet conveyed by the first conveyance portion is stacked, and, a discharge portion configured to discharge, onto the stacking portion, the sheet conveyed by the first conveyance portion. The sheet processing apparatus is capable of executing a binding discharge process in which the binding process is performed on the plurality of sheets by the processing portion and the plurality of sheets subjected to the binding process are discharged onto the stacking portion by the discharge portion, the plurality of sheets being positioned at the binding position by repeating a process in which, after the sheet is conveyed in the first conveyance direction by the first conveyance portion, the sheet conveyed by the first conveyance portion is conveyed in the second conveyance direction on the placement portion by the second conveyance portion to cause a downstream edge of the sheet in the second conveyance direction to abut the abutment portion, and the sheet is moved in the shift direction and positioned at the binding position by driving the shifting portion by the driving portion, and, a sorting discharge process including stacking an unbound first sheet bundle by repeating a plurality of times a process in which, after the sheet is conveyed in the first conveyance direction by the first conveyance portion, the sheet conveyed by the first conveyance portion is moved in the shift direction by the shifting portion by driving the shifting portion by the driving portion without conveying the sheet in the second conveyance direction by the second conveyance portion, and the sheet moved in the shift direction by the shifting portion is discharged to a shift position on the stacking portion by the discharge portion one by one, and, stacking an unbound second sheet bundle by repeating a plurality of times a process in which the sheet conveyed by the first conveyance portion is discharged one by one to a position displaced upstream in the shift direction from the shift position on the stacking portion by the discharge portion without being conveyed the sheet in the second conveyance direction by the second conveyance portion. The sheet processing apparatus is capable of executing the binding discharge process and the sorting discharge process on the sheet on which the image has been formed by the image forming portion.

Features of the present disclosure will become apparent from the following description of embodiments with reference to the attached drawings.

BRIEF DESCRIPTION OF THE DRAWINGS

FIG. 12 is a table illustrating a correspondence relationship between each motor and each component of the sheet processing apparatus according to the first embodiment.

FIG. 48 is a table illustrating a correspondence relationship between each motor and each component of the sheet processing apparatus according to the second embodiment.

FIG. 65B is a schematic view of the sheet processing apparatus as viewed from the side illustrating the state in which the sheet has been discharged onto the stacking tray in the shift mode (alignment-prioritized) for a large sheet according to the second embodiment.

FIG. 66A is a schematic view of the sheet processing apparatus as viewed from above illustrating a state in which the leading end of the sheet has reached the pre-processing rollers in a stapling mode according to the second embodiment.

FIG. 66B is a schematic view of the sheet processing apparatus as viewed from the side illustrating the state in which the leading end of the sheet has reached the pre-processing rollers in the stapling mode according to the second embodiment.

FIG. 67A is a schematic view of the sheet processing apparatus as viewed from above illustrating a state in which the sheet is caused to abut the trailing end regulating member in the stapling mode according to the second embodiment.

FIG. 67B is a schematic view of the sheet processing apparatus as viewed from the side illustrating the state in which the sheet is caused to abut the trailing end regulating member in the stapling mode according to the second embodiment.

FIG. 68A is a schematic view of the sheet processing apparatus as viewed from above illustrating a state in which a side end portion of the sheet in the width direction is regulated in the stapling mode according to the second embodiment.

FIG. 68B is a schematic view of the sheet processing apparatus as viewed from the side illustrating the state in which the side end portion of the sheet in the width direction is regulated in the stapling mode according to the second embodiment.

FIG. 69A is a schematic view of the sheet processing apparatus as viewed from above illustrating a state in which the trailing end of the sheet is pressed and it is possible to receive the next sheet in the stapling mode according to the second embodiment.

FIG. 69B is a schematic view of the sheet processing apparatus as viewed from the side illustrating the state in which the trailing end of the sheet is pressed and it is possible to receive the next sheet in the stapling mode according to the second embodiment.

FIG. 70A is a schematic view of the sheet processing apparatus as viewed from above illustrating a state in which the second sheet is caused to abut the trailing end regulating member in the stapling mode according to the second embodiment.

FIG. 70B is a schematic view of the sheet processing apparatus as viewed from the side illustrating the state in which the second sheet is caused to abut the trailing end regulating member in the stapling mode according to the second embodiment.

FIG. 71A is a schematic view of the sheet processing apparatus as viewed from above illustrating a state in which a side end portion of the two sheets in the width direction is regulated in the stapling mode according to the second embodiment.

Figure 71A:
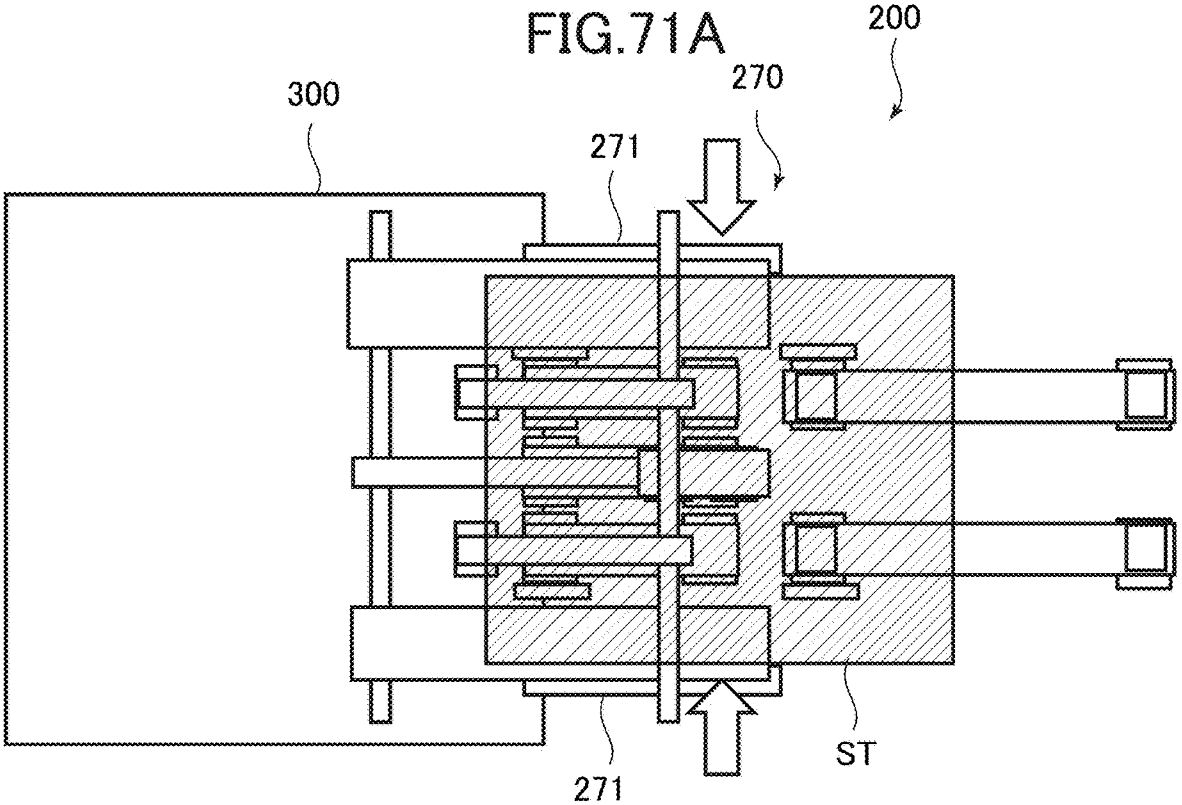
Figure 71B:
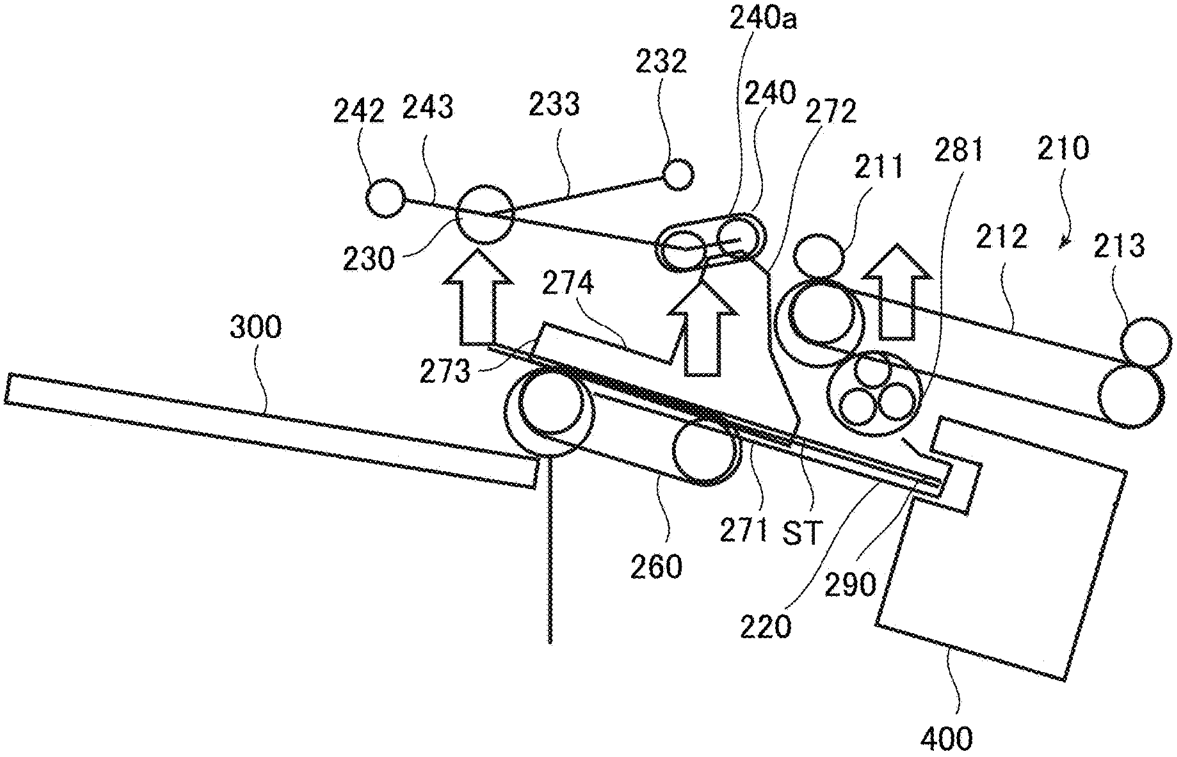

FIG. 71B is a schematic view of the sheet processing apparatus as viewed from the side illustrating the state in which the side end portion of the two sheets in the width direction is regulated in the stapling mode according to the second embodiment.

Figure 72A:
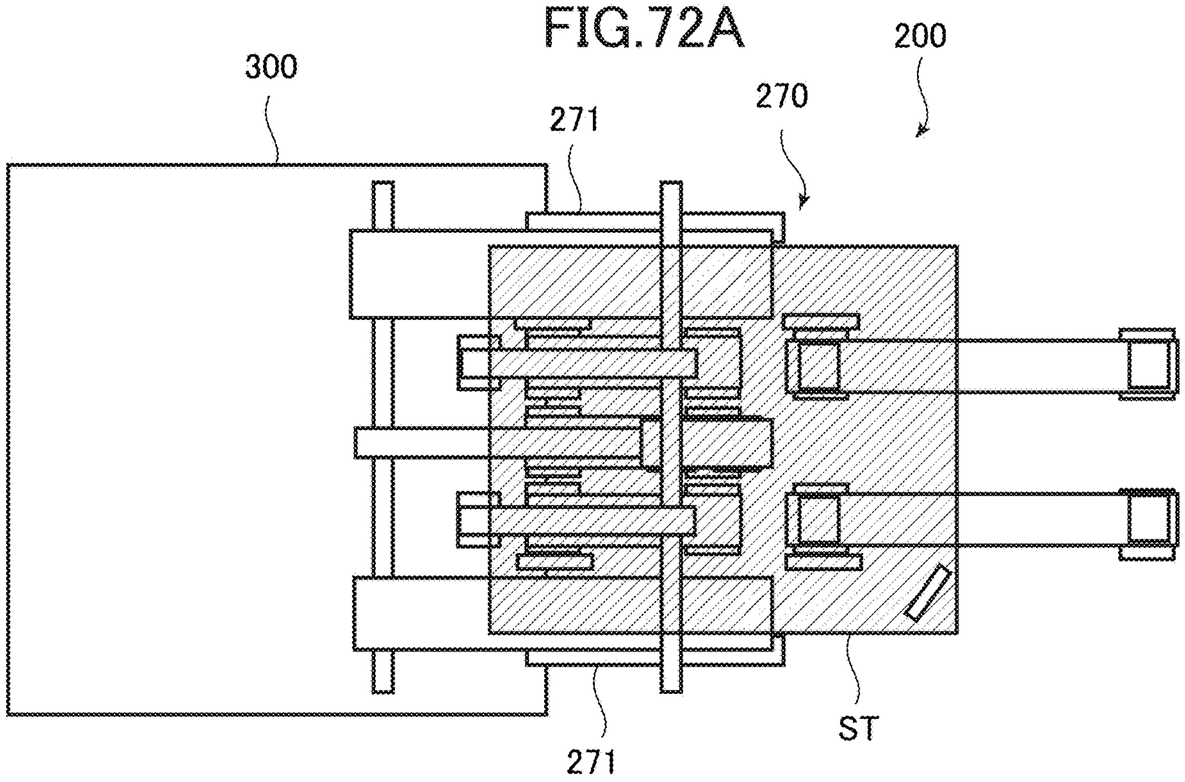

FIG. 72A is a schematic view of the sheet processing apparatus as viewed from above illustrating a state in which a stapling process is performed on a plurality of sheets in the stapling mode according to the second embodiment.

Figure 72B:
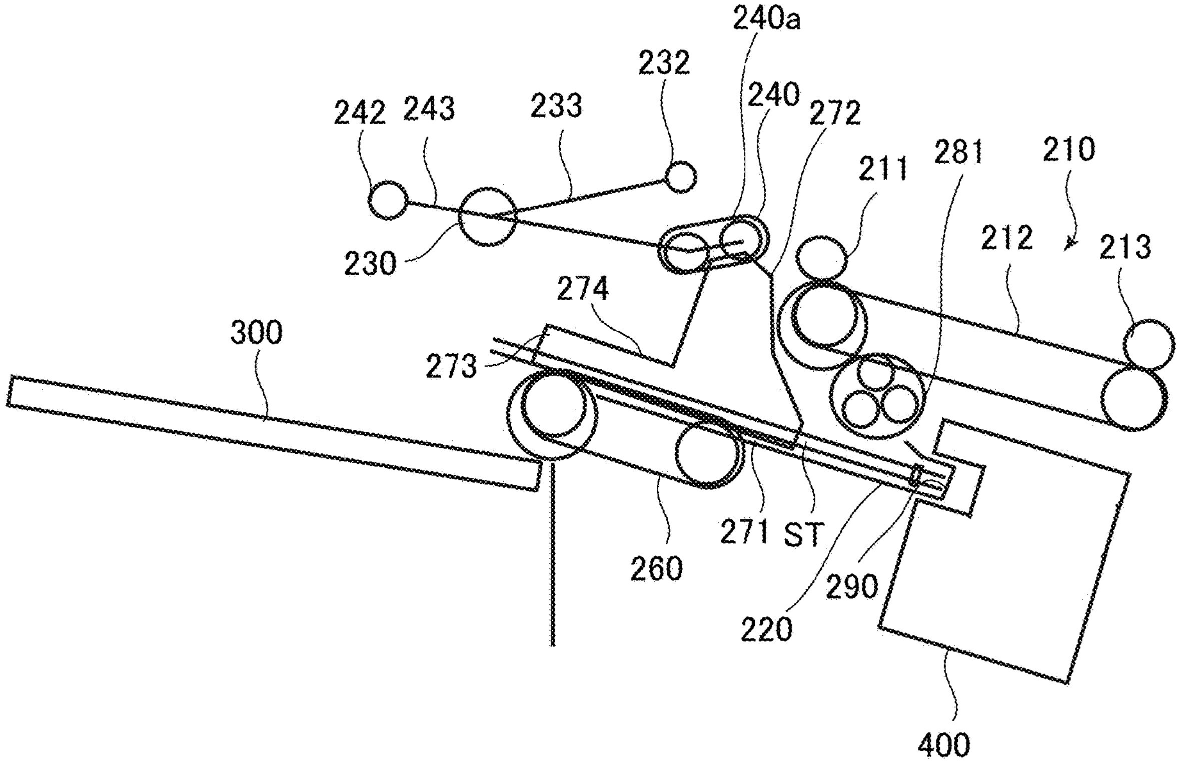

FIG. 72B is a schematic view of the sheet processing apparatus as viewed from the side illustrating the state in which the stapling process is performed on the plurality of sheets in the stapling mode according to the second embodiment.

Figure 73A:
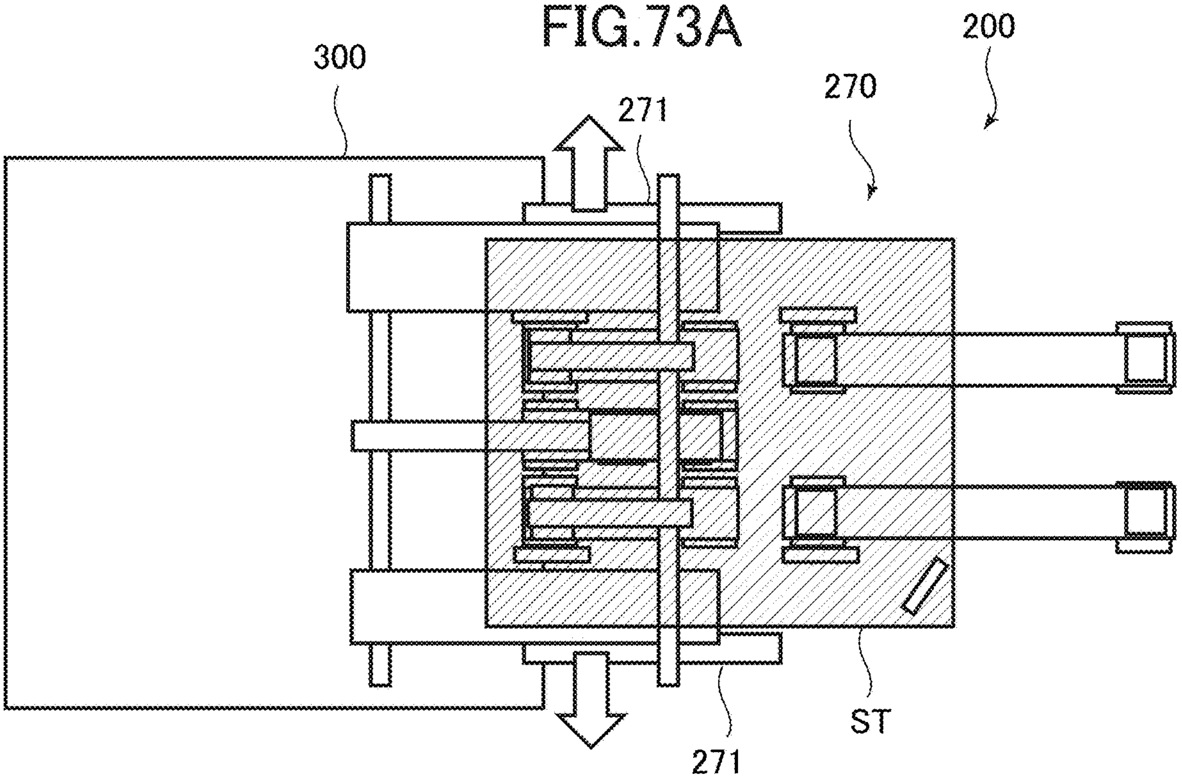

FIG. 73A is a schematic view of the sheet processing apparatus as viewed from above illustrating a state in which a sheet bundle subjected to the stapling process is nipped between the rake-in belts, the discharge rollers, and the discharge belts in the stapling mode according to the second embodiment.

Figure 73B:
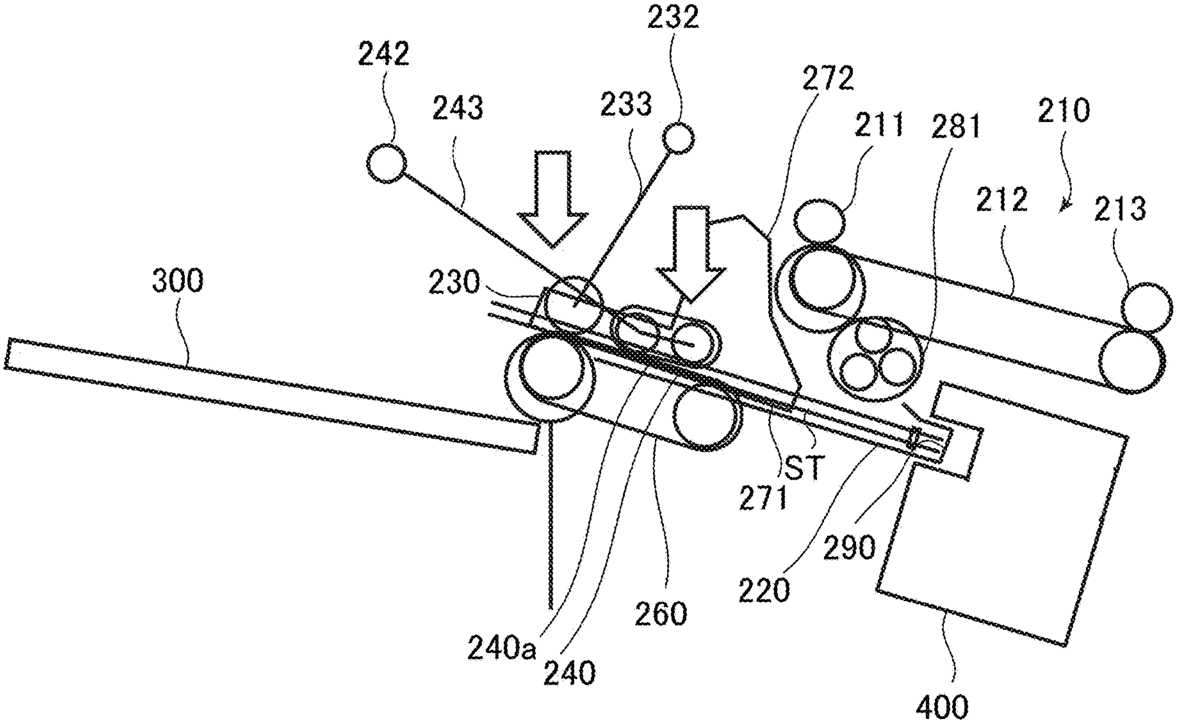

FIG. 73B is a schematic view of the sheet processing apparatus as viewed from the side illustrating the state in which the sheet bundle subjected to the stapling process is nipped between the rake-in belts, the discharge rollers, and the discharge belts in the stapling mode according to the second embodiment.

Figure 74A:
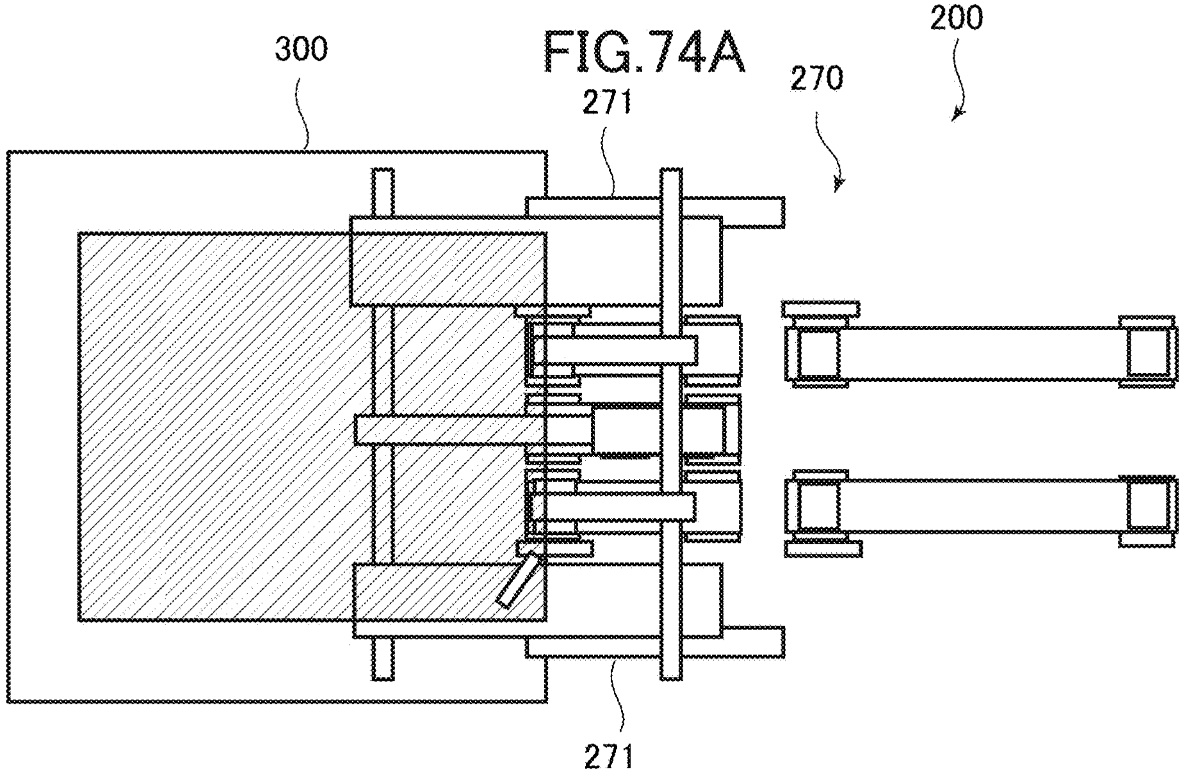

FIG. 74A is a schematic view of the sheet processing apparatus as viewed from above illustrating a state in which the sheet bundle subjected to the stapling process has been discharged onto the stacking tray in the stapling mode according to the second embodiment.

Figure 74B:
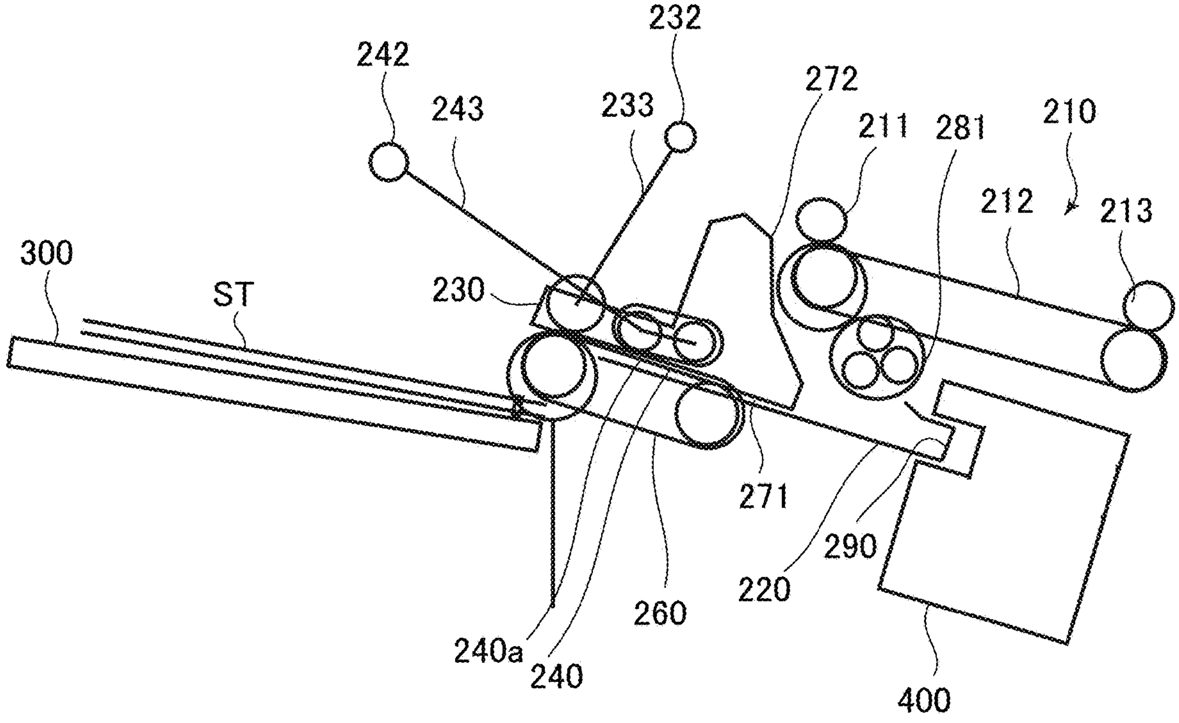

FIG. 74B is a schematic view of the sheet processing apparatus as viewed from the side illustrating the state in which the sheet bundle subjected to the stapling process has been discharged onto the stacking tray in the stapling mode according to the second embodiment.

Figure 75A:
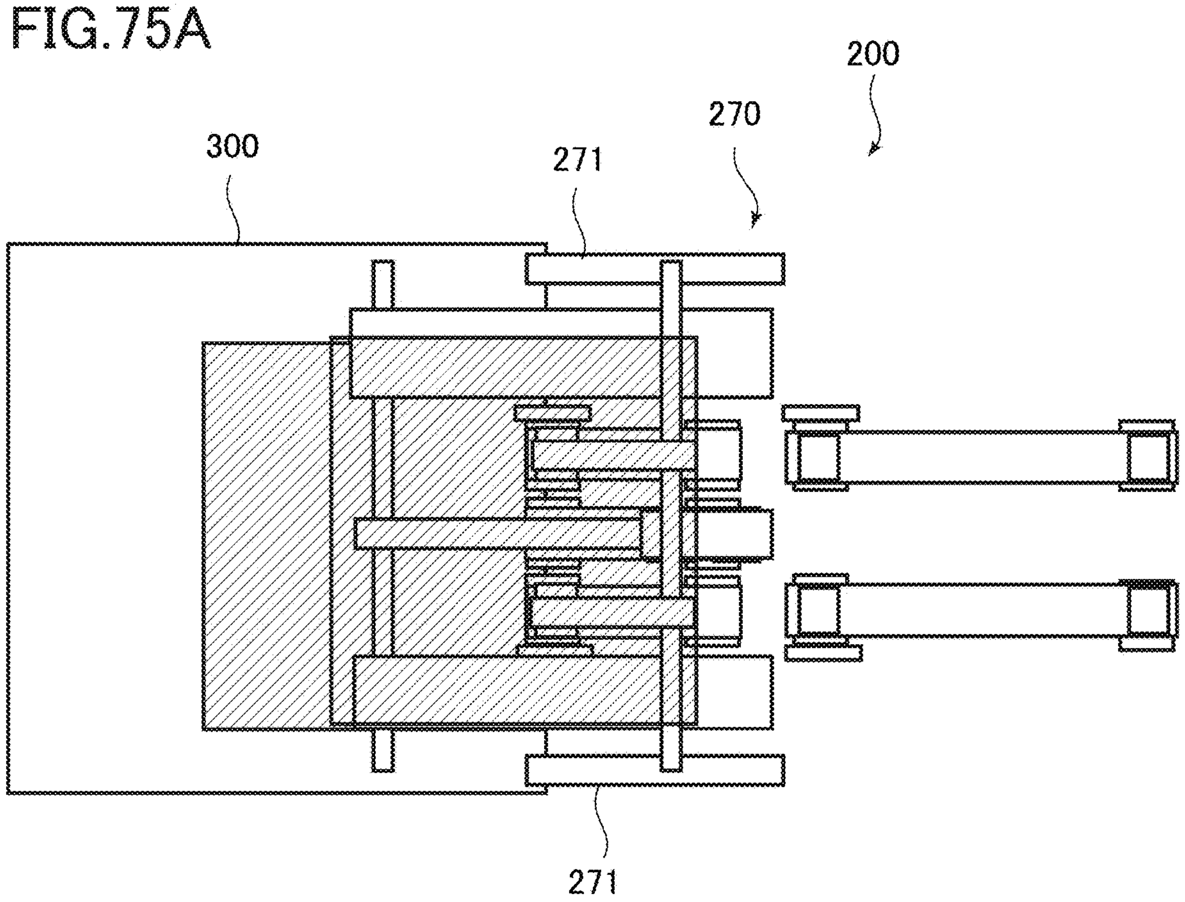

FIG. 75A is a schematic view of the sheet processing apparatus as viewed from above illustrating a state in which the sheet is nipped between the discharge rollers and the discharge belts in a sheet discharge operation according to the second embodiment.

Figure 75B:
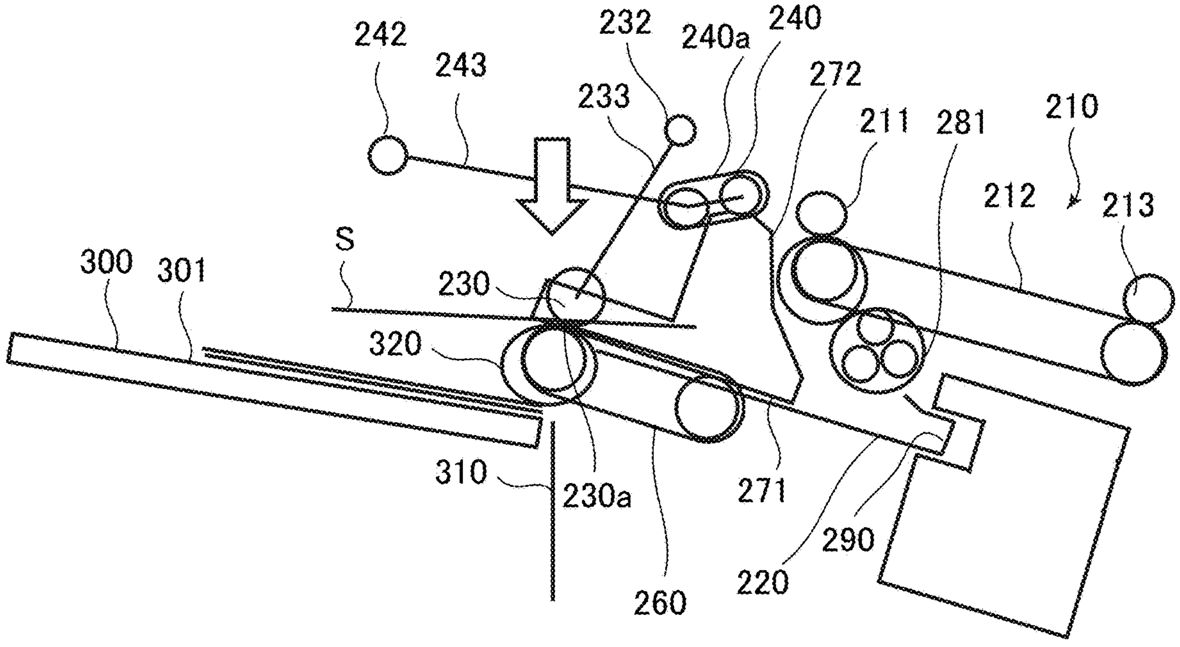

FIG. 75B is a schematic view of the sheet processing apparatus as viewed from the side illustrating the state in which the sheet is nipped between the discharge rollers and the discharge belts in the sheet discharge operation according to the second embodiment.

Figure 76A:
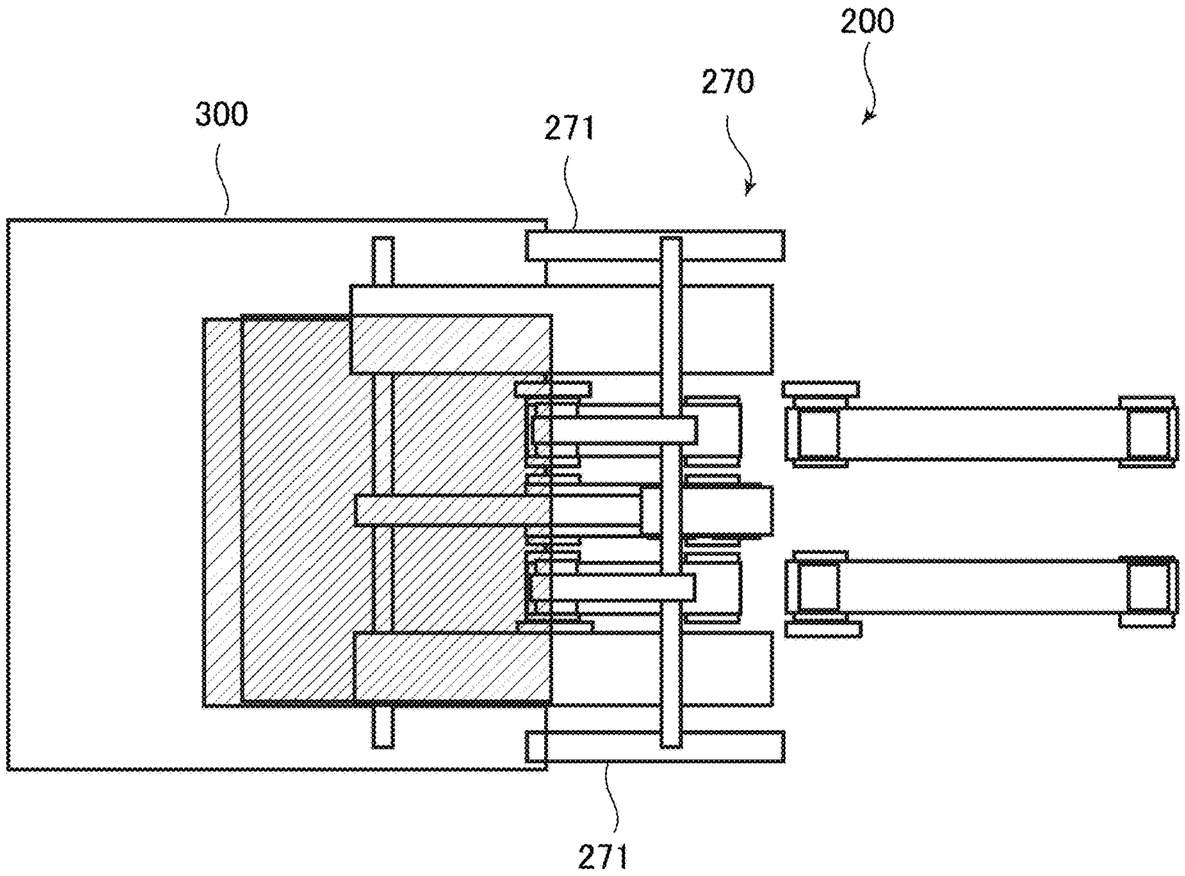

FIG. 76A is a schematic view of the sheet processing apparatus as viewed from above illustrating a state in which descent of the stacking tray is started in the sheet discharge operation according to the second embodiment.

Figure 76B:
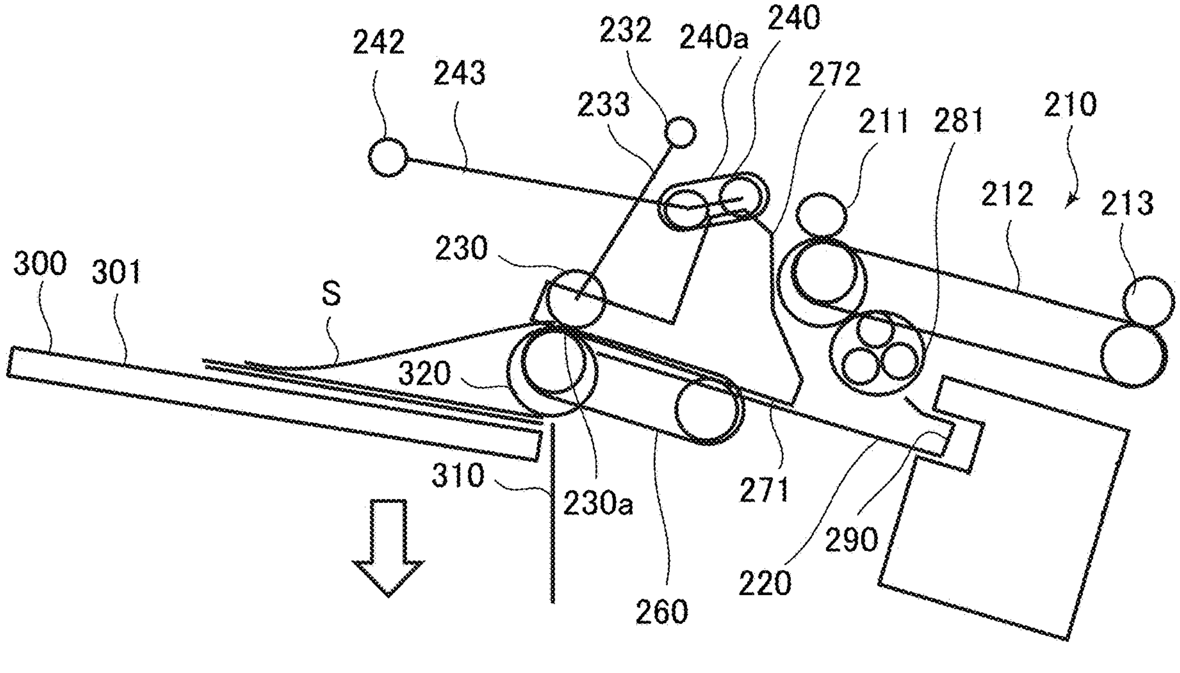

FIG. 76B is a schematic view of the sheet processing apparatus as viewed from the side illustrating the state in which the descent of the stacking tray is started in the sheet discharge operation according to the second embodiment.

Figure 77A:
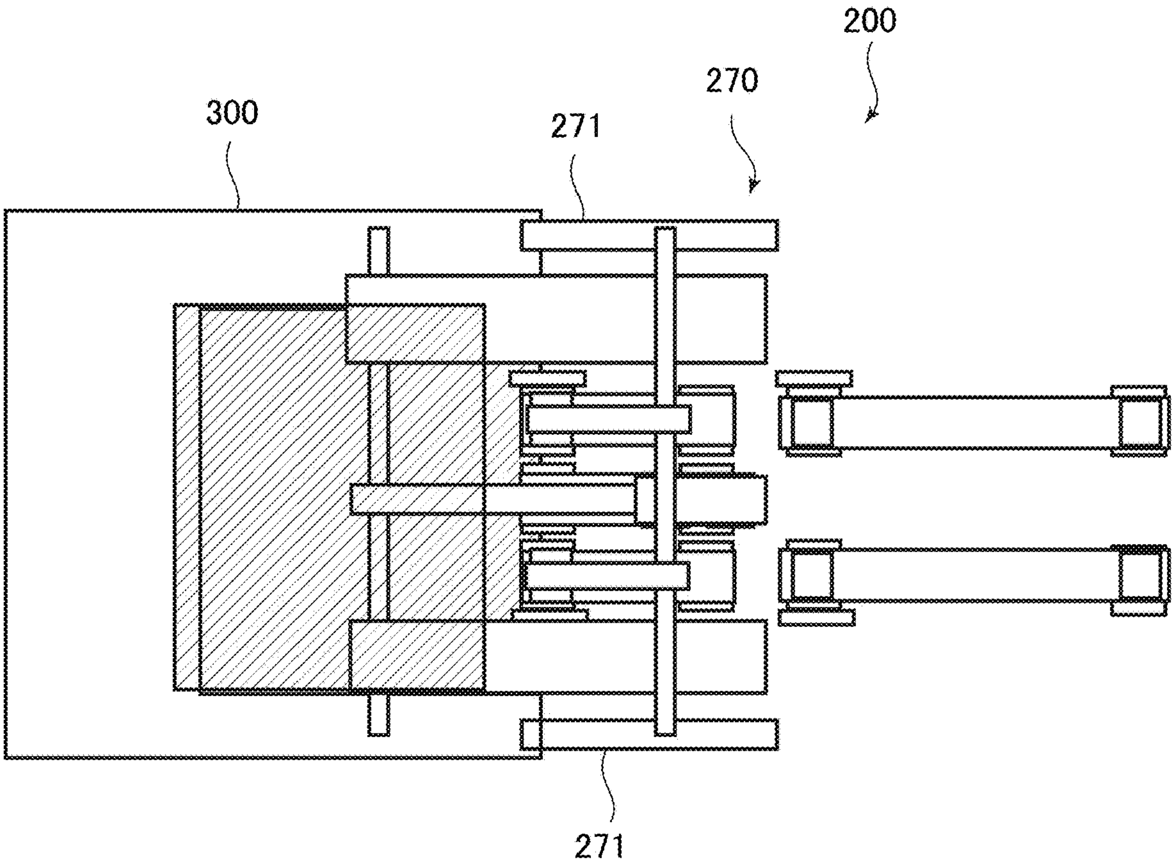

FIG. 77A is a schematic view of the sheet processing apparatus as viewed from above illustrating a state in which the trailing end of the sheet is guided to a position below a discharged sheet rake-in belt in the sheet discharge operation according to the second embodiment.

Figure 77B:
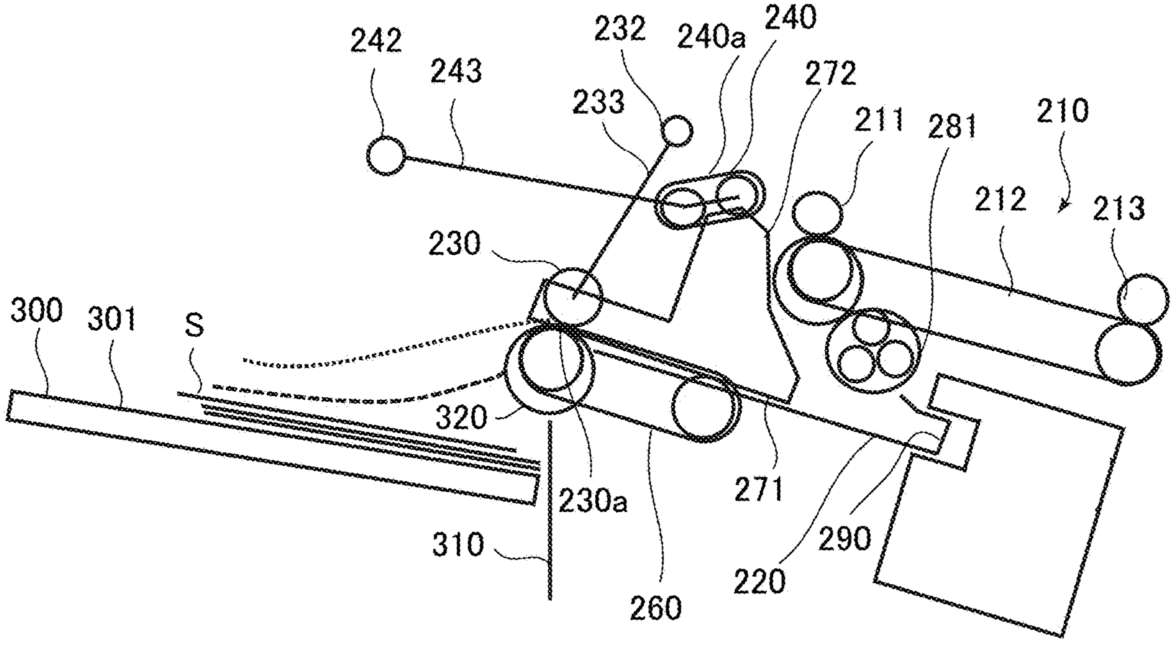

FIG. 77B is a schematic view of the sheet processing apparatus as viewed from the side illustrating the state in which the trailing end of the sheet is guided to a position below the discharged sheet rake-in belt in the sheet discharge operation according to the second embodiment.

Figure 78A:
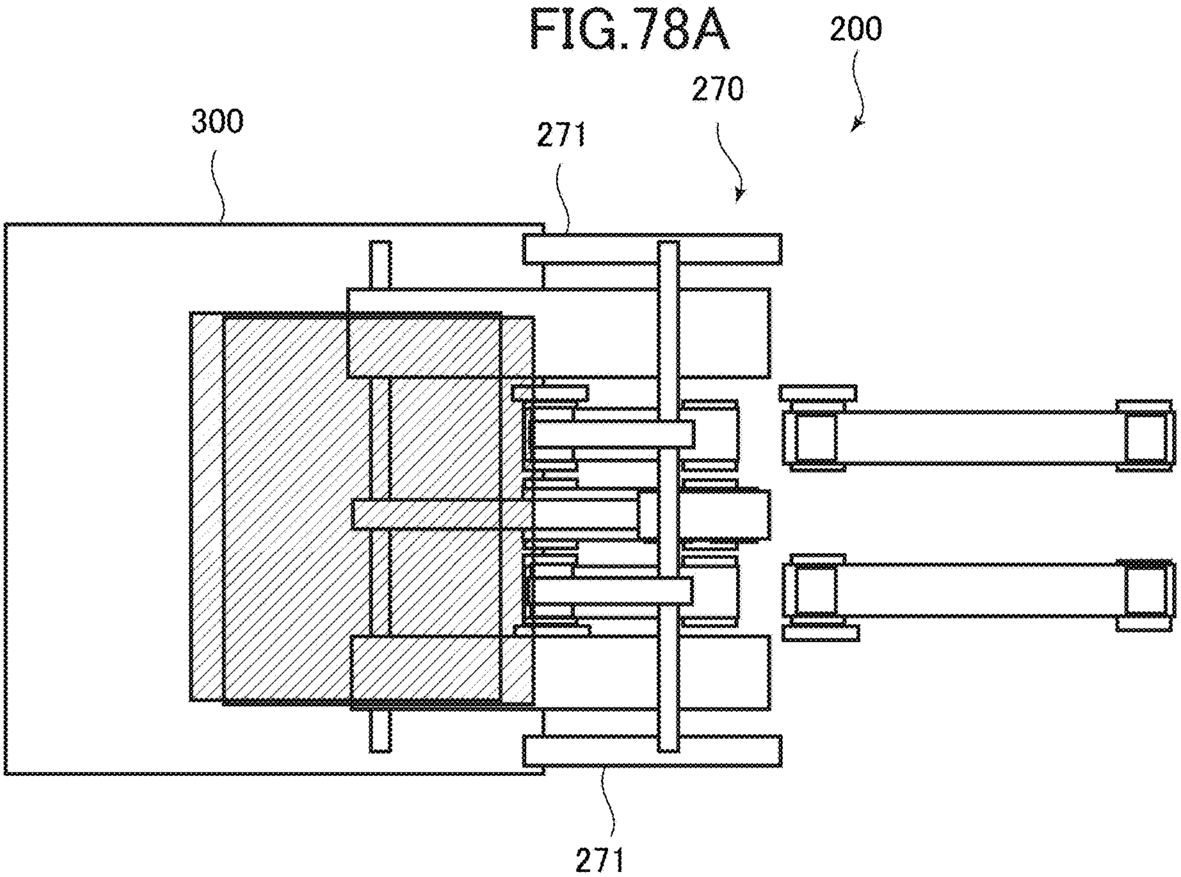

FIG. 78A is a schematic view of the sheet processing apparatus as viewed from above illustrating a state in which the stacking tray has moved up in the sheet discharge operation according to the second embodiment.

Figure 78B:
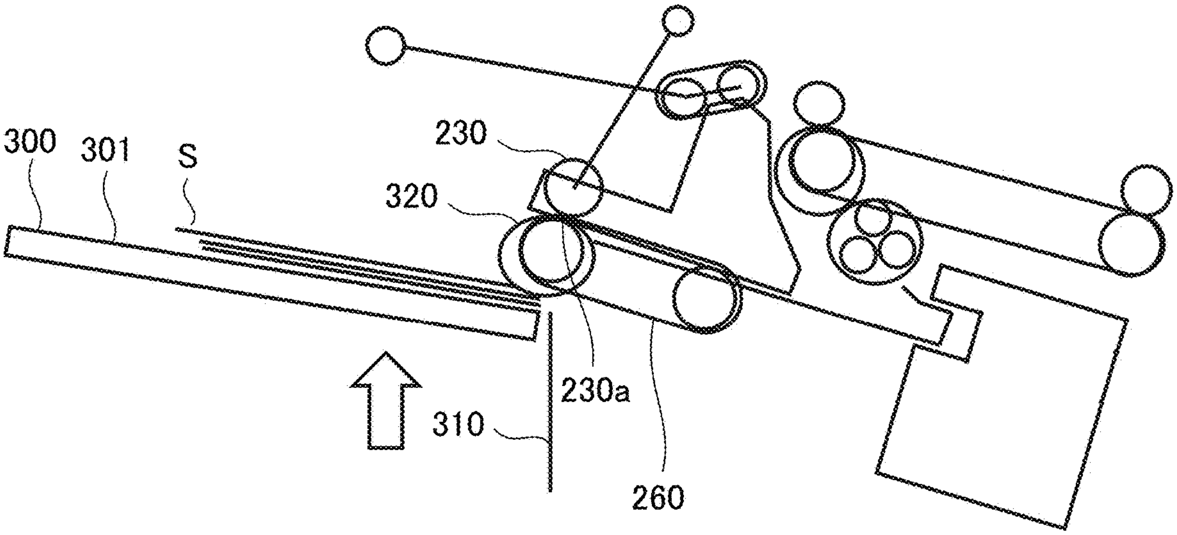

FIG. 78B is a schematic view of the sheet processing apparatus as viewed from the side illustrating the state in which the stacking tray has moved up in the sheet discharge operation according to the second embodiment.

Figure 79A:
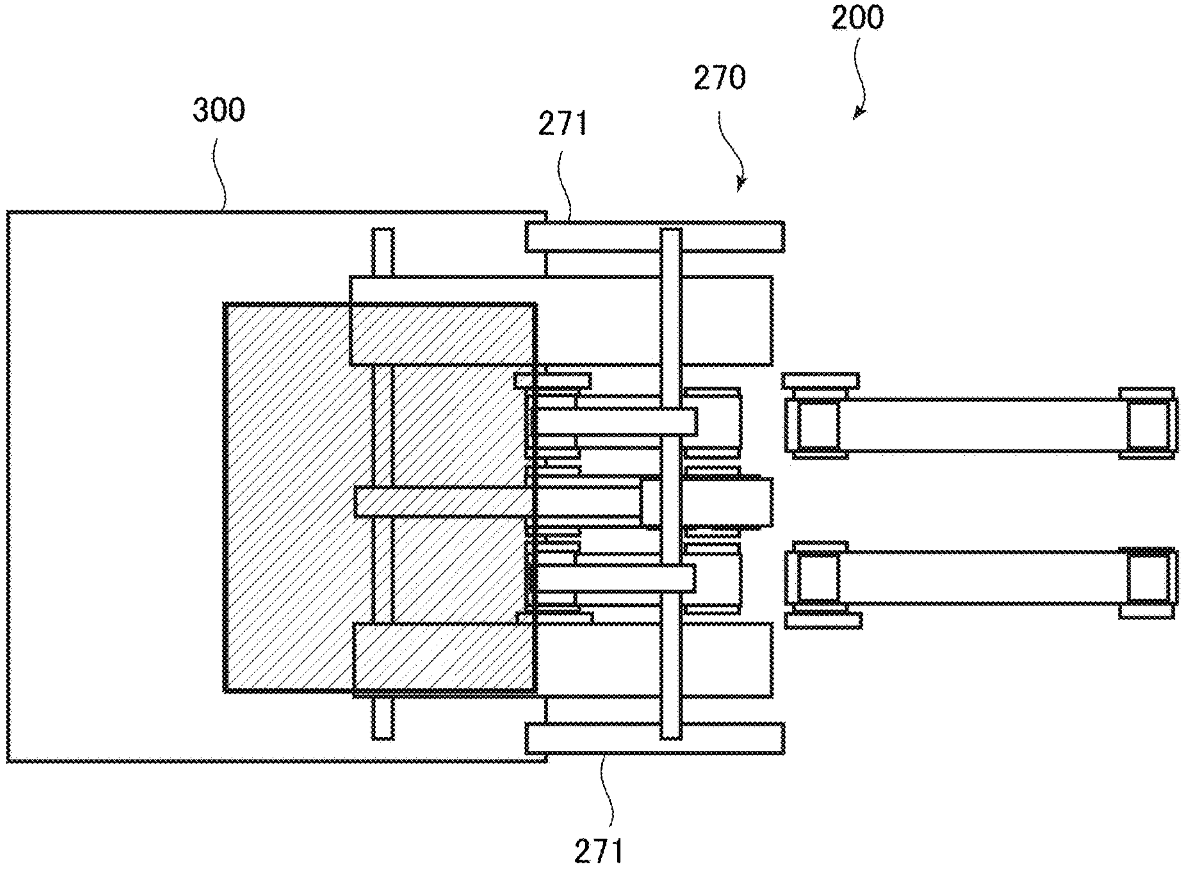

FIG. 79A is a schematic view of the sheet processing apparatus as viewed from above illustrating a state in which the trailing end of the sheet stacked on the stacking tray is pressed by the discharged sheet rake-in belt in the sheet discharge operation according to the second embodiment.

Figure 79B:
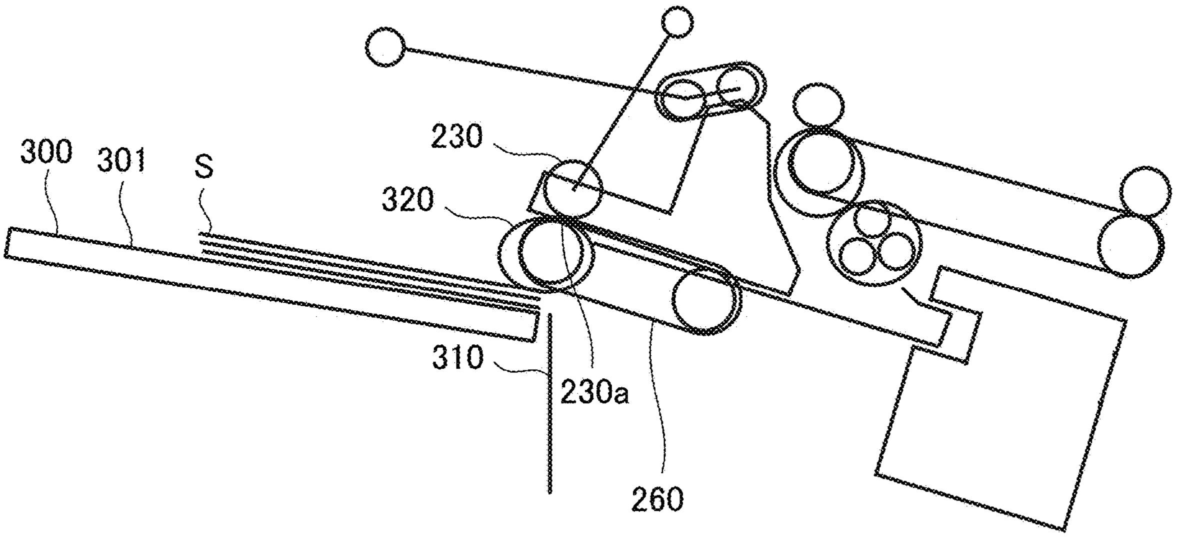

FIG. 79B is a schematic view of the sheet processing apparatus as viewed from the side illustrating the state in which the trailing end of the sheet stacked on the stacking tray is pressed by the discharged sheet rake-in belt in the sheet discharge operation according to the second embodiment.

Figure 80:
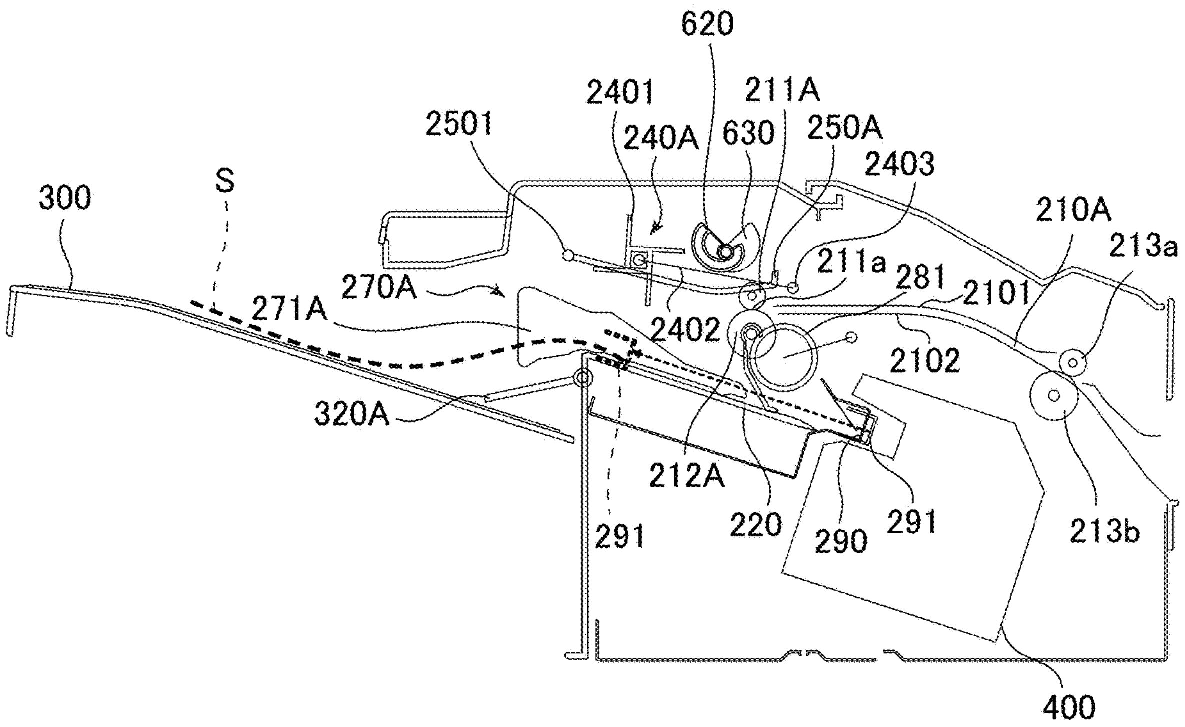

FIG. 80 is a schematic configurational section view of a sheet processing apparatus according to a first example of a third embodiment.

Figure 81:
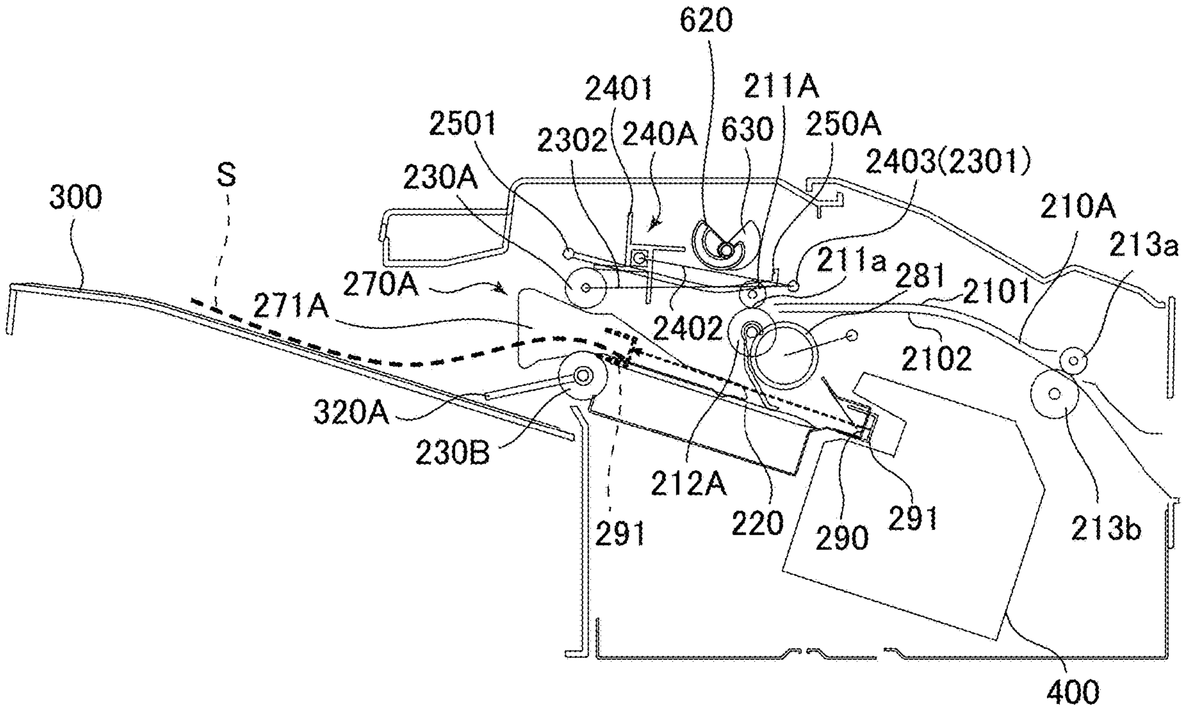

FIG. 81 is a schematic configurational section view of a sheet processing apparatus according to a second example of the third embodiment.

Figure 82A:
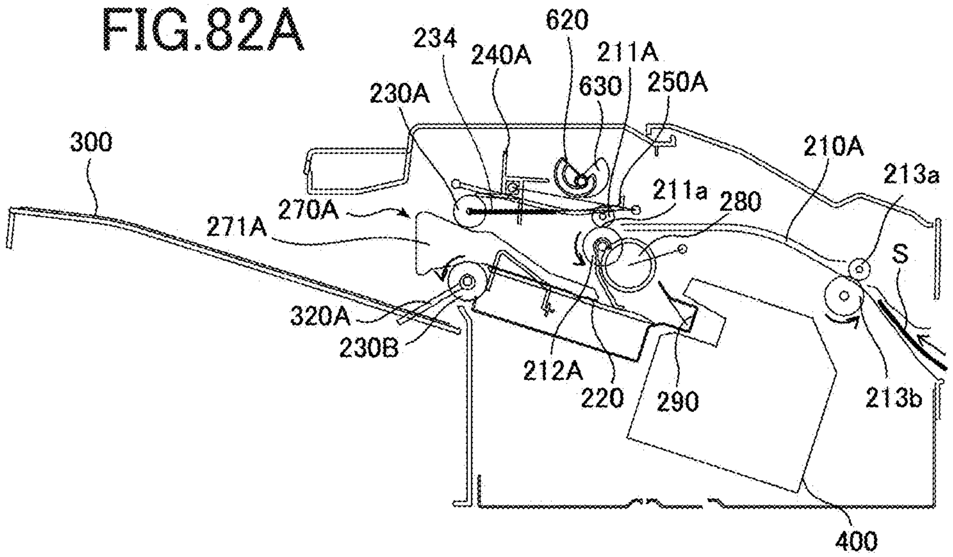

FIG. 82A is a schematic configurational section view of a sheet processing apparatus according to a third example of the third embodiment, and is a schematic configurational section view of the sheet processing apparatus at a home position in a first shift discharge process.

Figure 82B:
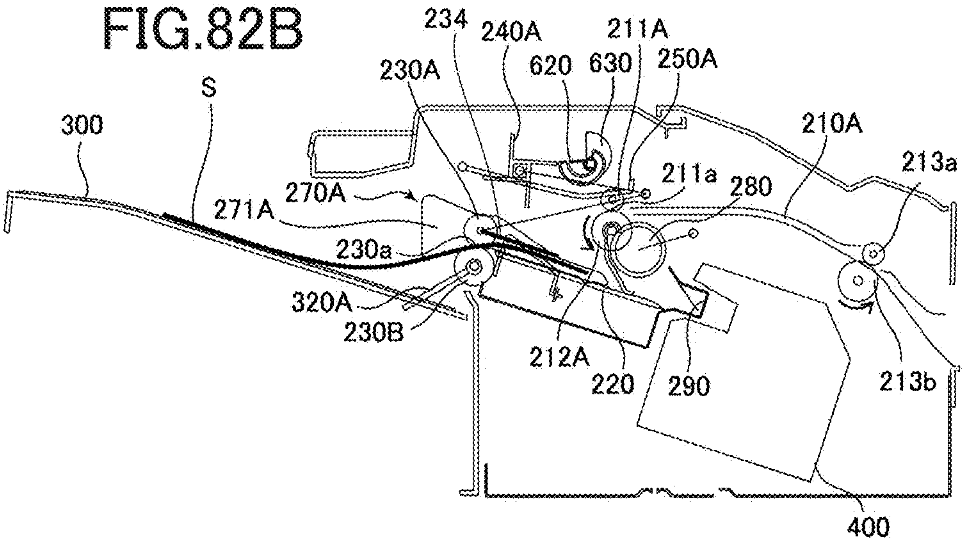

FIG. 82B is a schematic configurational section view of the sheet processing apparatus according to the third example of the third embodiment, and is a schematic configurational section view of the sheet processing apparatus during descent of upper discharge rollers in the first shift discharge process.

Figure 82C:
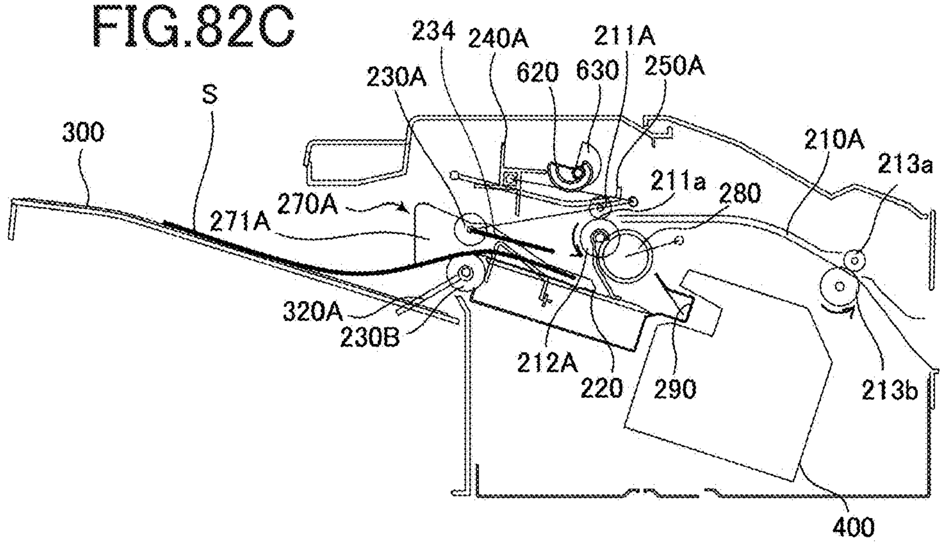

FIG. 82C is a schematic configurational section view of the sheet processing apparatus according to the third example of the third embodiment, and is a schematic configurational section view of the sheet processing apparatus when the sheet is shifted by alignment plates in the first shift discharge process.

Figure 83A:
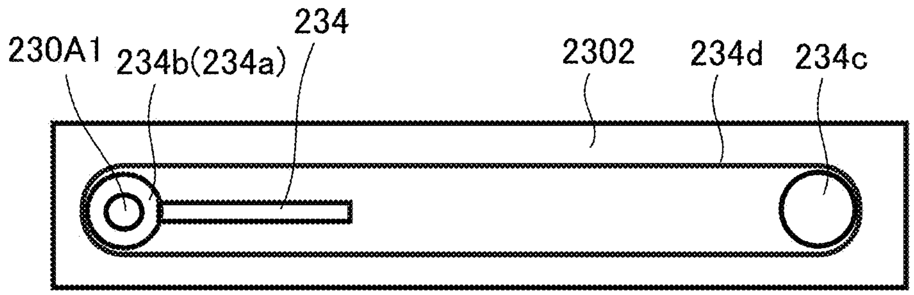

FIG. 83A is a schematic view of a discharge arm and a second trailing end dropping member according to the third example of the third embodiment, and is a diagram illustrating a state in which the second trailing end dropping member is at an upper position.

Figure 83B:
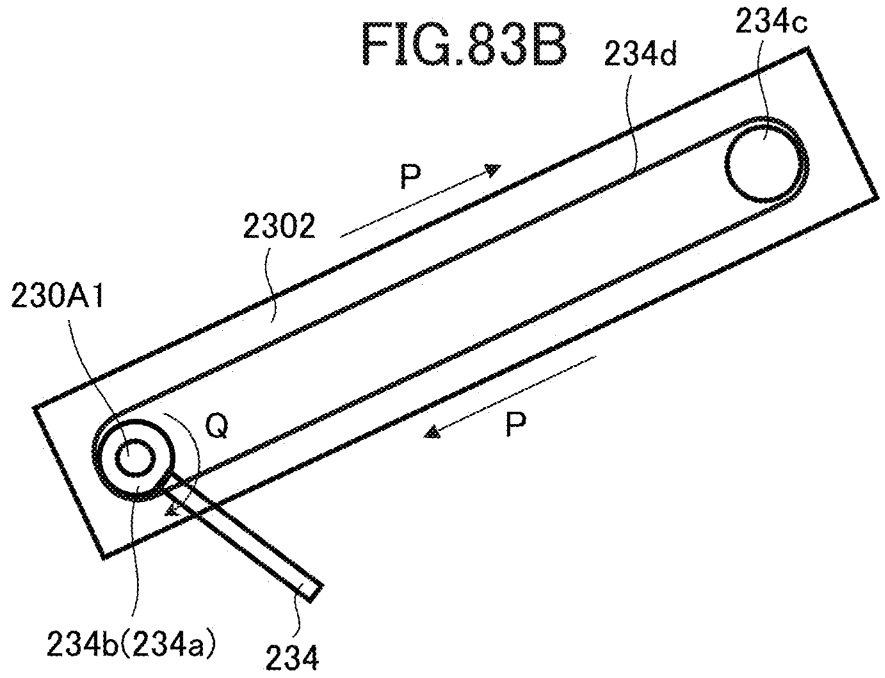

FIG. 83B is a schematic view of the discharge arm and the second trailing end dropping member according to the third example of the third embodiment, and is a diagram illustrating a state in which the second trailing end dropping member is at a lower position.

Figure 84A:
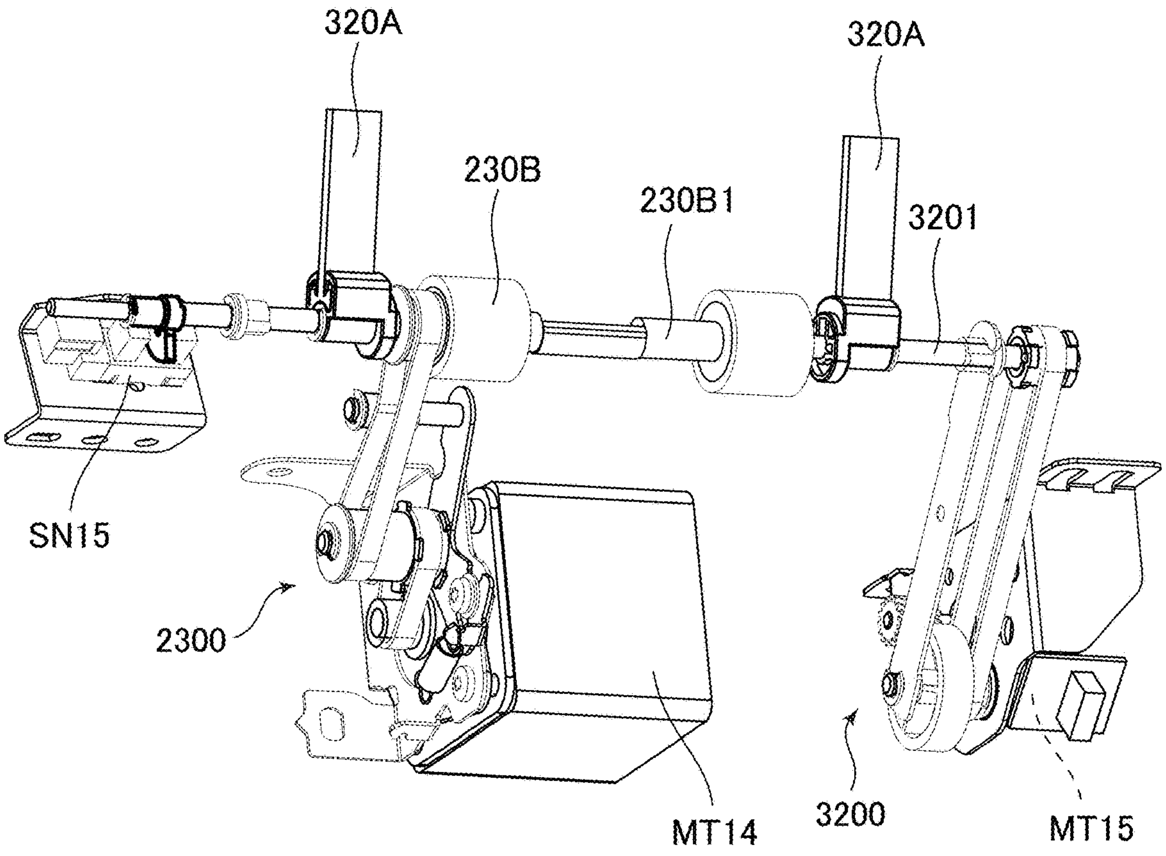

FIG. 84A is a perspective view of the vicinity of discharge rake-in paddles according to the first embodiment.

Figure 84B:
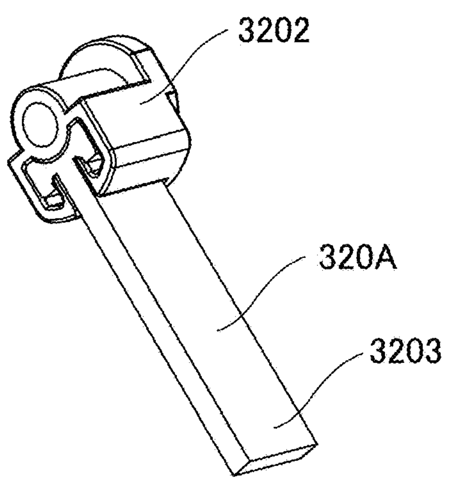

FIG. 84B is a perspective view of the discharge rake-in paddle according to the first embodiment.

Figure 85:
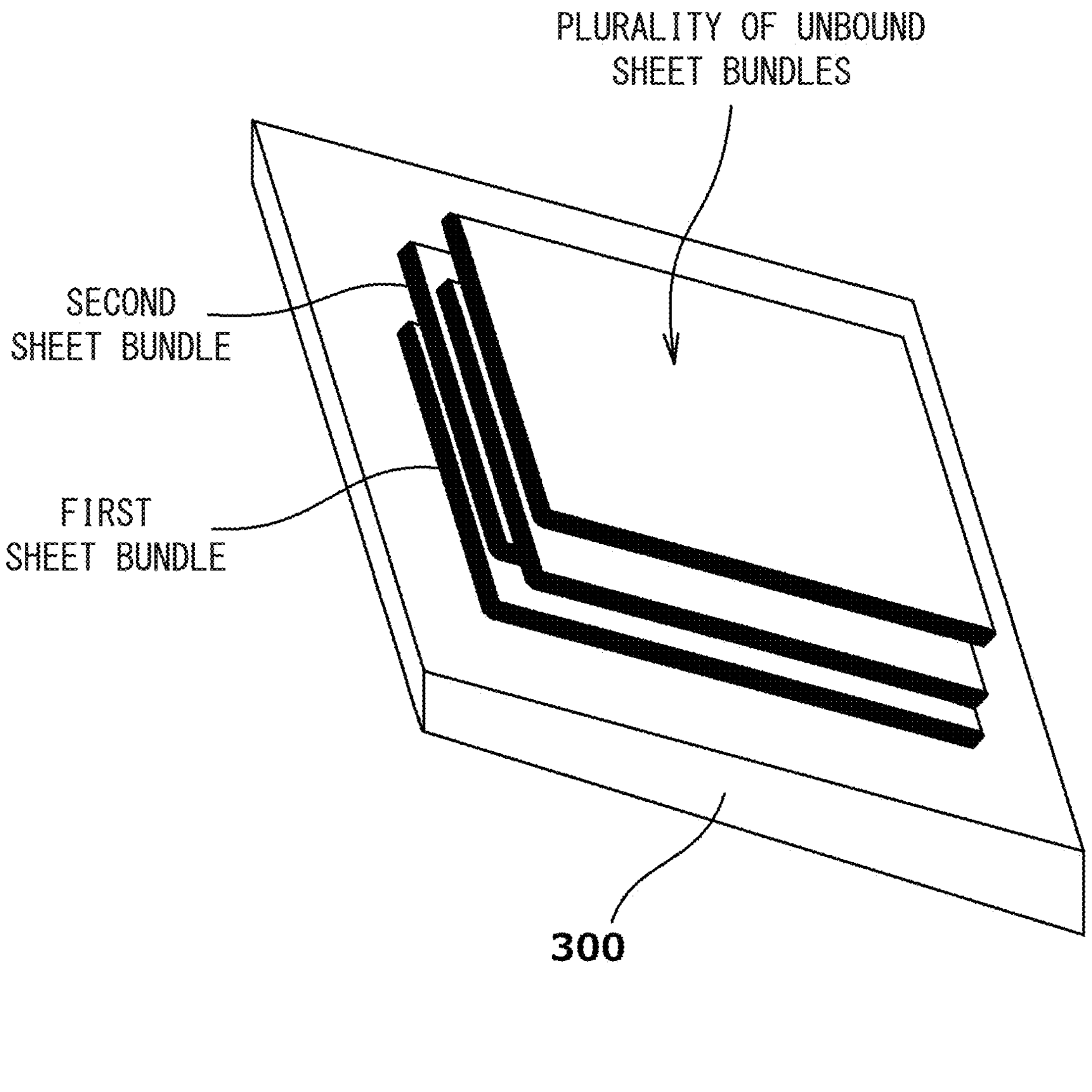

FIG. 85 is a perspective view illustrating a state in which an unbound sheet bundle moved in a shift direction is formed on the stacking tray.

Figure 86:
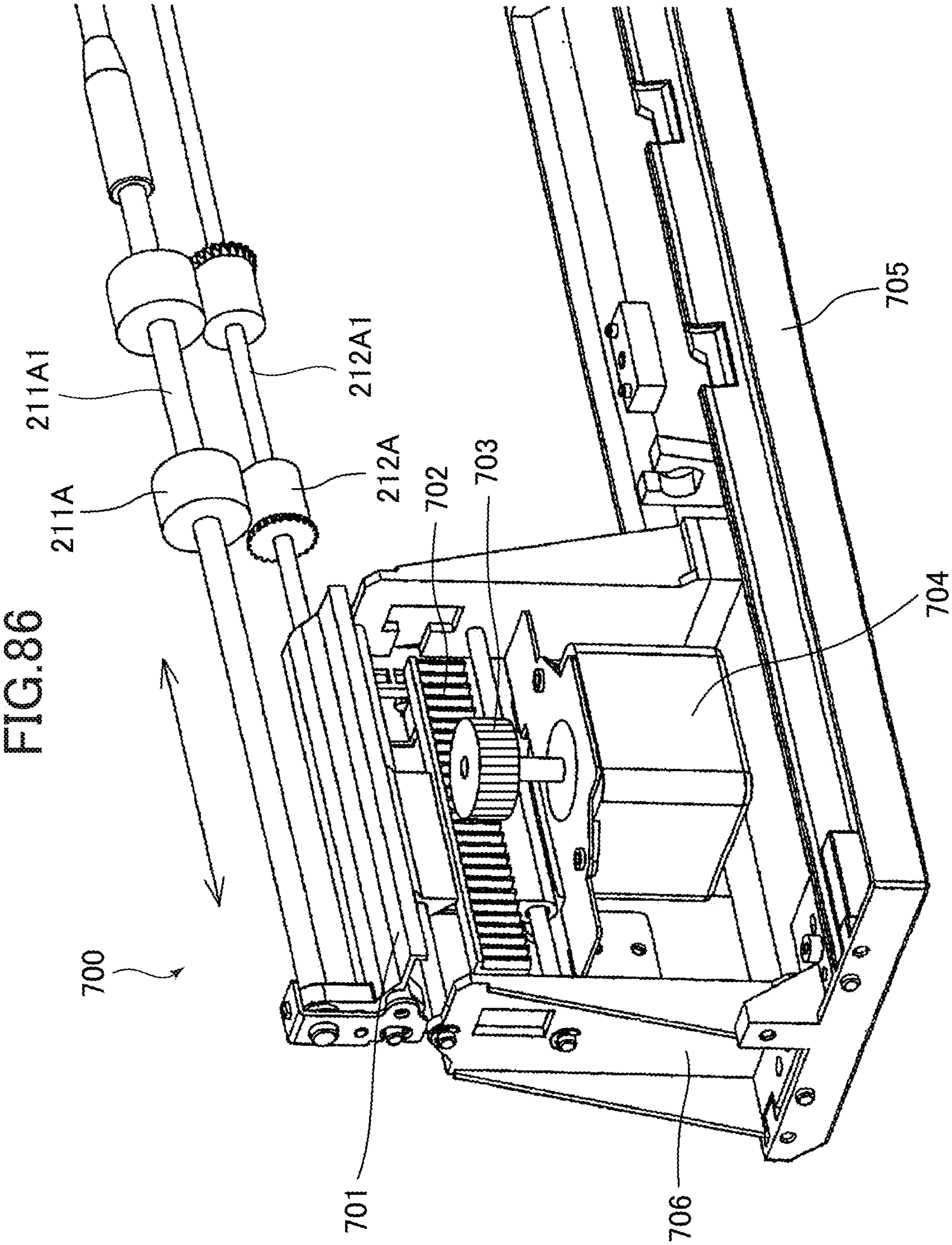

FIG. 86 is a perspective view of a shifting mechanism according to a fourth embodiment.

DESCRIPTION OF THE EMBODIMENTS

First Embodiment

A first embodiment will be described with reference to FIGS. 1 to 34B. First, a schematic configuration of an image forming system of the present embodiment will be described with reference to FIG. 1.

Image Forming System

Figure 1:
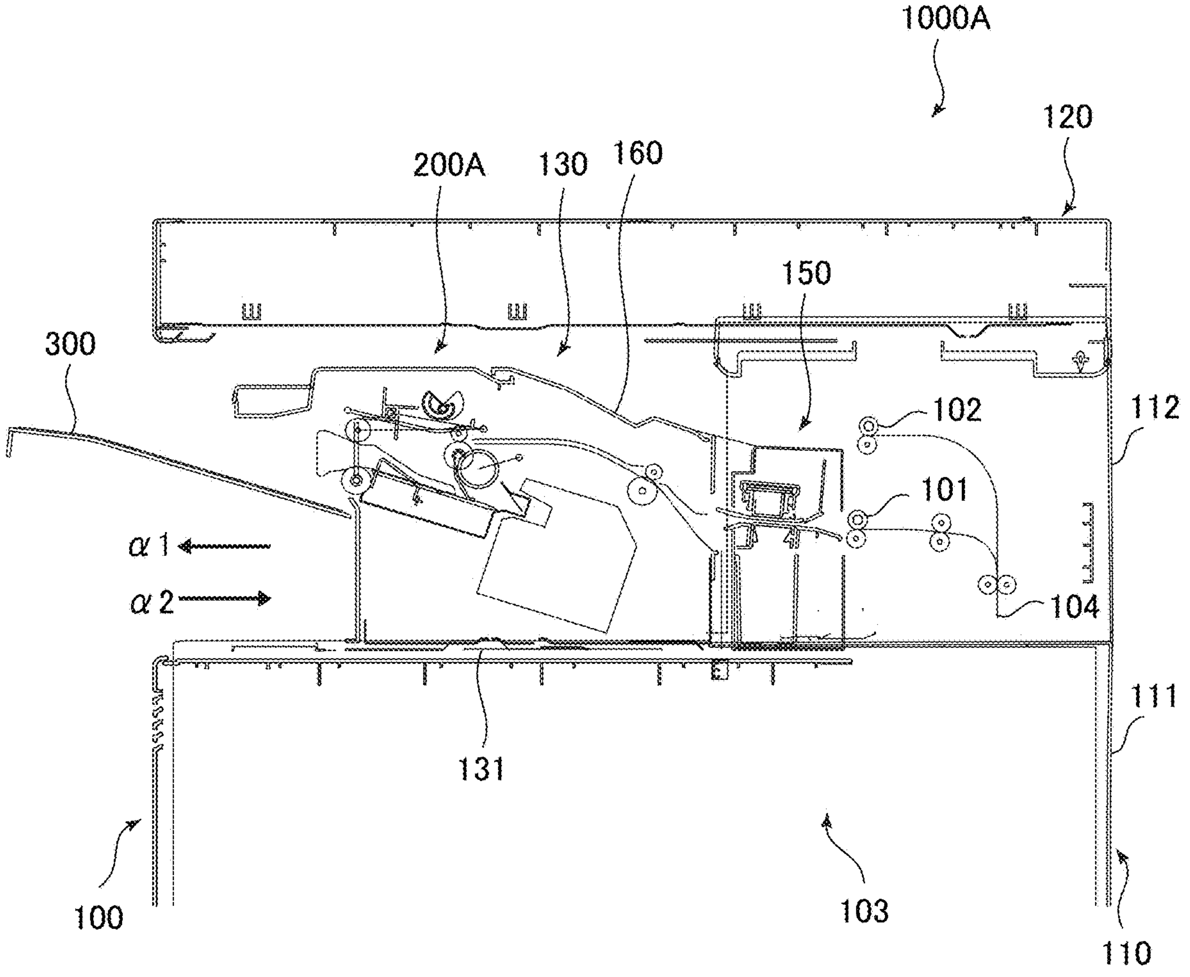
FIG. 1 is a schematic configurational section view of an image forming system according to a first embodiment.

FIG. 1 is a section view illustrating a schematic configuration of the image forming system of the present embodiment. An image forming system 1000A includes an image forming apparatus 100, a puncher unit 150, and a sheet processing apparatus 200A. The image forming apparatus 100 is a copier, a printer, a facsimile machine, a multifunctional apparatus having a plurality of functions of these, or the like, and forms an image on a sheet such as a paper sheet or a plastic sheet. In the present embodiment, a printer of an electrophotographic system is employed, and a sheet on which a toner image is formed is discharged through a first discharge portion 101 or a second discharge portion 102. To be noted, the image forming apparatus 100 may be an image forming apparatus of an ink jet system.

In the image forming apparatus of the present embodiment, a toner image is formed on the sheet in an image forming portion 103, although detailed illustration thereof is omitted. In simple description, an electrostatic latent image is formed on a photosensitive drum by charging the surface of the photosensitive drum and exposing the surface. Then, a developing apparatus develops this electrostatic latent image into a toner image by using developer. The toner image formed on the photosensitive drum is transferred onto the sheet, and is further heated and pressurized in the fixing apparatus and thus fixed to the sheet. The sheet to which the toner image is fixed is delivered to the first discharge portion 101 or the second discharge portion 102 through a conveyance path 104.

In addition, the image forming apparatus 100 of the present embodiment includes an image forming apparatus body 110 including the image forming portion 103, the conveyance path 104, the first discharge portion 101, and the second discharge portion 102, and an image reading portion 120 provided above the image forming apparatus body 110. The image reading portion 120 reads an image on a document, and sends an image signal obtained by the reading to the image forming apparatus body 110. The image forming apparatus body 110 includes a first casing portion 111 in which the image forming portion 103 is disposed, and a second casing portion 112 in which part of the conveyance path 104, the first discharge portion 101, and the second discharge portion 102 are disposed, and the second casing portion 112 is provided above the first casing portion 111. The image reading portion 120 is provided above the second casing portion 112. In addition, the second casing portion is provided with an unillustrated operation panel, and thus it is possible to receive input of an instruction (printing condition, mode setting, and the like) for the image forming apparatus 100, the puncher unit 150, and the sheet processing apparatus 200A from a user.

In the present embodiment, as a result of this configuration, an in-body space 130 surrounded by the first casing portion 111, the second casing portion 112, and the image reading portion 120 is provided. Further, a configuration in which the sheet is discharged to the in-body space 130 from the first discharge portion 101 or the second discharge portion 102 is employed. In addition, the puncher unit 150, the sheet processing apparatus 200A, and the like are attachable to and detachable from the in-body space 130. Although the image forming system 1000A is constituted by attaching the puncher unit 150 and the sheet processing apparatus 200A in the present embodiment, a configuration in which only one of these or an apparatus that performs different sheet processing is attached may be employed.

The puncher unit 150 is connected to the first discharge portion 101, and is capable of receiving the sheet discharged from the first discharge portion 101 and performing a punching process on the sheet. The sheet processing apparatus 200A is connected to a sheet discharge portion of the puncher unit 150, and receives the sheet discharged from the puncher unit 150, and is capable of performing a predetermined process such as stapling on the sheet, the details of which will be described later. To be noted, the sheet can be passed onto the sheet processing apparatus 200A without performing the punching process by the puncher unit 150, and the sheet can be discharged without performing the predetermined process in the sheet processing apparatus 200A. To be noted, the sheet discharged from the second discharge portion 102 is discharged onto a sheet placement surface 160 above the puncher unit 150 and the sheet processing apparatus 200A.

A rail 131 is provided in the left-right direction in FIG. 1 in the in-body space 130, and the puncher unit 150 and the sheet processing apparatus 200A are attachable and detachable in arrow α1 and α2 directions along the rail 131. To be noted, the sheet processing apparatus 200A can be also directly connected to the first discharge portion 101 by omitting the puncher unit 150. In addition, jam removal of the sheet is made possible by configuring the puncher unit 150 and the sheet processing apparatus 200A to be attachable and detachable as described above.

For example, in the case where the sheet is jammed in the first discharge portion 101, the first discharge portion 101 is exposed by drawing out the puncher unit 150 and the sheet processing apparatus 200A in the arrow α1 direction. In addition, in the case where a jam of the sheet has occurred in the puncher unit 150, only the sheet processing apparatus 200A is drawn out in the arrow α1 direction to expose the puncher unit 150. When attaching the puncher unit 150 and the sheet processing apparatus 200A to the image forming apparatus 100, each is pushed in in the arrow α2 direction. As described above, in the present embodiment, since the sheet processing apparatus 200A is disposed in the in-body space 130 of the image forming apparatus 100, there is a demand to miniaturize the sheet processing apparatus 200A.

[Sheet Processing Apparatus]

The configuration of the sheet processing apparatus 200A of the present embodiment will be described with reference to FIGS. 2 to 11C. First, the overall configuration of the sheet processing apparatus 200A will be described with reference to FIGS. 2 and 3.

[Overall Configuration of Sheet Processing Apparatus]

The sheet processing apparatus 200A includes a conveyance path 210A, pre-processing rollers 211A and 212A serving as a first conveyance portion, a processing tray 220 serving as a placement portion, an upper discharge roller (nipping member) 230A and a lower discharge roller 230B serving as a pair of discharge rotary members (discharge portion), a rake-in paddle 240A serving as a second conveyance portion, a trailing end dropping member 250A serving as a sheet dropping portion, an alignment portion 270A serving as first and second shifting portions, a returning member 280, a trailing end regulating member 290 serving as an abutment portion, a stacking tray 300 serving as a stacking portion, a discharged sheet rake-in paddle (sheet pressing paddle) 320A serving as a rake-in portion, and the like. The sheet received from the image forming apparatus 100 or the puncher unit 150 is conveyed to the conveyance path 210A.

The sheet conveyed from the conveyance path 210A is directly discharged onto the stacking tray 300, or placed on the processing tray 220 in accordance with the mode for processing the sheet. To be noted, directly discharging onto the stacking tray 300 means discharging the sheet onto the stacking tray 300 without conveying the sheet in a reverse direction on the processing tray 220 to a position where the stapling process is executable. In other words, the sheet processing apparatus 200A has a mode for discharging the sheet subjected to the stapling process by the stapling unit 400 onto the stacking tray 300 and a mode for discharging the sheet onto the stacking tray 300 without performing the stapling process by the stapling unit 400. In the present embodiment, alignment of sheets is enabled by the alignment portion 270A without placement on the processing tray 220. In addition, alignment of sheets is also possible on the processing tray 220, and stapling can be performed on the sheets placed on the processing tray 220 by the stapling unit 400. In addition, a sheet or a sheet bundle placed on the processing tray 220 can be discharged onto the stacking tray 300 by the upper discharge roller 230A and the lower discharge roller 230B serving as a pair of discharge rotary members, and the like. Detailed description of the configuration of each component will be given below.

[Conveyance Path]

Figure 2:
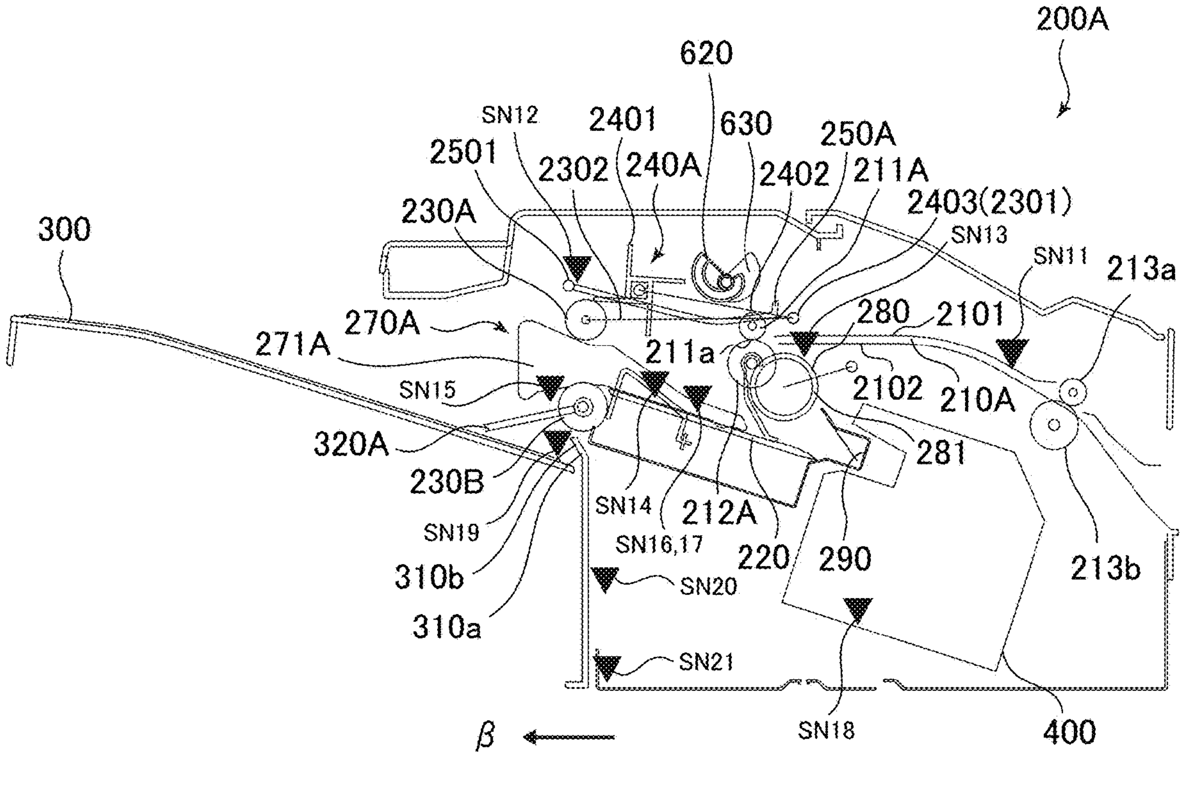
FIG. 2 is a schematic configurational section view of a sheet processing apparatus according to the first embodiment.

The conveyance path 210A is a path for conveying the sheet in a first conveyance direction (predetermined direction), and includes an upper guide 2101 that guides the upper surface of the conveyed sheet, and a lower guide 2102 that guides the lower surface of the sheet. In the conveyance path 210A, the pre-processing rollers 211A and 212A serving as a first conveyance portion (pair of conveyance rotary members), and upstream rollers (inlet rollers) 213*a* and 213*b* are disposed. These pairs are disposed so as to be separated in a width direction of the sheet (arrow γ direction of FIG. 3)

intersecting with the conveyance direction of the sheet (first conveyance direction, arrow β direction (left-right direction) of FIG. 2).

The pre-processing rollers 211A and 212A are a first conveyance portion and a pair of conveyance rotary members that convey the sheet, and at least one thereof rotates while nipping the sheet. At least one of the upstream rollers 213*a* and 213*b* rotates while nipping the sheet. The upstream rollers 213*a* and 213*b* are disposed at an entrance of the sheet processing apparatus 200A, receive the sheet conveyed from the upstream side of the sheet processing apparatus 200A, and conveys the received sheet to the conveyance path 210A. Then, the sheet having passed the conveyance path 210A reaches the pre-processing rollers 211A and 212A.

The pre-processing rollers 211A and 212A form a pre-processing nip portion 211*a* capable of nipping and conveying the sheet. Then, the sheet is nipped and conveyed in the first conveyance direction in the pre-processing nip portion 211*a*, and is discharged from the conveyance path 210A. As will be described later, the pre-processing rollers 211A and 212A are capable of coming into contact with or out of contact from each other, or the nip pressure thereof can be changed.

[Processing Tray]

The processing tray 220 serving as a placement portion is disposed downstream of the conveyance path 210A in the sheet conveyance direction (first conveyance direction) and below the conveyance path 210A in the vertical direction. In addition, the processing tray 220 is inclined with respect to the horizontal surface such that the upstream side thereof in the first conveyance direction is lower than the downstream side thereof. On the processing tray 220, the sheet conveyed downstream in the first conveyance direction by the pre-processing rollers 211A and 212A is temporarily placed. In addition, a plurality of sheets can be stacked and supported on the processing tray 220, and alignment in the width direction and movement in the width direction of the sheets (shift of the sheets) are performed by the alignment portion 270A on the processing tray 220. In addition, a trailing end regulating member 290 serving as an abutment portion that the upstream edge in the first conveyance direction of the sheet placed on the processing tray 220 (a trailing end of the sheet) is caused to abut is disposed at an upstream end of the processing tray 220 in the first conveyance direction. To be noted, part (for example, a downstream end portion in the first conveyance direction) of the processing tray 220 may project upward in the vertical direction more than the conveyance path 210A.

In addition, the stapling unit 400 serving as a processing portion is disposed upstream of the processing tray 220 in the first conveyance direction. The stapling unit 400 performs the stapling process (binding process) serving as a predetermined process on a sheet bundle subjected to alignment in the width direction and regulation of the trailing end on the processing tray 220. The stapling unit 400 is capable of changing the stapling position on the sheet bundle, and moves in accordance with the stapling position. To be noted, the predetermined process may be a process different from stapling such as punching. The sheet or sheet bundle placed on the processing tray 220 is discharged onto the stacking tray 300 by the upper discharge roller 230A and the lower discharge roller 230B as will be described later.

[Rake-in Paddle]

A rake-in paddle 240A serving as a second conveyance portion conveys the sheet in a second conveyance direction in which the upstream edge in the first conveyance direction of the sheet on the processing tray 220 moves toward the trailing end regulating member 290 (switchback conveyance). The rake-in paddle 240A includes a paddle portion 2401 serving as a rotary member, a paddle arm 2402 serving as a support portion that supports the paddle portion 2401, and a swing fulcrum 2403 that swingably supports the paddle arm 2402. That is, the paddle arm 2402 is capable of swinging in the up-down direction about the swing fulcrum 2403, and the paddle portion 2401 is rotatably provided at a distal end of the paddle arm 2402.

Figure 3:
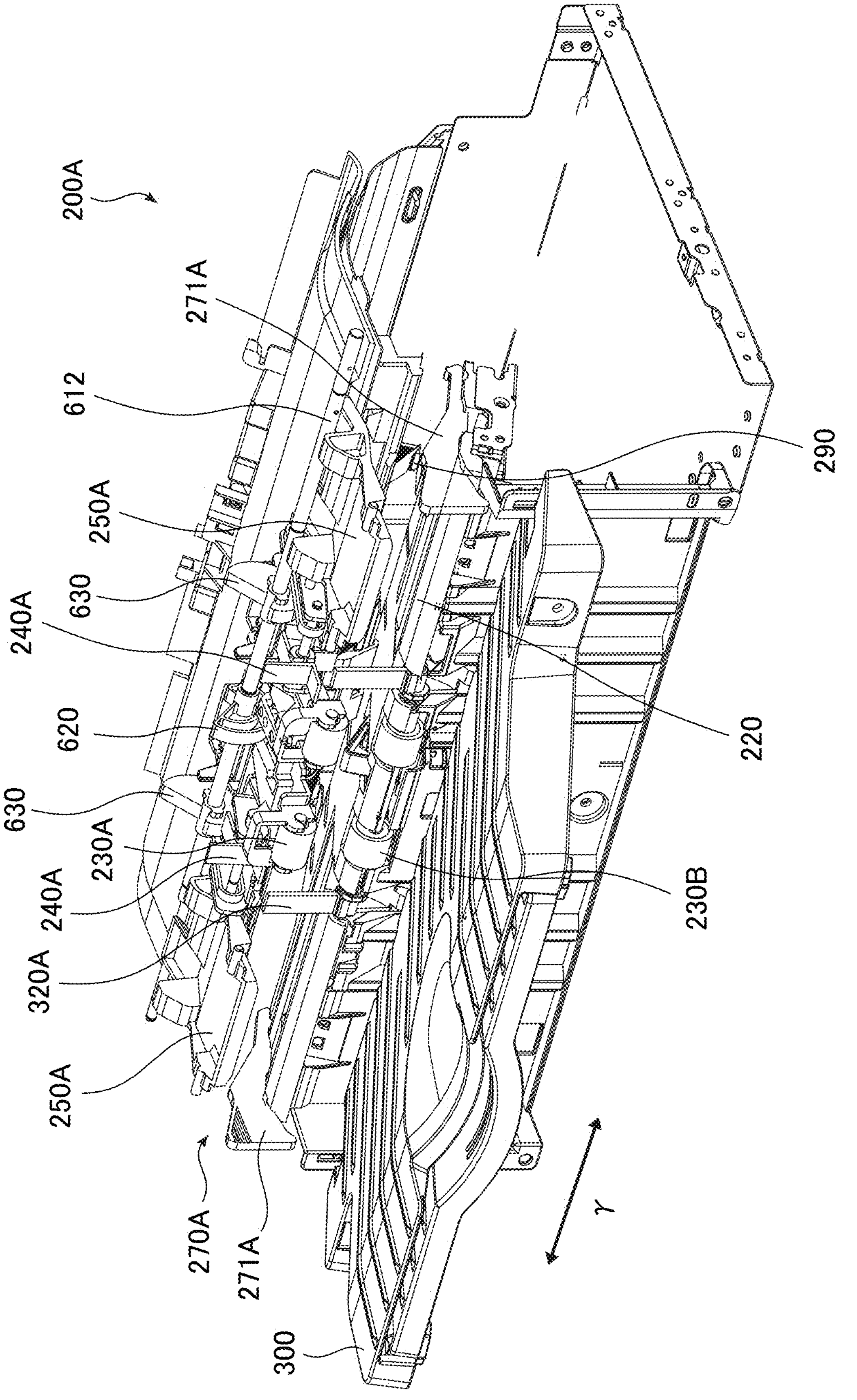
FIG. 3 is a schematic configurational perspective view of the sheet processing apparatus according to the first embodiment in a state in which a top cover is detached.

The rake-in paddle 240A configured in this manner is capable of swinging about the swing fulcrum 2403, between a returning position where the paddle portion 2401 abuts the upper surface of the sheet on the processing tray 220 and is capable of conveying the sheet in the second conveyance direction and an upper retracted position where the paddle portion 2401 is retracted upward from the returning position. The swing fulcrum 2403 is disposed at a position upstream of the pre-processing nip portion 211*a* serving as a nip position where the pre-processing rollers 211A and 212A nip the sheet in the first conveyance direction and above the pre-processing nip portion 211*a* in the vertical direction. Further, the paddle arm 2402 is provided to extend downstream in the first conveyance direction from the swing fulcrum 2403, and the paddle portion 2401 is provided at a distal end portion thereof. In addition, the rake-in paddle 240A is provided as a pair on respective sides of the upper discharge roller 230A, which will be described later, in the width direction as illustrated in FIG. 3.

[Trailing End Dropping Member]

The trailing end dropping member 250A serving as a sheet dropping portion is provided as a pair on respective sides of the pair of rake-in paddles 240A. That is, the pair of trailing end dropping members 250A are disposed on respective sides of the rake-in paddles 240A in the width direction, moves in the up-down direction in an interlocked manner with the rake-in paddles 240A as will be described later, and thus abut the upper surface of the upstream side of the sheet in the first conveyance direction to operate to drop the upstream end portion (trailing end portion) of the sheet toward the processing tray 220. To be noted, the trailing end dropping members 250A may be configured to operate by being driven by a different driving system than the rake-in paddles 240A.

The trailing end dropping members 250A configured in this manner include a pivot shaft 2501 serving as a pivot center at a position downstream of the pre-processing rollers 211A and 212A serving as a pair of conveyance rollers in the first conveyance direction, are provided to extend upstream in the first conveyance direction from the pivot shaft 2501, and are capable of pivoting between an upper position above the pre-processing rollers 211A and 212A and a lower position below the pre-processing rollers 211A and 212A about the pivot shaft 2501. The trailing end dropping members 250A pivot from the upper position to the lower position, and thus abut, from above, the sheet conveyed by the pre-processing rollers 211A and 212A to drop the sheet onto the processing tray 220 below.

[Returning Member]

The returning member 280 conveys the sheet conveyed toward the trailing end regulating member 290 by the rake-in paddles 240A as described above further toward the trailing end regulating member 290, and causes the trailing end of the sheet to abut the trailing end regulating member 290 to regulate the trailing end position of the sheet. The returning member 280 configured in this manner is constituted by a knurled belt 281, and by rotationally driving the knurled belt 281, the sheet conveyed upstream in the first conveyance direction by the rake-in paddles 240A is further raked in, and thus the trailing end is caused to abut the trailing end regulating member 290. The returning member 280 is capable of moving between an abutting position where the returning member 280 is capable of abutting the sheet and a retracted position where the returning member 280 is retracted upward from the abutting position, and moves to the abutting position in the case of conveying the sheet toward the trailing end regulating member 290 and to the retracted position in the case of conveying the sheet on the processing tray 220 toward the stacking tray 300, respectively.

[Discharge Rollers]

The upper discharge roller (upper discharge rotary member) 230A and the lower discharge roller (lower discharge rotary member) 230B constitute a pair of discharge rotary members and a discharge portion, and convey the sheet conveyed downstream in the first conveyance direction by the pre-processing rollers 211A and 212A to the downstream side of the processing tray 220 in the first conveyance direction to discharge the sheet. The upper discharge roller 230A and the lower discharge roller 230B are capable of moving to a nipping position where the sheet conveyed in the first conveyance direction by the pre-processing rollers 211A and 212A is nipped therebetween, a separated position where the upper discharge roller 230A and the lower discharge roller 230B are separated from each other, and a retracted position where the upper discharge roller 230A and the lower discharge roller 230B are further separated from each other than at the separated position. In the present embodiment, the upper discharge roller 230A is capable of moving to a nipping position (contact position) where the sheet is nipped between the upper discharge roller 230A and the lower discharge roller 230B and a retracted position where the upper discharge roller 230A is retracted upward from the nipping position, and nips the sheet with the lower discharge roller 230B at the nipping position. That is, the upper discharge roller 230A functions as a nipping member that nips the sheet with the lower discharge roller 230B at the nipping position. Two of each of the upper discharge roller 230A and the lower discharge roller 230B are disposed at an interval in the width direction of the sheet. In the present embodiment, these are disposed on the inside of the pair of rake-in paddles 240A in the width direction.

The upper discharge rollers 230A and the lower discharge rollers 230B nip the sheet or sheet bundle at the nipping position, and conveys the nipped sheet or sheet bundle by, for example, rotation of the lower discharge rollers 230B. To be noted, the upper discharge rollers 230A are driven rollers that rotate in accordance with the rotation of the lower discharge rollers 230B, but may be configured to be driven. That is, in the present embodiment, the upper discharge rollers 230A are configured as driven rotary members, and the lower discharge rollers 230B are configured as driving rotary members. In addition, although the upper discharge rollers 230A function as nipping members capable of nipping the sheet with the lower discharge rollers 230B at the nipping position, these nipping members may be different rotary members such as belts instead of rollers, and may be abutting members that abut the sheet without rotating such as lever members.

In addition, the lower discharge rollers 230B may be rotary members such as belts other than rollers. In the case where an endless belt is used in place of the lower discharge roller 230B serving as a lower discharge rotary member, for example, this belt is stretched by a plurality of rollers, the outer peripheral surface of the belt stretched by one of the plurality of rollers abuts a nipping member such as the upper discharge roller 230A, and thus forms a discharge nip portion 230*a* (see FIG. 8B that will be described later). In this case, the rotation shaft of the lower discharge rotary member is the rotation shaft of the roller stretching the belt at the position where the discharge nip portion 230*a* is formed.

The upper discharge rollers 230A are capable of pivoting between the nipping position and the retracted position about a pivot shaft 2301. In other words, the upper discharge rollers 230A are capable of moving up and down between the nipping position and the retracted position. The upper discharge rollers 230A are provided at a distal end of a discharge arm 2302 serving as a support portion. The pivot shaft 2301 is coaxially provided with the swing fulcrum 2403 described above, and is provided at a position upstream of the pre-processing nip portion 211*a* where the pre-processing rollers 211A and 212A nip the sheet in the first conveyance direction and above the pre-processing nip portion 211*a* in the vertical direction. Further, the discharge arm 2302 is provided to extend downstream in the first conveyance direction from the pivot shaft 2301, and the upper discharge rollers 230A are provided at the distal end portion thereof. The pivot shaft 2301 does not have to be coaxially provided with the swing fulcrum 2403, but in the present embodiment, the pivot shafts of the upper discharge rollers 230A and the rake-in paddles 240A are configured to be coaxial.

The pivot shaft 2301 is disposed upstream of the discharge nip portion that nips the sheet between the upper discharge rollers 230A and the lower discharge rollers 230B in the nipping position in the first conveyance direction. In addition, at the retracted position, the upper discharge rollers 230A are positioned above the pre-processing nip portion 211*a* that nips the sheet between the pre-processing rollers 211A and 212A in the vertical direction, and the pivot shaft 2301 is positioned above the center of the upper discharge rollers 230A at the retracted position in the vertical direction.

In the state of being at the retracted position, the upper discharge rollers 230A allow the sheet having passed the pre-processing nip portion 211*a* to move toward the stacking tray 300 because the positional relationship thereof with the pivot shaft 2301 and the pre-processing nip portion 211*a* is defined as described above. Meanwhile, the upper discharge rollers 230A move downward from the retracted position to the nipping position by pivoting about the pivot shaft 2301 in a counterclockwise direction of FIG. 2. Then, as a result of the upper discharge rollers 230A moving to the nipping position, the sheet can be nipped between the upper discharge rollers 230A and the lower discharge rollers 230B.

[Alignment Portion]

The alignment portion 270A serving as a shifting portion will be described with reference to FIGS. 4A to 4C in addition to FIGS. 2 and 3. The alignment portion 270A moves the sheet in a shift direction by moving in the shift direction (width direction) intersecting with the first conveyance direction in the state of abutting an edge following the first conveyance direction of the sheet conveyed downstream in the first conveyance direction by the pre-processing rollers 211A and 212A. The alignment portion 270A configured in this manner includes a pair of alignment plates 271A serving as a first shifting portion and a second shifting portion disposed to oppose each other in the shift direction.

The pair of alignment plates 271A are disposed further downstream of the downstream end portion of the conveyance path 210A in the first conveyance direction, and align the sheet in the width direction by abutting edges of the sheet in the width direction by moving in the width direction. In the present embodiment, these are disposed on respective sides of the sheet placed on the processing tray 220 in the width direction, and are each capable of moving in the width direction. In addition, the pair of alignment plates 271A are provided to extend from the upstream side to the downstream side in the first conveyance direction with respect to the upper discharge rollers 230A and the lower discharge rollers 230B. To be noted, the pair of alignment plates 271A are configured in the same manner. The pair of alignment plates 271A move in the shift direction by being driven by a front-side (F-side) alignment plate moving motor MT16 and a rear-side (R-side) alignment plate moving motor MT17 (see FIG. 12) serving as a first driving portion and a second driving portion. In the pair of alignment plates 271A, the alignment plate on the upstream side in the shift direction serves as a first shifting portion, and the alignment plate on the downstream side in the shift direction serves as a second shifting portion, in a first shift discharge process (switch-backless shift discharge process) and a second shift discharge process (switchback shift discharge process) that will be described later. In addition, the motor that drives the first shifting portion serves as a first driving portion, and the motor that drives the second shifting portion serves as a second driving portion.

The alignment plates 271A are formed such that the width thereof in the up-down direction on the downstream side in the first conveyance direction is larger. That is, the alignment plate 271A includes a first plate portion 2701 on the downstream side in the first conveyance direction and a second plate portion 2702 formed on the upstream side in the first conveyance direction so as to be continuous with the first plate portion 2701. The first plate portion 2701 has a larger area in the up-down direction than the second plate portion 2702 so as to be capable of abutting the sheet even in the case where the leading end side of the conveyed sheet is curled up or down. In contrast, the second plate portion 2702 is formed to have a height in the up-down direction smaller than the first plate portion 2701 so as not to interfere with the trailing end dropping members 250A even in the case where the trailing end dropping members 250A are positioned at the lower position. In addition, the upper edge of the second plate portion 2702 is inclined so as to be lower on the upstream side in the first conveyance direction.

In addition, the first plate portion 2701 is formed so as to extend from the upstream side to the downstream side in the first conveyance direction of the upper discharge rollers 230A and the lower discharge rollers 230B. As a result of this, even in the case where the sheet is discharged by the first shift discharge process that will be described later, at least the first plate portion 2701 is capable of abutting the sheet. In addition, the second plate portion 2702 is positioned on the processing tray 220, and is formed to be continuous with the first plate portion 2701 in the first conveyance direction. As a result of this, at least the second plate portion 2702 is capable of abutting the sheet placed on the processing tray 220 by the second shift discharge process that will be described later.

Figure 4A:
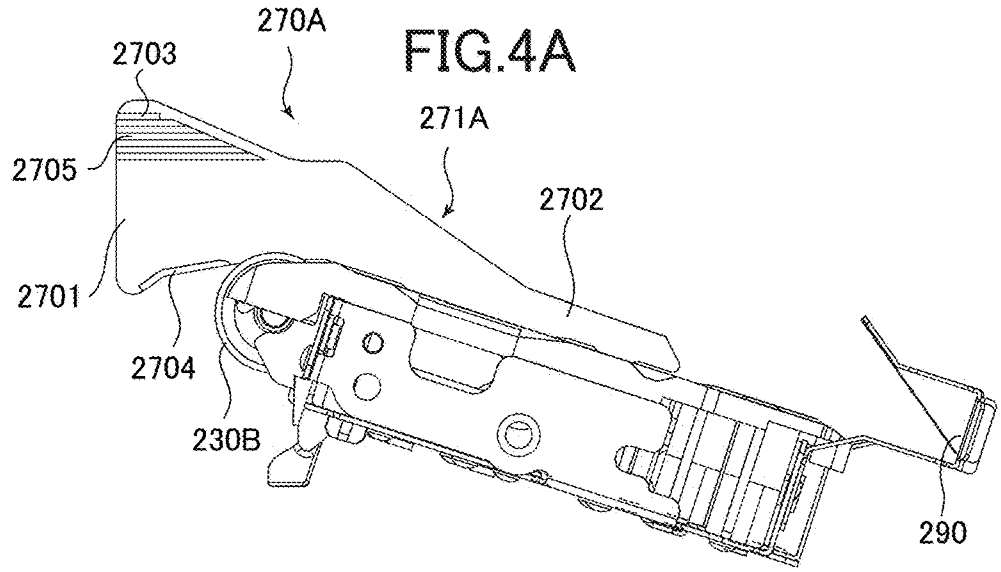
FIG. 4A is a diagram illustrating an alignment plate on a processing tray according to the first embodiment as viewed in a width direction.
Figure 4B:
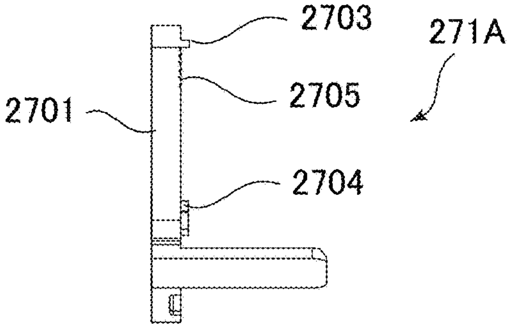
FIG. 4B is a diagram illustrating the alignment plate according to the first embodiment as viewed from the downstream side in a sheet conveyance direction.
Figure 4C:
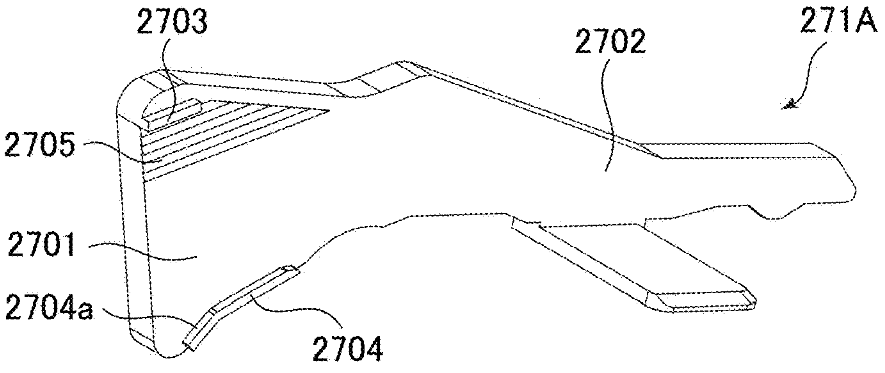
FIG. 4C is a perspective view of the alignment plate according to the first embodiment.

In addition, the first plate portion 2701 includes a curl pressing portion 2703 and a support portion 2704 as illustrated in FIGS. 4A to 4C. The curl pressing portion 2703 is provided downstream of a discharge nip portion 230*a* (see FIG. 8B that will be described later) that is a nip position where the upper discharge rollers 230A and the lower discharge rollers 230B nip the sheet in the first conveyance direction and above the discharge nip portion 230*a* in the vertical direction, and presses the leading end of the sheet that is curled up. In the present embodiment, the curl pressing portion 2703 is a projection portion projecting on the inside in the width direction (side that abuts the sheet, right side in FIG. 4B) from the upper end portion of the first plate portion 2701, and the leading end of the sheet can be pressed as a result of abutment at an edge of the curled sheet in the width direction. In addition, an uneven portion 2705 is provided below the curl pressing portion 2703, and depending on the state of the curl, the leading end of the curled sheet can be pressed as a result of the edge of the sheet in the width direction being caught by the uneven portion 2705.

The support portion 2704 is provided downstream of the discharge nip portion 230*a* that is a nip position where the upper discharge rollers 230A and the lower discharge rollers 230B nip the sheet in the first conveyance direction and below the discharge nip portion 230*a* in the vertical direction, and supports the sheet from below. In the present embodiment, the support portion 2704 is a projection portion projecting on the inside in the width direction (side that abuts the sheet, right side in FIG. 4B) from the lower end portion of the first plate portion 2701. In addition, as illustrated in FIGS. 4A and 4C, an inclined portion 2704*a* inclined downstream and downward is formed at a downstream end portion of the support portion 2704 in the first conveyance direction. As a result of this, the sheet supported by the support portion 2704 can be smoothly guided onto the stacking tray 300. In addition, as a result of the sheet downstream of the discharge nip portion 230*a* in the first conveyance direction being supported by the support portion 2704, the area of contact of the pair of alignment plates 271A with the sheet side edges can be increased as compared with an unsupported case.

[Stacking Tray]

The stacking tray 300 serving as a stacking portion stacks the sheet discharged thereonto by the upper discharge rollers 230A and the lower discharge rollers 230B as described above. The stacking tray 300 is provided downstream of the processing tray 220 in the first conveyance direction and below the processing tray 220 in the vertical direction so as to be capable of moving up and down. In addition, the stacking tray 300 is inclined with respect to the horizontal surface such that the upstream side thereof in the first conveyance direction is lower than the downstream side thereof. For example, the stacking tray 300 configured in this manner is supported to be movable in the up-down direction along a rail disposed in the up-down direction, and moves up and down by being driven by a stacking tray lifting/lowering motor MT20 (FIG. 12) serving as a lifting/lowering means.

At the upstream end of the stacking tray 300 in the first conveyance direction, an erecting surface 310*a* serving as a stacking side regulating means that regulates the upstream end (trailing end) in the predetermined direction of the sheet or sheet bundle stacked on the stacking tray 300, and a trailing end pressor 310*b* that presses the trailing end of the sheet abutting the erecting surface 310*a* are provided. The trailing end pressor 310*b* is inclined upward to the downstream side in the first conveyance direction, and even in the case where the trailing end of the sheet is curled up, the trailing end can be pressed by the trailing end pressor 310*b*.

In addition, discharged sheet rake-in paddles 320A are provided coaxially with a rotation shaft 230B1 of the lower discharge rollers 230B (see FIGS. 84A and B that will be described later). To be noted, a rotation shaft 3201 of the discharged sheet rake-in paddles 320A (see FIG. 2 and FIGS. 84A and B that will be described later) does not have to be coaxial with the rotation shaft 230B1. It suffices as long as the rotation shaft 3201 of the discharged sheet rake-in paddles 320A is, in the vertical direction, provided between the discharge nip portion 230*a* (see FIG. 8B that will be described later) of the upper discharge roller 230A and the lower discharge roller 230B serving as a pair of discharge rotary members and an erecting surface 310*a* serving as a stacking-side abutment portion provided on the upstream side of the stacking tray 300 in the first conveyance direction of the stacking tray 300. In the present embodiment, as illustrated in FIG. 2, the rotation shaft 3201 of the discharged sheet rake-in paddles 320A is, in the vertical direction, disposed between the downstream end portion of the processing tray 220 in the first conveyance direction and the upper end portion of the erecting surface 310*a*.

The stacking tray 300 is capable of being moved up and down by the stacking tray lifting/lowering motor MT20 between a first stacking position and a second stacking position below the first stacking position. The second stacking position is a position where the movement of the stacking tray 300 moving down when discharging the sheet onto the stacking tray 300 is switched to upward movement. When discharging the sheet, the stacking tray 300 moves up and down, the discharged sheet rake-in paddles 320A rotate, and the sheet on the stacking tray 300 is conveyed (raked in) in a third conveyance direction in which the upstream edge of the sheet in the first conveyance direction moves toward the erecting surface 310*a*. Further, the upper surface of a sheet or a sheet bundle constituted by a plurality of sheets on the stacking tray 300 is pressed by the discharged sheet rake-in paddles 320A.

[Configuration around Discharged Sheet Rake-in Paddles]

Here, the configuration around the discharged sheet rake-in paddles 320A serving as rake-in portions of the present embodiment will be described with reference to FIGS. 84A and B. FIG. 84A is a perspective view illustrating a driving elements of the lower discharge roller 230B and the discharged sheet rake-in paddles 320A in an extracted state.

The lower discharge rollers 230B are driven by a discharge roller motor MT14 via a drive transmission mechanism 2300. The drive transmission mechanism 2300 is constituted by a pulley and a belt in the illustrated example, and transmits the rotational drive of the drive shaft of the discharge roller motor MT14 to the rotation shaft 230B1 of the lower discharge rollers 230B. Meanwhile, the discharged sheet rake-in paddles 320A are driven by a rake-in motor MT15 via a drive transmission mechanism 3200. The drive transmission mechanism 3200 is constituted by a pulley and a belt in the illustrated example, and transmits the rotational drive of the drive shaft of the rake-in motor MT15 to the rotation shaft 3201 of the discharged sheet rake-in paddles 320A.

The rotation shaft 3201 of the discharged sheet rake-in paddles 320A can extend through the inside of the rotation shaft 230B1 of the lower discharge roller 230B, and the two discharged sheet rake-in paddles 320A provided on the two opposite sides of the lower discharge rollers 230B in the rotational axis direction can be disposed on one rotation shaft 3201. The rotation shaft 230B1 of the lower discharge rollers 230B is rotatably supported by the rotation shaft 3201 of the discharged sheet rake-in paddles 320A via a bearing. As a result of this, the lower discharge rollers 230B and the discharged sheet rake-in paddles 320A can be each independently driven by a different motor. To be noted, the drive transmission mechanisms 2300 and 3200 may be constituted by different drive transmission members such as a plurality of gears instead of a pulley and a belt.

The discharged sheet rake-in paddle 320A includes, as illustrated in FIG. 84B, a fixed portion 3202 fixed to the rotation shaft 3201 and a plate-shaped paddle portion 3203 provided on the fixed portion 3202. The paddle portion 3203 extends in a direction orthogonal to the rotation shaft 3201 from the fixed portion 3202 fixed to the rotation shaft 3201. In addition, the paddle portion 3203 is formed from an elastic member such as rubber. The discharged sheet rake-in paddle 320A configured in this manner rotates by the rotation of the rotation shaft 3201 and rakes in the sheet on the stacking tray 300 as described above. In addition, in the case where the paddle portion 3203 abuts the sheet on the stacking tray 300 as a result of rotating, the paddle portion 3203 elastically deforms to reliably rake-in the sheet and press the trailing end of the sheet.

[Driving Configuration of Each Portion]

Figure 5A:
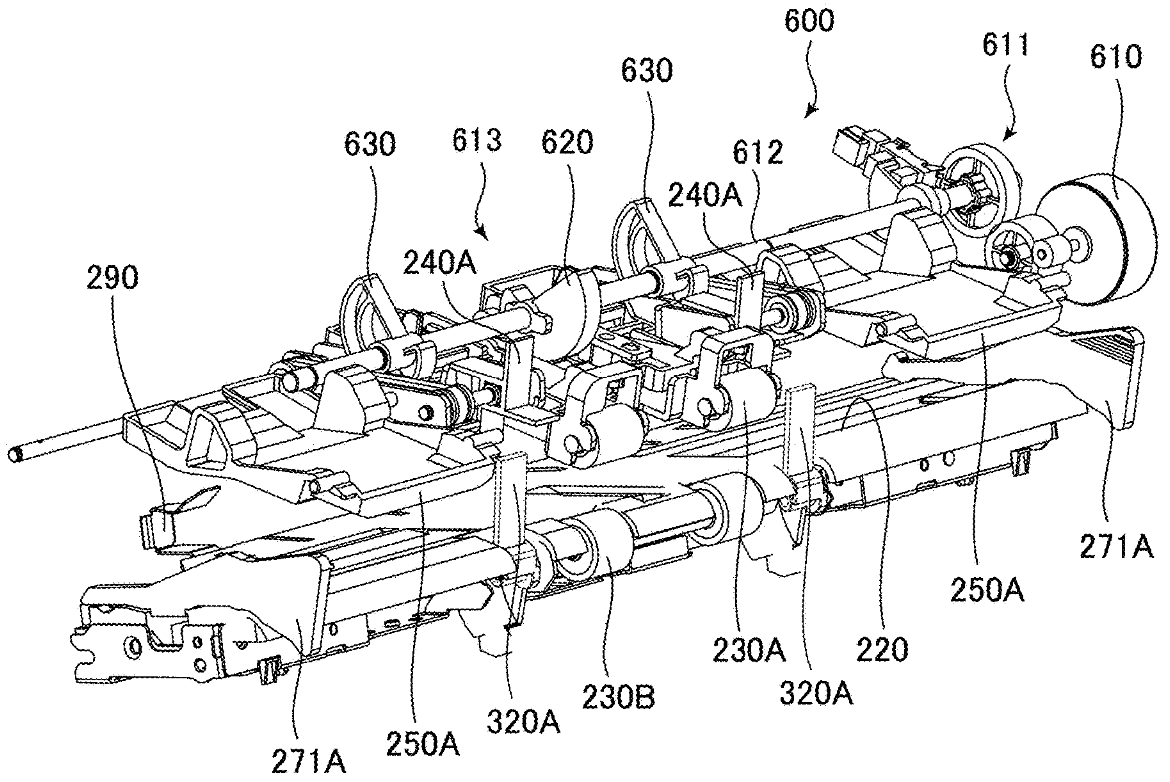
FIG. 5A is a perspective view of the vicinity of the processing tray at a home position of the sheet processing apparatus according to the first embodiment.
Figure 5B:
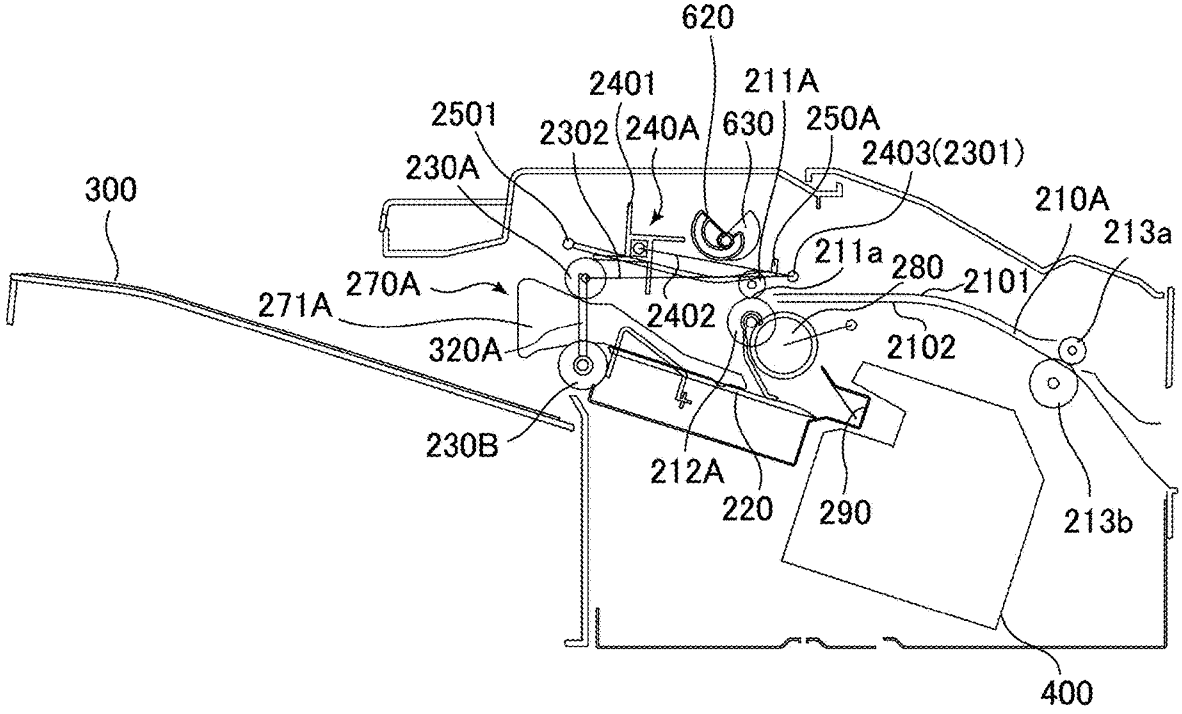
FIG. 5B is a schematic configurational section view of the sheet processing apparatus at the home position of the sheet processing apparatus according to the first embodiment.

Next, the driving configurations of the upper discharge rollers 230A, the rake-in paddles 240A, and the trailing end dropping members 250A will be described with reference to FIGS. 5A to 11C. In the present embodiment, the upper discharge rollers 230A, the rake-in paddles 240A, and the trailing end dropping member 250A are configured to operate in an interlocked manner. As illustrated in FIG. 5A, a driving configuration 600 for these includes a processing upper motor 610 (MT12, FIG. 12) serving as a drive source, a drive transmission mechanism 611, a rotation shaft 612, and a cam mechanism 613. The processing upper motor 610 is capable of rotating in a normal direction and a reverse direction, and the drive of the processing upper motor 610 is transmitted to the rotation shaft 612 via the drive transmission mechanism 611. In the present embodiment, the drive transmission mechanism 611 is constituted by a gear train, but may be a different drive transmission configuration such as a configuration in which the drive is transmitted by a belt.

The rotation shaft 612 is disposed to extend in the width direction above the upper discharge rollers 230A, the rake-in paddles 240A, and the trailing end dropping members 250A. Further, the cam mechanism 613 is configured to operate by the rotation of the rotation shaft 612. The cam mechanism 613 includes a first cam member 620 and second cam members 630 that rotate together with the rotation shaft 612. The first cam member 620 is disposed between the pair of upper discharge rollers 230A, and moves the upper discharge rollers 230A. One second cam member 630 each is provided to be adjacent to each of the pair of rake-in paddles 240A, and moves the rake-in paddle 240A and the trailing end dropping member 250A.

Figure 6A:
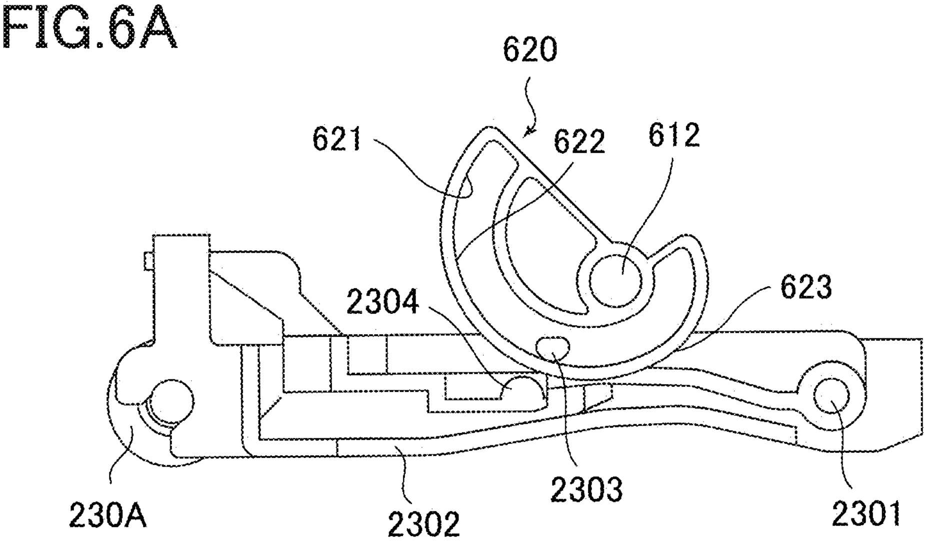
FIG. 6A is a diagram illustrating the state of a discharge roller at the home position of the sheet processing apparatus according to the first embodiment as viewed in the width direction.

As illustrated in FIG. 6A, a groove portion 621 that a protrusion portion 2303 provided on the discharge arm 2302 of the upper discharge rollers 230A is capable of entering is defined on the inside of the first cam member 620. The outer peripheral surface of the groove portion 621, that is, the inner peripheral surface of the first cam member 620 serves as an inner cam surface 622. The inner cam surface 622 is a cam surface whose distance from the rotational center of the rotation shaft 612 varies depending on the phase in the rotational direction. In addition, the outer peripheral surface of the first cam member 620 serves as an outer cam surface 623. The outer cam surface 623 is also a cam surface whose distance from the rotational center of the rotation shaft 612 varies depending on the phase in the rotational direction.

The discharge arm 2302 of the upper discharge rollers 230A includes an abutment portion 2304 capable of abutting the outer cam surface 623 of the first cam member 620 in addition to the protrusion portion 2303 described above. The first cam member 620, by rotating together with the rotation shaft 612, changes the abutting position (phase) between the inner cam surface 622 and the protrusion portion 2303, separate these to change the abutting position (phase) between the outer cam surface 623 and the abutment portion 2304, and by separating these, as will be described later, pivots the upper discharge rollers 230A from the nipping position to the retracted position about the pivot shaft 2301.

Figure 6B:
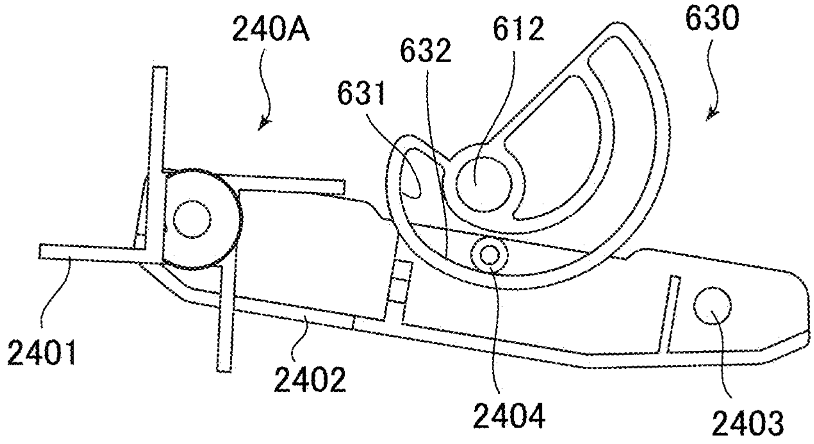
FIG. 6B is a diagram illustrating the state of a rake-in paddle at the home position of the sheet processing apparatus according to the first embodiment as viewed in the width direction.

As illustrated in FIG. 6B, a groove portion 631 that a first protrusion portion 2404 provided on the paddle arm 2402 of the rake-in paddle 240A is capable of entering is provided on the inside of the second cam member 630. The outer peripheral surface of the groove portion 631, that is, the inner peripheral surface of the second cam member 630 serves as an inner cam surface 632. The inner cam surface 632 is a cam surface whose distance from the rotational center of the rotation shaft 612 varies depending on the phase in the rotational direction. The second cam member 630 pivots the rake-in paddle 240A between the returning position and the upper retracted position about the swing fulcrum 2403 as will be described later, by rotating together with the rotation shaft 612 and thus changing the abutting position (phase) between the inner cam surface 632 and the first protrusion portion 2404.

Figure 6C:
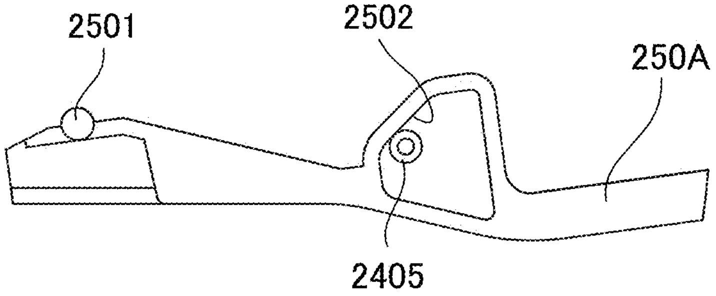
FIG. 6C is a diagram illustrating the state of a trailing end dropping member at the home position of the sheet processing apparatus according to the first embodiment as viewed in the width direction.
Figure 7:
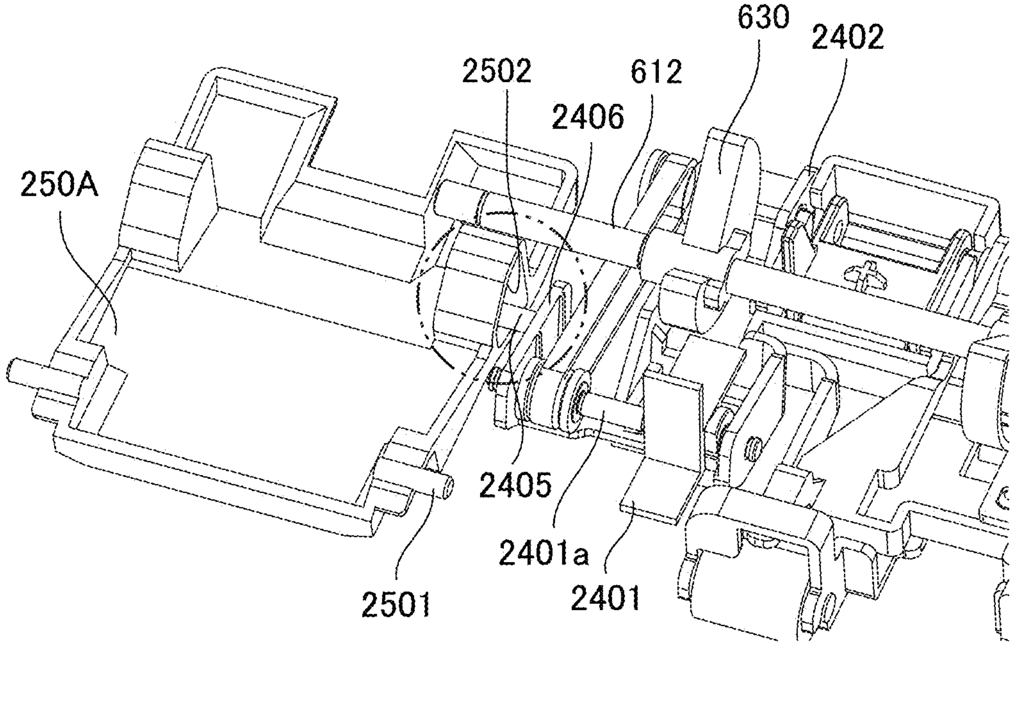
FIG. 7 is a perspective view illustrating an engagement relationship between the trailing end dropping member and the rake-in paddle according to the first embodiment.

In addition, a support portion 2406 that swings about the swing fulcrum 2403 together with the paddle arm 2402 of the rake-in paddle 240A and supports an end portion of a rotation shaft 2401*a* of the paddle portion 2401 is provided with a second protrusion portion 2405 capable of entering an engagement recess portion 2502 defined in the trailing end dropping member 250A as illustrated in FIGS. 6C and 7. The engagement recess portion 2502 pivots the trailing end dropping member 250A between the upper position and the lower position about the pivot shaft 2501 in an interlocked manner with pivoting of the rake-in paddles 240A by abutting or separating from the second protrusion portion 2405. Driving of the upper discharge rollers 230A, the rake-in paddles 240A, and the trailing end dropping members 250A will be described in detail below.

[Home Position]

First, FIGS. 5A to 6C illustrate a home position (HP) of the upper discharge rollers 230A, the rake-in paddles 240A, and the trailing end dropping members 250A. In the home position, as illustrated in FIGS. 5A and B, the upper discharge rollers 230A, the rake-in paddles 240A, and the trailing end dropping members 250A are respectively positioned at the retracted position, the upper retracted position, and the upper position.

In this state, as illustrated in FIG. 6A, the protrusion portion 2303 of the upper discharge rollers 230A abuts a portion of the first cam member 620 whose distance from the center of the rotation shaft 612 of the inner cam surface 622 is small, and thus the upper discharge rollers 230A are supported by the first cam member 620.

In addition, as illustrated in FIG. 6B, as a result of the first protrusion portions 2404 of the rake-in paddles 240A abutting portions of the inner cam surfaces 632 of the second cam members 630 whose distance from the center of the rotation shaft 612 is small, the rake-in paddles 240A are supported by the second cam members 630.

Further, as illustrated in FIG. 6C, as a result of engagement recess portions 2502 of the trailing end dropping members 250A abutting second protrusion portions 2405 of the rake-in paddles 240A, the trailing end dropping members 250A are supported by the rake-in paddles 240A via the second protrusion portions 2405.

[Descent of Upper Discharge Rollers]

Next, an operation of moving the upper discharge rollers 230A from the home position (retracted position) to the nipping position will be described with reference to FIGS. 8A to 9C. In the case where the processing upper motor 610 is driven to rotate the rotation shaft 612 in a first direction (counterclockwise direction in FIGS. 9A and B) to move down the upper discharge rollers 230A from the home position, the first cam member 620 also rotates in the same direction, and the protrusion portion 2303 moves along the inner cam surface 622. The inner cam surface 622 is formed such that movement in a counterclockwise direction from the home position increases the distance from the center of the rotation shaft 612. Therefore, as a result of this operation, the upper discharge rollers 230A move down.

Figure 9A:
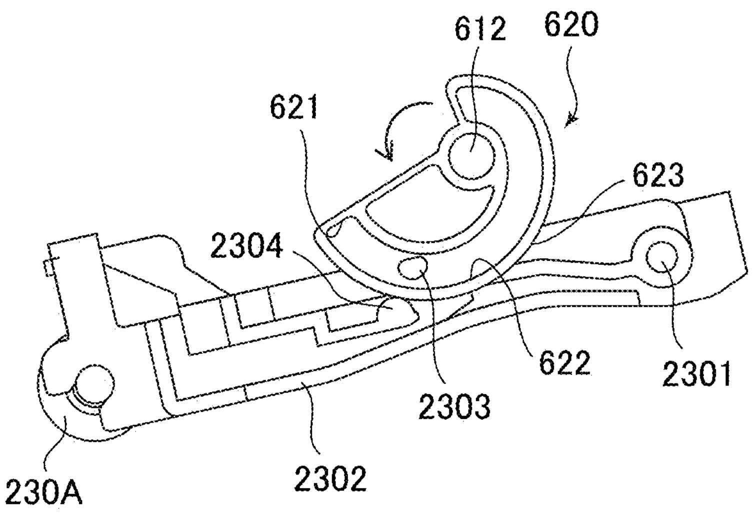
FIG. 9A is a diagram illustrating the state of the discharge roller at the time of sheet discharge of the sheet processing apparatus according to the first embodiment as viewed in the width direction.

Next, when the upper discharge rollers 230A move to the nipping position and come into contact with the lower discharge rollers 230B, as illustrated in FIG. 9A, the inner cam surface 622 of the first cam member 620 and the protrusion portion 2303 are separated, and the outer cam surface 623 abuts the abutment portion 2304. By causing the outer cam surface 623 to abut the abutment portion 2304 as described above, the upper discharge rollers 230A are pressurized toward the lower discharge rollers 230B, and a predetermined nip pressure is applied between these rollers.

Figure 8A:
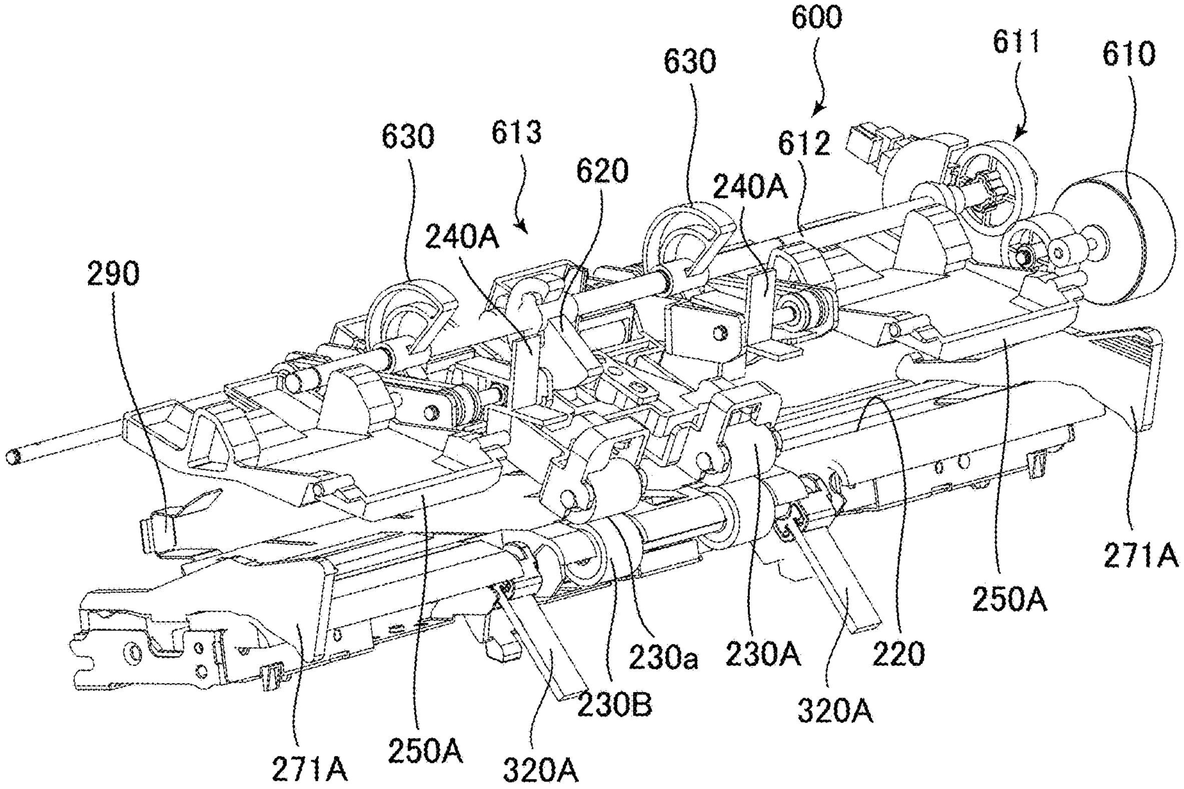
FIG. 8A is a perspective view of the vicinity of the processing tray at the time of sheet discharge of the sheet processing apparatus according to the first embodiment.
Figure 8B:
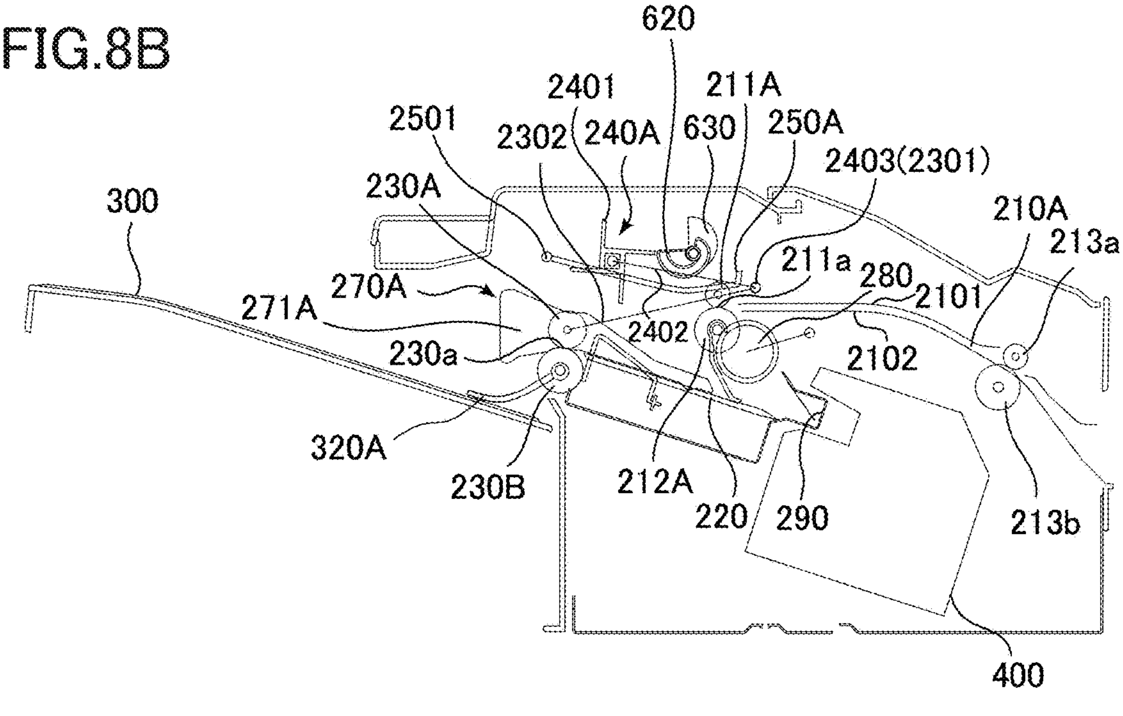
FIG. 8B is a schematic configurational section view of the sheet processing apparatus at the time of sheet discharge of the sheet processing apparatus according to the first embodiment.
Figure 9B:
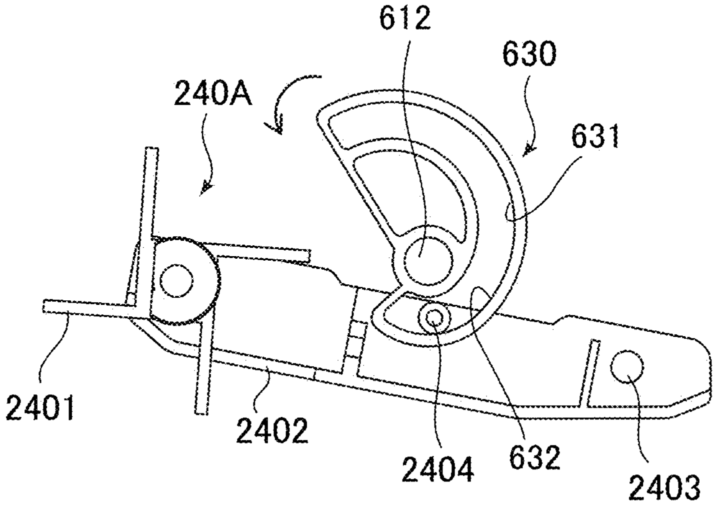
FIG. 9B is a diagram illustrating the state of the rake-in paddle at the time of sheet discharge of the sheet processing apparatus according to the first embodiment as viewed in the width direction.
Figure 9C:
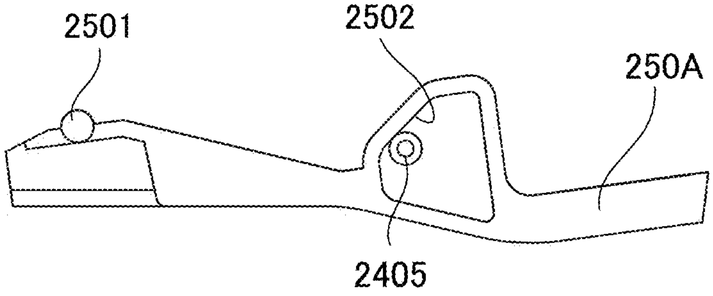
FIG. 9C is a diagram illustrating the state of the trailing end dropping member at the time of sheet discharge of the sheet processing apparatus according to the first embodiment as viewed in the width direction.

At this time, the second cam members 630 also rotate together with the rotation shaft 612, but as illustrated in FIG. 9B, the distance of the position where the inner cam surface 632 abuts the first protrusion portion 2404 from the center of the rotation shaft 612 is approximately equal to the distance in the home position. Therefore, even if the second cam members 630 rotate, the rake-in paddles 240A are maintained at the home position. Since the rake-in paddles 240A are maintained at the home position, as illustrated in FIG. 9C, the trailing end dropping members 250A are also maintained at the home position. That is, in this state, as illustrated in FIG. 8B, the upper discharge rollers 230A move to the nipping position, but the rake-in paddles 240A and the trailing end dropping members 250A are maintained at the home position.

In the case of moving up the upper discharge rollers 230A, the processing upper motor 610 is driven to rotate the rotation shaft 612 in a second direction (clockwise direction in FIGS. 9A and B) opposite to the first direction. Then, the first cam member 620 rotates in the same direction together with the rotation shaft 612, the protrusion portion 2303 moves along the inner cam surface 622, and the upper discharge rollers 230A move up. Then, return to the home position illustrated in FIG. 6A occurs.

Here, in the rake-in paddles 240A and the trailing end dropping members 250A, the first protrusion portions 2404 move along the inner cam surfaces 632 of the second cam members 630 when returning from the state of FIGS. 9B and C to the state of FIGS. 6B and C, and the inner cam surfaces 632 are defined such that the distance of the position where the inner cam surfaces 632 abut the first protrusion portions 2404 from the center of the rotation shaft 612 does not change at this time. Therefore, the rake-in paddles 240A are maintained at the home position. Since the rake-in paddles 240A are maintained at the home position, the trailing end dropping members 250A are also maintained at the home position.

[Descent of Rake-in Paddles and Trailing End Dropping Members]

Figure 10A:
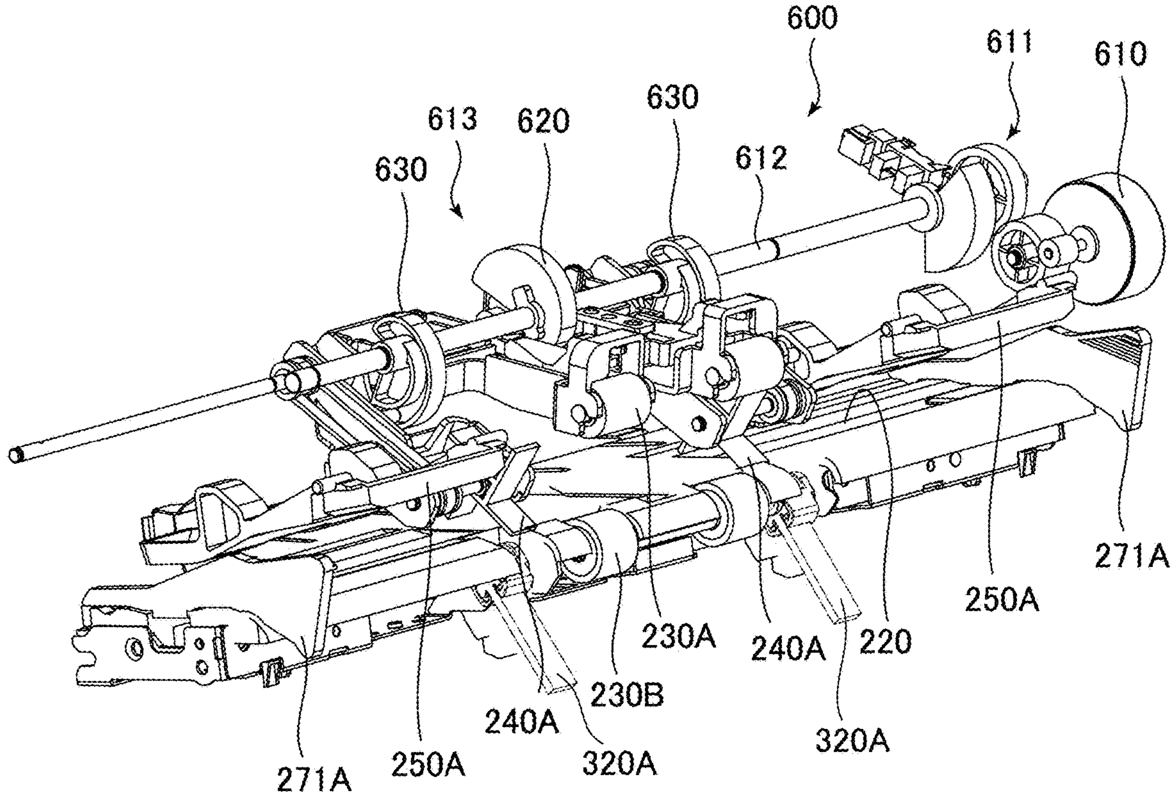
FIG. 10A is a perspective view of the vicinity of the processing tray at the time of sheet rake-in of the sheet processing apparatus according to the first embodiment.
Figure 10B:
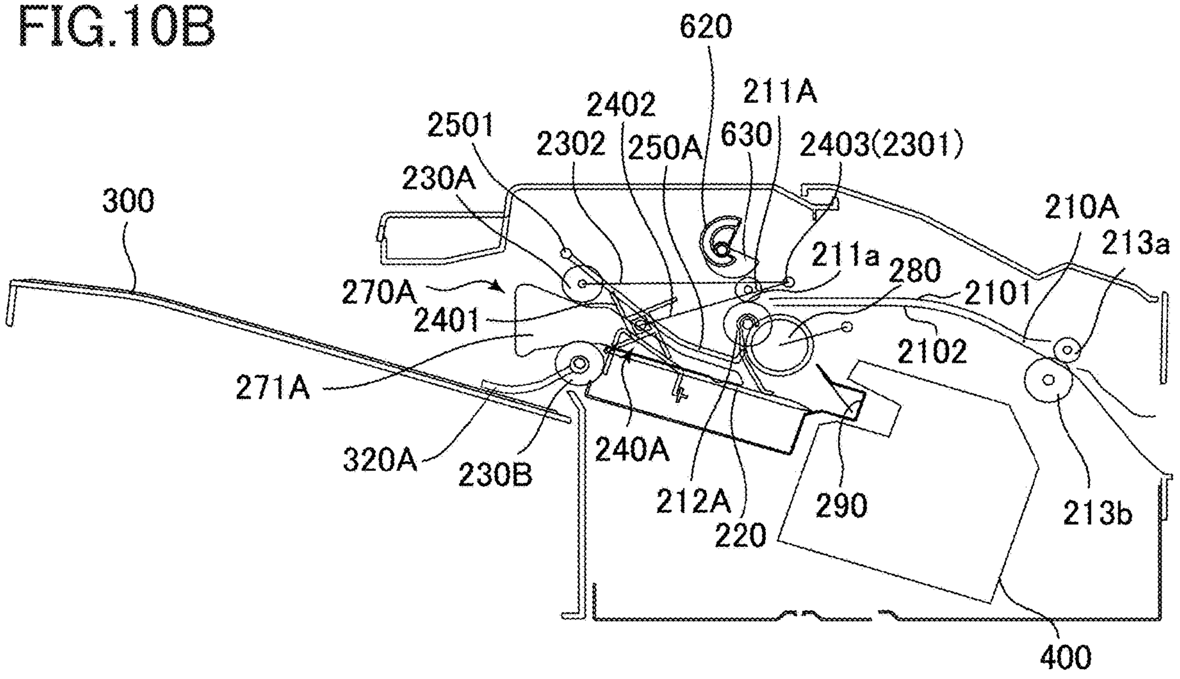
FIG. 10B is a schematic configurational section view of the sheet processing apparatus at the time of sheet rake-in of the sheet processing apparatus according to the first embodiment.
Figure 11A:
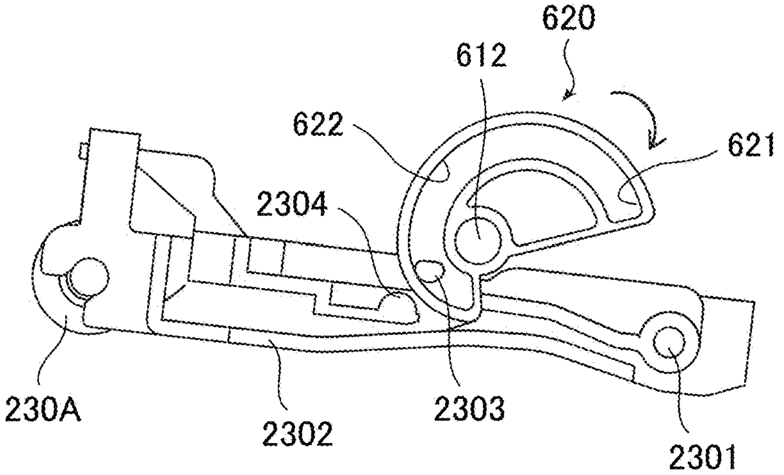
FIG. 11A is a diagram illustrating the state of the discharge roller at the time of sheet rake-in of the sheet processing apparatus according to the first embodiment as viewed in the width direction.
Figure 11B:
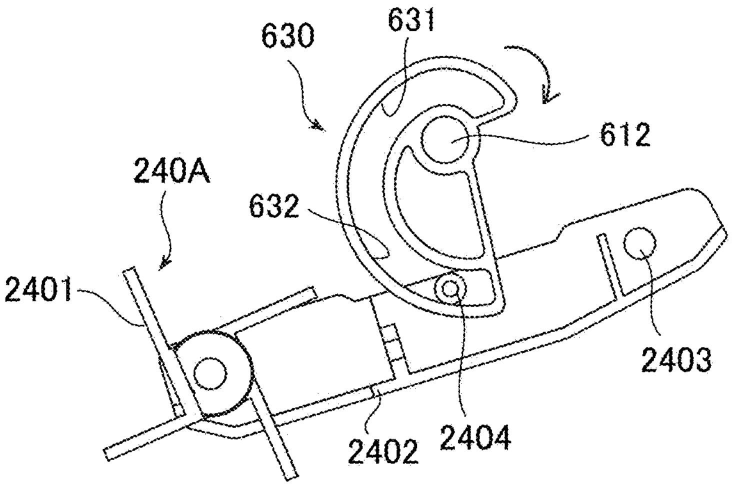
FIG. 11B is a diagram illustrating the state of the rake-in paddle at the time of sheet rake-in of the sheet processing apparatus according to the first embodiment as viewed in the width direction.
Figure 11C:
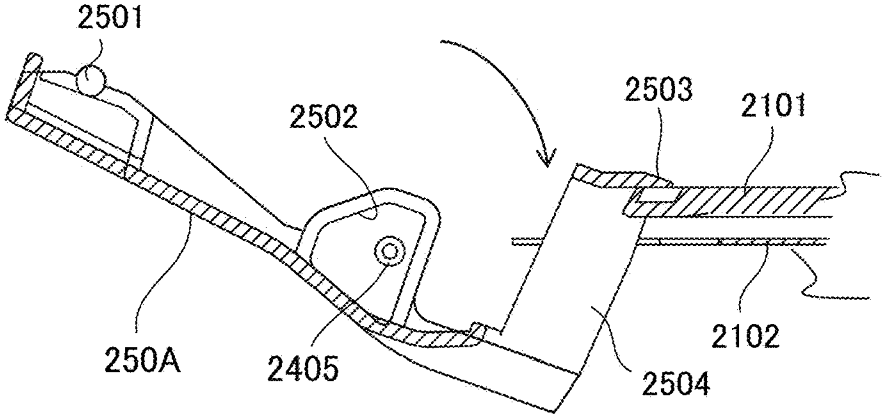
FIG. 11C is a diagram illustrating the state of the trailing end dropping member at the time of sheet rake-in of the sheet processing apparatus according to the first embodiment as viewed in the width direction.

Next, an operation of moving the rake-in paddles 240A and the trailing end dropping members 250A from the home position (upper retracted position and upper position) to the returning position and the lower position will be described with reference to FIGS. 10A to 11C. When the processing upper motor 610 is driven to rotate the rotation shaft 612 in the second direction (clockwise direction in FIGS. 11A and B) opposite to the first direction to move down the rake-in paddles 240A and the trailing end dropping members 250A from the home position, the first cam member 620 also rotates in the same direction, and the protrusion portion 2303 moves along the inner cam surface 622. The inner cam surface 622 is formed such that the distance from the center of the rotation shaft 612 does not change even in the case of rotating in the clockwise direction from the home position. Therefore, as illustrated in FIG. 11A, the upper discharge rollers 230A are maintained at the home position.

Meanwhile, the second cam members 630 also rotate in the same direction together with the rotation shaft 612, and the first protrusion portions 2404 move along the inner cam surfaces 632. The inner cam surfaces 632 are formed such that the distance from the center of the rotation shaft 612 changes in accordance with rotation in the clockwise direction from the home position. Therefore, as a result of this operation, the rake-in paddles 240A move down, and move to the returning position.

At this time, the trailing end dropping members 250A also move down together with the rake-in paddles 240A. In the present embodiment, the trailing end dropping member 250A includes a positioning portion 2503 positioned at the lower position by engaging with the upper guide 2101 of the conveyance path 210A when pivoting from the upper position to the lower position. The positioning portion 2503 is provided at an upper end portion of a projection portion 2504 provided to project upward from a distal end (upstream end in the first conveyance direction) of the trailing end dropping member 250A. The projection portion 2504 also has a function of regulating the leading end of the sheet conveyed toward the pre-processing nip portion 211*a* on the upstream side of the pre-processing nip portion 211*a* in the first conveyance direction in a state in which the trailing end dropping member 250A is at the lower position.

The positioning portion 2503 is an engagement portion provided at an upper edge of the projection portion 2504 to be capable of engaging with the upper guide 2101, and restricts further descent of the trailing end dropping member 250A by abutting the upper surface of the upper guide 2101. The engagement recess portions 2502 are defined to be separated from the second protrusion portions 2405 in this state. Therefore, the trailing end dropping members 250A are in a state in which the engaged state with the rake-in paddles 240A is cancelled, and are in a state of being positioned at the lower position by the positioning portions 2503.

As a result of this, even when the rake-in paddles 240A have reached the returning position, the trailing end dropping members 250A do not move down further due to the engagement between the positioning portions 2503 and the upper guide 2101, and are positioned at the lower position. In such a state, as illustrated in FIG. 10B, the rake-in paddles 240A and the trailing end dropping members 250A move to the returning position and the lower position, and the upper discharge rollers 230A are positioned at the home position.

To be noted, illustration of the projection portion 2504 and the positioning portion 2053 described above and illustrated in FIG. 11C is omitted in FIGS. 1 to 10B. The projection portion 2504 and the positioning portion 2053 configured in this manner may be omitted, and in this case, a different positioning mechanism may be provided to position the trailing end dropping members 250A at the lower position. For example, the positioning may be performed by engagement between the engagement recess portion 2502 and the second protrusion portion 2405 at the lower position.

In the case of moving up the rake-in paddles 240A and the trailing end dropping members 250A, the processing upper motor 610 is driven to rotate the rotation shaft 612 in the first direction (counterclockwise direction in FIGS. 11A and B). Then, the second cam members 630 rotate in the same direction together with the rotation shaft 612, the first protrusion portions 2404 move along the inner cam surfaces 632, and the rake-in paddles 240A move up. At this time, the second protrusion portions 2405 engage with the engagement recess portions 2052 again, and the trailing end dropping members 250A also move up due to this engagement. Then, the rake-in paddles 240A and the trailing end dropping members 250A return to the home position illustrated in FIGS. 5A to 6C.

Here, in the upper discharge rollers 230A, when returning from the state of FIG. 11A to the state of FIG. 6A, the protrusion portion 2303 moves along the inner cam surface 622 of the first cam member 620, but the inner cam surface 622 is formed such that the distance of the position where the inner cam surface 622 abuts the protrusion portion 2303 from the center of the rotation shaft 612 does not change at this time. Therefore, the upper discharge rollers 230A are maintained at the home position.

In the present embodiment, when the rotation shaft 612 is rotated in the counterclockwise direction of FIGS. 6A to 6C from the home position, the upper discharge rollers 230A move down, and the rake-in paddles 240A and the trailing end dropping members 250A are maintained at the home position. In contrast, when the rotation shaft 612 is rotated in the clockwise direction of FIGS. 6A and 6C from the home position, the upper discharge rollers 230A are maintained at the home position, and the rake-in paddles 240A and the trailing end dropping members 250A move down.

In addition, when the rotation shaft 612 is rotated in the clockwise direction of FIGS. 9A to 9C in a state in which the upper discharge rollers 230A are at the nipping position illustrated in FIG. 9A, the upper discharge rollers 230A move up, and the rake-in paddles 240A and the trailing end dropping members 250A are maintained at the home position. In contrast, when the rotation shaft 612 is rotated in the counterclockwise direction of FIGS. 11A to 11C in a state in which the rake-in paddles 240A and the trailing end dropping members 250A are at the returning position and the lower position, the upper discharge rollers 230A are maintained at the home position, and the rake-in paddles 240A and the trailing end dropping members 250A move up.

FIG. 12 illustrates the relationship between each motor and each component. The columns illustrated in FIG. 12 indicate, from the left side, the number, the name of the motor, the driven part, the operation, the operation direction at the time of normal rotation, and the operation direction at the time of reverse rotation. In FIG. 12, the processing upper motor MT12 is the processing upper motor 610 described above. As can be seen from FIG. 12, a conveyance motor MT11 drives either one roller of the upstream rollers (inlet rollers) 213*a* and 213*b*, either one roller of the pre-processing rollers 211A and 212A, the rake-in paddles 240A, and the returning member 280.

In addition, the processing upper motor MT12 lifts and lowers the rake-in paddles 240A, the trailing end dropping members 250A, and the upper discharge rollers (nipping members) 230A. In the present embodiment, in addition to this, a returning lifting/lowering motor MT13 for lifting and lowering the returning member 280, a discharge roller motor MT14 for driving the lower discharge rollers 230B, a rake-in motor (sheet pressor motor) MT15 for driving the discharged sheet rake-in paddle (sheet pressing (stack pressing) paddle) 320A, an F-side alignment plate moving motor MT16 for moving (laterally moving) the alignment plate 271A on the front side in the width direction, an R-side alignment plate moving motor MT17 for moving (laterally moving) the alignment plate 271A on the rear side in the width direction, an STP moving motor MT18 that moves the stapling unit (STP) 400 for changing the stapling position, an STP motor MT19 for driving the stapling unit 400 to staple the sheet bundle, and a stacking tray lifting/lowering motor MT20 that lifts and lowers the stacking tray 300 are provided.

[Control Configuration of Sheet Processing Apparatus]

Figure 13:
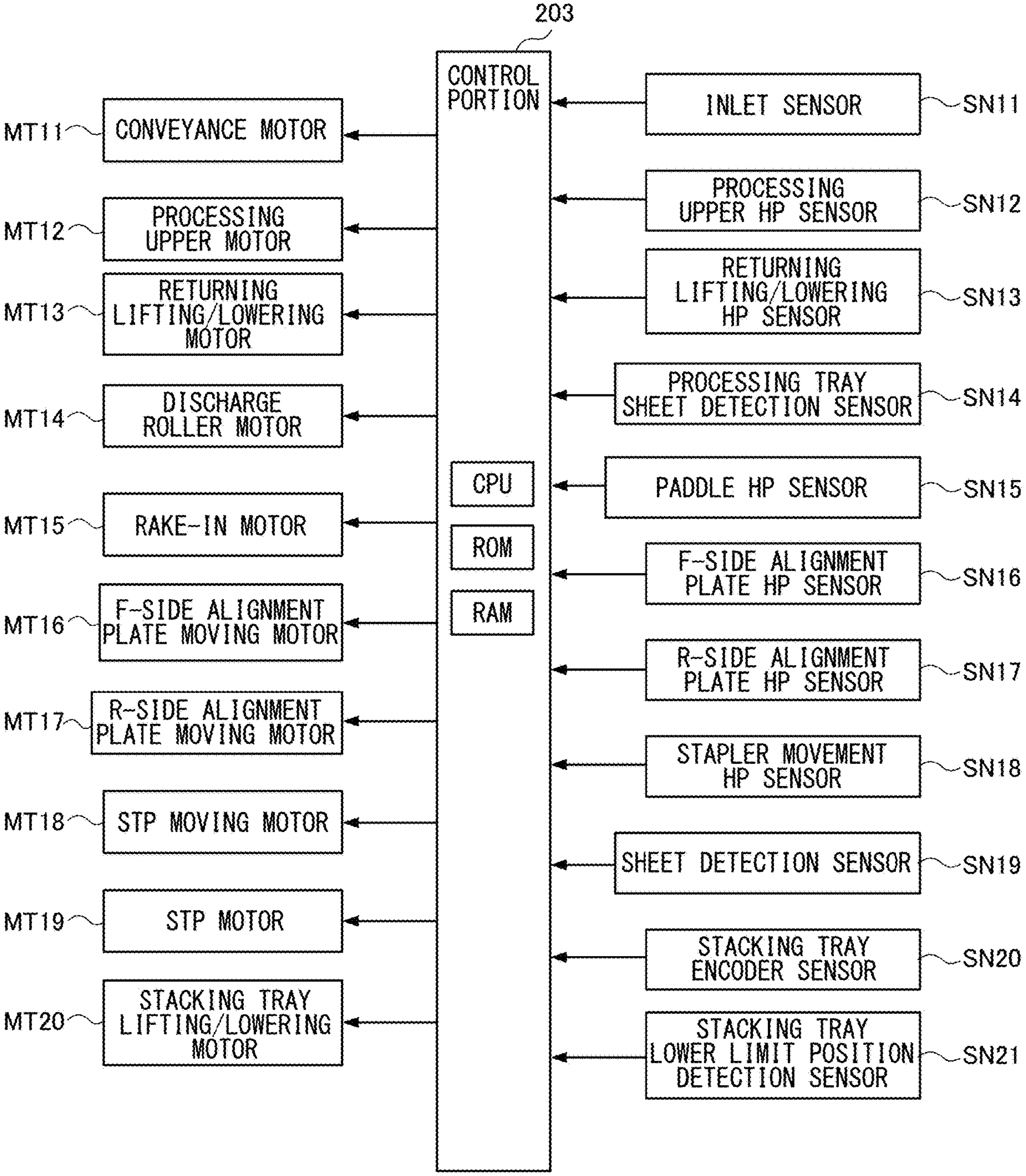
FIG. 13 is a block diagram illustrating a control configuration of the sheet processing apparatus according to the first embodiment.
Figure 14:
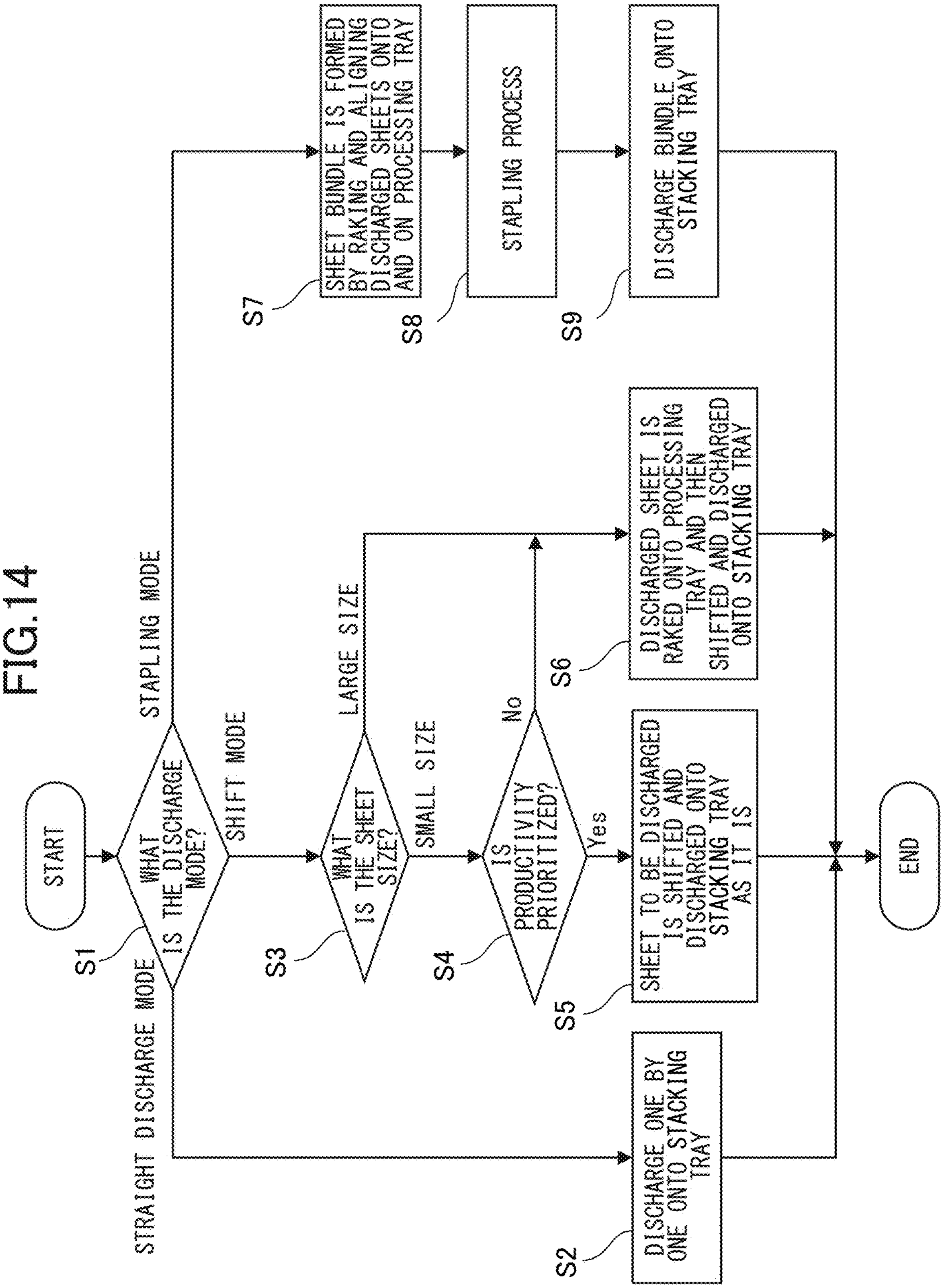
FIG. 14 is a flowchart illustrating an example of a control flow of the sheet processing apparatus according to the first embodiment.

The control configuration of the sheet processing apparatus 200A will be described with reference to FIGS. 13 and 14. FIG. 13 is a block diagram illustrating each motor and each sensor included in the sheet processing apparatus 200A. The signal of each of these sensors is input to a control portion 203 serving as a control means, and each motor is controlled by the control portion 203. The control portion 203 is communicably connected to a control portion included in the image forming apparatus 100, and performs overall control of the sheet processing apparatus 200A.

The control portion 203 configured in this manner includes a central processing unit (CPU), a read only memory (ROM), and a random access memory: RAM. The CPU controls each portion while reading out a program corresponding to a control procedure stored in the ROM. In addition, the RAM stores work data and input data, and the CPU performs control with reference to the data stored in the RAM on the basis of the program described above and the like.

Each motor illustrated in FIG. 13 is as described above. In contrast, each sensor will be described with reference to FIG. 2. First, an inlet sensor SN11 is provided in the conveyance path 210A, and detects the leading end of the sheet conveyed to the conveyance path 210A. A processing upper HP sensor SN12 detects the home position of the rake-in paddles 240A, the trailing end dropping members 250A, and the upper discharge rollers (nipping members) 230A. A returning lifting/lowering HP sensor SN13 detects the home position of the returning member 280 (position retracted from the processing tray 220). A processing tray sheet detection sensor SN14 detects the presence or absence of the sheet on the processing tray 220. A paddle HP sensor (sheet pressor HP sensor) SN15 detects the home position of the discharged sheet rake-in paddle 320A.

An F-side alignment plate HP sensor SN16 and an R-side alignment plate HP sensor SN17 respectively detect the alignment plate 271A on the front side and the alignment plate 271A on the rear side being at positions (home positions) separated from the sheet placed on the processing tray 220 in the width direction. A stapler movement HP sensor SN18 detects the stapling unit 400 being at the home position. A sheet detection sensor SN19 detects the uppermost sheet placed on the stacking tray 300. A stacking tray encoder sensor SN20 detects the position of the stacking tray 300 in a lifting/lowering direction. A stacking tray lower limit position detection sensor SN21 detects the lower limit position of the stacking tray 300. The control portion 203 performs each control described later on the basis of the signal of each of these sensors.

Next, the flow of control of each mode of the present embodiment will be described with reference to FIG. 14. In the present embodiment, a straight discharge mode in which the sheet delivered to the sheet processing apparatus 200A is discharged onto the stacking tray 300 as it is without performing the predetermined process, a shift mode in which the sheet delivered to the sheet processing apparatus 200A is discharged onto the stacking tray 300 after being moved in the width direction (shifting operation) to classify the sheet discharged onto the stacking tray 300, and a stapling mode in which the sheet delivered to the sheet processing apparatus 200A is subjected to stapling as the predetermined process and then discharged onto the stacking tray 300 are provided. Each of these modes is selected by a user through an operation panel of the image forming apparatus 100 or a PC connected via a network or the like.

In the present embodiment, a manual mode setting by a user and an automatic setting according to the sheet type (sheet length) are possible, and whether the first shift discharge process is selected or the second shift discharge process that will be described later is selected in the shift mode can be appropriately set in accordance with the final product desired by the user.

In the stapling mode serving as a binding discharge process, the sheet conveyed downstream in the first conveyance direction by the pre-processing rollers 211A and 212A is conveyed in the second conveyance direction on the processing tray 220 by the rake-in paddles 240A, and thus the downstream edge (trailing end) of the sheet in the second conveyance direction is caused to abut the trailing end regulating member 290, that is, the trailing end of the sheet is regulated. Then, by driving the alignment portion 270A (pair of alignment plates 271A) by the F-side alignment plate moving motor MT16 and the R-side alignment plate moving motor MT17, the sheet caused to abut the trailing end regulating member 290 by the alignment portion 270A is moved in the sheet width direction (same direction as the shift direction), and is positioned at the binding position. That is, an alignment process is performed. In the present embodiment, alignment is performed by hitting the sheet from both sides in the sheet width direction by using the pair of alignment plates 271A in center alignment. By repeating the operation of regulating the trailing end of the sheet and the alignment process described above, a sheet bundle is formed on the processing tray 220. Then, the stapling process is performed on the sheet bundle positioned at the binding position, and the sheet bundle subjected to the stapling process is discharged onto the stacking tray 300 by the upper discharge rollers 230A and the lower discharge rollers 230B. In the shift mode described below, a shifting operation is performed for a sheet not subjected to the binding process, by using the pair of alignment plates 271A, the F-side alignment plate moving motor MT16, and the R-side alignment plate moving motor MT17 that are used in the alignment process for formation of the sheet bundle in the stapling mode.

In addition, in the shift mode, there are a case of performing a shifting operation on a sheet (first sheet, sheet of a small size) whose length in the conveyance direction of the sheet (first conveyance direction) is a first length, and a case of performing a shifting operation on a sheet (second sheet, sheet of a large size) whose length in the first conveyance direction is a second length larger than the first length. The sheet of a small size is, for example, a sheet whose length in the first conveyance direction is equal to or less than a predetermined length, and the sheet of a large size is, for example, a sheet whose length in the first conveyance direction is larger than the predetermined length. The predetermined length is, for example, a size of so-called A4 longitudinal in which a paper sheet of the A4 size is conveyed in the longitudinal direction (direction in which the longitudinal direction is the conveyance direction). In addition, in the shift mode, a productivity-prioritized mode in which the productivity is prioritized, and an alignment-prioritized mode in which alignment of the sheet is prioritized can be selected and executed. In addition, in either of the shift modes, the sheet can be shifted in both a direction from the rear side to the front side and a direction from the front side to the rear side (both directions are shift directions).

The productivity-prioritized mode as the switchbackless shift discharge process and the first shift discharge process is a mode in which the sheet conveyed downstream in the first conveyance direction by the pre-processing rollers 211A and 212A is moved (shifted) in the shift direction by the alignment portion 270A (pair of alignment plates 271A) by driving the F-side alignment plate moving motor MT16 and the R-side alignment plate moving motor MT17 without performing the conveyance in the second conveyance direction by the rake-in paddles 240A, and is discharged onto the stacking tray 300 by the upper discharge rollers 230A and the lower discharge rollers 230B.

The alignment-prioritized mode as the switchback shift discharge process and the second shift discharge process is a mode in which the sheet conveyed downstream in the first conveyance direction by the pre-processing rollers 211A and 212A is conveyed in the second conveyance direction on the processing tray 220 by the rake-in paddles 240A to cause (regulate) the downstream edge of the sheet in the second conveyance direction to abut the trailing end regulating member 290, is then moved (shifted) in the shift direction by the alignment portion 270A (pair of alignment plates 271A) by driving the F-side alignment plate moving motor MT16 and the R-side alignment plate moving motor MT17 without performing the stapling process by the stapling unit 400, and is discharged onto the stacking tray 300 by the upper discharge rollers 230A and the lower discharge rollers 230B. Detailed description of this point will be given below.

When the control is started, the control portion 203 determines which of the straight discharge mode, the shift mode, and the stapling mode is selected as the discharge mode (S1). In the case where the straight discharge mode is selected, sheets conveyed to the sheet processing apparatus 200A are discharged one by one onto the stacking tray 300 as they are without performing the predetermined process (S2).

In S1, in the case where the shift mode is selected, whether the sheet size is a sheet of a large size or a sheet of a small size is determined (S3). In the case of the sheet of the small size, whether or not the productivity is prioritized is determined (S4). In the case where the productivity is prioritized, the sheet discharged from the conveyance path 210A is discharged onto the stacking tray 300 by performing the shifting operation by the alignment portion 270A without conveyance in the second conveyance direction on the processing tray 220 (S5). In the case where the productivity is not prioritized in S4, the sheet discharged from the conveyance path 210A is raked onto the processing tray 220, is subjected to the shifting operation on the processing tray 220 by the alignment portion 270A, and is discharged onto the stacking tray 300 (S6). In the case of the sheet of the large size in S3, the process also proceeds to S6.

In the case where the stapling mode is selected in S1, the sheet discharged from the conveyance path 210A is conveyed in the second conveyance direction on the processing tray 220 by the rake-in paddles 240A, and the downstream edge of the sheet in the second conveyance direction is caused to abut the trailing end regulating member 290. That is, the trialing end of the sheet is regulated. Then, after regulating the trailing end of the sheet, the positioning (alignment) at the binding position is performed by the alignment portion 270A (pair of alignment plates 271A) by driving the F-side alignment plate moving motor MT16 and the R-side alignment plate moving motor MT17. By repeating the operation of trailing-end regulation and alignment of the sheet described above, a sheet bundle is formed on the processing tray 220 (S7). Then, the stapling process is performed on the sheet bundle (S8). Then, the sheet bundle subjected to the stapling process is discharged onto the stacking tray 300 (S9).

The operation of the sheet processing apparatus 200A in the first shift discharge process and the second shift discharge process in the shift mode described above will be described with reference to FIGS. 15A to 34B.

[First Shift Discharge Process (Productivity-Prioritized Mode)]

Figure 15A:
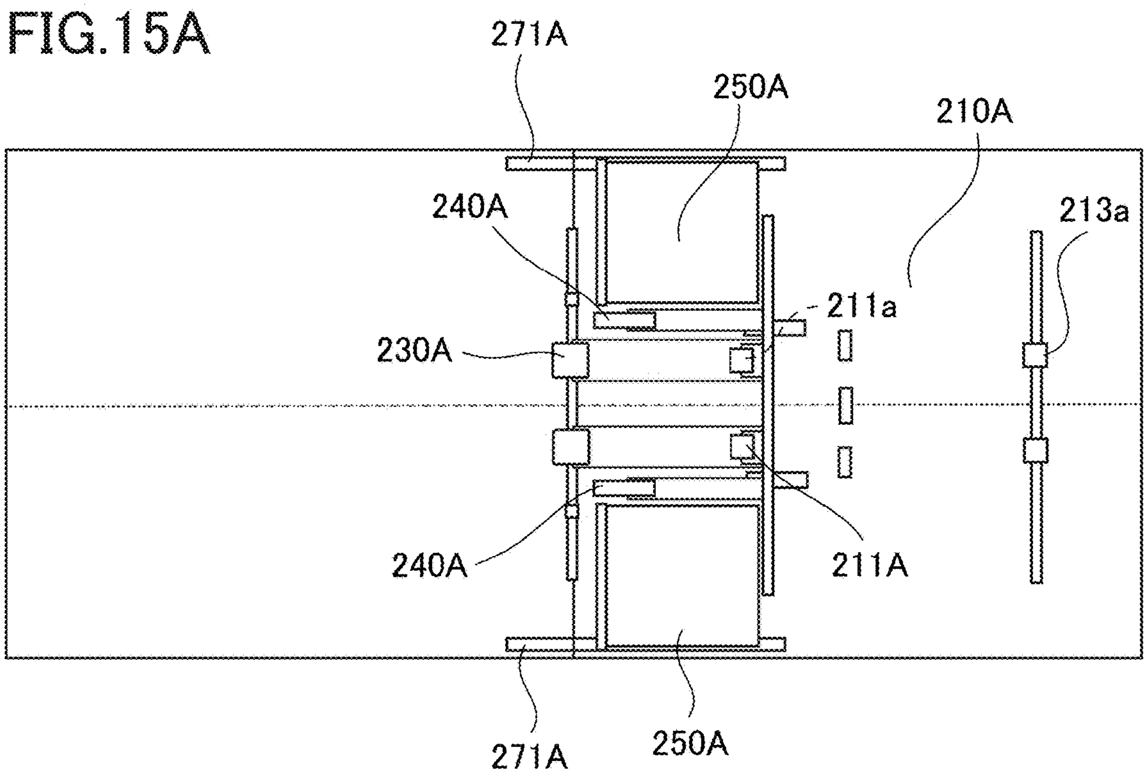
FIG. 15A is a schematic view of a main part of the sheet processing apparatus at a home position of a first shift discharge process according to the first embodiment as viewed from above.
Figure 15B:
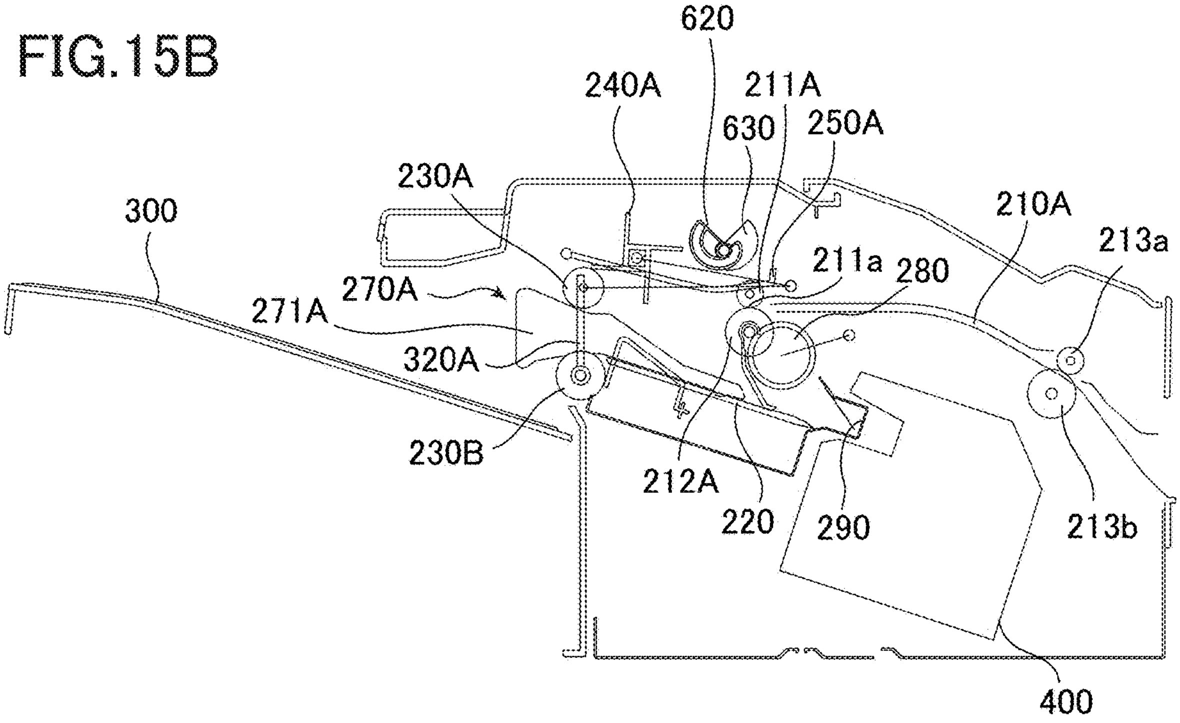
FIG. 15B is a schematic configurational section view of the sheet processing apparatus at the home position of the first shift discharge process according to the first embodiment.

First, the first shift discharge process (productivity-prioritized mode) in the shift mode will be described with reference to FIGS. 15A to 24B. As illustrated in FIGS. 15A and B, in a state in which the sheet S is not yet conveyed to the conveyance path 210A, the upper discharge rollers 230A, the rake-in paddles 240A, and the trailing end dropping members 250A are each positioned at the home position. In addition, the pair of alignment plates 271A are positioned at the home position in which these are separated from each other the most.

Figure 16A:
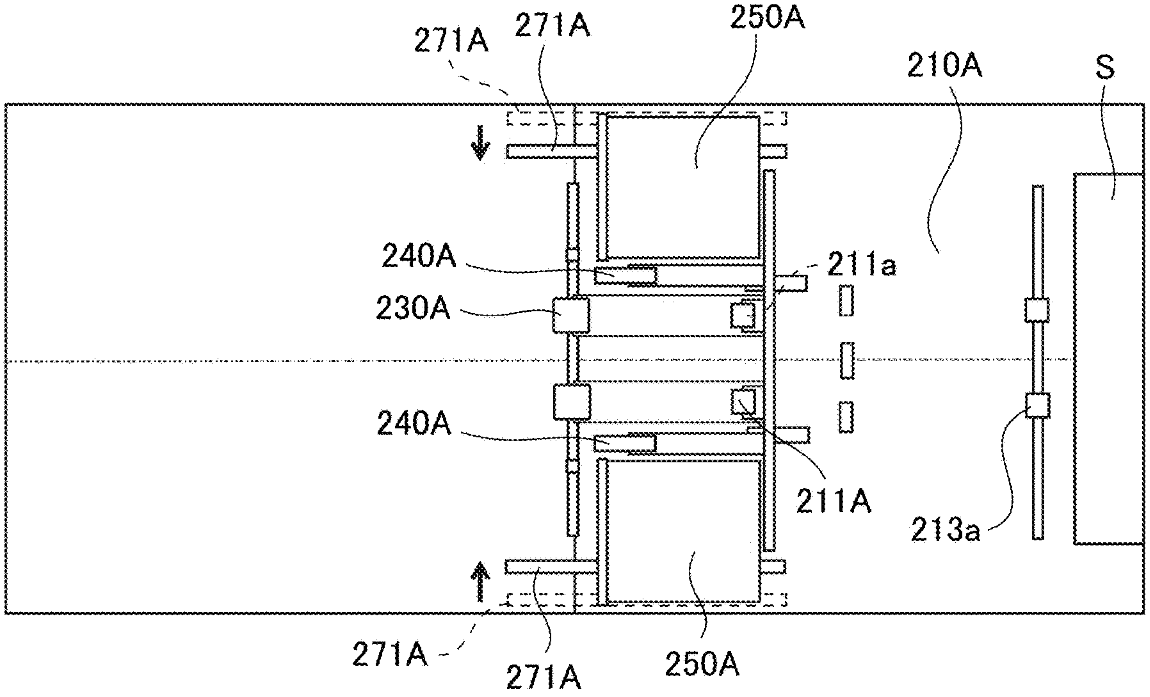
FIG. 16A is a schematic view of the main part of the sheet processing apparatus at the time of sheet reception in the first shift discharge process according to the first embodiment as viewed from above.
Figure 16B:
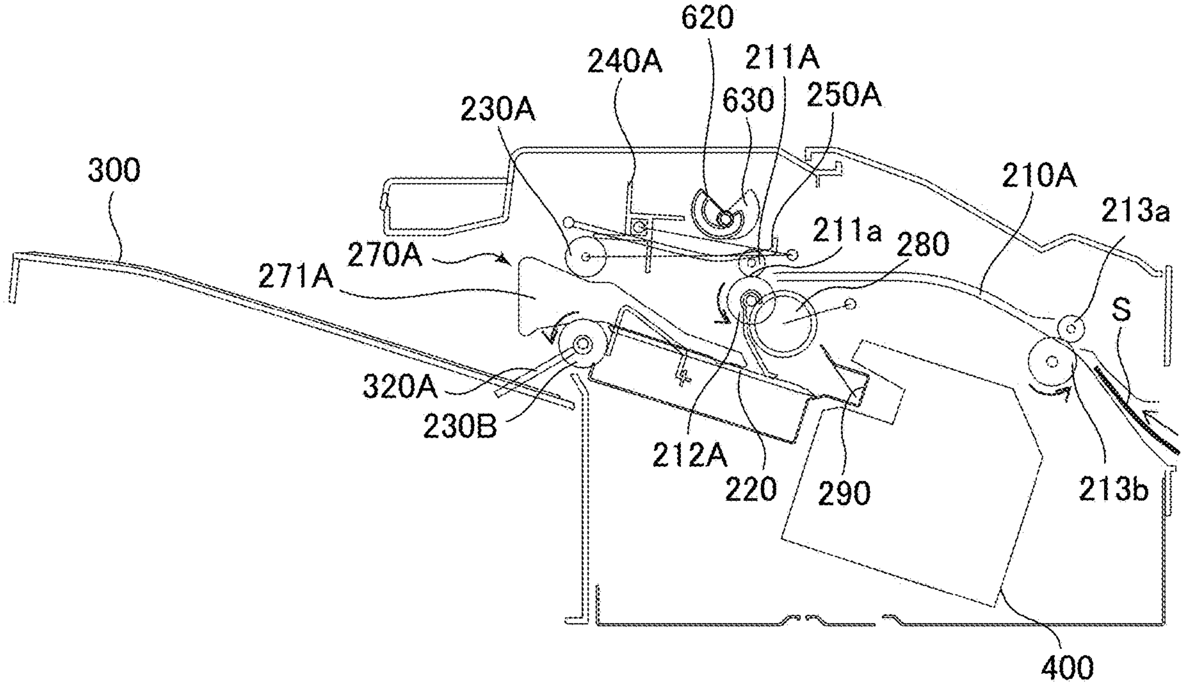
FIG. 16B is a schematic configurational section view of the sheet processing apparatus at the time of sheet reception in the first shift discharge process according to the first embodiment.

Next, as illustrated in FIGS. 16A and B, in a state in which the sheet S is conveyed to the entrance of the conveyance path 210A, the pair of alignment plates 271A move from the home position to be closer to each other, and stand by at a receiving position for receiving the sheet. In addition, also in this state, the upper discharge rollers 230A, the rake-in paddles 240A, and the trailing end dropping members 250A are each at the home position.

Figure 17A:
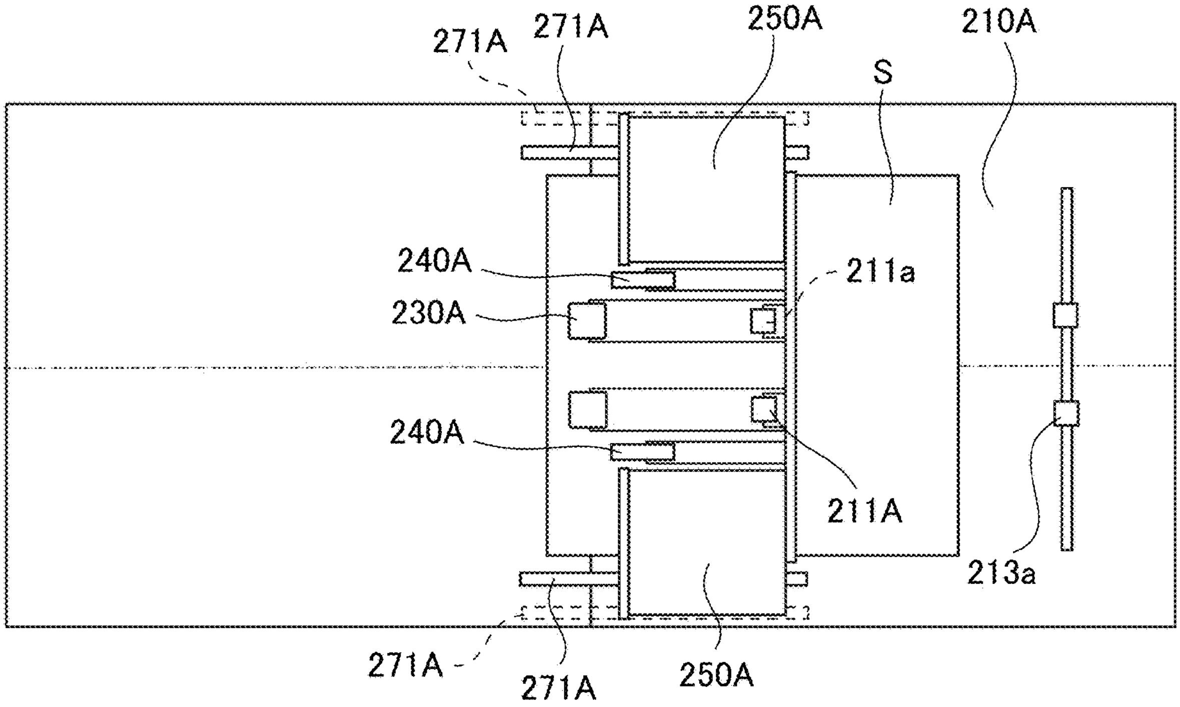
FIG. 17A is a schematic view of the main part of the sheet processing apparatus at the time of descent of upper discharge rollers in the first shift discharge process according to the first embodiment as viewed from above.
Figure 17B:
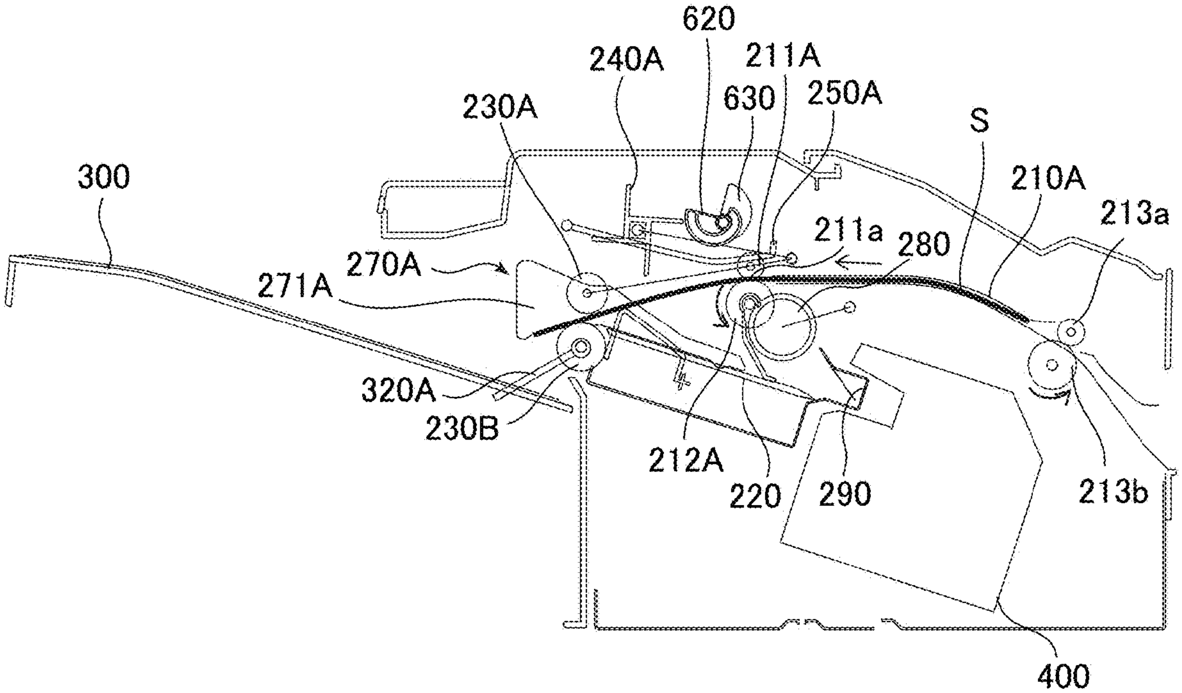
FIG. 17B is a schematic configurational section view of the sheet processing apparatus during descent of the upper discharge rollers in the first shift discharge process according to the first embodiment.

Next, as illustrated in FIGS. 17A and B, when the downstream end (leading end) of the sheet S in the first conveyance direction passes the pre-processing nip portion 211*a* of the pre-processing rollers 211A and 212A and the leading end of the sheet S passes the lower discharge rollers 230B, the upper discharge rollers 230A start moving down. For example, the upper discharge rollers 230A are moved down such that the gap between the upper discharge rollers 230A and the lower discharge rollers 230B is 2 mm when the leading end of the sheet S reaches a position that is 10 mm downstream from the nip position where the sheet is nipped between the upper discharge rollers 230A and the lower discharge rollers 230B. That is, positioning at the separated position where the upper discharge rollers 230A are closer to the lower discharge rollers 230B than the retracted position and the upper discharge rollers 230A and the lower discharge rollers 230B are separated from each other is performed. That is, the upper discharge rollers 230A and the lower discharge rollers 230B are positioned at the retracted position when the sheet is conveyed in the first conveyance direction from the pre-processing rollers 211A and 212A, and then the upper discharge rollers 230A and the lower discharge rollers 230B are positioned at the separated position before the sheet is moved in the shift direction by the alignment portion 270A. At this time, the rake-in paddles 240A and the trailing end dropping members 250A are still positioned at the home position.

Figure 18A:
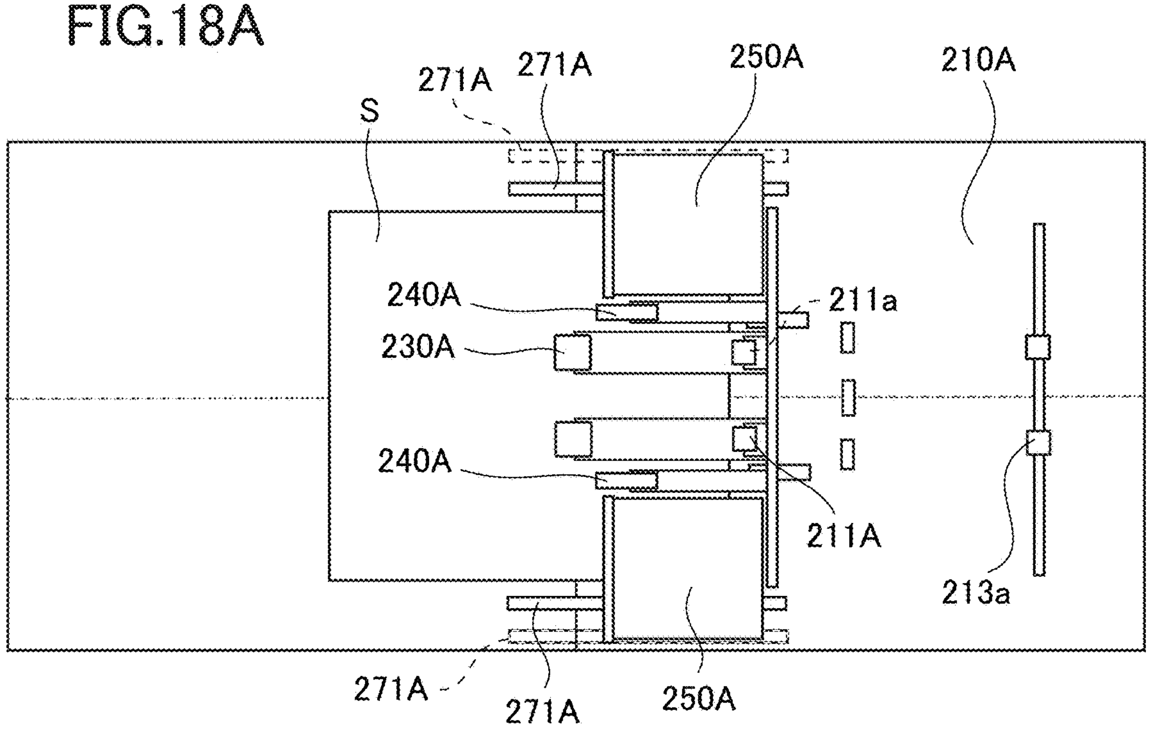
FIG. 18A is a schematic view of the main part of the sheet processing apparatus while the conveyance is stopped in the first shift discharge process according to the first embodiment as viewed from above.
Figure 18B:
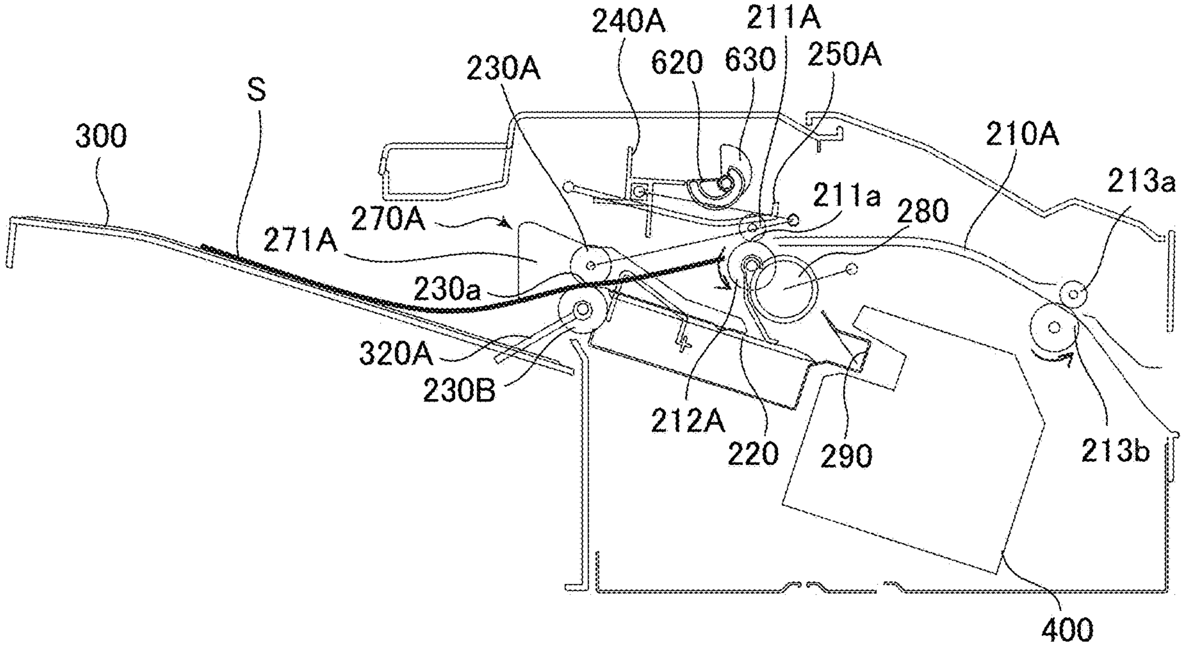
FIG. 18B is a schematic configurational section view of the sheet processing apparatus while the conveyance is stopped in the first shift discharge process according to the first embodiment.

Next, as illustrated in FIGS. 18A and B, when the upstream end (trailing end) of the sheet S in the first conveyance direction has passed the pre-processing nip portion 211*a* of the pre-processing rollers 211A and 212A, the upper discharge rollers 230A are moved down to the nipping position, and the sheet is nipped by the upper discharge rollers 230A and the lower discharge rollers 230B. In addition, the rotation of the lower discharge rollers 230B is stopped. For example, when the trailing end of the sheet S is reached a position that is 10 mm downstream of the pre-processing nip portion 211*a*, the upper discharge rollers 230A are positioned at the nipping position. As a result of this, a state in which the sheet S is nipped between the upper discharge rollers 230A and the lower discharge rollers 230B, and the conveyance is stopped is taken.

Figure 19A:
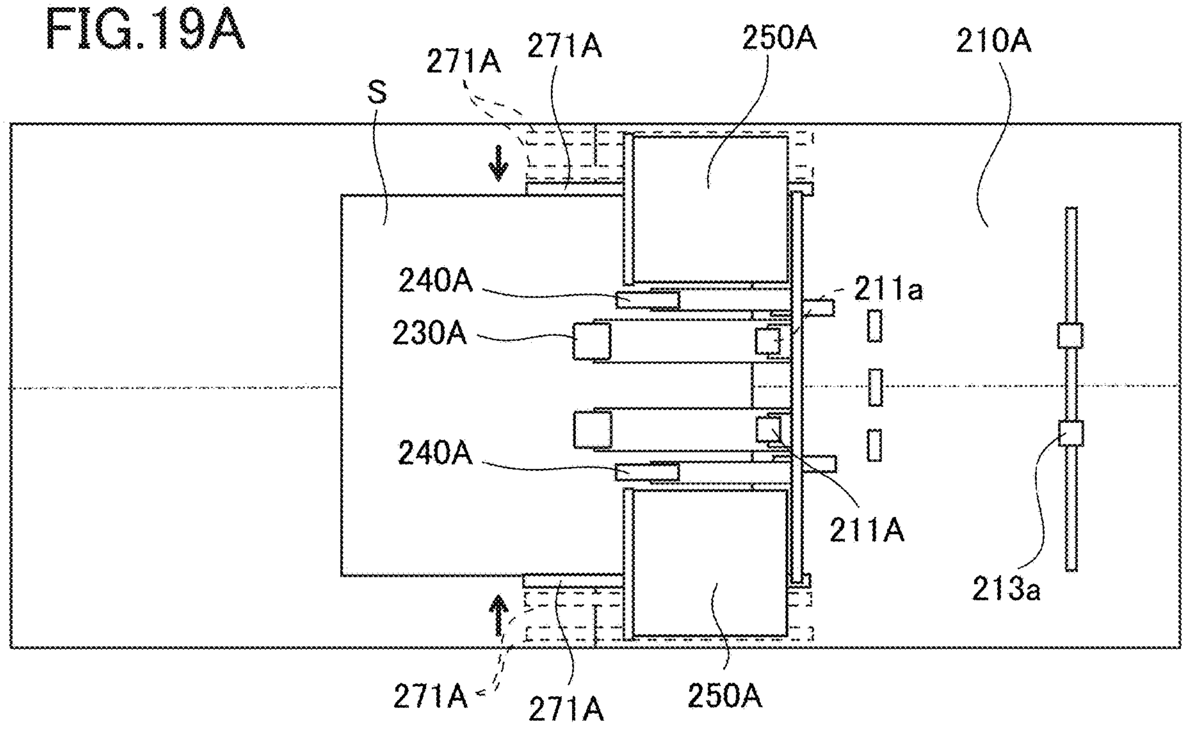
FIG. 19A is a schematic view of the main part of the sheet processing apparatus while the alignment plates are moved in the first shift discharge process according to the first embodiment as viewed from above.
Figure 19B:
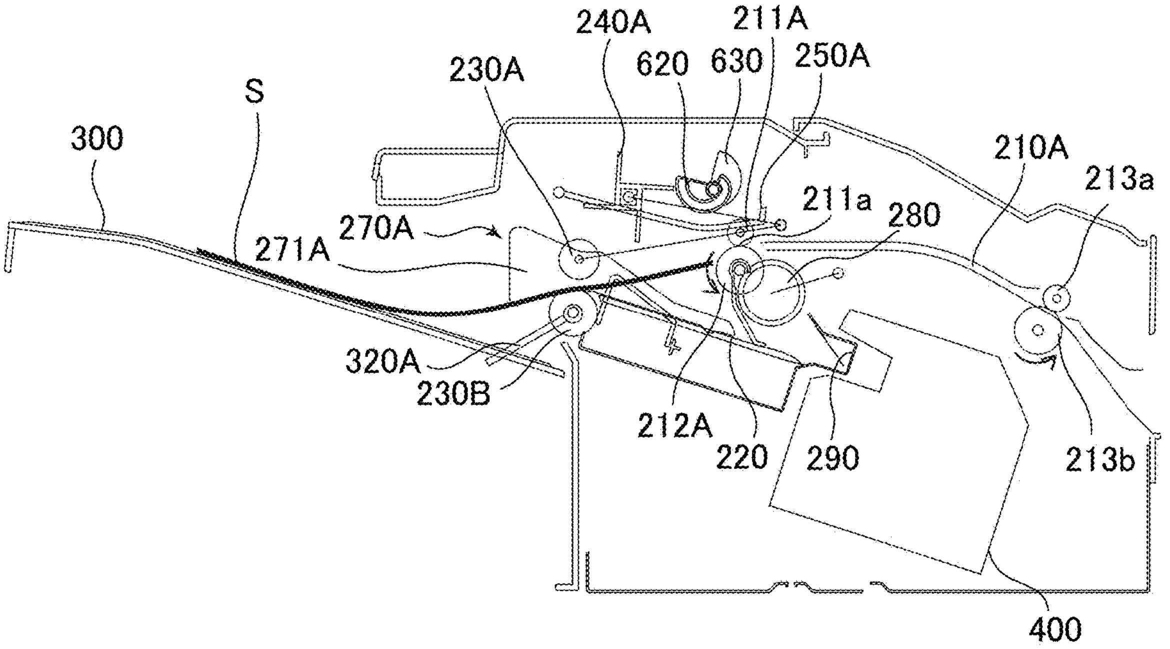
FIG. 19B is a schematic configurational section view of the sheet processing apparatus while the alignment plates are moved in the first shift discharge process according to the first embodiment.

In this state, as illustrated in FIGS. 19A and B, the upper discharge rollers 230A are moved up to the separated position, and the pair of alignment plates 271A are moved to a position in the width direction corresponding to the size of the sheet S. As a result of this, the sheet S is nipped from both sides in the width direction (both sides in the shift direction). To be noted, since the sheet S is nipped by the pair of alignment plates 271A, displacement of the sheet S in the first conveyance direction or the second conveyance direction is suppressed even when the upper discharge rollers 230A are moved up to the separated position.

Figure 20A:
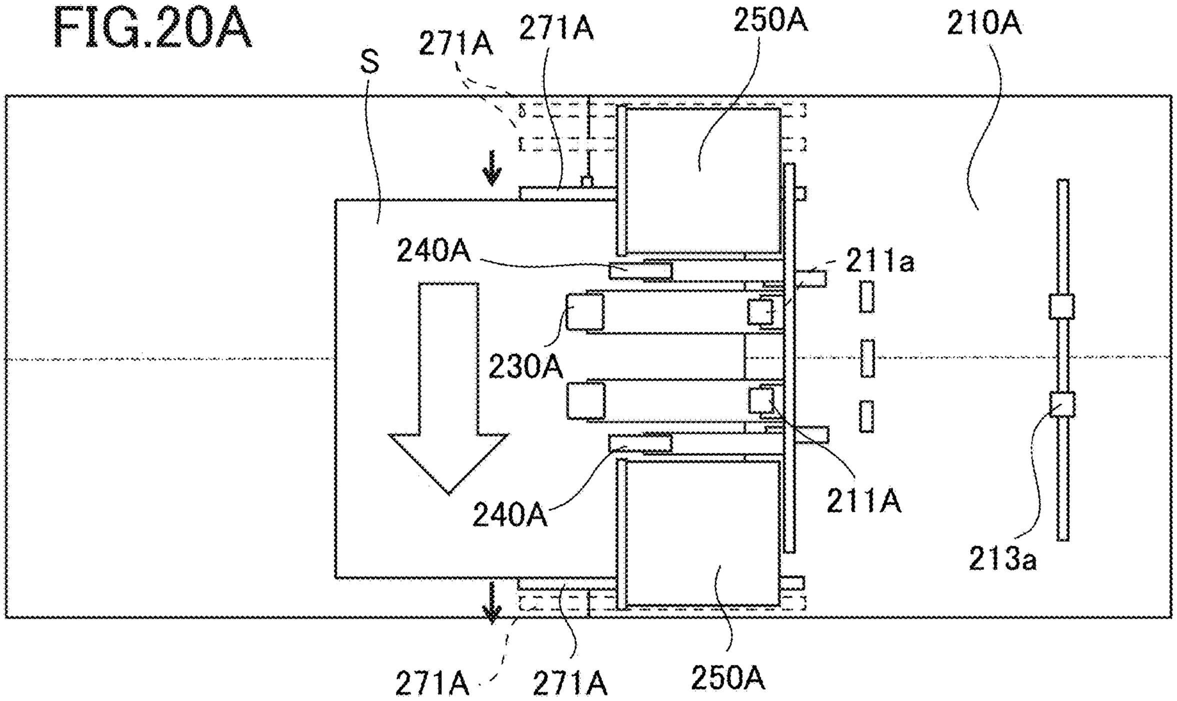
FIG. 20A is a schematic view of the main part of the sheet processing apparatus while the sheet is shifted by the alignment plates in the first shift discharge process according to the first embodiment as viewed from above.
Figure 20B:
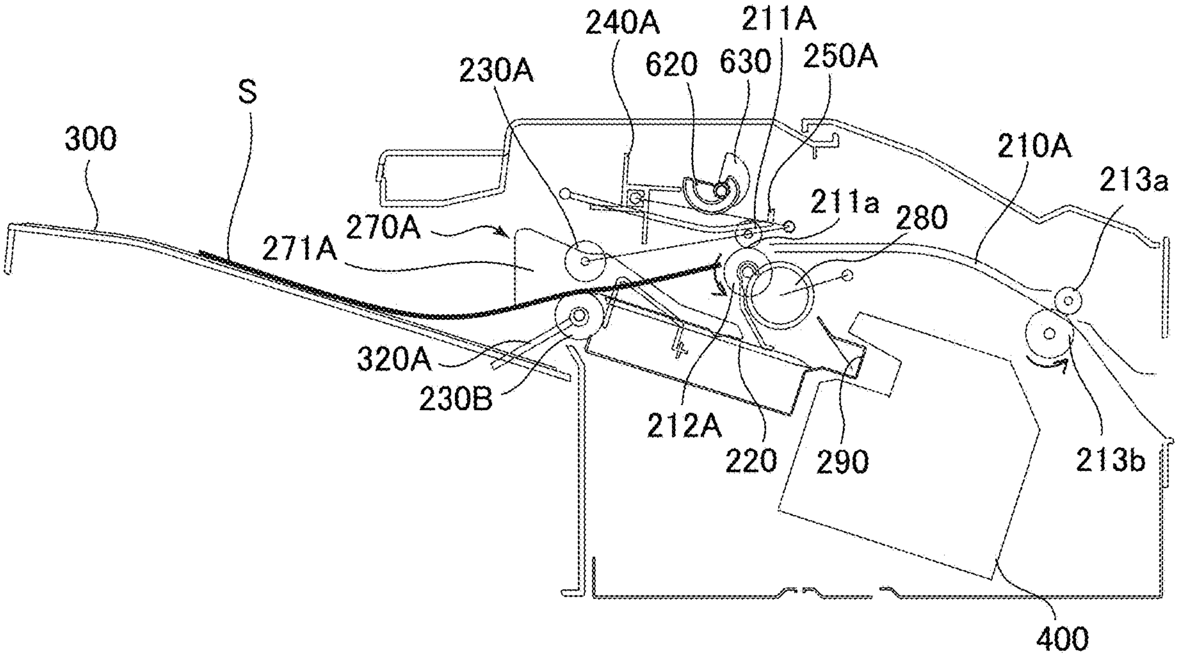
FIG. 20B is a schematic configurational section view of the sheet processing apparatus while the sheet is shifted by the alignment plates in the first shift discharge process according to the first embodiment.
Figure 21A:
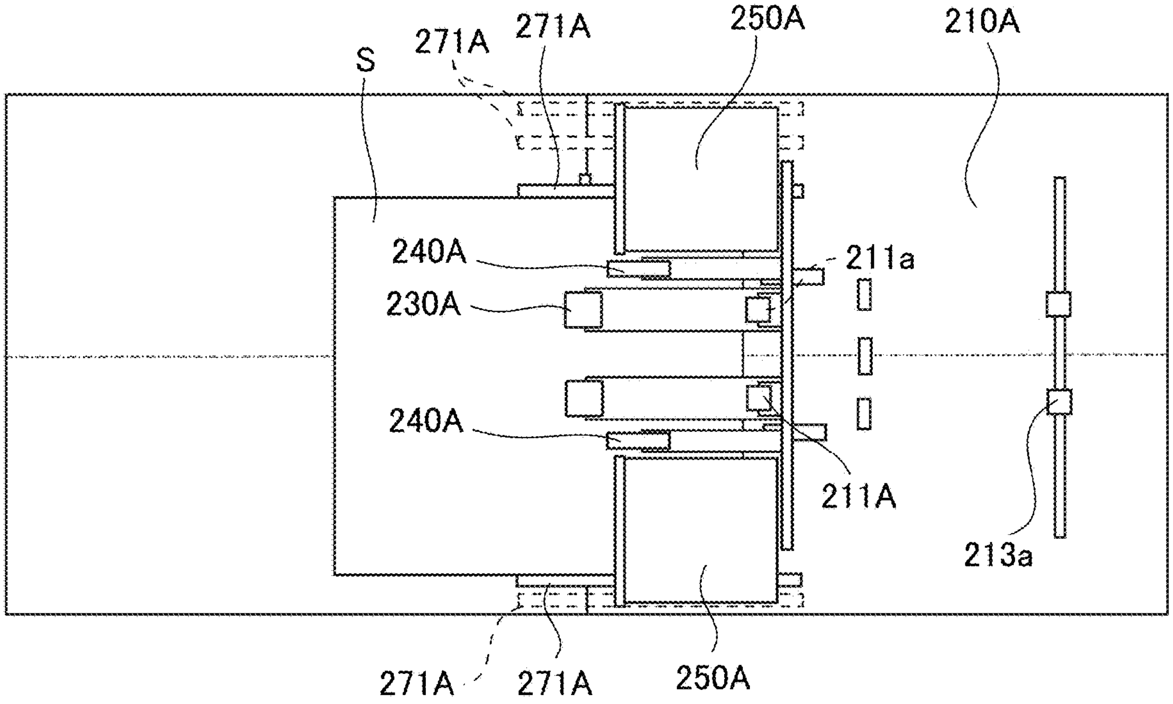
FIG. 21A is a schematic view of the main part of the sheet processing apparatus when the shift of the sheet is completed in the first shift discharge process according to the first embodiment as viewed from above.
Figure 21B:
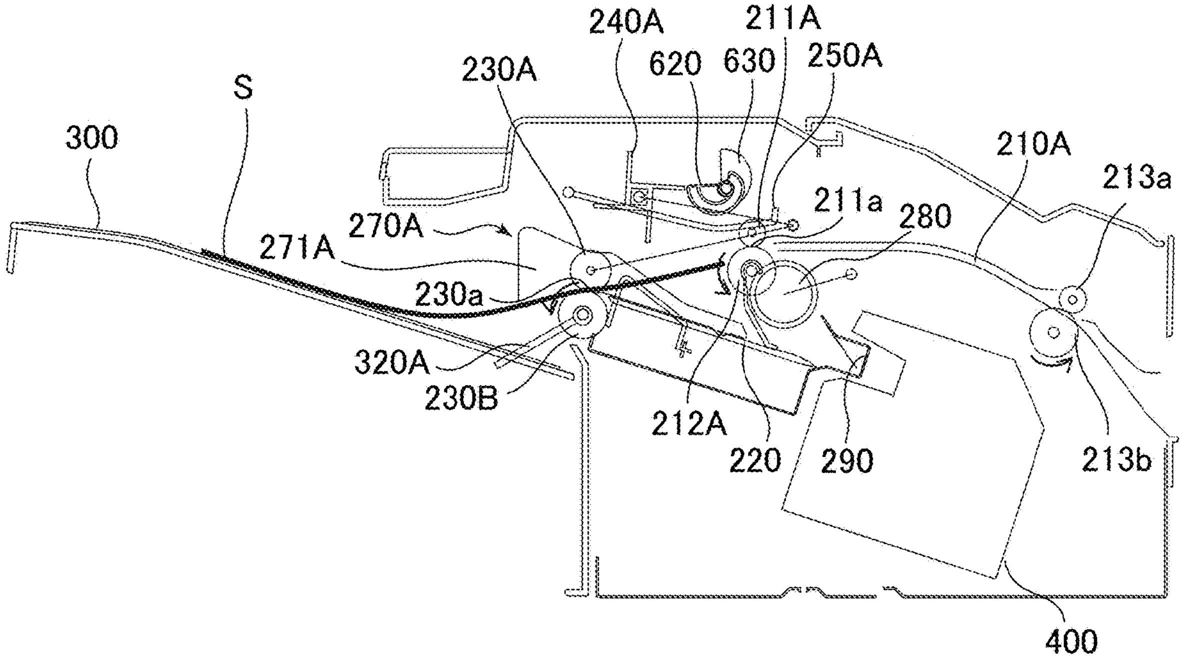
FIG. 21B is a schematic configurational section view of the sheet processing apparatus when the shift of the sheet is completed in the first shift discharge process according to the first embodiment.
Figure 22A:
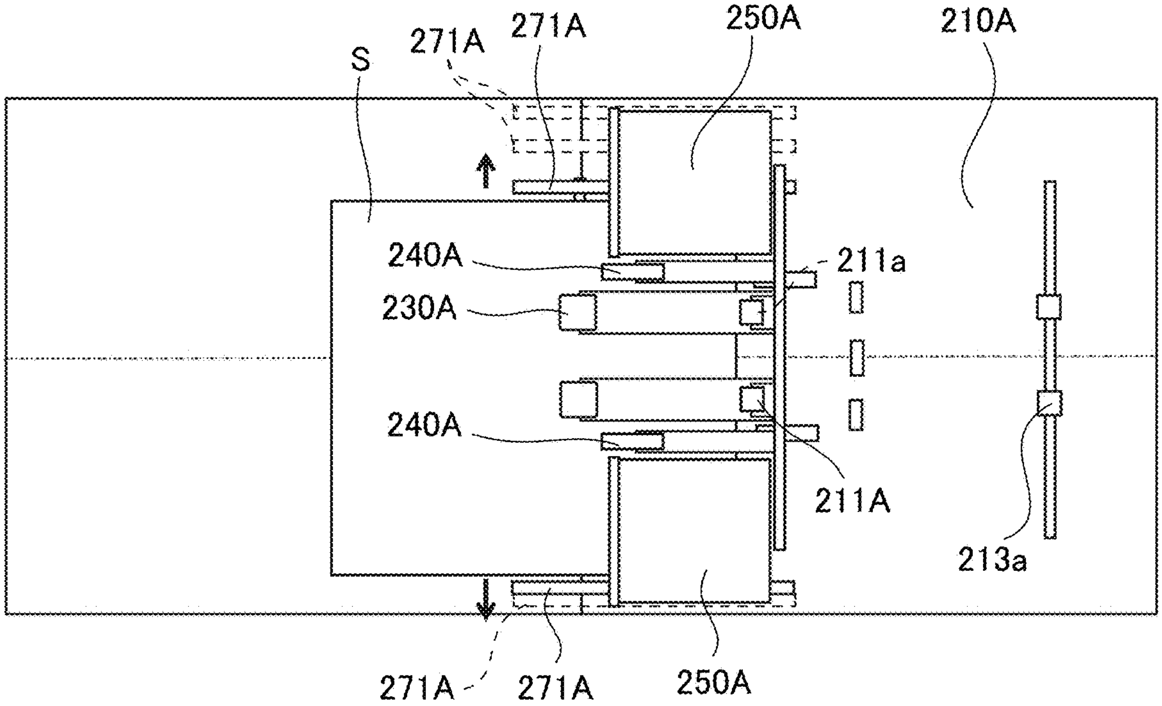
FIG. 22A is a schematic view of the main part of the sheet processing apparatus when the alignment plates are retracted in the first shift discharge process according to the first embodiment as viewed from above.
Figure 22B:
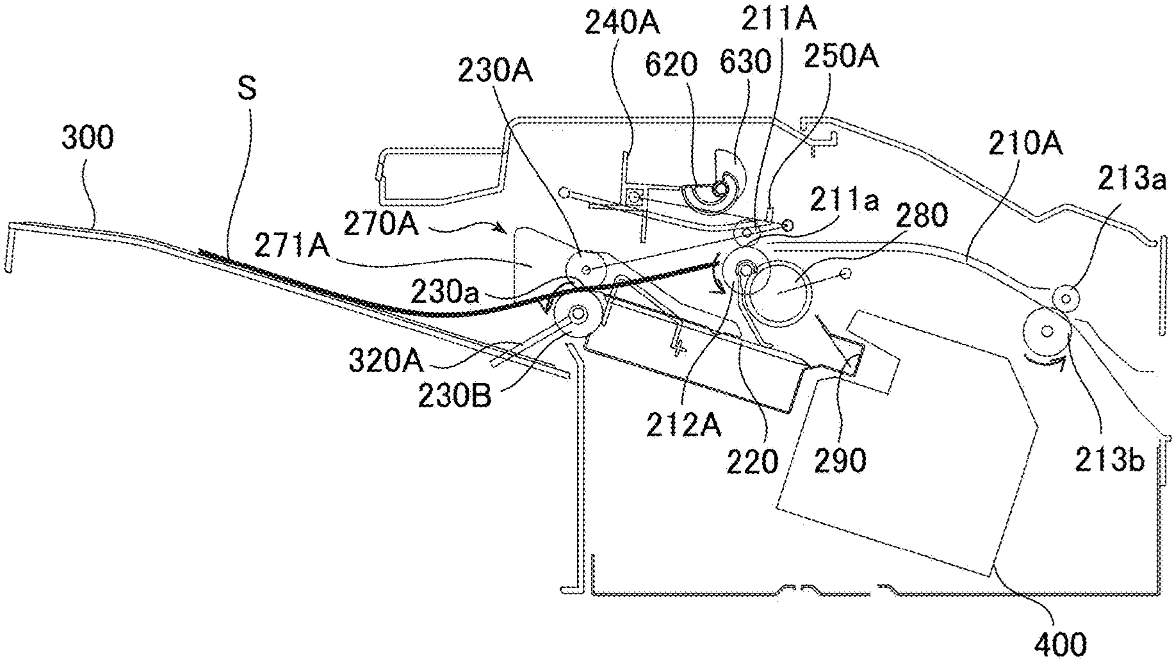
FIG. 22B is a schematic configurational section view of the sheet processing apparatus when the alignment plates are retracted in the first shift discharge process according to the first embodiment.

Then, as illustrated in FIGS. 20A and B, the sheet S is moved in the shift direction in a state in which the sheet S is nipped by the pair of alignment plates 271A. That is, the shifting operation is performed. After the shifting operation is completed, as illustrated in FIGS. 21A and B, the upper discharge rollers 230A are moved down to the nipping position, and the sheet S is nipped between the upper discharge rollers 230A and the lower discharge rollers 230B again. When the sheet S is nipped between the upper discharge rollers 230A and the lower discharge rollers 230B, the pair of alignment plates 271A are retracted from the sheet S as illustrated in FIGS. 22A and B. In this example, since the shift direction is a direction from the rear side to the front side, the alignment plate on the rear side serves as a first shifting portion, and the alignment plate on the front side serves as a second sifting portion, among the pair of alignment plates 271A. In addition, the rear-side alignment plate moving motor MT17 serves as a first driving portion, and the front-side alignment plate moving motor MT16 serves as a second driving portion. Conversely, in the case where the shift direction is a direction from the front side to the rear side, the alignment plate on the front side serves as a first shifting portion, and the alignment plate on the rear side serves as a second sifting portion, among the pair of alignment plates 271A. In addition, the front-side alignment plate moving motor MT16 serves as a first driving portion, and the rear-side alignment plate moving motor MT17 serves as a second driving portion.

Figure 23A:
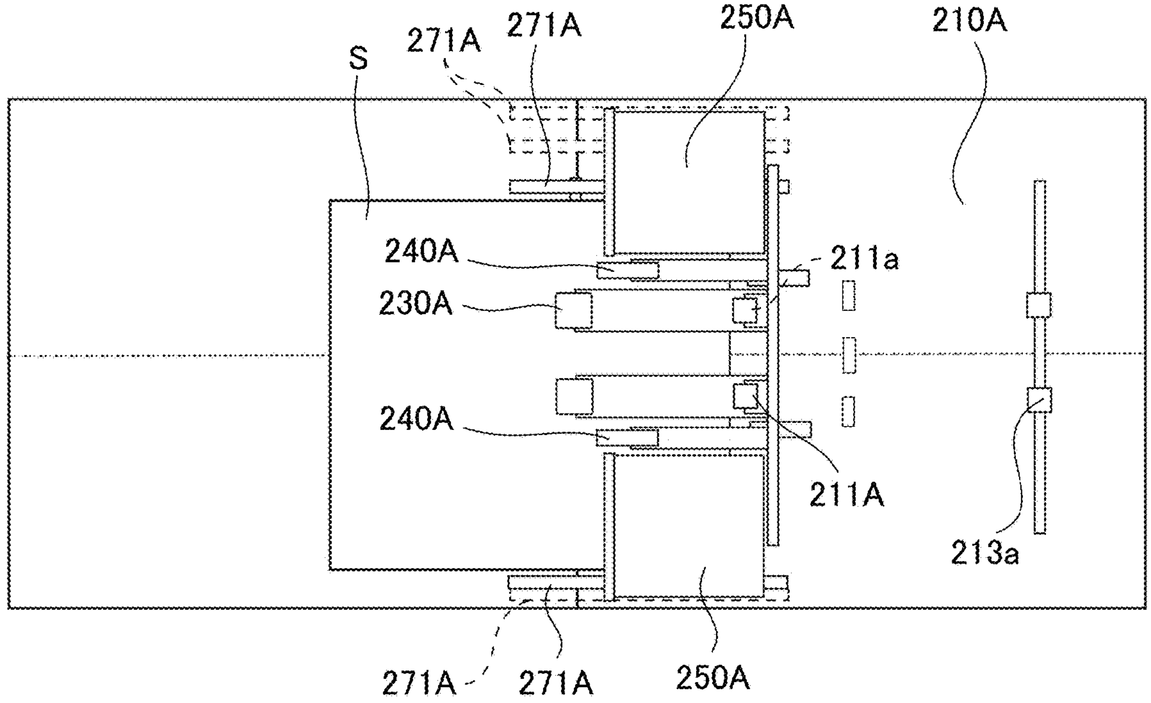
FIG. 23A is a schematic view of the main part of the sheet processing apparatus at the time of sheet discharge in the first shift discharge process according to the first embodiment as viewed from above.
Figure 23B:
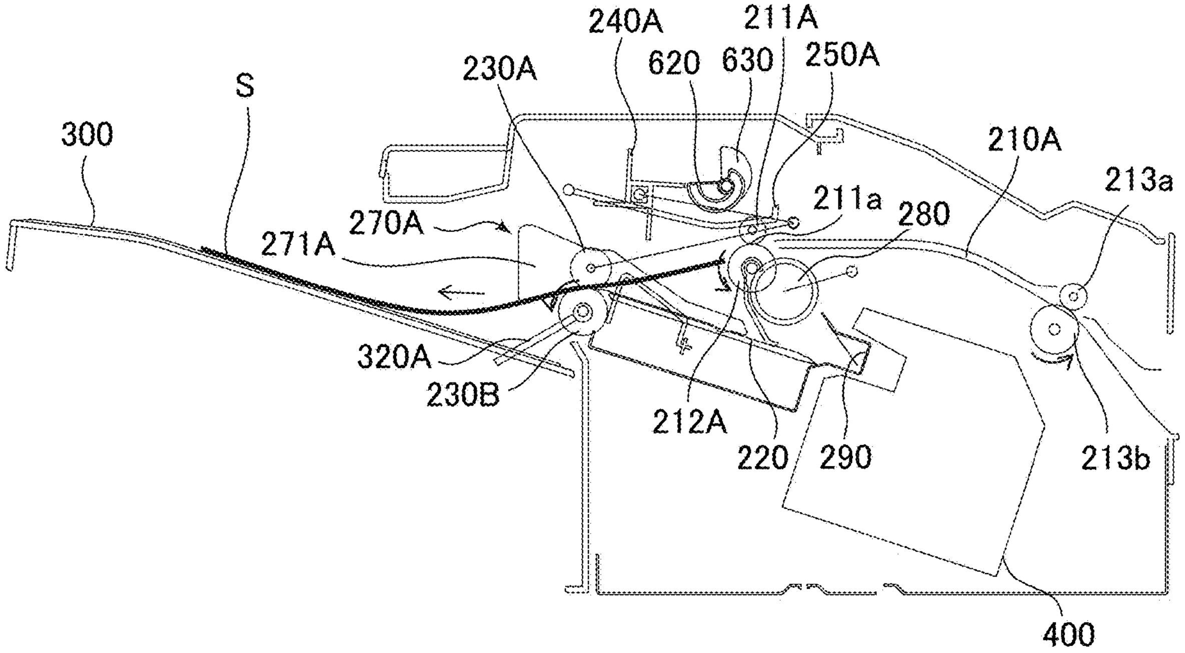
FIG. 23B is a schematic configurational section view of the sheet processing apparatus at the time of sheet discharge in the first shift discharge process according to the first embodiment.
Figure 24A:
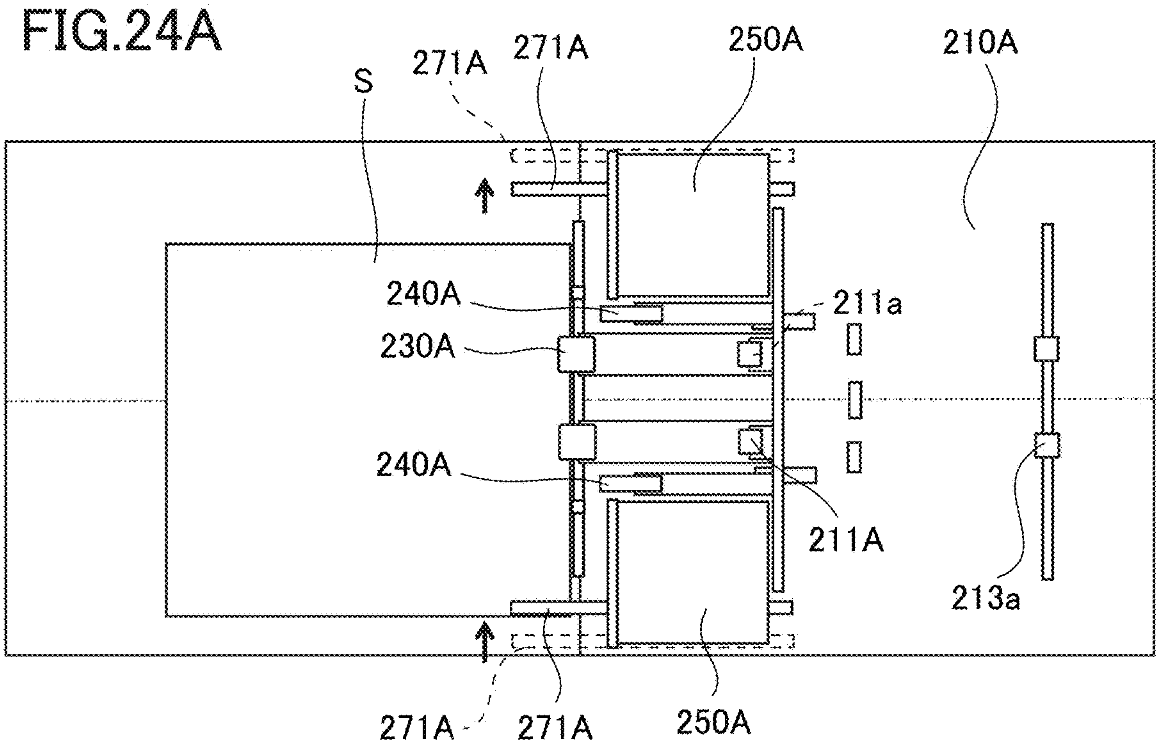
FIG. 24A is a schematic view of the main part of the sheet processing apparatus when the sheet discharge is completed in the first shift discharge process according to the first embodiment as viewed from above.
Figure 24B:
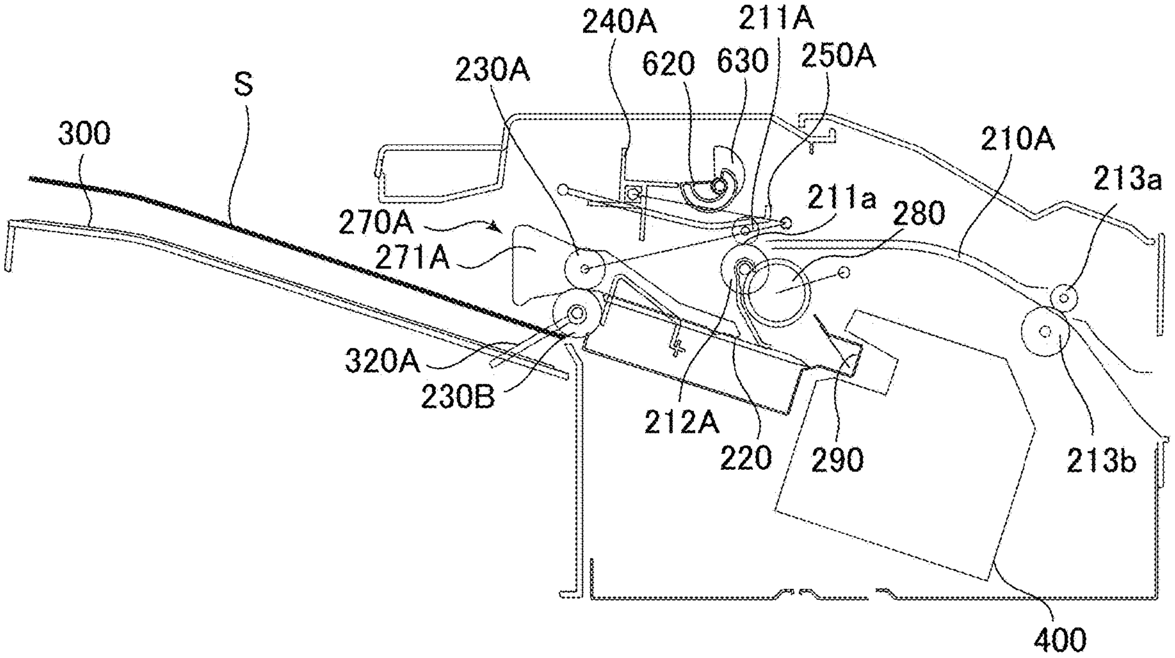
FIG. 24B is a schematic configurational section view of the sheet processing apparatus when the sheet discharge is completed in the first shift discharge process according to the first embodiment.

Next, as illustrated in FIGS. 23A and B, the lower discharge rollers 230B are rotated, and the sheet S nipped between the upper discharge rollers 230A and the lower discharge rollers 230B is discharged onto the stacking tray 300. After the sheet S is discharged onto the stacking tray 300, as illustrated in FIGS. 24A and B, the sheet S is further raked in by the discharged sheet rake-in paddles 320A, and further the trailing end of the sheet S is pressed. At this time, the pair of alignment plates 271A are moved to the receiving position to receive the next sheet.

In the case of the productivity-prioritized mode described above, since an operation of conveying the sheet S in the second conveyance direction onto the processing tray 220 (switchback conveyance) is not performed, the shifting operation of the sheet S can be performed more quickly than in the case of on the processing tray 220. To be noted, the productivity-prioritized mode is preferably applicable to a sheet of a small size, but may be executed for a sheet of a large size, that is, may be executed for all the sheets shifted and discharged without performing the stapling process.

[Second Shift Discharge Process (Alignment-Prioritized Mode)]

Next, the second shift discharge process (alignment-prioritized mode) among the shifting modes will be described with reference to FIGS. 25A to 34B. To be noted, although the alignment-prioritized mode may be executed for a sheet of a small size, but a case of execution for a sheet of a large size will be described herein. The state in which the sheet S has not been conveyed to the conveyance path 210A yet and the state in which the sheet S has been conveyed to the entrance of the conveyance path 210A are the same as those illustrated in FIGS. 15A to 16B described for the first shift discharge process.

Figure 25A:
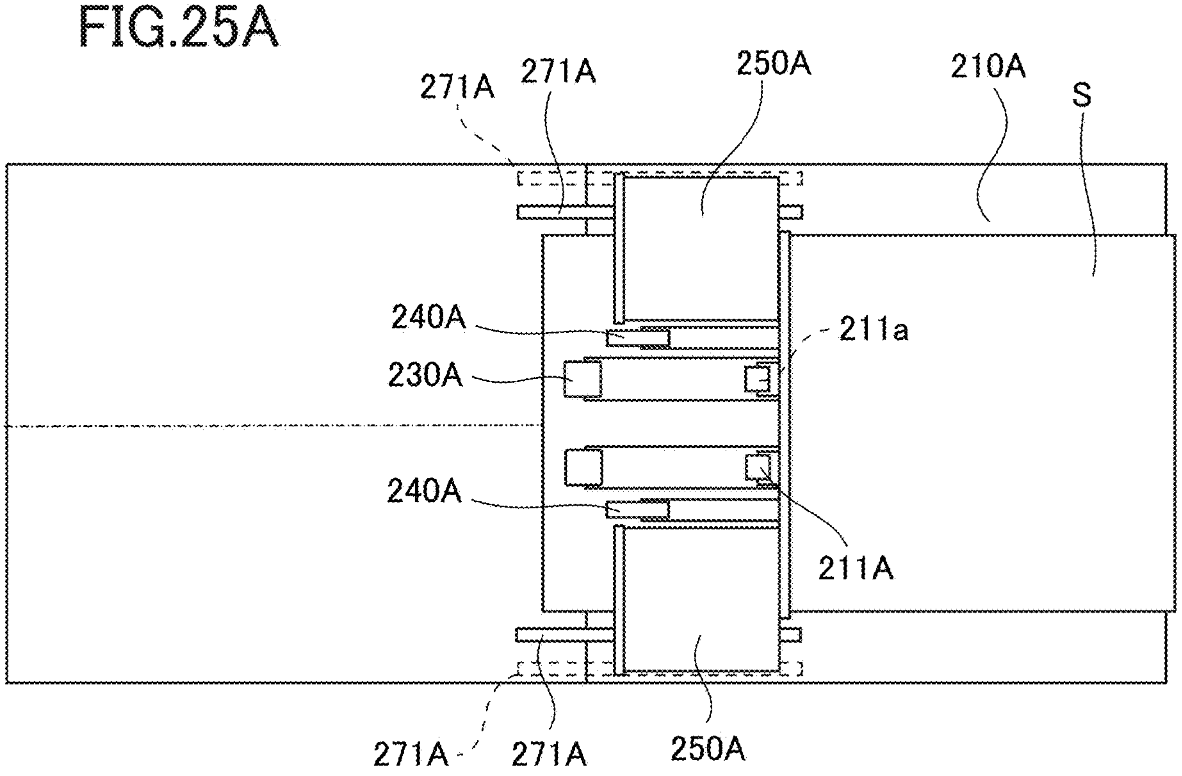
FIG. 25A is a schematic view of the main part of the sheet processing apparatus in a state in which the leading end of the sheet has passed the discharge rollers in a second shift discharge process according to the first embodiment as viewed from above.
Figure 25B:
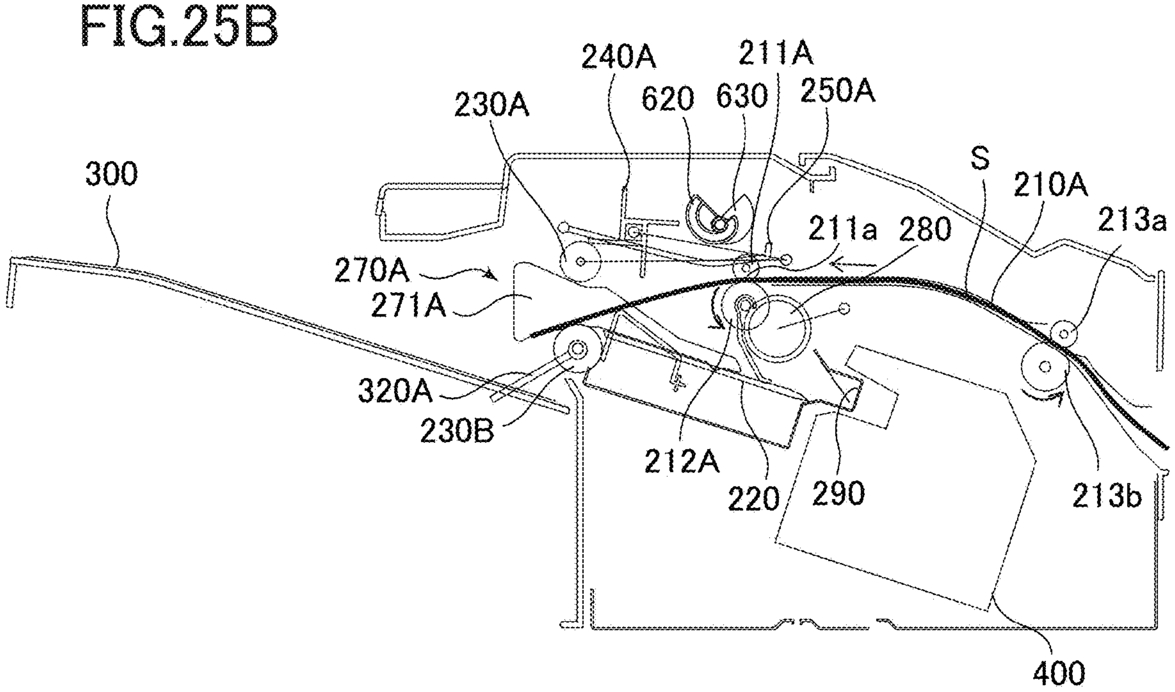
FIG. 25B is a schematic configurational section view of the sheet processing apparatus in a state in which the leading end of the sheet has passed the discharge rollers in the second shift discharge process according to the first embodiment.

In the second shift discharge process, as illustrated in FIGS. 25A and B, even when the downstream end (leading end) of the sheet S in the first conveyance direction has passed the pre-processing nip portion 211*a* of the pre-processing rollers 211A and 212A and the leading end of the sheet S has passed the lower discharge rollers 230B, the upper discharge rollers 230A do not move down. That is, in this state, the upper discharge rollers 230A, the rake-in paddles 240A, and the trailing end dropping members 250A are still positioned at the home position.

Figure 26A:
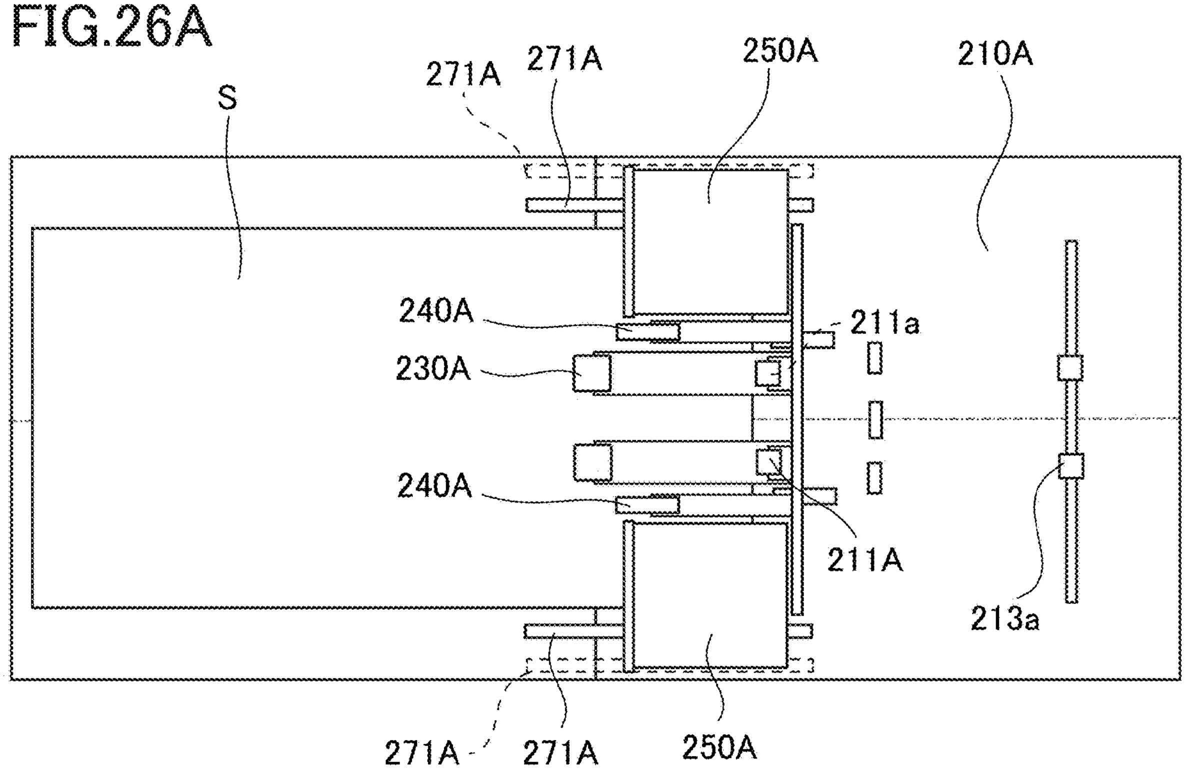
FIG. 26A is a schematic view of the main part of the sheet processing apparatus in a state in which the trailing end of the sheet has passed pre-processing rollers in the second shift discharge process according to the first embodiment as viewed from above.
Figure 26B:
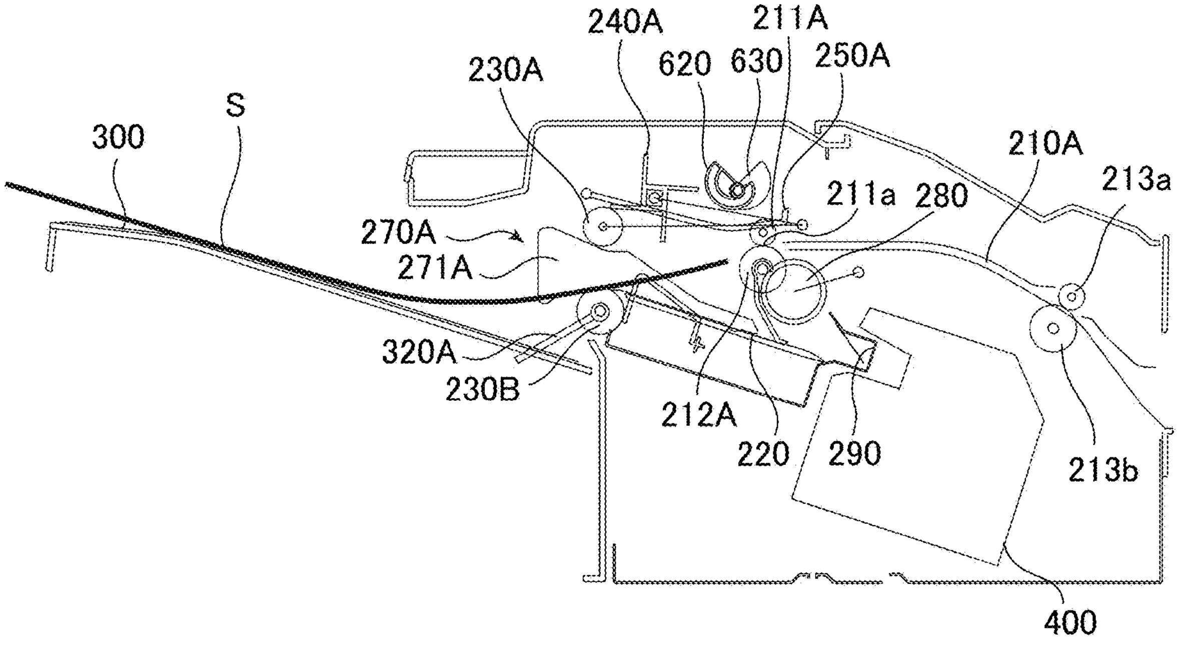
FIG. 26B is a schematic configurational section view of the sheet processing apparatus in the state in which the trailing end of the sheet has passed the pre-processing roller in the second shift discharge process according to the first embodiment.
Figure 27A:
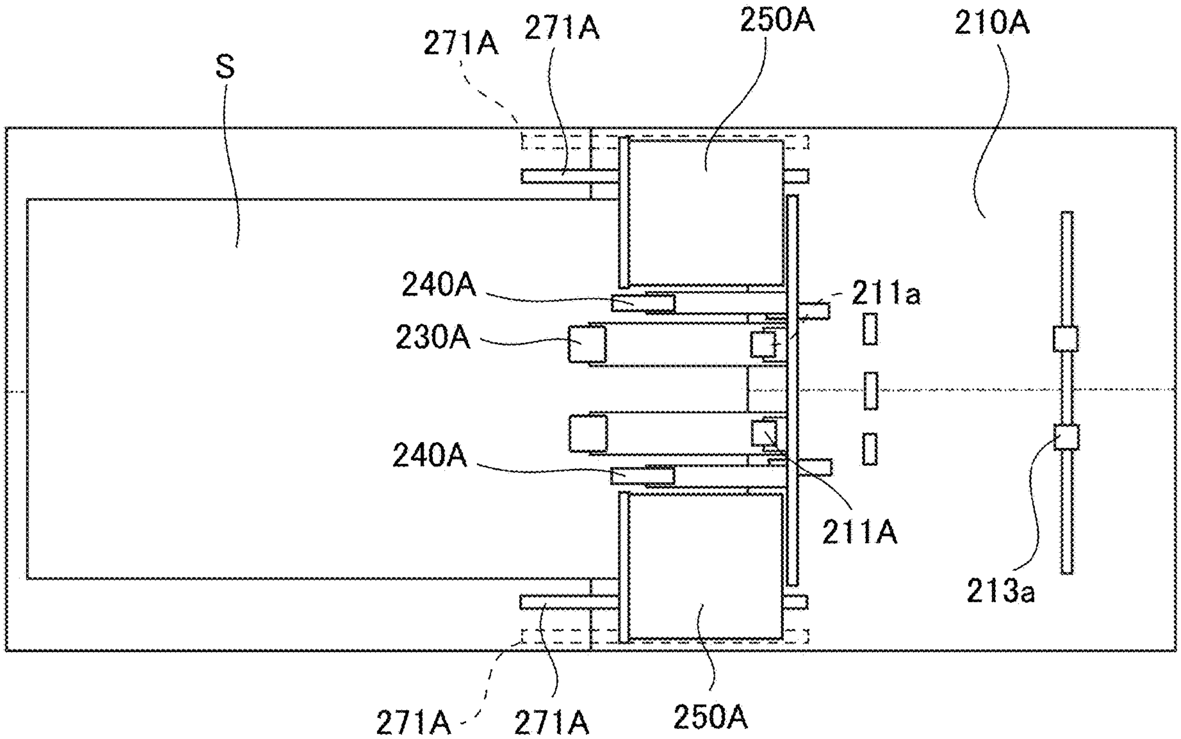
FIG. 27A is a schematic view of the main part of the sheet processing apparatus at the time of sheet rake-in of the second shift discharge process according to the first embodiment as viewed from above.
Figure 27B:
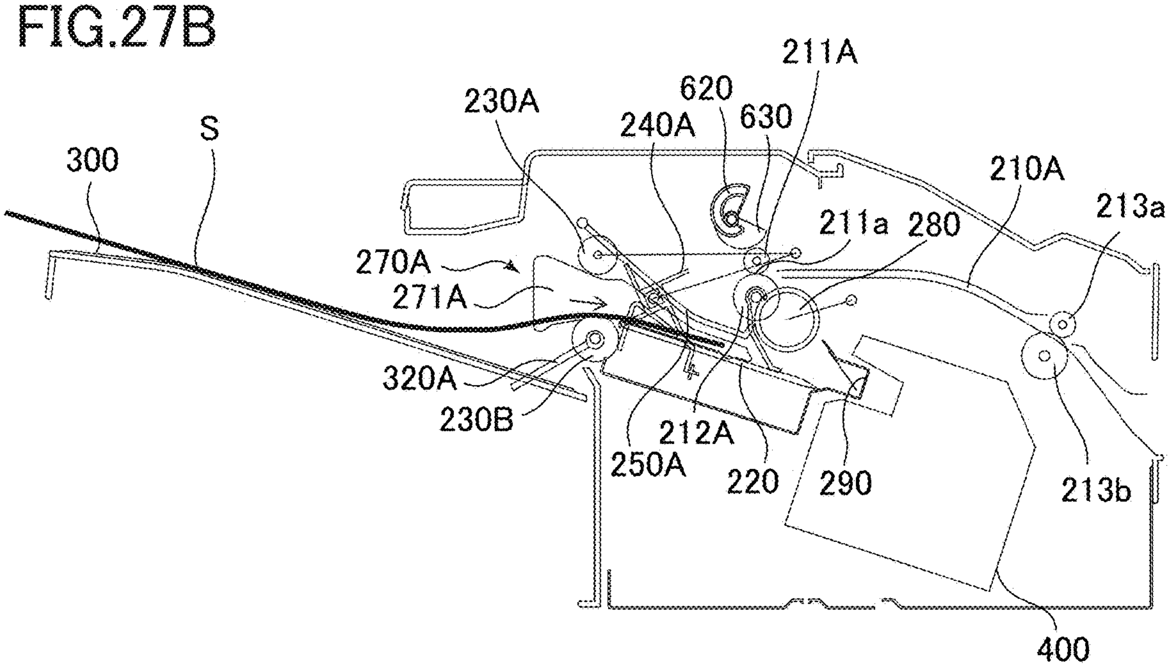
FIG. 27B is a schematic configurational section view of the sheet processing apparatus at the time of sheet rake-in of the second shift discharge process according to the first embodiment.

Next, as illustrated in FIGS. 26A and B, after the upstream end (trailing end) of the sheet S in the first conveyance direction has passed the pre-processing nip portion 211*a* of the pre-processing rollers 211A and 212A, descent of the rake-in paddles 240A is started. Then, as illustrated in FIGS. 27A and B, the rake-in paddles 240A are positioned at the returning position, the trailing end dropping members 250A are positioned at the lower position, the sheet S is dropped onto the processing tray 220, and the sheet S is conveyed in the second conveyance direction by the rake-in paddles 240A.

Figure 28A:
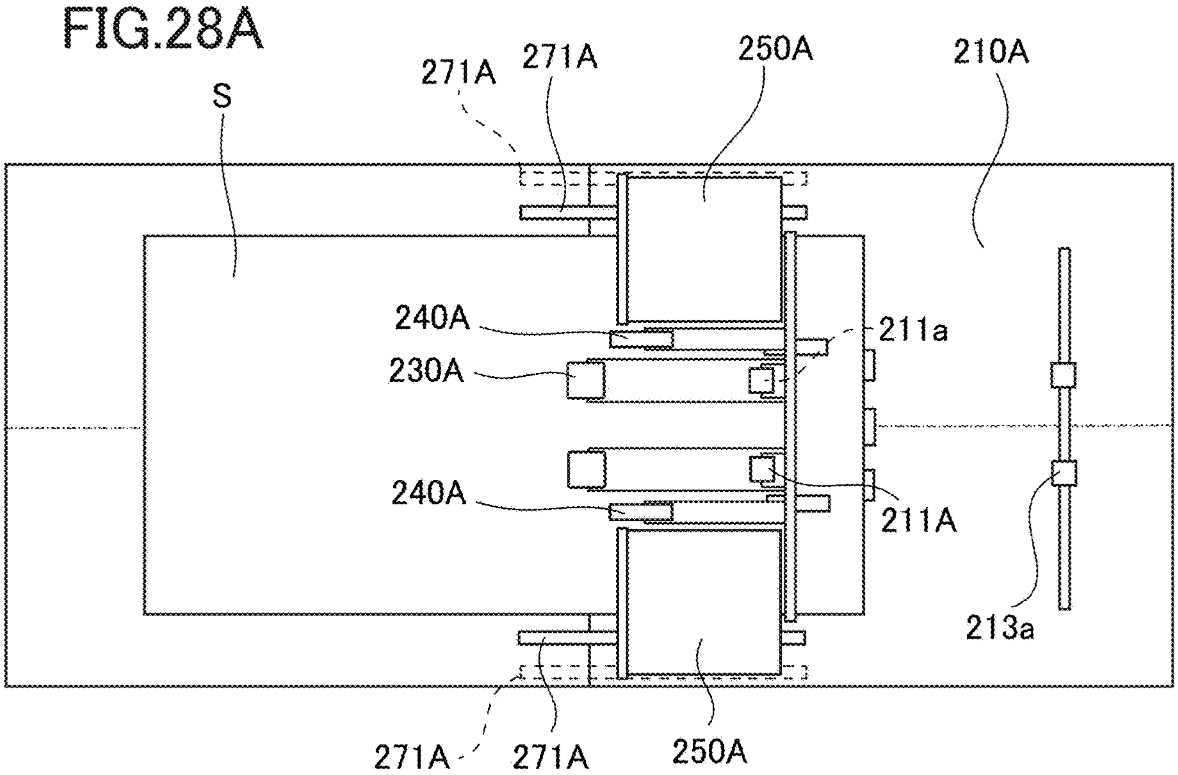
FIG. 28A is a schematic view of the main part of the sheet processing apparatus at the time of descent of a returning member in the second shift discharge process according to the first embodiment as viewed from above.
Figure 28B:
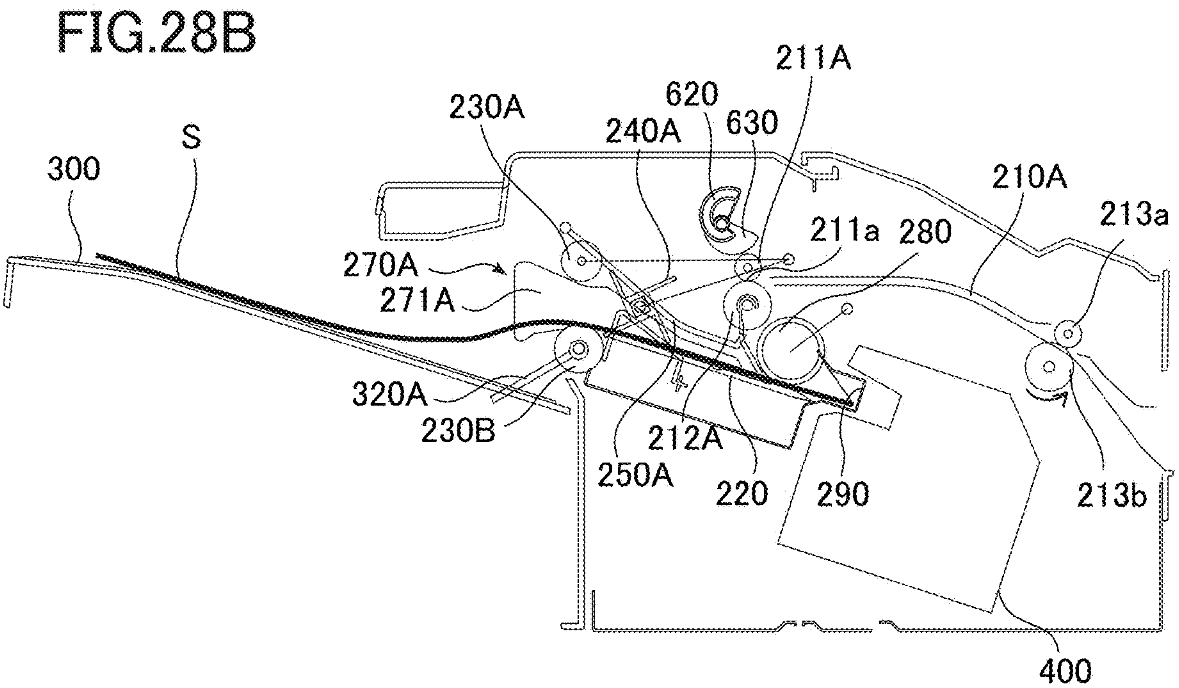
FIG. 28B is a schematic configurational section view of the sheet processing apparatus at the time of descent of the returning member in the second shift discharge process according to the first embodiment.
Figure 29A:
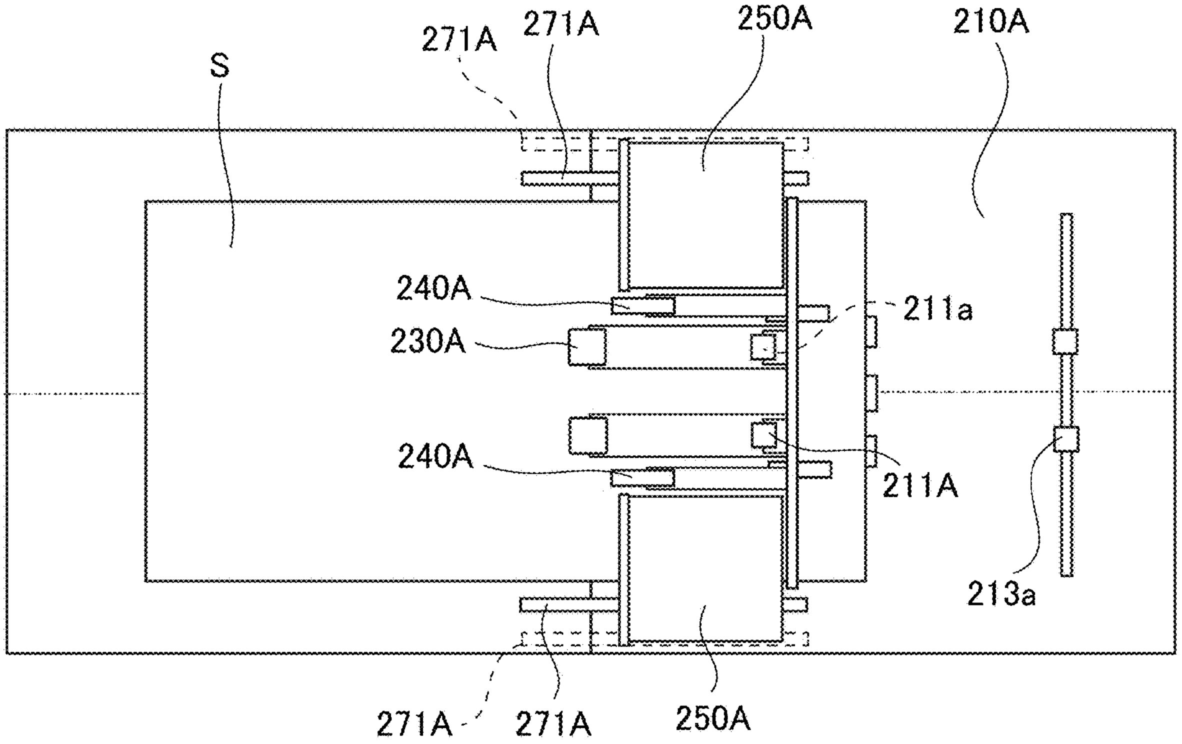
FIG. 29A is a schematic view of the main part of the sheet processing apparatus at the time of ascent of the trailing end dropping members, the rake-in paddles, and the returning member in the second shift discharge process according to the first embodiment as viewed from above.
Figure 29B:
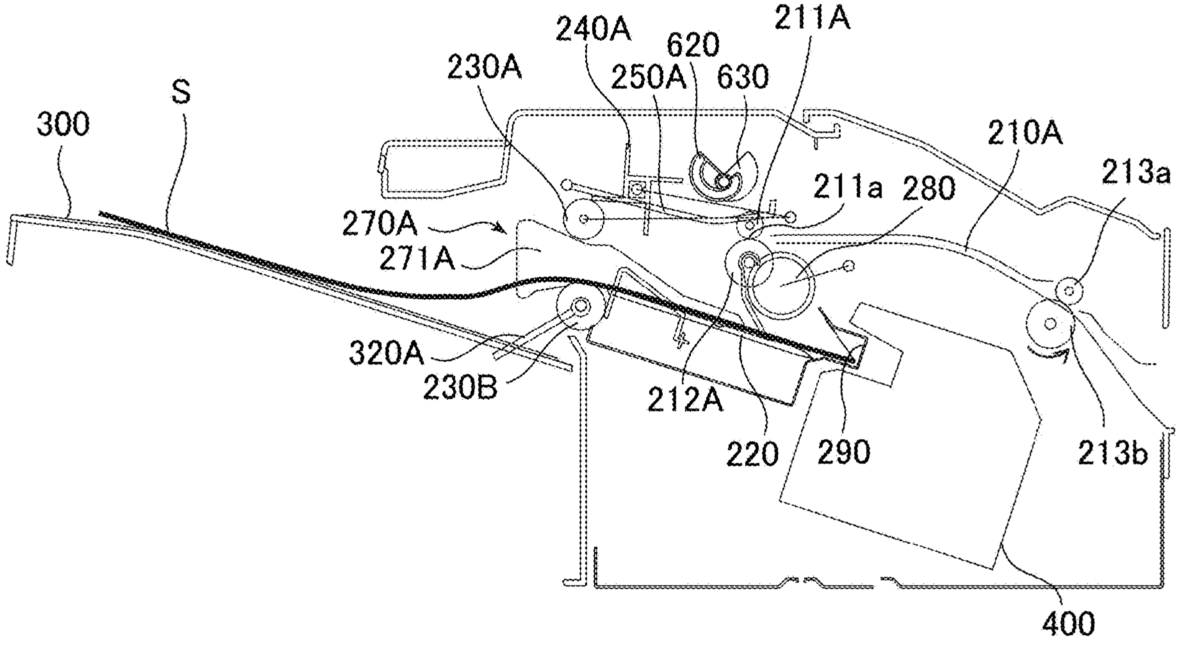
FIG. 29B is a schematic configurational section view of the sheet processing apparatus at the time of ascent of the trailing end dropping members, the rake-in paddles, and the returning member in the second shift discharge process according to the first embodiment.
Figure 30A:
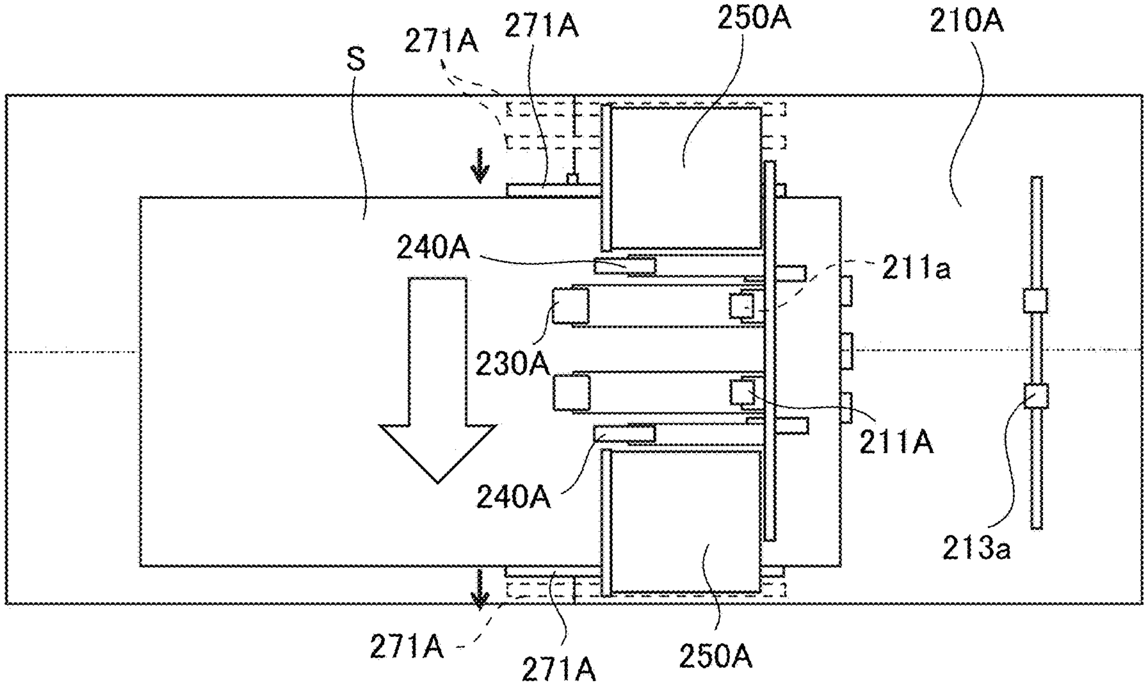
FIG. 30A is a schematic view of the main part of the sheet processing apparatus when the sheet is shifted by the alignment plates in the second shift discharge process according to the first embodiment as viewed from above.
Figure 30B:
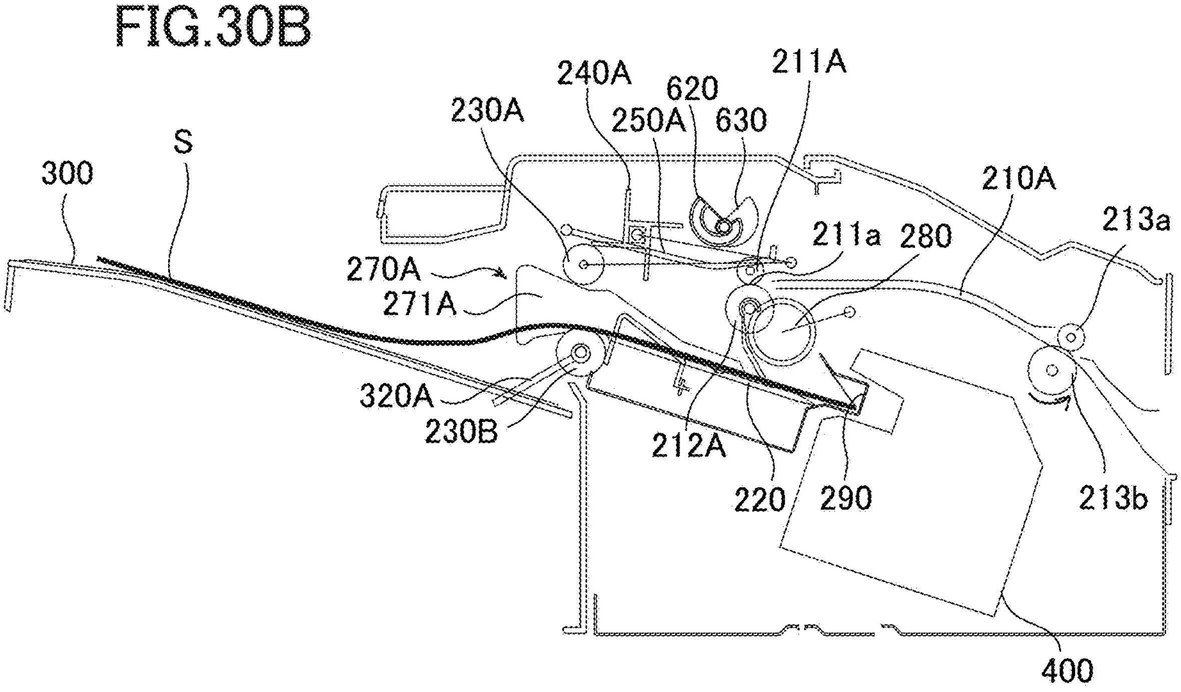
FIG. 30B is a schematic configurational section view of the sheet processing apparatus when the sheet is shifted by the alignment plates in the second shift discharge process according to the first embodiment.

Further, as illustrated in FIGS. 28A and B, the returning member 280 (knurled belt 281) is also moved down, the sheet S is conveyed in the second conveyance direction by the rake-in paddles 240A and the returning member 280, and the trailing end of the sheet S is caused to abut the trailing end regulating member 290. Then, as illustrated in FIGS. 29A and B, the rake-in paddles 240A, the trailing end dropping members 250A, and the returning member 280 are moved up. In this state, as illustrated in FIGS. 30A and B, only the alignment plate 271A (first shifting portion) on the upstream side in the shift direction (upper side in FIG. 30A) among the pair of alignment plates 271A is moved toward the sheet S, and the sheet S is moved in the shift direction by this alignment plate 271A. That is, in the second shift discharge process, the shifting operation of the sheet S is performed by moving the alignment plate 271A on the upstream side in the shift direction without nipping the sheet by the pair of alignment plates 271A. The alignment plate 271A on the downstream side (lower side in FIG. 30A) is standing by at the receiving position at the start of the shifting operation, and moves in the shift direction from this receiving position in accordance with the shift amount of the sheet S. To be noted, the knurled belt 281 in a rotating state may be brought into contact with the upper surface of the sheet in the shifting operation by the alignment plates 271A. As a result of this, the shifting operation is performed in a state in which the trailing end of the sheet has been caused to abut the trailing end regulating member 290, and therefore the behavior of the sheet becomes stable.

The alignment plate 271A on the downstream side is not moved from the receiving position to the sheet S side as described above to enable the shifting operation in a state in which a plurality of sheets are placed on the processing tray 220 in the second shift discharge process. That is, it is because in the case of performing the shifting operation on the second or later sheet, if the alignment plate 271A on the downstream side is moved from the receiving position to the sheet side, the first sheet is also pushed and moved by this alignment plate 271A on the downstream side, and there is a possibility that the alignment of the first sheet is disturbed.

Figure 31A:
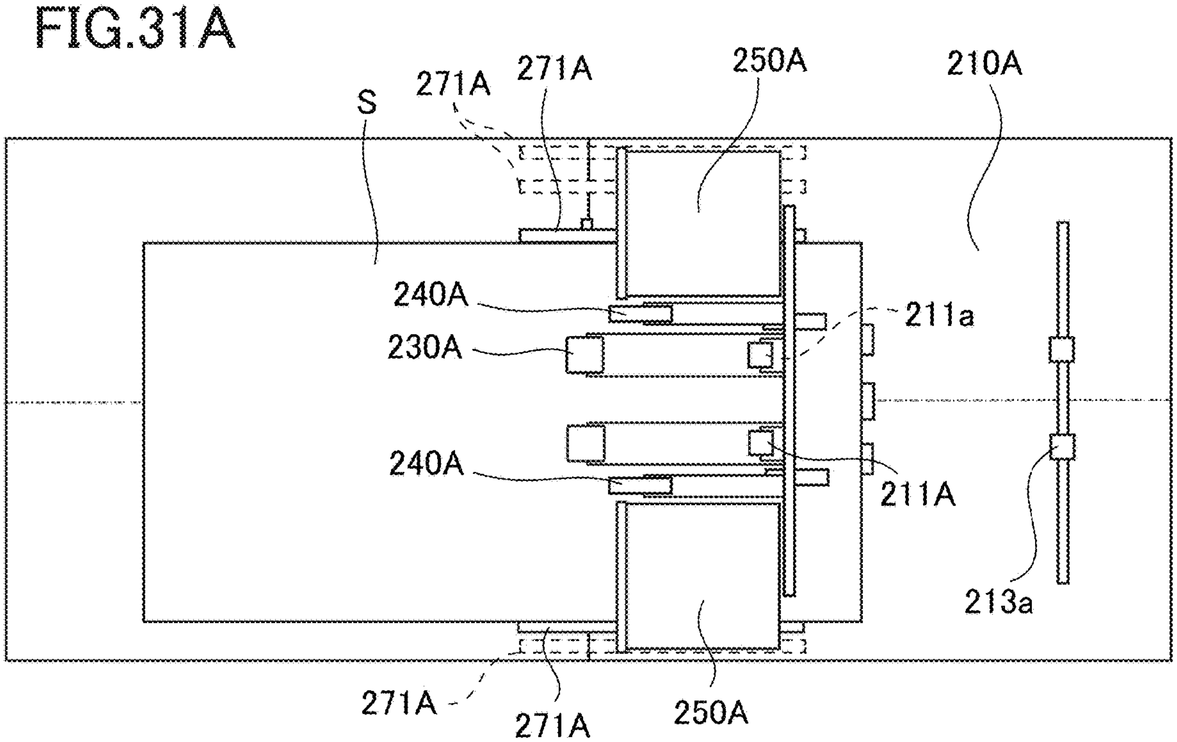
FIG. 31A is a schematic view of the main part of the sheet processing apparatus when the shift of the sheet is completed in the second shift discharge process according to the first embodiment as viewed from above.
Figure 31B:
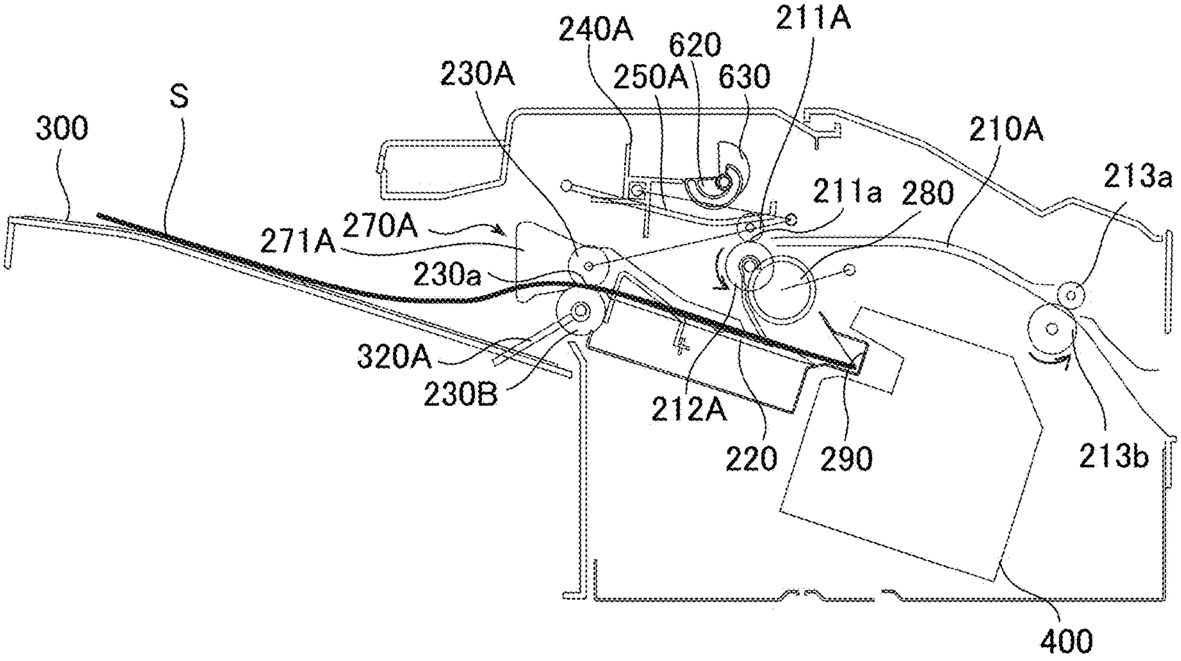
FIG. 31B is a schematic configurational section view of the sheet processing apparatus when the shift of the sheet is completed in the second shift discharge process according to the first embodiment.
Figure 32A:
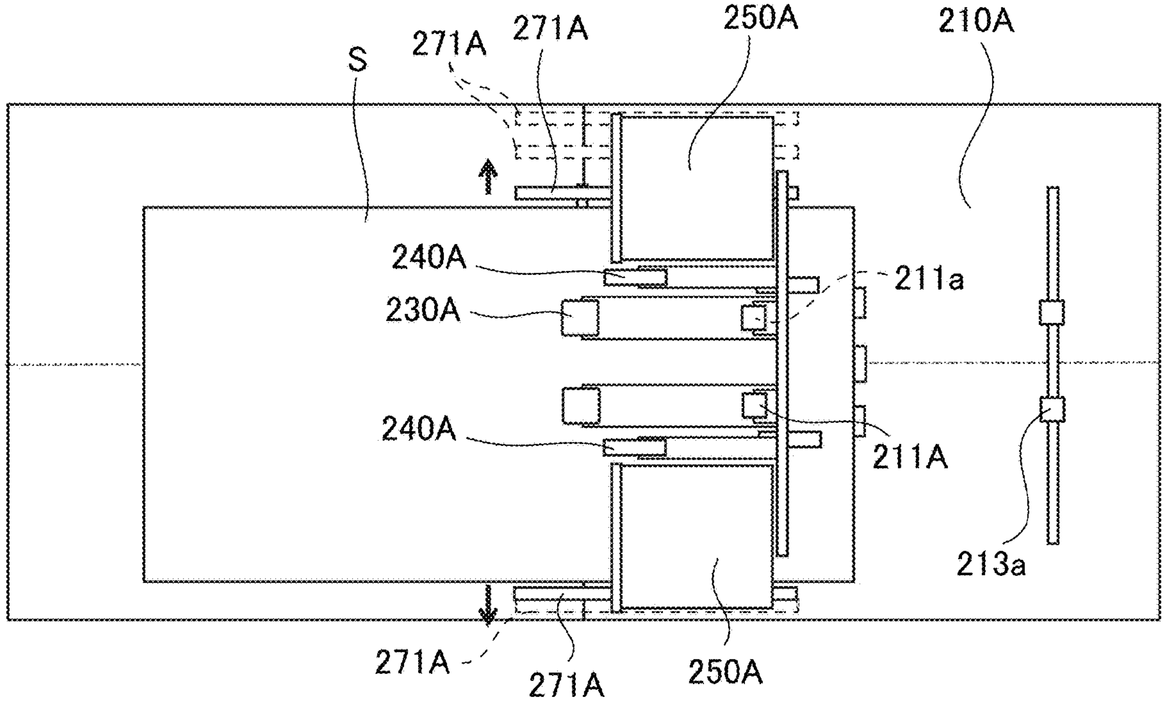
FIG. 32A is a schematic view of the main part of the sheet processing apparatus when the alignment plate is retracted in the second shift discharge process according to the first embodiment as viewed from above.
Figure 32B:
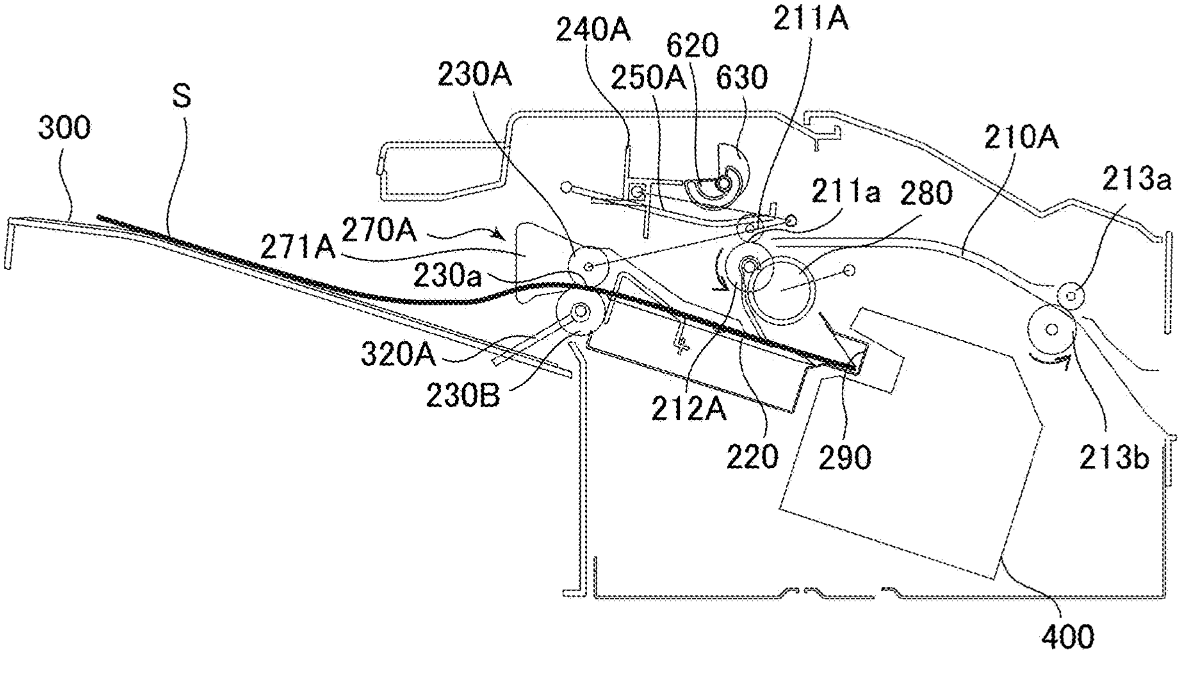
FIG. 32B is a schematic configurational section view of the sheet processing apparatus when the alignment plate is retracted in the second shift discharge process according to the first embodiment.

When the shifting operation of the sheet S is completed, as illustrated in FIGS. 31A and B, the upper discharge rollers 230A are moved down to the nipping position, and the sheet S is nipped between the upper discharge rollers 230A and the lower discharge rollers 230B. When the sheet S is nipped between the upper discharge rollers 230A and the lower discharge rollers 230B, the pair of alignment plates 271A are retracted from the sheet S as illustrated in FIGS. 32A and B. Although a case of performing the second shift discharge direction on one sheet S will be described in this example, in the case of performing the second shift discharge process on a plurality of sheets of two or more, the upper discharge rollers 230A are moved up from this state, and the shift operation is performed for the second and later sheets in a similar manner to the sheet S described above.

Figure 33A:
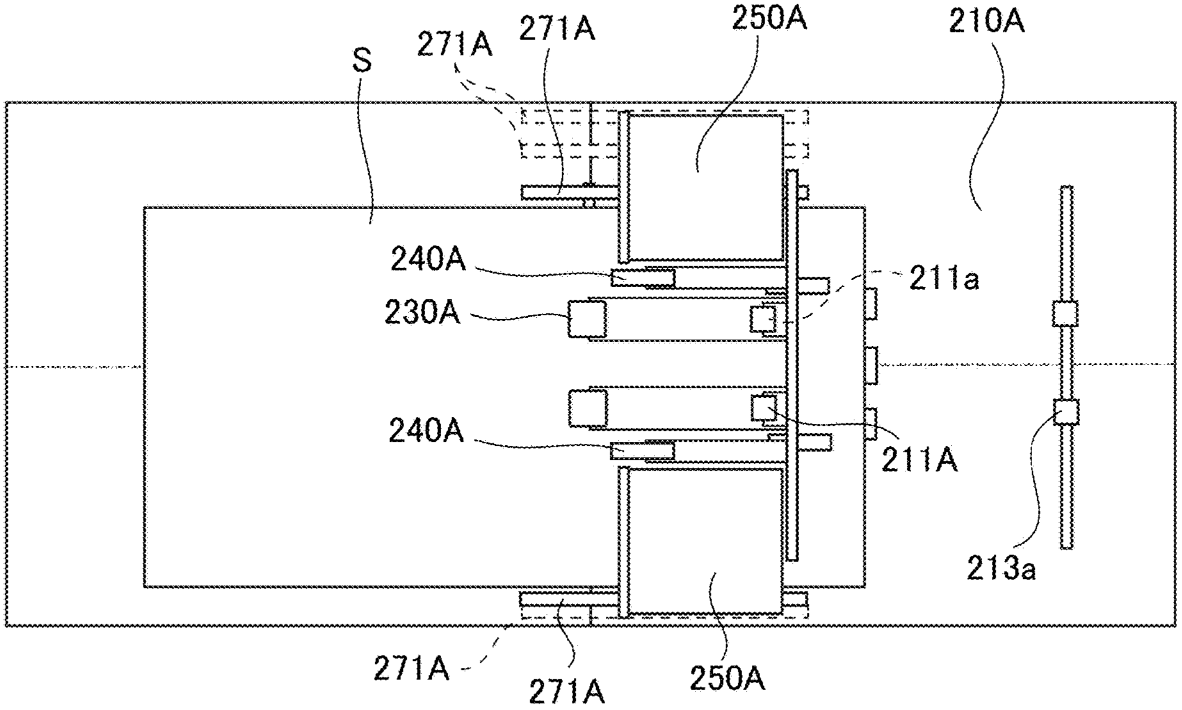
FIG. 33A is a schematic view of the main part of the sheet processing apparatus at the time of sheet discharge in the second shift discharge process according to the first embodiment as viewed from above.
Figure 33B:
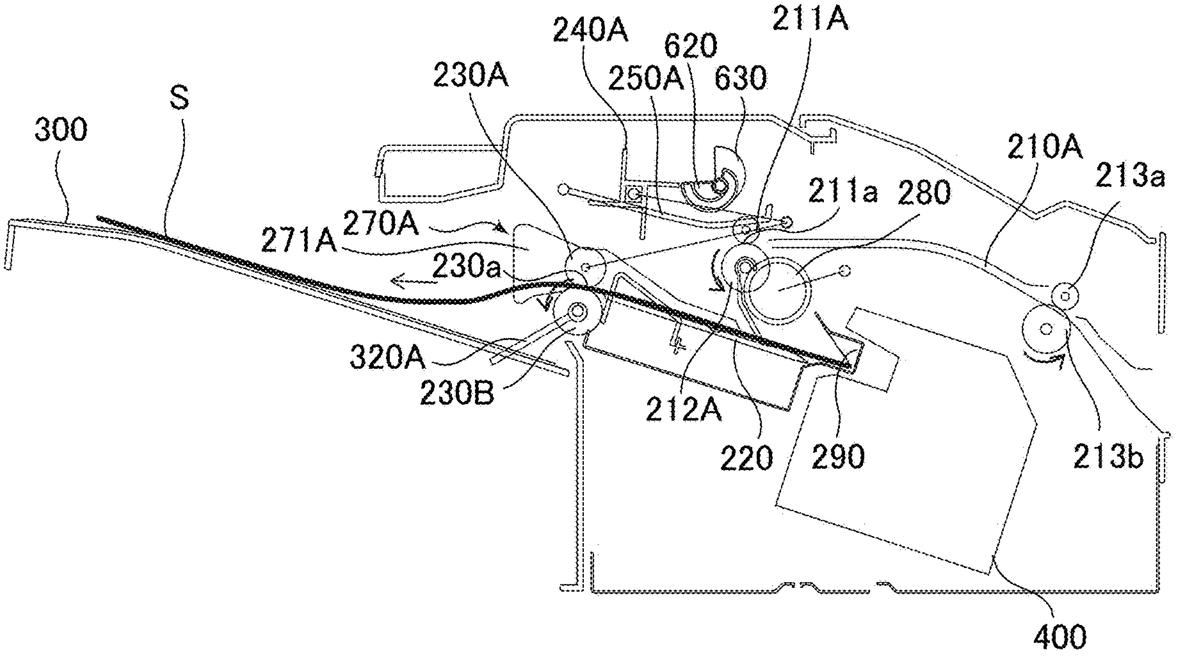
FIG. 33B is a schematic configurational section view of the sheet processing apparatus at the time of sheet discharge in the second shift discharge process according to the first embodiment.
Figure 34A:
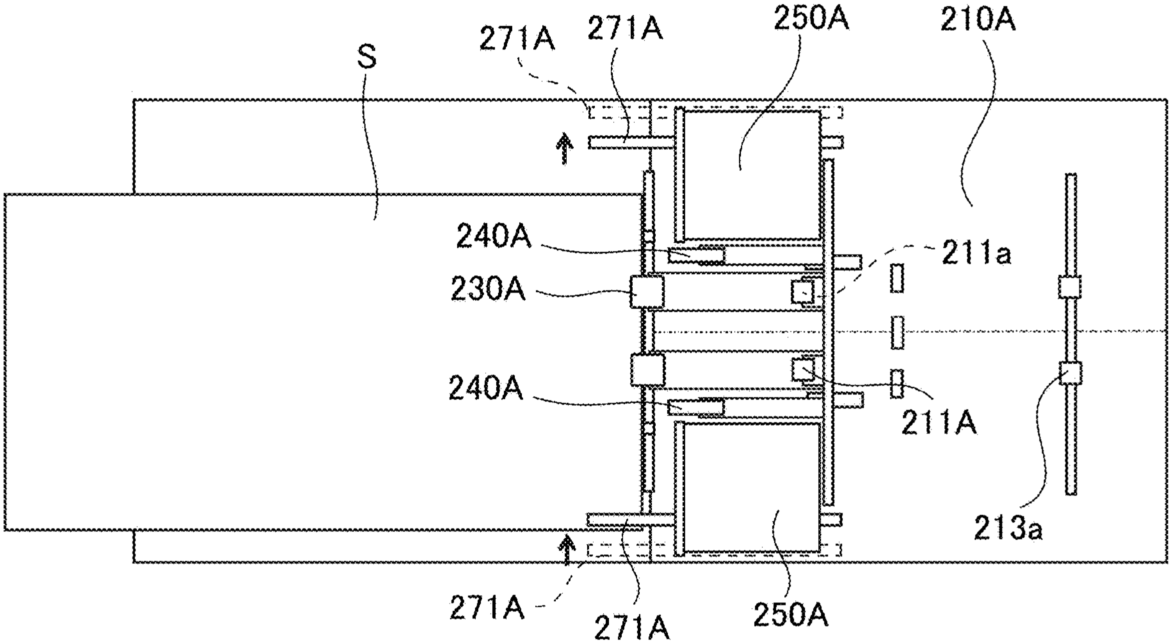
FIG. 34A is a schematic view of the main part of the sheet processing apparatus when the sheet discharge is completed in the second shift discharge process according to the first embodiment as viewed from above.
Figure 34B:
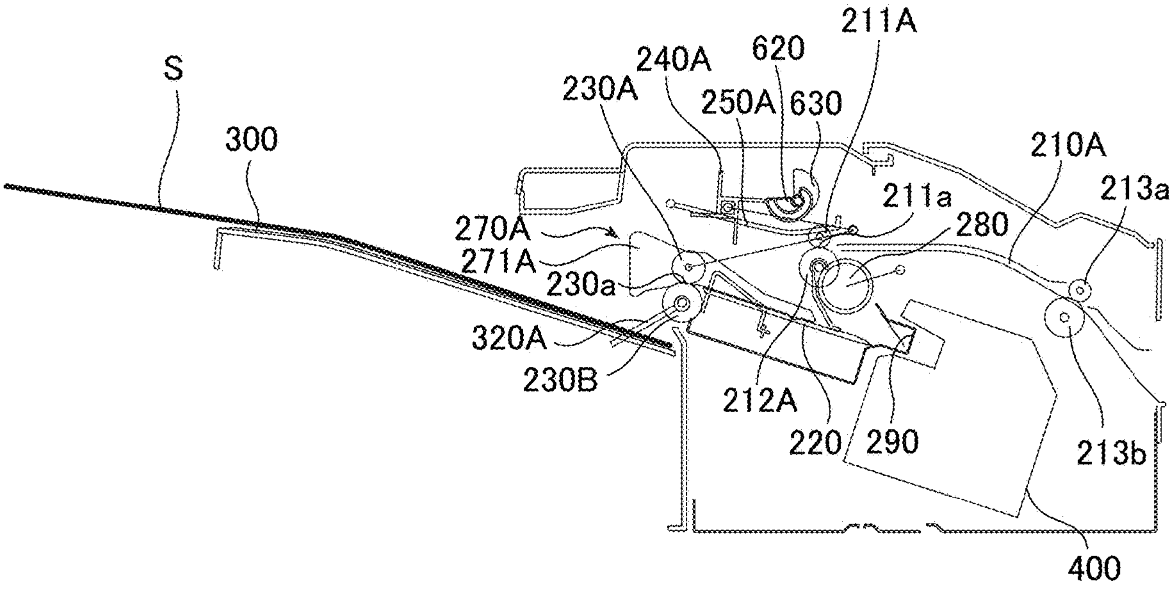
FIG. 34B is a schematic configurational section view of the sheet processing apparatus when the sheet discharge is completed in the second shift discharge process according to the first embodiment.

When discharging the sheet subjected to the shifting operation, the sheet S nipped between the upper discharge rollers 230A and the lower discharge rollers 230B is discharged onto the stacking tray 300 by rotating the lower discharge rollers 230B as illustrated in FIGS. 33A and B in a state in which the upper discharge rollers 230A are positioned at the nipping position, that is, in a state of FIGS. 32A and B. After the sheet S is discharged onto the stacking tray 300, as illustrated in FIGS. 34A and B, the sheet S is further raked in by the discharged sheet rake-in paddles 320A, and further the trailing end of the sheet S is pressed. At this time, the pair of alignment plates 271A are moved to the receiving position to receive the next sheet.

As described above, in the alignment-prioritized mode, the sheet S is subjected to alignment and shifting operation on the processing tray 220, and therefore the alignment of the sheet S can be improved as compared with the productivity-prioritized mode. To be noted, in the alignment-prioritized mode, since an operation of temporarily placing the sheet on the processing tray 220 is performed, the process takes more time than in the productivity-prioritized mode. However, in the case of a sheet of a large size, even a process in the image forming apparatus 100 takes time. Therefore, in the case where the alignment-prioritized mode is executed for a sheet of a large size, the shifting operation can be performed with a productivity appropriate for the productivity of the image forming apparatus 100, and further, the alignment of the sheet can be improved. To be noted, even for a sheet of a large size, the productivity-prioritized mode described above may be executed.

In the case of the present embodiment as described above, when performing the stapling mode, the first shift discharge process, and the second shift discharge process, each process is performed by the front-side alignment plate moving motor MT16 and the rear-side alignment plate moving motor MT17 that are common drive sources, and the common alignment plates 271A. Therefore, the cost can be reduced as compared with a configuration in which different alignment plates and drive sources are required for each process.

To be noted, in the example described above, in the first shift discharge process and the second shift discharge process, the shifting operation is performed in a state in which the upper discharge rollers 230A are separated from the lower discharge rollers 230B. To be noted, the shifting operation may be performed in a state in which the nip pressure between the upper discharge rollers 230A and the lower discharge rollers 230B is reduced. That is, in the example described above, the driving configuration 600 for moving the upper discharge rollers 230A functions as a discharge rotary member moving member that moves the upper discharge rollers 230A to the nipping position, the separated position, and the retracted position. To be noted, this driving configuration 600 may be caused to function as a discharge rotary member nip pressure switching mechanism that switches the nip pressure for nipping the sheet between the upper discharge rollers 230A and the lower discharge rollers 230B to a first nip pressure and a second nip pressure lower than the first nip pressure. Further, the shifting operation may be performed in a state in which the nip pressure is set to the second nip pressure. The first nip pressure is a nip pressure in the case of discharging the sheet by the upper discharge rollers 230A and the lower discharge rollers 230B.

In addition, in the example described, in the first shift discharge process, the shifting operation is performed after the sheet has passed the pre-processing nip portion 211*a* of the pre-processing rollers 211A and 212A, but the shifting operation may be performed in a state in which the sheet is in the pre-processing nip portion 211*a*. Either one of the pre-processing rollers 211A and 212A may be movable to a nipping position for nipping the sheet and a separated position where these are separated from each other, and the pre-processing rollers 211A and 212A may be moved to the separated position in the shifting operation in the first shift discharge process. In addition, the nip pressure between the pre-processing rollers 211A and 212A may be switchable between the first nip pressure and the second nip pressure lower than the first nip pressure, and may be set to the second nip pressure in the shifting operation in the first shift discharge process. The mechanisms for switching of the nip pressure of the pre-processing rollers 211A and 212A and movement to the nipping position and the separated position may be similar to that of the second embodiment. In addition, a sheet of a small size may be subjected to the shifting operation by the pair of alignment plates 271A after the trailing end of the sheet has passed the pre-processing nip portion 211*a*, and a sheet of a large size may be subjected to the shifting operation by the pair of alignment plates 271*a* after the leading end of the sheet has passed the discharge nip portion 230*a* and before the trailing end of the sheet passes the pre-processing nip portion 211*a*. As a result of this, portions of the sheet of a large size that abut the pair of alignment plates 271*a* become closer to the position of the center of gravity of the sheet, and thus the force to rotate the sheet in the shifting operation can be reduced.

In addition, in the example described above, when executing the first shift discharge process, the sheet S is shifted by moving the pair of alignment plates 271A in the shift direction in a state in which the sheet S is between the upper discharge rollers 230A and the lower discharge rollers 230B and the upper discharge rollers 230A are positioned at the separated position (or a state in the second nip pressure). Further, similarly, when executing the second shift discharge direction, the sheet S is shifted by moving the pair of alignment plates 271A in the shift direction in a state in which the sheet S is between the upper discharge rollers 230A and the lower discharge rollers 230B and the upper discharge rollers 230A are positioned at the separated position (or a state in the second nip pressure). Further, in the case of executing the stapling mode, when performing the alignment of the sheet S on the processing tray 220 in the sheet width direction, the alignment in the sheet width direction is performed similarly by moving the pair of alignment plates 271A in the shift direction in a state in which the sheet S is between the upper discharge rollers 230A and the lower discharge rollers 230B and the upper discharge rollers 230A are positioned at the separated position (or a state in the second nip pressure).

That is, in the first shift discharge process, when the sheet S is shifted by using the pair of alignment plates 271A, nip cancellation of the members nipping the sheet S needs to be performed (or the nip pressure needs to be changed to the second nip pressure), and the nip cancellation mechanism (mechanism for moving the upper discharge rollers 230A to the nipping position and the separated position) is not provided solely for the first shift discharge process, and is also used for the second shift discharge process and the stapling mode. Therefore, in the first embodiment described above, the nip cancellation mechanism is made more common than in a second embodiment described later, and therefore, the stapling mode, the first shift discharge process, and the second shift discharge process can be performed at a lower cost.

[Formation of Sheet Bundle by Shift Discharge Process]

Here, in the present embodiment, a process of shifting sheets one by one in the shift direction, discharging the sheets onto the stacking tray 300 without performing a binding process, and thus forming a sheet bundle constituted by a plurality of unbound sheets will be described. For example, as illustrated in FIG. 85, there is a case of discharging a plurality of unbound sheet bundles onto the stacking tray 300 in the state of being shifted in the shift direction with respect to each other (this will be referred to as a sorting discharge process). This sorting discharge process is a process as follows. First, after the sheet is conveyed in the first conveyance direction by the pre-processing rollers 211A and 212A, the sheet conveyed by the pre-processing rollers 211A and 212A is moved in the shift direction by the pair of alignment plates 271A by driving the front-side (F-side) alignment plate moving motor MT16 and the rear-side (R-side) alignment plate moving motor MT17 without conveying the sheet conveyed by the pre-processing rollers 211A and 212A by the rake-in paddles 240A in the second conveyance direction. Next, discharging the sheets moved in the shift direction by the pair of alignment plates 271A one by one to a shift position on the stacking tray 300 by the upper discharge rollers 230A and the lower discharge rollers 230B is repeated a plurality of times, and thus an unbound first sheet bundle is stacked. Next, discharging the sheets moved in the shift direction by the pair of alignment plates 271A one by one to position displaced upstream in the shift direction from the shift position on the stacking tray 300 by the upper discharge rollers 230A and the lower discharge rollers 230B without conveying the sheets in the second conveyance direction by the rake-in paddles 240A is repeated a plurality of times, and thus an unbound second sheet bundle is stacked. To be noted, "stacking a sheet bundle" mentioned herein refers to forming a sheet bundle on the stacking tray 300, and forming a sheet bundle on the stacking tray 300 by discharging a plurality of sheets one by one onto the stacking tray 300 is referred to as "stacking a sheet bundle" even in the case of one sheet bundle as in the present embodiment.

To be noted, in the sorting discharge process, the second sheet bundle may be stacked by discharging sheets onto the stacking tray 300 while moving the sheets one by one in a direction opposite to the shift direction of the first sheet bundle by the pair of alignment plates 271A, or may be stacked by discharging sheets onto the stacking tray 300 while keeping the same position in the shift direction to which the sheets are conveyed by the pre-processing rollers 211A and 212A without moving the sheets one by one in the direction opposite to the shift direction of the first sheet bundle (same as straight discharge mode). In short, it suffices as long as the first sheet bundle and the second sheet bundle are stacked in the state of being displaced from each other in the shift direction as illustrated in FIG. 85. In addition, a sheet bundle may be stacked on the stacking tray 300 while keeping the position in the shift direction to which the sheets bundle is conveyed by the pre-processing rollers 211A and 212A without moving the sheet bundle in the direction opposite to the shift direction of the first sheet bundle before the first sheet bundle, and then the first sheet bundle may be moved in the shift direction and stacked on the stacking tray 300.

To be noted, when stacking the second sheet bundle on the stacking tray 300, in the case of discharging sheets onto the stacking tray 300 while keeping the position in the shift direction to which the sheets are conveyed by the pre-processing rollers 211A and 212A without moving the sheets in the direction opposite to the shift direction of the first sheet bundle, the sheets may be discharged after performing only width alignment by the pair of alignment plates 271A before discharging the sheets by the upper discharge rollers 230A and the lower discharge rollers 230B. As a result of this, the alignment of the second sheet bundle on the stacking tray 300 is improved. In addition, the sheets may be discharged onto the stacking tray 300 after performing width alignment on the sheets one by one by the pair of alignment plates 271A also in the case of only the straight discharge mode.

Examples of the sorting discharge process described above include a sorting process and a grouping process. For example, in the case of ten copies of sheet bundles each constituted by five sheets, the sorting process is a process of stacking sheet bundles on the stacking tray 300 while shifting each sheet bundle. In addition, the grouping process is a process of stacking on the stacking tray 300 while shifting ten copies of the first page, ten copies of the second page, . . . ten copies of the fifth page from each other. The sorting process and the grouping process can be, for example, selected by a user by using an operation panel of the image forming apparatus 100 or an external terminal such as a personal computer (PC) connected thereto via a network or the like. Then, a command of the process selected by the user is transmitted from the image forming apparatus 100 to the sheet processing apparatus 200A, and the sheet processing apparatus 200A executes this process.

In addition, the sorting discharge process includes, in the case where jobs of different contents are successively input to the image forming system 1000A, a process of stacking sheet bundles on the stacking tray 300 while shifting the sheet bundles for each job. For example, a case where a person A inputs a job of forming a sheet bundle of ten sheets as a first job and then a person B inputs a job of forming a sheet bundle of five sheets as a second job will be considered. In this case, the sheet bundle of the first job is moved in the shift direction and stacked on the stacking tray 300, and then the sheet bundle of the second job is stacked on the stacking tray 300 without shifting the sheet bundle or after moving the sheet bundle in a direction opposite to the shift direction.

In addition, as a process of shifting and discharging sheets without performing a binding process, in the present embodiment, the switchback shift discharge process (alignment-prioritized mode) and the sorting discharge process described above can be executed. Further, the sorting discharge process includes the switchbackless shift discharge process (productivity-prioritized mode) described above.

In the switchbackless shift discharge process, sheets are shifted one by one and discharged onto the stacking tray 300. At this time, in the case where a sheet bundle is formed by simply stacking shifted sheets on the stacking tray 300, there is a possibility that the alignment of the sheets on the stacking tray 300 deteriorates. In addition, even if it is attempted to rake in the sheets by the discharged sheet rake-in paddles 320A after forming a sheet bundle on the stacking tray 300, only the uppermost sheet of the sheet bundle is raked in, which can degrade the alignment of the sheets. Therefore, in the present embodiment, as described with reference to FIGS. 24A and B described above, when a sheet is discharged onto the stacking tray 300, the sheet is raked in by the discharged sheet rake-in paddles 320A.

That is, in the case of forming a shifted sheet bundle on the stacking tray 300 (stacking portion) without performing a binding process, a sheet bundle constituted by a plurality of sheets is formed on the stacking tray 300 by repeatedly executing the shift discharge process and the rake-in process on a plurality of sheets. The shift discharge process is a process of shifting a sheet by the alignment portion 270A and discharging the sheet shifted by the alignment portion 270A onto the stacking tray 300 by the upper discharge rollers 230A and the lower discharge rollers 230B, and is the switchbackless shift discharge process described above. The rake-in process is a process of conveying the sheet discharged onto the stacking tray 300 in a third conveyance direction by the discharged sheet rake-in paddles 320A.

In addition, when repeating the shift discharge process and the rake-in process, the rake-in paddles 320A are stopped at a position to press the upper surface of the sheet raked in on the stacking tray 300 after the sheet is raked in until the next sheet is discharged (until the trailing end of the sheet passes the nip point of the discharge rollers 230). Then, when the next sheet is discharged onto the stacking tray 300, the rake-in paddles 320A rotate to rake in the sheet, and thus further presses the trailing end of the sheet. As a result of this, a situation in which a sheet that is already raked in is displaced on the stacking tray 300 by the next sheet can be suppressed.

As a result of this, when forming an unbound sheet bundle moved in the shift direction on the stacking tray 300, the alignment of the sheet bundle can be improved. That is, as a result of discharging a sheet onto the stacking tray 300 in a shifted state and further raking in this sheet by the discharged sheet rake-in paddles 320A, the sheet discharged onto the stacking tray 300 can be caused to abut the erecting surface 310*a* provided at an upstream end of the stacking tray 300 in the first conveyance direction. Further, by repeating this operation on each sheet, the alignment of the sheet bundle discharged onto the stacking tray 300 can be improved.

To be noted, this operation can be also performed by the switchback shift discharge process. That is, normally, in the case of performing the switchback shift discharge process, a sheet bundle is formed on the processing tray 220 and is then discharged onto the stacking tray 300. However, sheets may be discharged onto the stacking tray 300 after being shifted one by one on the processing tray 220. Also in this case, as described with reference to FIGS. 34A and B described above, the alignment of the sheet bundle discharged onto the stacking tray 300 can be improved by performing the rake-in process on each sheet discharged onto the stacking tray 300.

In addition, also in the case of forming a second sheet bundle on the stacking tray 300 or in the case of the straight discharge mode, the alignment of the second sheet bundle or the sheet bundle formed by being discharged in the straight discharge mode can be improved by performing the rake-in process described above on the sheets discharged one by one onto the stacking tray 300.

Second Embodiment

Figure 35:
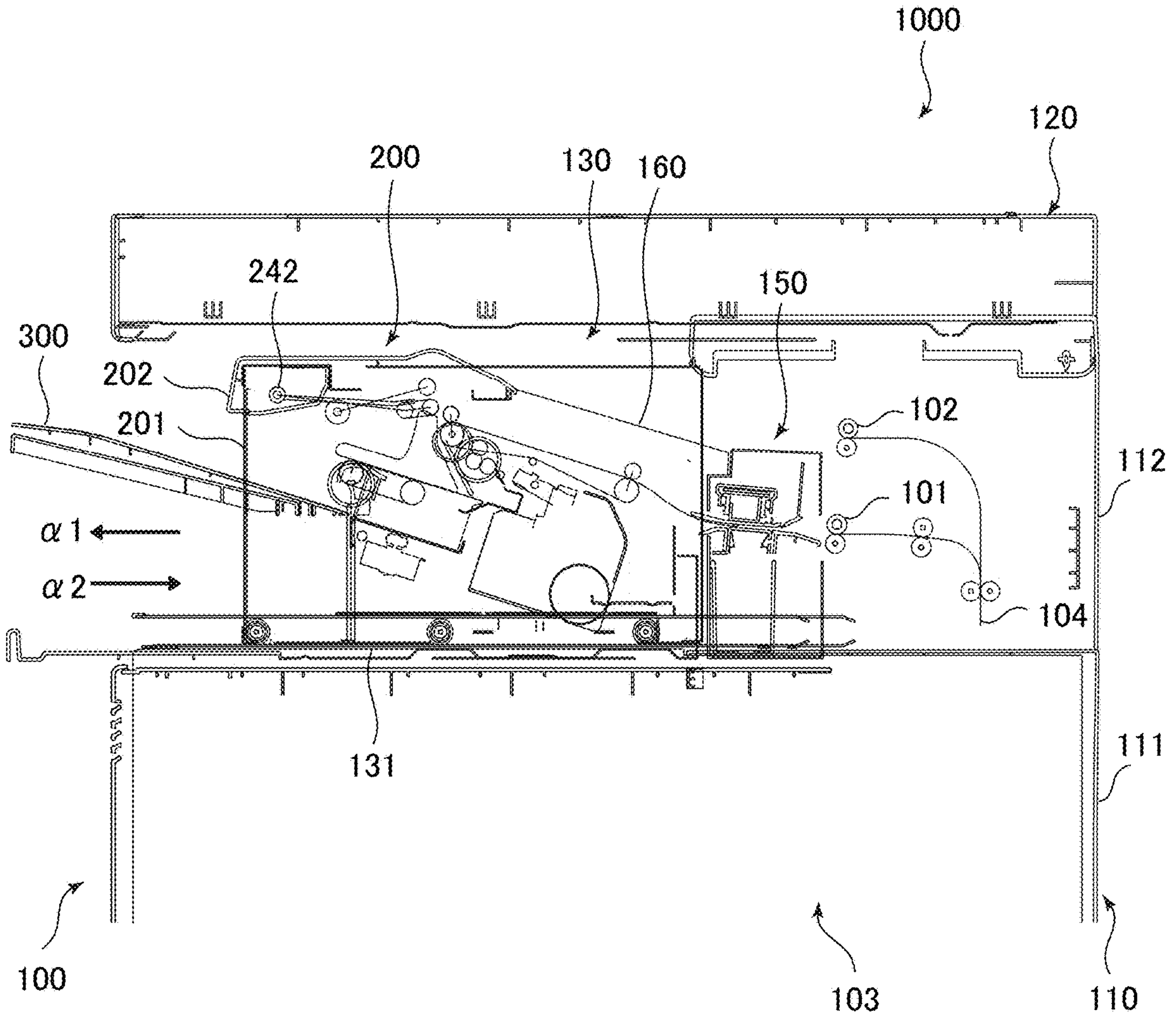
FIG. 35 is a schematic configurational section view of an image forming system according to a second embodiment.
Figure 36:
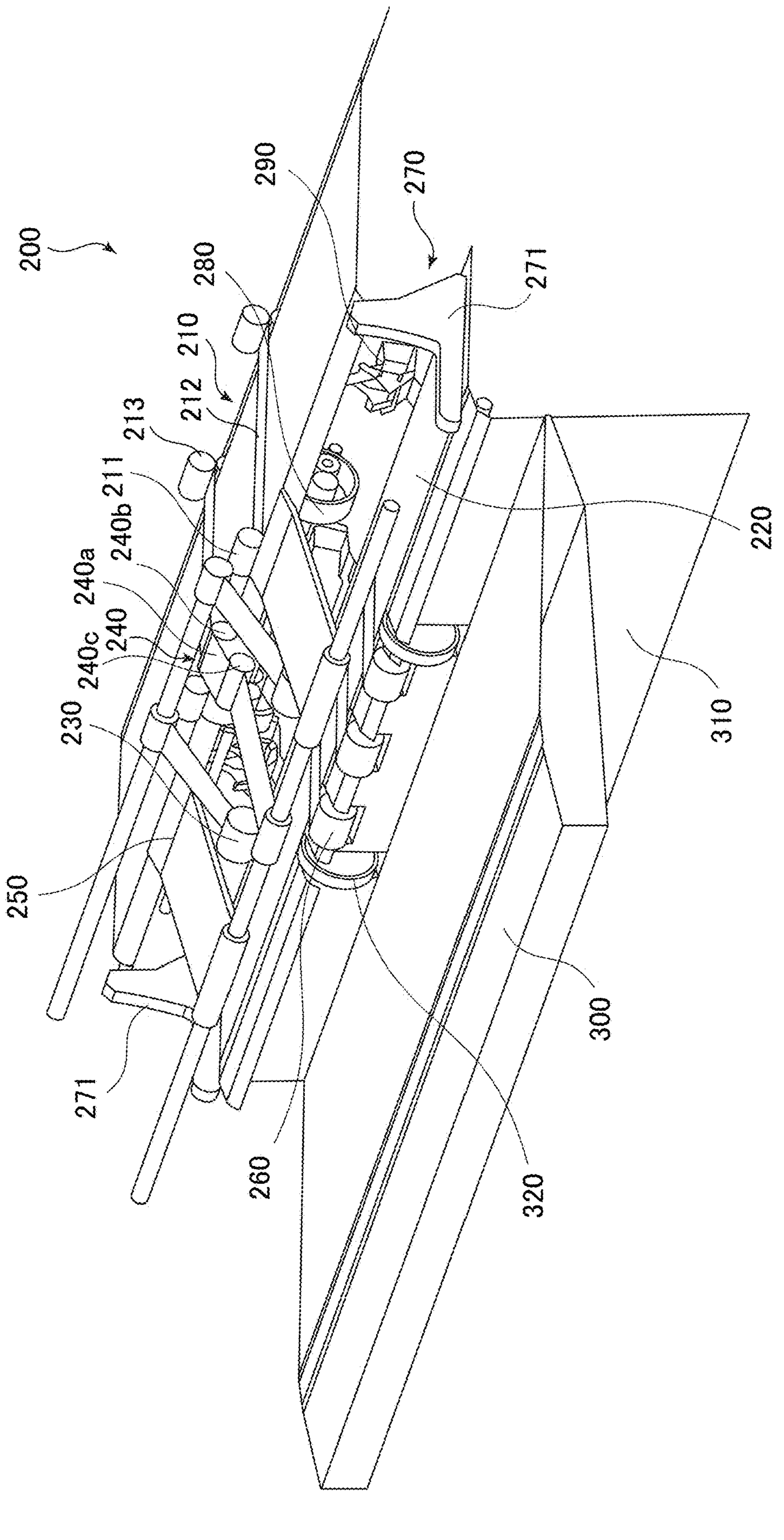
FIG. 36 is a schematic configurational section view of a sheet processing apparatus according to the second embodiment.

A second embodiment will be described with reference to FIGS. 35 to 79B. An image forming system 1000 of the present embodiment has a schematic configuration similar to the image forming system 1000A of the first embodiment. That is, as illustrated in FIG. 35, the image forming system 1000 of the present embodiment includes an image forming apparatus 100, a puncher unit 150, and a sheet processing apparatus 200. The configuration of the image forming apparatus 100 and the puncher unit 150 is the same as in the first embodiment. To be noted, there is a difference between the sheet processing apparatus 200 the sheet processing apparatus 200A of the first embodiment as described below. The other elements and functions are similar to the first embodiment described above, and therefore the sheet processing apparatus 200 of the present embodiment will be described below.

[Sheet Processing Apparatus]

The configuration of the sheet processing apparatus 200 of the present embodiment will be described with reference to FIGS. 36 to 49. First, the overall configuration of the sheet processing apparatus 200 will be described with reference to FIGS. 36, 37A, and B.

[Overall Configuration of Sheet Processing Apparatus]

The sheet processing apparatus 200 includes a conveyance path 210, a processing tray 220 serving as a placement portion, a discharge roller (nipping member) 230, a rake-in portion 240 serving as a second conveyance portion, a trailing end dropping member 250 serving as a sheet dropping member, a discharge belt (stack output belt) 260, an alignment portion 270 serving as a shifting portion, a returning member 280, a trailing end regulating member 290, a stacking tray 300, an erecting surface 310, a discharged sheet rake-in belt (sheet pressing belt 320), and the like. To be noted, the discharge roller 230 and the discharge belt 260 correspond to a discharge portion and a pair of discharge rotary members. The sheet received from the image forming apparatus 100 or the puncher unit 150 is conveyed to the conveyance path 210.

The sheet conveyed from the conveyance path 210 is directly discharged onto the stacking tray 300 or placed on the processing tray 220 in accordance with the mode for processing the sheet. To be noted, direct discharge onto the stacking tray 300 means discharging the sheet onto the stacking tray 300 without conveyance in a reverse direction on the processing tray 220 to a position where the stapling process is executable. In other words, the sheet processing apparatus 200 has a mode for discharging the sheet subjected to the stapling process by the stapling unit 400 onto the stacking tray 300 and a mode for discharging the sheet onto the stacking tray 300 without performing the stapling process by the stapling unit 400. In the present embodiment, alignment of sheets is enabled by the alignment portion 270 without placement on the processing tray 220. In addition, alignment of sheets is also possible on the processing tray 220, and stapling can be performed on the sheets placed on the processing tray 220 by the stapling unit 400. In addition, a sheet or sheet bundle placed on the processing tray 220 can be discharged onto the stacking tray 300 by the discharge belt 260 and the like. Detailed description of the configuration of each component will be given below.

[Conveyance Path]

The conveyance path 210 is a path for conveying the sheet in a predetermined direction (first conveyance direction), and in the conveyance path 210, pre-processing rollers 211 serving as first rotary members, conveyance belts 212 serving as second rotary members, upstream rollers 213 serving as third rotary members, and knurled belts 214 are disposed. These are each disposed as a pair separated in a width direction of the sheet (arrow γ direction (up-down direction) of FIG. 37A) intersecting with the conveyance direction of the sheet (predetermined direction, arrow β direction (left-right direction) of FIG. 37A).

The conveyance belt 212 is an endless belt disposed in an entire region of the conveyance path 210 in the predetermined direction so as to support the lower surface of the sheet received in the sheet processing apparatus 200. The conveyance belt 212 is looped over a pair of rollers 212*a* and 212*b*, and rotates as a result of the one roller 212*a* being driven. The upstream rollers 213 are disposed at upstream end portions of the conveyance belts 212 in the predetermined direction, the sheet is nipped between the upstream rollers 213 and the conveyance belts 212 at the entrance of the conveyance path 210, and thus the sheet is conveyed.

The pre-processing rollers 211 are disposed at downstream end portions of the conveyance belts 212 in the predetermined direction, and the pre-processing rollers 211 and the conveyance belts 212 form a pre-processing nip portion 211*a* capable of nipping and conveying the sheet. In addition, the pre-processing rollers 211 and the conveyance belts 212 correspond to a first conveyance portion and a pair of conveyance rotary members. Then, the sheet is nipped and conveyed in the predetermined direction in the pre-processing nip portion 211*a*, and the sheet is discharged from the conveyance path 210. In the present embodiment, the pre-processing rollers 211 and the conveyance belts 212 constitute conveyance rotary member pairs and conveyance means. As will be described later, the pre-processing rollers 211 are capable of changing the abutting pressure (nip pressure) on the conveyance belts 212.

The pre-processing rollers 211 are rotationally driven similarly to the conveyance belts 212, but may be configured to rotate in accordance with the motion of the conveyance belts 212 without being rotationally driven, because the conveyance belts 212 are rotationally driven. In addition, in the present embodiment, a plurality of rollers and conveyance belts constitute the conveyance path 210, but the conveyance path may have a configuration in which a plurality of spherical members are disposed above the conveyance belts so as to be rotatable in an arbitrary direction. In the case of this configuration, as will be described later, the shifting of the sheet can be performed without performing adjustment of the nip pressure such as reduction of the nip pressure of the pre-processing rollers 211 even in a state in which a sheet is in the conveyance path.

The rotation axis of the knurled belts 214 is disposed coaxially with the downstream rollers 212*a* on which the conveyance belts 212 are stretched, and the knurled belts 214 are capable of rotating together with the rollers 212*a*. The knurled belts 214 configured in this manner are provided to project more downstream than the downstream end of the conveyance belts 212 in the predetermined direction, and make the trailing end (upstream end in the predetermined direction) of the sheet less likely to remain in the pre-processing nip portion 211*a* when discharging the sheet by the pre-processing rollers 211 and the conveyance belts 212.

[Processing Tray]

The processing tray 220 is disposed downstream of the conveyance path 210 in the sheet conveyance direction and below the conveyance path 210 in the vertical direction. In addition, the processing tray 220 is inclined with respect to the horizontal surface such that the upstream side thereof in the predetermined direction is lower than the downstream side thereof. On the processing tray 220, the sheet conveyed from the conveyance path 210 can be placed and a plurality of sheets can be stacked and supported, and alignment in the width direction and movement in the width direction of the sheets (shift of the sheets) are performed by the alignment portion 270 on the processing tray 220. In addition, a trailing end regulating member 290 serving as a regulating means and a processing-side regulating means that regulates the upstream end (trailing end) in the predetermined direction of the sheet placed on the processing tray 220 is disposed at an upstream end of the processing tray 220 in the predetermined direction.

In addition, the stapling unit 400 serving as a processing portion is disposed upstream of the processing tray 220 in the predetermined direction. The stapling unit 400 performs the stapling process serving as a predetermined process on a sheet bundle subjected to alignment in the width direction and regulation of the trailing end on the processing tray 220. The stapling unit 400 is capable of changing the stapling position on the sheet bundle, and moves in accordance with the stapling position. To be noted, the predetermined process may be a process different from stapling such as punching. The sheet or sheet bundle placed on the processing tray 220 is discharged onto the stacking tray 300 by the discharge roller 230, the rake-in portion 240, and the discharge belt 260 as will be described later.

[Discharge Belt]

The discharge belt (lower rotary member) 260 and the discharge roller (upper rotary member) 230 constitute a discharge rotary member pair (pair of discharge rotary members) and a discharge portion that nip and convey the sheet. The discharge belt 260 is stretched over at least two stretch rollers 261 and 262. That is, in the present embodiment, the discharge belt 260 is stretched over the two stretch rollers 261 and 262, but the discharge belt 260 may be stretched over three or more stretch rollers. In addition, in the present embodiment, three discharge belts 260 are disposed at positions separated in the sheet width direction. Among these three discharge belts 260, the discharge belt 260 in the middle is disposed at a position where the discharge belt 260 can nip the sheet with the rake-in portion 240 that will be described above, and the discharge belts 260 on the two sides are respectively disposed at positions where the discharge belts 260 can nip the sheet with the discharge rollers 230.

The discharge belts 260 are disposed along the predetermined direction, rotate as a result of the stretch rollers 261 being rotationally driven, and convey the sheet or sheet bundle on the processing tray 220 toward the stacking tray 300. That is, the stretch rollers 261 are driving rollers that drive the discharge belts 260. In the present embodiment, the rotation shaft of the stretch rollers 261 correspond to the rotation shaft of the discharge belts 260 serving as lower discharge rotary members. To be noted, if the sheet or sheet bundle on the processing tray 220 can be conveyed toward the stacking tray 300, different rotary members such as discharge rollers may be used in place of the discharge belts.

[Rake-in Portion]

The rake-in portion 240 serving as a transfer means, a processing-side conveyance means, and a dropping member transfers the sheet placed on the processing tray 220 toward the trailing end regulating member 290. The rake-in portion 240 is capable of moving between a first position positioned above the pre-processing nip portion 211*a* where the sheet is nipped between the pre-processing rollers 211 and the conveyance belts 212 in the vertical direction and a second position where the rake-in portion 240 is capable of abutting the upper surface of the sheet placed on the processing tray 220 and transferring the sheet toward the trailing end regulating member 290.

The rake-in portion 240 nips the sheet placed on the processing tray 220 with the discharge belt 260 at the second position. The position where the rake-in portion 240 nips the sheet with the discharge belt 260 is upstream of the position where the sheet is nipped between the discharge rollers 230 and the discharge belts 260 that will be described later in the predetermined direction. That is, at the second position, the rake-in portion 240 is positioned between the pre-processing rollers 211 and the position (discharge nip portion) where the sheet is nipped between the discharge rollers 230 and the discharge belts 260 that will be described later in the predetermined direction.

The rake-in portion 240 configured in this manner is rotationally driven in both of a normal direction and a reverse direction, is thus capable of conveying the sheet on the processing tray 220 toward the trailing end regulating member 290, that is, upstream in the predetermined direction as described above, and is capable of conveying the sheet placed on the processing tray 220 downstream in the predetermined direction together with the discharge belts 260. That is, the rake-in portion 240 includes a rake-in belt 240*a* as will be described later, and is capable of rotationally driving the rake-in belt 240*a* in both of a normal direction and a reverse direction. Further, at the second position, the rake-in portion 240 abuts the sheet on the processing tray 220, and conveys the sheet toward the trailing end regulating member 290 by rotating the rake-in belt 240*a* in the normal direction in this state. In contrast, by rotating the rake-in belt 240*a* in the reverse direction, the sheet or sheet bundle on the processing tray 220 is conveyed toward the stacking tray 300.

The sheet or sheet bundle placed on the processing tray 220 is nipped between the discharge rollers 230 that will be described later and the discharge belts 260 to be discharged onto the stacking tray 300, but there is a possibility that particularly a sheet bundle cannot be reliably discharged by just the conveyance by the discharge rollers 230 and the discharge belts 260. Conventionally, discharge of a sheet bundle is assisted by moving the trailing end regulating member 290 to the side on which the sheet bundle is discharged, but in the present embodiment, such a configuration is not employed, and the trailing end regulating member 290 does not move in a direction to discharge the sheet bundle. Therefore, in the present embodiment, to assist the discharge of the sheet bundle, the sheet bundle placed on the processing tray 220 is conveyed toward the stacking tray 300 by the rake-in portion 240.

Particularly, in the present embodiment, since at the second position, the rake-in portion 240 is positioned between the pre-processing rollers 211 and the discharge nip portion in the predetermined direction, drive is more easily transmitted to the sheet on the processing tray 220. That is, the downstream side of the sheet on the processing tray 220 in the predetermined direction hangs down from the processing tray 220 toward the stacking tray 300. Therefore, in a state in which the sheet is nipped in the discharge nip portion, the side downstream of the discharge nip portion in the predetermined direction hangs down, and the upstream side lifts up. Therefore, in the present embodiment, the side upstream of the discharge nip portion of the sheet on the processing tray 220, which lifts up, is pressed by the rake-in portion 240, thus the drive of the rake-in portion 240 can be efficiently transmitted to the sheet, and the discharge of the sheet can be efficiently assisted.

In addition, at the second position, the rake-in portion 240 nips the sheet or sheet bundle placed on the processing tray 220 with the discharge belt 260. That is, the rake-in portion 240 presses the upper surface of the sheet at a position opposing the discharge belt 260 with the sheet or sheet bundle therebetween. Therefore, the conveyance force of the sheet or sheet bundle by the discharge belts 260 can be increased. Further, by configuring the rake-in portion 240 to abut the sheet at a position as close as possible to the discharge nip portion, the assist by the rake-in portion 240 can be performed for a longer period of time.

The rake-in portion 240 includes the rake-in belt 240*a* serving as a transfer belt, and at least two rollers 240*b* and 240*c* that stretch the rake-in belt 240*a*. That is, in the present embodiment, the rake-in belt 240*a* is stretched over the two rollers 240*b* and 240*c*, but three or more rollers may stretch the rake-in belt 240*a*. In the rake-in portion 240, the stretched surface of the rake-in belt 240*a* stretched by the two rollers 240*b* and 240*c* at the second position is capable of abutting the sheet placed on the processing tray 220. That is, the rake-in portion 240 is capable of abutting the sheet on the processing tray 220 by a large contact area, and as a result of this, the drive in the conveyance direction can be more easily transmitted to the sheet. In other words, as a result of the surface in contact with the sheet being increased and stabilized, the conveyance efficiency is improved, and thus the contact pressure can be reduced. As a result, occurrence of a damage during the sheet conveyance can be reduced.

Figure 38A:
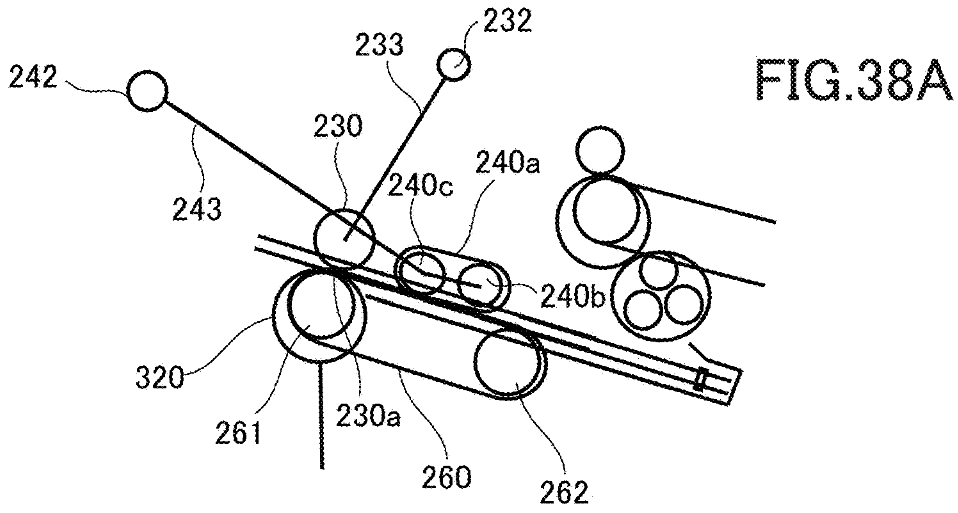
FIG. 38A is a schematic view of a first example of a sheet nipping position between rake-in belts and discharge belts according to the second embodiment.

Here, in the present embodiment, the relationship of the contact position between the rake-in belt 240*a* and the discharge belts 260 is set as in FIG. 38A. That is, at the second position, the rake-in belt 240*a* is configured to nip the sheet with a portion of the discharge belt 260 stretched between the two stretch rollers 261 and 262. To be noted, the relationship of the contact position between the rake-in belt 240*a* and the discharge belt 260 may be set as illustrated in FIGS. 38B and C.

Figure 38B:
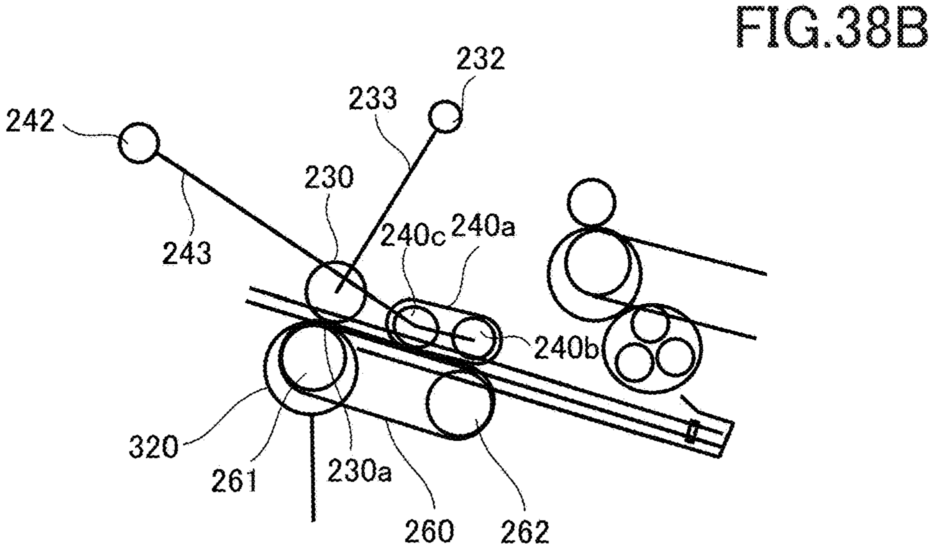
FIG. 38B is a schematic view of a second example of the sheet nipping position between the rake-in belts and the discharge belts according to the second embodiment.
Figure 38C:
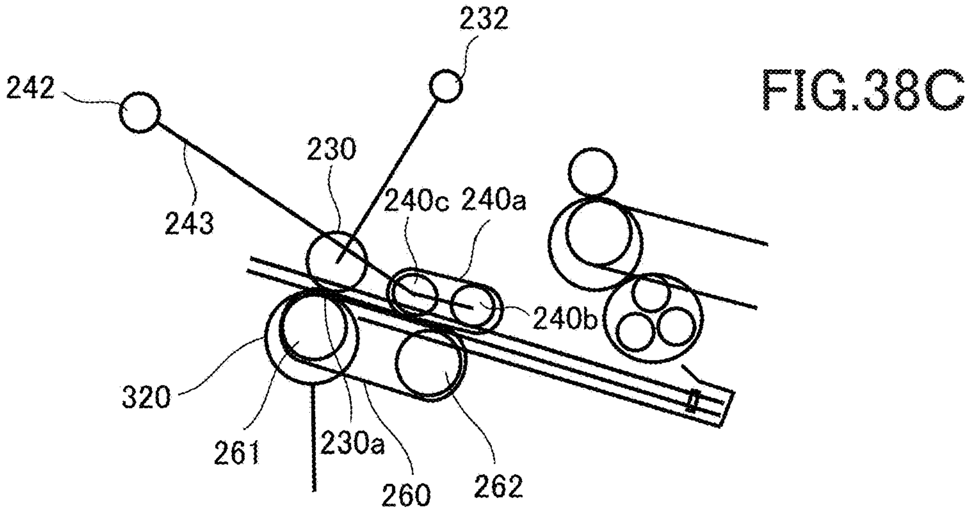
FIG. 38C is a schematic view of a third example of the sheet nipping position between the rake-in belts and the discharge belts according to the second embodiment.

That is, as illustrated in FIG. 38B, at the second position, the rake-in belt 240*a* may nip the sheet with the stretch roller 262 on the upstream side in the predetermined direction among the two stretch rollers 261 and 262 with the discharge belt 260 therebetween. Alternatively, as illustrated in FIG. 38C, at the second position, regarding the rake-in belt 240*a*, a portion of the rake-in belt 240*a* stretched between the two rollers 240*b* and 240*c* may nip the sheet with the stretch roller 262 on the upstream side in the predetermined direction among the two stretch rollers 261 and 262 with the discharge belt 260 therebetween.

To be noted, the rake-in portion 240 may be a different rotary member such as a roller instead of a belt. For example, in the case of a roller, the roller may nip the sheet with a portion of the discharge belt 260 stretched between the two stretch rollers 261 and 262, or the roller may nip the sheet with the stretch roller 262 on the upstream side in the predetermined direction among the two stretch rollers 261 and 262 with the discharge belt 260 therebetween. To be noted, in terms of securing the contact area with the sheet on the processing tray 220, the rake-in portion 240 is preferably constituted by a belt as in the present embodiment.

The rake-in portion 240 is pivoted about a pivot shaft 242 serving as a first pivot shaft between a first position and a second position by a rake-in pivoting mechanism 241 serving as a moving means and a first pivoting means. In other words, the rake-in portion 240 is capable of moving up and down between the first position and the second position. The rake-in pivoting mechanism 241 includes a rake-in arm 243 serving as a first support member that supports the rake-in portion 240, and the pivot shaft 242 that pivotably supports the rake-in arm 243, and the rake-in portion 240 supported at the distal end of the rake-in arm 243 can be pivoted about the pivot shaft 242.

Here, the rake-in portion 240 preferably move along the up-down direction, and configuring the mechanism that moves the rake-in portion 240 between the first position and the second position as a linear motion mechanism can be considered. To be noted, in the case where a linear motion mechanism is employed, there is a possibility that the apparatus increases in size in the up-down direction as a result of, for example, arranging a motor and a shaft for linear motion in the up-down direction. As described above, the sheet processing apparatus 200 of the present embodiment is disposed in the in-body space 130 of the image forming apparatus 100, and therefore increase in the dimension in the up-down direction is not preferable. Therefore, in the present embodiment, the pivoting mechanism 241 that pivots the rake-in portion 240 about the pivot shaft 242 is employed. To be noted, in the case of a sheet processing apparatus in which the dimension in the up-down direction can be secured, a linear motion mechanism may be employed as the mechanism for lifting and lowering the rake-in portion 240. In addition, the rake-in portion 240 is made movable in a direction following the up-down direction as much as possible by increasing the distance between the pivot shaft 242 and the rake-in portion 240 as much as possible to increase the pivot radius.

At the contact position, the pivot shaft 242 is disposed downstream of the discharge nip portion where the sheet is nipped between the discharge rollers 230 and the discharge belts 260 in the predetermined direction. As a result of this, the pivot trajectory (pivot radius) of the rake-in portion 240 can be increased, and a motion close to a linear motion can be performed. In addition, at the first position, the rake-in portion 240 is positioned above the pre-processing nip portion 211*a* where the sheet is nipped between the pre-processing rollers 211 and the conveyance belts 212 in the vertical direction, and the pivot shaft 242 is positioned above the rake-in portion 240 at the first position in the vertical direction.

Figure 37A:
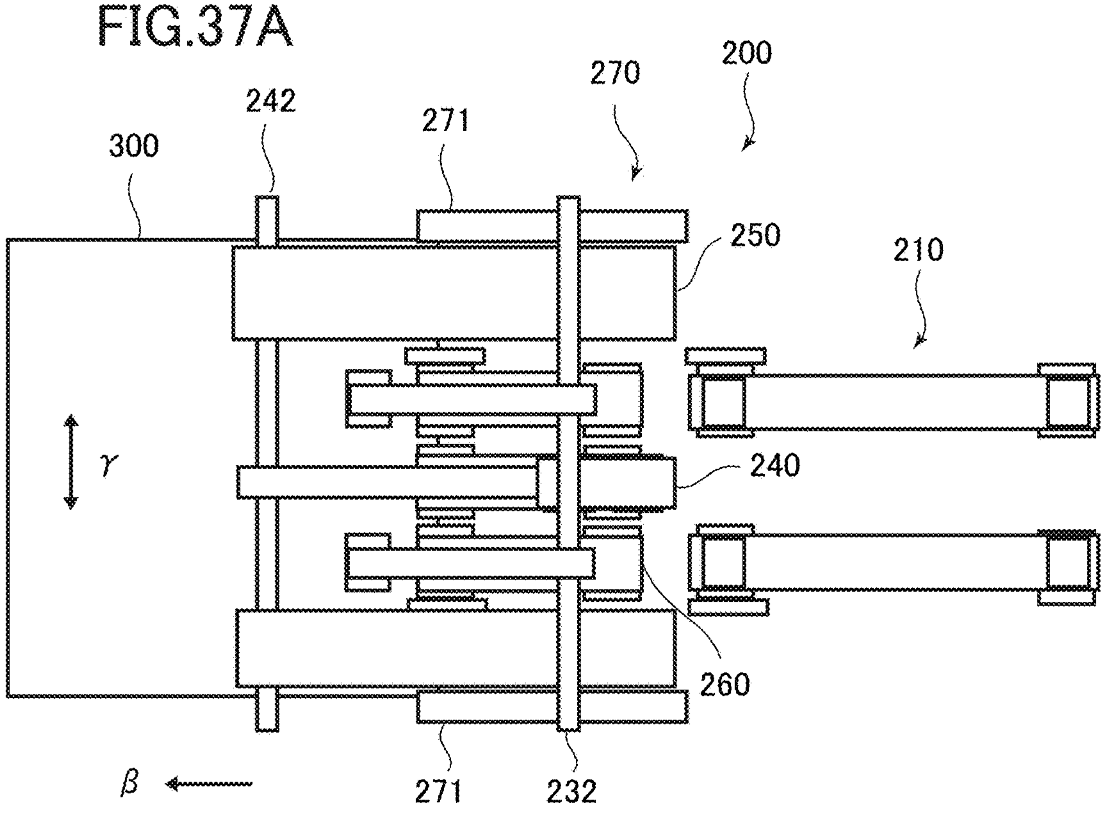
FIG. 37A is a schematic view of the sheet processing apparatus according to the second embodiment as viewed from above.
Figure 37B:
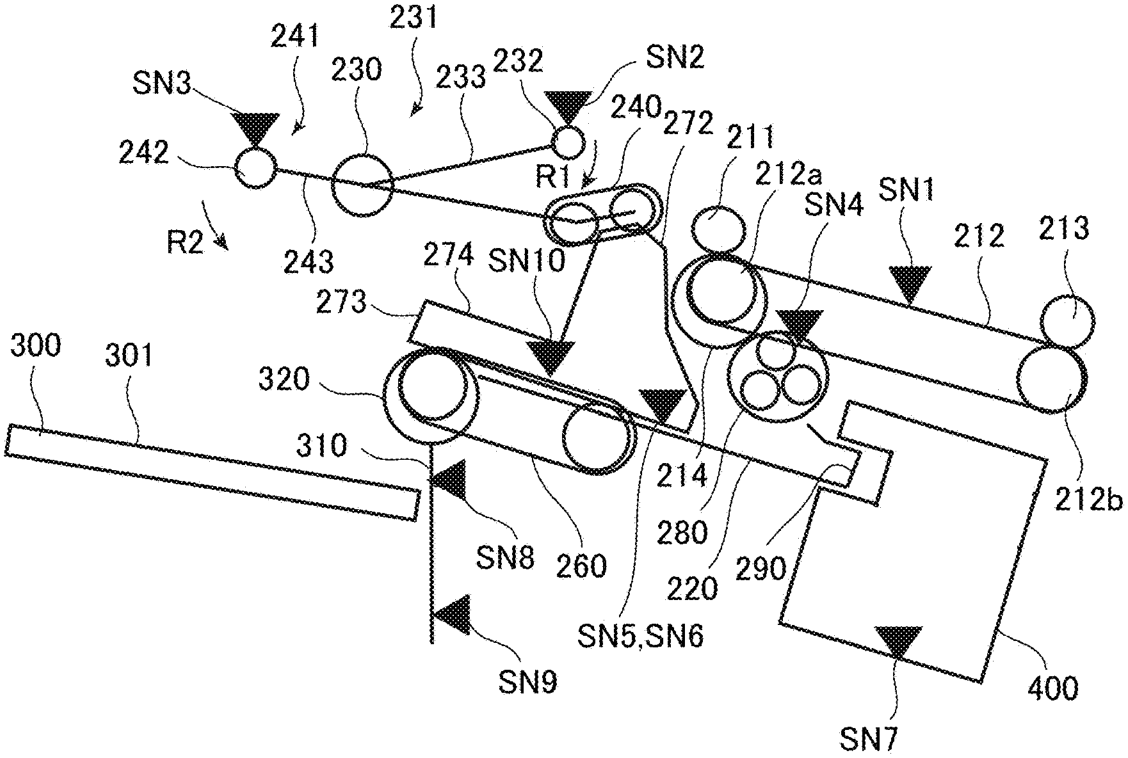
FIG. 37B is a schematic view of the sheet processing apparatus according to the second embodiment as viewed from the side.

As will be described later, a pivot shaft 232 of the discharge rollers 230 is disposed upstream of the discharge nip portion, and the pivot direction is preferably a counter-clockwise direction of FIG. 37B in terms of the relationship with the sheet conveyed from the pre-processing nip portion 211*a*. In contrast, increase in the pivot radius is required for the pivot shaft 242 of the rake-in portion 240 as described above, and the second position is preferably upstream of the discharge nip portion in the predetermined direction. From this viewpoint, in the present embodiment, the pivot shaft 242 is disposed downstream of the discharge nip portion in the predetermined direction, and the pivot direction of the rake-in portion 240 is set to be opposite to the pivot direction of the discharge rollers 230, that is, set to an arrow R1 direction (clockwise direction) of FIG. 37B. Further, the rotation trajectories thereof are set to overlap with each other as viewed in the width direction.

That is, the pivot trajectory of the rake-in arm 243 supporting the rake-in portion 240 is closer to the pivot shaft 232 of the discharge rollers 230 (second pivot shaft) than the pivot shaft 242. In contrast, the pivot trajectory of discharge arms 233 supporting the discharge rollers 230 that will be described later is positioned closer to the pivot shaft 242 (first pivot shaft) of the rake-in portion 240 than the pivot shaft 232. Further, the pivot trajectory of the rake-in arm 243 overlaps with part of the pivot trajectory of the discharge arms 233 as viewed in the sheet width direction intersecting with the sheet conveyance direction. Therefore, in the present embodiment, the discharge rollers 230 and the rake-in portion 240 are arranged at positions displaced in the width direction. Specifically, two discharge rollers 230 are disposed on two sides in the width direction, and one rake-in portion 240 is disposed between the two discharge rollers 230. As a result of this configuration, the pivot radius of the rake-in portion 240 can be increased, and the rake-in portion 240 can come into contact with the sheet on the processing tray 220 at a position upstream of the discharge nip portion in the predetermined direction.

In the present embodiment, to reduce the pivot radius of the rake-in portion 240, the pivot shaft 242 is disposed above a discharge port 201 of the sheet processing apparatus 200 illustrated in FIG. 35. At the discharge port 201 of the sheet processing apparatus 200, an eaves portion 202 is provided such that a finger or the like does not enter the stapling unit 400. Particularly, in the present embodiment, since the length of the processing tray 220 is reduced to reduce the cost, it is easy for a finger or the like to reach the stapling unit 400, but the eaves portion 202 is provided such that a finger or the like does not reach the stapling unit 400 from the discharge port 201. Even if the eaves portion 202 configured in this manner is not provided, a safety switch or the like that, for example, detects entrance of a finger or the like and automatically stops the operation of the stapling unit 400 needs to be provided, which leads to increase in the cost.

For such a reason, the eaves portion 202 is provided above the discharge port 201, and in the present embodiment, as a result of providing this eaves portion 202, the pivot shaft 242 of the rake-in portion 240 can be provided in the vicinity of the discharge port 201. As a result of this, the pivot shaft 242 can be separated from the rake-in portion 240 that moves above the processing tray 220, the pivot radius of the rake-in portion 240 is increased, and the movement direction of the rake-in portion 240 is caused to follow a straight line direction as much as possible.

The rake-in portion 240 is moved in a direction following a straight line direction as much as possible to reduce the change in the angle of the stretched surface of the rake-in belt 240*a* between states in which the rake-in portion 240 is at the first position and the second position. That is, at the second position, to secure the contact area between the rake-in belt 240*a* and the sheet, the stretched surface of the rake-in belt 240*a* is configured to be approximately parallel to the sheet placement surface of the processing tray 220 or the upper surface of the sheet on the processing tray 220. To be noted, approximately parallel means that, for example, the angle of the stretched surface with respect to the upper surface of the sheet is within the range of 5°. If the pivot radius of the rake-in portion 240 is small, the stretched surface of the rake-in belt 240*a* erects when the rake-in portion 240 is moved to the first position, and thus the dimension of the rake-in position 240 in the up-down direction at the first position increases. In this case, the size of the apparatus is increased to secure a space for this dimension. Therefore, in the present embodiment, the pivot radius of the rake-in portion 240 is increased.

Figure 39A:
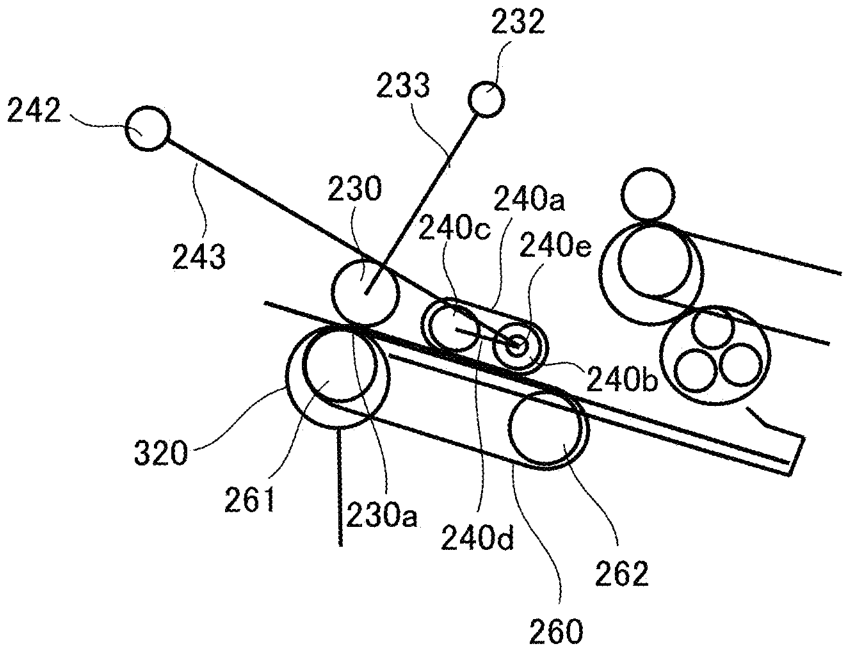
FIG. 39A is a schematic view of another example of a support configuration of the rake-in belts according to the second embodiment, and is a diagram illustrating a state in which the number of sheets on the processing tray is small.
Figure 39B:
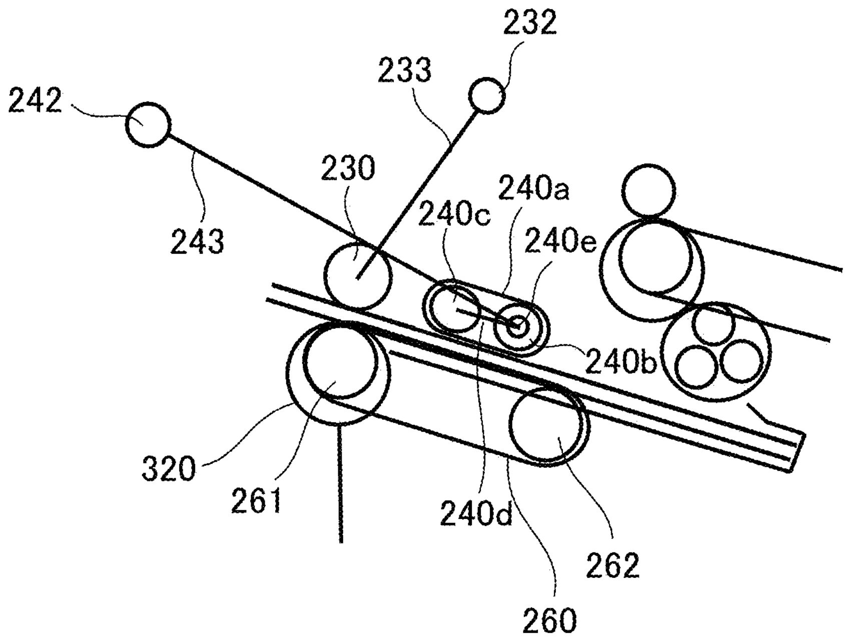
FIG. 39B is a schematic view of another example of the support configuration of the rake-in belts according to the second embodiment, and is a diagram illustrating a state in which the number of sheets on the processing tray has increased.

To be noted, when the number of sheets placed on the processing tray 220 is increased, the position where the rake-in belt 240*a* comes into contact with the sheet becomes higher. Therefore, in the case of a mechanism in which the angle of the stretched surface of the rake-in belt 240*a* does not change, the contact area between the rake-in belt 240*a* and the sheet changes in accordance with the amount of supported sheets. Therefore, a mechanism capable of changing the angle of the rake-in belt 240*a* may be additionally provided. For example, as illustrated in FIGS. 39A and B, by coupling the rollers 240*b* and 240*c* stretching the rake-in belt 240*a* via an arm 240*d* and providing a pivot shaft 240*e* on the roller 240*c* that is on the upstream side in the predetermined direction, the rake-in belt 240*a* is configured to be pivotable about the pivot shaft 240*e* with respect to the rake-in arm 243. Further, by providing a compression spring or torsion spring such that the roller 240*b* on the downstream side in the predetermined direction is urged toward the sheet, the stretched surface of the rake-in belt 240*a* is configured such that the angle thereof changes to follow the surface of the sheet. As a result of this, the stretched surface of the rake-in belt 240*a* is made capable of coming into contact with the upper surface of the sheet by a wide contact area regardless of the amount of sheets supported on the processing tray 220.

In addition, in the case of the present embodiment, the rake-in portion 240 also functions as a dropping member that drops the trailing end (upstream end in the predetermined direction) of the sheet conveyed from the pre-processing rollers 211 toward the processing tray 220. That is, the rake-in pivoting mechanism 241 positions the rake-in portion 240 at the first position when the pre-processing rollers 211 and the conveyance belts 212 are conveying the sheet. In contrast, after the upstream end (trailing end) of the sheet in the predetermined direction has passed the pre-processing nip portion 211*a* of the pre-processing rollers 211 and the conveyance belts 212, the rake-in pivoting mechanism 241 moves the rake-in portion 240 from the first position to the second position, and drops the sheet toward the processing tray 220. As a result of this, the trailing end of the sheet being left in the pre-processing nip portion 211*a* is suppressed. To be noted, the timing of the start of movement of the rake-in portion 240 from the first position to the second position may be before the upstream end of the sheet in the conveyance direction passes the pre-processing nip portion 211*a*, as long as the movement to the second position is completed after the upstream end of the sheet in the conveyance direction has passed the pre-processing nip portion 211*a*, and the sheet can be dropped onto the processing tray 220. In addition, the same applies to the movement timing of trailing end dropping members 250 that will be described later.

Particularly, in the present embodiment, while the sheet is conveyed by the pre-processing rollers 211 and the conveyance belts 212, the rake-in portion 240 is positioned at the first position. That is, the rake-in portion 240 is standing by above the pre-processing nip portion 211*a*. Therefore, an operation of causing the rake-in portion 240 to abut and further press down the upper surface of the trailing end portion of the sheet having passed the pre-processing nip portion 211*a* can be performed easily, and thus the trailing end of the sheet can be more reliably dropped onto the processing tray 220. In addition, the rake-in portion 240 that also functions as a trailing end dropper for the sheet includes the rake-in belt 240*a* stretched by the two rollers 240*b* and 240*c* as described above. Further, in the present embodiment, the stretched surface of the rake-in belt 240*a* is caused to abut the upper surface of the sheet when dropping the trailing end of the sheet. Therefore, for example, a larger contact area with the sheet can be secured than in the case where the rake-in portion is a roller, and therefore the trailing end dropping of the sheet can be performed more reliably.

[Trailing End Dropping Members]

The rake-in portion 240 described above is positioned at the center of the sheet in the width direction, and there is a possibility that the trailing end of the sheet cannot be sufficiently dropped by this rake-in portion 240. Therefore, in the present embodiment, trailing end dropping members 250 serving as upstream end dropping members are further provided. The trailing end dropping members 250 are provided as a pair on the two sides of the rake-in portion 240. That is, the pair of trailing end dropping members 250 are disposed on the two sides of the rake-in portion 240 in the sheet width direction intersecting with the sheet conveyance direction, and move in the up-down direction in an interlocked manner with the rake-in portion 240 to drop the upstream end portion (trailing end portion) of the sheet toward the processing tray 220 by abutting the upper surface of the upstream side of the sheet in the predetermined direction (upstream side in the sheet conveyance direction) after the upstream end of the sheet in the predetermined direction has passed the pre-processing nip portion 211*a*.

The pair of trailing end dropping members 250 configured in this manner are each a plate-shaped member and pivotably supported by the pivot shaft 242 similarly to the rake-in portion 240, and are further pivoted in the up-down direction by the rake-in pivoting mechanism 241 together with the rake-in portion 240. In the case where the rake-in portion 240 is at the first position, the distal ends of the pair of trailing end dropping members 250 are positioned above the pre-processing nip portion 211*a* similarly to the rake-in portion 240. In addition, in the case where the rake-in portion 240 is at the second position, the surface (lower surface of the distal end portion) of the pair of trailing end dropping members 250 that abuts the sheet is positioned above the surface of the rake-in portion 240 that abuts the sheet. Further, the lower surface of the distal end portion of the trailing end dropping members 250 abuts the upper surface of a curled portion in the case where the sheet placed on the processing tray 220 is curled, and in the case where the trailing end of the sheet bundle is lifted up when the sheet bundle is discharged, abuts the upper surface of this lifted-up portion. To be noted, the trailing end dropping members 250 may be configured to abut the upper surface of the sheet or sheet bundle placed on the processing tray 220 similarly to the rake-in portion 240 in the case of being disposed to oppose the discharge belts 260 with the sheet or sheet bundle therebetween at the second position. As described above, in the case where the trailing end dropping members 250 are positioned to nip the sheet with the discharge belts 260, at the second position, since the upper surface of the sheet or sheet bundle is pressed on both sides of the rake-in portion 240 in the width direction by the trailing end dropping members 250, the sheet or sheet bundle can be more reliably pressed toward the discharge belts 260, and therefore the sheet or sheet bundle can be conveyed more reliably. To be noted, the distal end portions of the pair of trailing end dropping members 250 are formed as bent portions 251 that are bent so as to be approximately parallel to the upper surface of the sheet on the processing tray 220 at the second position. The pivoting trajectory of the pair of trailing end dropping members 250 is similar to those of the rake-in portion 240 and the rake-in arm 243.

[Returning Member]

The returning member 280 conveys the sheet conveyed toward the trailing end regulating member 290 by the rake-in portion 240 as described above further toward the trailing end regulating member 290, causes the trailing end of the sheet to abut the trailing end regulating member 290, and regulates the trailing end position of the sheet. The returning member 280 configured in this manner is constituted by a knurled belt 281, and by rotationally driving the knurled belt 281, the sheet conveyed upstream in the predetermined direction by the rake-in portion 240 is further raked in, and thus the trailing end thereof is caused to abut the trailing end regulating member 290. The returning member 280 is capable of moving to an abutting position where the returning member 280 can abut the sheet and a retracted position where the returning member 280 is retracted upward from the abutting position, and as will be described in detail later, moves to the abutting position in the case of conveying the sheet toward the trailing end regulating member 290, and moves to the retracted position in the case of conveying the sheet on the processing tray 220 toward the stacking tray 300, respectively.

[Discharge Rollers]

The discharge rollers 230 constitute discharge rotary member pairs (pair of discharge rotary members) and discharge portions together with the discharge belts 260. The discharge rollers 230 serving as upper discharge rotary members are movable to a contact position where the discharge rollers 230 come into contact with the upper surface of the sheet placed on the processing tray 220, and a retracted position where the discharge rollers 230 are retracted upward from the contact position, and nip the sheet with the discharge belts 260 at the contact position. That is, the discharge rollers 230 function as nipping members that nip the sheet with the discharge belts 260 at the contact position. Two discharge rollers 230 are disposed at an interval in the width direction of the sheet, and as described above, the discharge rollers 230 are each capable of nipping the sheet with a corresponding discharge belt 260 at the contact position.

In addition, in the case of the present embodiment, two discharge rollers 230 are disposed at an interval in the width direction. That is, one discharge roller 230 each is provided between a trailing end dropping member 250 on one side and the rake-in portion 240 and between a trailing end dropping member 250 on the other side and the rake-in portion 240 among the pair of trailing end dropping members 250. These two discharge rollers 230 respectively nip the sheet with the discharge belts 260 on the two sides in the width direction at the contact position. Then, the discharge belts 260 rotate, and thus the sheet or sheet bundle nipped between the discharge rollers 230 and the discharge belts 260 is conveyed. If the sheet or sheet bundle is nipped and conveyed between the discharge rollers 230 and the discharge belts 260 at positions separated in the width direction as described above, skew is less likely to occur during conveyance of the sheet or sheet bundle. In addition, at this time, since the sheet or sheet bundle is nipped between the discharge belt 260 at the center in the width direction and the rake-in portion 240 and thus the discharge of the sheet or sheet bundle is assisted, the conveyance force can be transmitted to the sheet at three positions in the width direction during discharge of the sheet or sheet bundle, and the sheet or sheet bundle can be discharged more reliably while suppressing the skew.

The discharge rollers 230 are driven rollers that rotate in accordance with the rotation of the discharge belts 260, but may be driven. That is, in the present embodiment, the discharge rollers 230 are configured as driven rotary members, and the discharge belts 260 are configured as driving rotary members. In addition, although the discharge rollers 230 function as nipping members capable of nipping the sheet with the discharge belts 260 at the contact position, but these nipping members may be different rotary members such as belts instead of rollers, and may be abutment members such as lever members that abut the sheet without rotating.

The discharge rollers 230 are disposed to oppose stretch rollers 261 that are on the downstream side among the stretch rollers 261 and 262 stretching the discharge belts 260 with the discharge belts 260 therebetween at the contact position. As a result of this, at the contact position, the sheet can be nipped between the discharge rollers 230 and the stretch rollers 261 with the discharge belts 260 therebetween, and the sheet can be nipped and conveyed more reliably.

The discharge rollers 230 can be pivoted between a contact position and a retracted position about the pivot shaft 232 serving as a second pivot shaft by a discharge roller pivoting mechanism 231 serving as a second pivoting means. In other words, the discharge rollers 230 are capable of moving up and down between the contact position and the retracted position. The discharge roller pivoting mechanism 231 includes the discharge arms 233 serving as second support members supporting the discharge rollers 230, and the pivot shaft 232 pivotably supporting the discharge arm 233, and is capable of pivoting the discharge rollers 230 supported at the distal ends of the discharge arms 233 about the pivot shaft 232. The detailed configuration of the discharge roller pivoting mechanism 231 will be described later.

At the contact position, the pivot shaft 232 is disposed upstream of the discharge nip portion where the sheet is nipped between the discharge rollers 230 and the discharge belts 260 in the predetermined direction. In addition, at the retracted position, the discharge rollers 230 are positioned above the pre-processing nip portion 211*a* where the sheet is nipped between the pre-processing rollers 211 and the conveyance belts 212 in the vertical direction, and the pivot shaft 232 is positioned above the discharge rollers 230 at the retracted position in the vertical direction.

Since the positional relationship of the discharge rollers 230 with the pivot shaft 232 and the pre-processing nip portion 211*a* is defined as described above, the discharge rollers 230 allow the sheet having passed the pre-processing nip portion 211*a* to move toward the stacking tray 300 in the state of being at the retracted position. In contrast, the discharge rollers 230 move downward from the retracted position toward the contact position by pivoting in an arrow R2 direction (counterclockwise direction) of FIG. 37B about the pivot shaft 232. At this time, the discharge arms 233 enter a path that the sheet having passed the pre-processing nip portion 211*a* passes through, and has a function of guiding the sheet downward. Specifically, in the case of guiding the sheet having passed the pre-processing nip portion 211*a* by the discharge arms 233, the discharge rollers 230 stop at a guide position that is between the contact position and the retracted position in the up-down direction. Further, the discharge rollers 230 move from the guide position to the contact position that is further down, and thus it becomes possible to nip the sheet between the discharge rollers 230 and the discharge belts 260.

[Alignment Portion]

The alignment portion 270 serving as an alignment means and a shifting portion includes a pair of alignment plates 271 serving as a first shifting portion and a second shifting portion. The pair of alignment plates 271 are disposed further downstream of the downstream end portion of the conveyance path 210 in the sheet conveyance direction (downstream end portion in the predetermined direction), and align the sheet in the width direction by abutting edges of the sheet in the width direction by moving in the sheet width direction intersecting with the sheet conveyance direction. In the present embodiment, these are disposed on respective sides of the sheet placed on the processing tray 220 in the width direction, and are each capable of moving in the width direction. In addition, the pair of alignment plates 271 are configured in the same manner. The pair of alignment plates 271 move in the shift direction by being driven by a front-side (F-side) alignment plate moving motor MT5 and a rear-side (R-side) alignment plate moving motor MT6 (see FIG. 49) serving as a first driving portion and a second driving portion.

In addition, the pair of alignment plates 271 include first abutment portions 272 and the second abutment portions 273. The first abutment portions 272 are capable of abutting the edges in the width direction of the sheet hanging down from the conveyance path 210 toward the processing tray 220 at a position further downstream of the downstream end portion of the conveyance path 210 in the sheet conveyance direction. That is, the first abutment portions 272 are provided at positions where the first abutment portions 272 are capable of abutting the edges of the sheet in the width direction in a state in which the sheet is hanging down from the conveyance path 210 to the pre-processing nip portion 211*a* in a state in which the leading end (downstream end in the predetermined direction) of the sheet conveyed in the conveyance path 210 has passed the pre-processing nip portion 211*a* and in which the trailing end thereof has not passed the pre-processing nip portion 211*a*. To be noted, although it has been disclosed that the first abutment portions 272 are disposed at positions further downstream of the downstream end portion of the conveyance path 210 in the sheet conveyance direction in the present embodiment, the first abutment portions 272 may be provided to extend to not only the positions further downstream of the downstream end portion of the conveyance path 210 in the sheet conveyance direction but also positions upstream of the pre-processing nip portion 211*a* in the sheet conveyance direction and abut the edges of the sheet in the width direction in a state of extending beyond the pre-processing nip portion 211*a*.

The second abutment portions 273 are disposed to extend on the downstream side of the first abutment portions 272 in the sheet conveyance direction from a lower portion of the first abutment portions 272, and are capable of abutting the edges of the sheet in the width direction in a state in which the downstream end of the sheet placed on the processing tray 220 in the sheet conveyance direction is projecting to the stacking tray 300 side (stacking tray side) more than the downstream end of the processing tray 220 in the sheet conveyance direction. That is, the second abutment portions 273 are provided at positions where the second abutment portions 273 are capable of abutting the edges of the sheet in the width direction in the state of being placed on the processing tray 220. The processing tray 220 is normally shorter than the sheet placed thereon, and even the leading end of a sheet that is placed on the processing tray 220 and whose trailing end is regulated as described above hangs down to the stacking tray 300 side. The second abutment portions 273 are formed at positions where the second abutment portions are capable of abutting the edges of the sheet in the width direction in such a state.

In addition, as will be described in detail later, the second abutment portions 273 are capable of abutting the edges in the width direction of the sheet hanging down from the conveyance path 210 to the processing tray 220 side together with the first abutment portions 272. As described above, the discharge rollers 230 pivot from the retracted position to the guide position. As will be described in detail later, the discharge rollers 230 and the discharge arms 233 start pivoting toward the guide position at a timing matching the sheet discharged from the conveyance path 210, abut the leading end and the upper surface of the sheet being discharged from the conveyance path 210, and has a function as a guide means that guides the sheet downward. Further, as a result of the sheet being guided downward by the discharge rollers 230 and the discharge arms 233 as described above, the edges of the sheet in the width direction abut the first abutment portions 272 and the second abutment portions 273.

Here, the first abutment portions 272 are positioned above the second abutment portions 273 in the vertical direction. In addition, the pair of alignment plates 271 have cutout portions 274 that are cut out so as not to interfere with the trailing end dropping members 250 described above. That is, the pair of alignment plates 271 include the second abutment portions 273 that are longer in the predetermined direction, the first abutment portions 272 extending upward from upstream portions of the second abutment portions 273 in the predetermined direction, and cutout portions 274 formed above downstream portions of the second abutment portions 273 in the predetermined direction. As described above, since the trailing end dropping members 250 pivot about the pivot shaft 242 that is on the downstream side of the discharge nip portion in the predetermined direction, downstream portions of the pair of alignment plates 271 are cut out to prevent interference with the trailing end dropping members 250.

Meanwhile, as described above, the first abutment portions 272 are provided above the upstream portions of the second abutment portions 273 in the predetermined direction so as to be capable of abutting the edges in the width direction of the sheet hanging down from the conveyance path 210. Further, the second abutment portions 273 are formed to be present also below the cutout portions 274 such that the edges in the width direction of the sheet hanging down from the conveyance path 210 are capable of abutting the second abutment portions 273.

As will be described in detail later, in the case of causing abutment on the edges in the width direction of the sheet hanging down from the conveyance path 210, the nip pressure of the pre-processing rollers 211 is set to approximately 0, and thus alignment of the sheet or movement (shift) of the sheet in the width direction are made possible by the pair of alignment plates 271 even in a state in which the sheet is in the conveyance path 210. In addition, the second abutment portions 273 abut the edges in the width direction of the sheet hanging down from the conveyance path 210 together with the first abutment portions 272 as described above, and enable alignment of the sheet or movement of the sheet in the width direction. Further, the second abutment portions 273 are movable in the width direction along the sheet placement surface of the processing tray 220 so as to be able to abut the edges in the width direction of the sheet placed on the processing tray 220, and are formed to be longer than the first abutment portions 272 in the predetermined direction, such that the contact area with the edges in the width direction of the sheet on the processing tray 220 is large.

[Stacking Tray]

The stacking tray 300 stacks the sheet discharged thereonto by the discharge rollers 230 and the discharge belts 260 as described above. The stacking tray 300 is provided downstream of the processing tray 220 in the predetermined direction and below the processing tray 220 in the vertical direction so as to be capable of moving up and down. In addition, the stacking tray 300 is inclined with respect to the horizontal surface such that the upstream side thereof in the predetermined direction is lower than the downstream side thereof. For example, the stacking tray 300 configured in this manner is supported to be movable in the up-down direction along a rail disposed in the up-down direction, and moves up and down by being driven by a lifting/lowering motor MT9 (FIG. 48) serving as a lifting/lowering means.

At the upstream end of the stacking tray 300 in the predetermined direction, the erecting surface 310 serving as a stacking side regulating means that regulates the upstream end (trailing end) in the predetermined direction of the sheet or sheet bundle stacked on the stacking tray 300 is provided. In addition, the discharged sheet rake-in belt 320 that is an endless belt serving as a rake-in portion provided such that at least part thereof projects more downstream in the predetermined direction than the erecting surface 310 and more downward than the sheet placement surface of the processing tray 220 is provided at a downstream end of the processing tray 220 in the predetermined direction. The discharged sheet rake-in belt 320 is an endless belt, and a knurled belt similar to the returning member 280 described above.

The stacking tray 300 is capable of being moved up and down by the lifting/lowering motor MT9 between a first stacking position and a second stacking position below the first stacking position. The first stacking position is a position where the sheet on the stacking tray is capable of coming into contact with the discharged sheet rake-in belt 320. In addition, the second stacking position is a position where the movement of the stacking tray 300 moving down when discharging the sheet onto the stacking tray 300 is switched to upward movement.

As will be described in detail later, when discharging the sheet or sheet bundle, the stacking tray 300 moves up and down, and the upper surface of the trailing end side of the sheet or sheet bundle on the stacking tray 300 is brought into contact with the discharged sheet rake-in belt 320. As a result of this, the trailing end of the sheet or sheet bundle on the stacking tray 300 is pressed by the discharged sheet rake-in belt 320, and even when the sheet or sheet bundle is discharged thereafter, displacement of the sheet or sheet bundle already stacked on the stacking tray 300 can be suppressed.

In addition to the function of pressing the trailing end of the sheet or sheet bundle on the stacking tray 300 as described above, the discharged sheet rake-in belt 320 is rotationally driven to convey (rake in) the sheet or sheet bundle constituted by a plurality of sheets on the stacking tray 300 toward the erecting surface 310 in a third conveyance direction, and thus causes the trailing end of the sheet or sheet bundle to abut the erecting surface 310 to align the trailing end of the sheet or sheet bundle. The discharged sheet rake-in belt 320 configured in this manner is disposed coaxially with the stretch rollers 261 that drive the discharge belts 260 serving as driving rotary members. That is, a roller that drives the discharged sheet rake-in belt 320 is also provided on a drive shaft 261*a* of the stretch rollers 261, and the discharge belts 260 and the discharged sheet rake-in belt 320 rotate in synchronization.

To be noted, the rotation shaft of the discharged sheet rake-in belts 320 does not have to be coaxial with the drive shaft (rotation shaft) 261*a* of the stretch rollers 261. Also in the case of the present embodiment, it suffices as long as the rotation shaft of the discharged sheet rake-in belts 320 is provided, in the vertical direction, between the discharge nip portion 230*a* (see FIG. 38A and the like) between the discharge roller 230 and the discharge belt 260 serving as a pair of discharge rotary members and the upstream end portion of the stacking tray 300 in the first conveyance direction. In addition, the discharged sheet rake-in belts 320 may be driven separately from the discharge belts 260 similarly to the first embodiment described above.

[Driving Configuration of Sheet Processing Apparatus]

Figure 40:
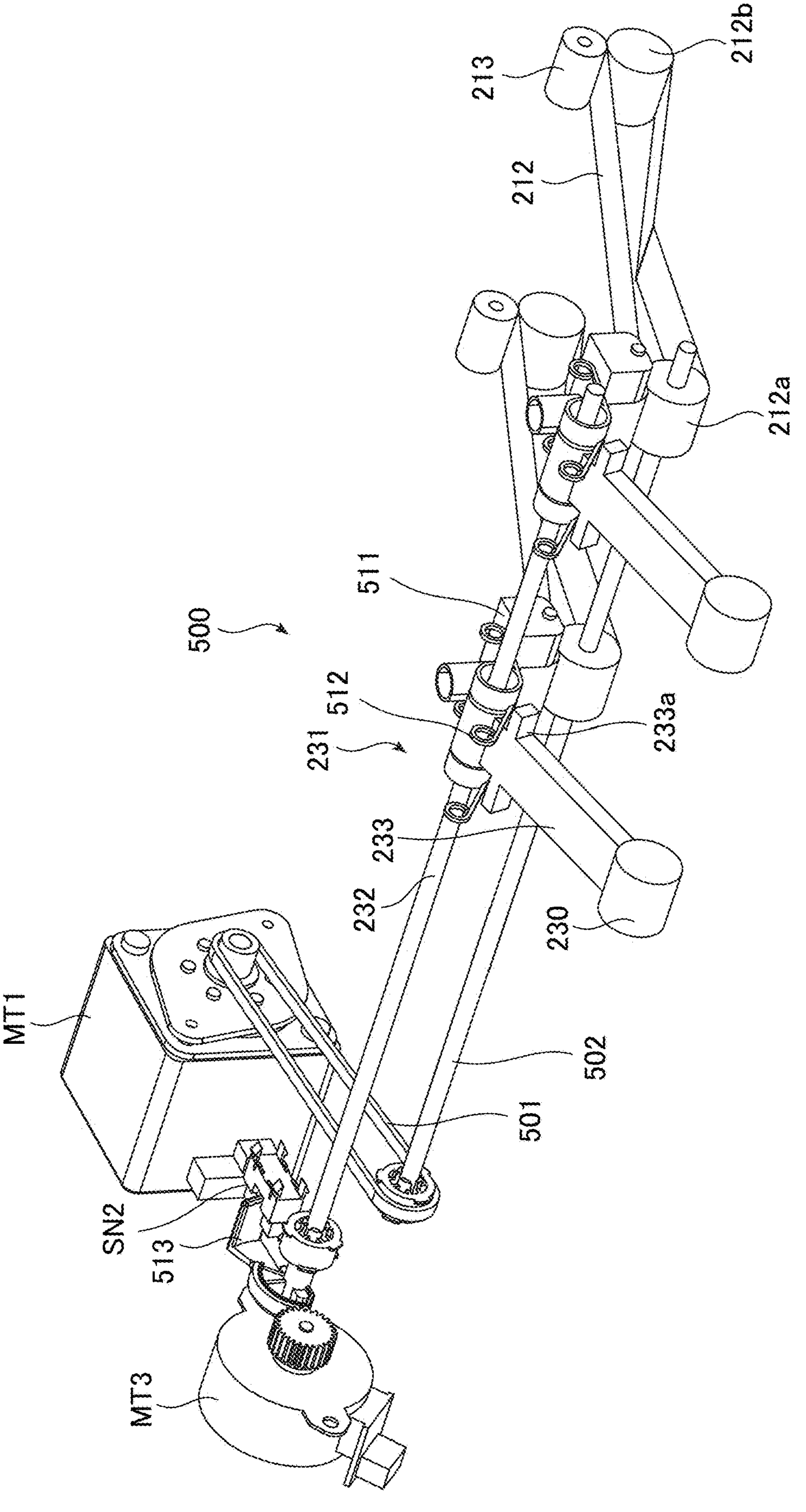
FIG. 40 is a perspective view of part of a driving configuration according to the second embodiment.

Next, a drive configuration 500 of each component of the sheet processing apparatus 200 will be described with reference to FIGS. 40 to 48. FIG. 40 illustrates a configuration for changing the nip pressure of the pre-processing rollers 211, driving of the conveyance belts 212 and the like, and lifting and lowering the discharge rollers 230, among the drive configuration 500. A conveyance motor MT1 transmits a drive to a drive shaft 502 of the rollers 212*a* that drive the conveyance belts 212 via a transmission belt 501. Since rollers for driving the knurled belts 214 are also provided on the drive shaft 502, the knurled belts 214 are also rotationally driven by the conveyance motor MT1.

In addition, the drive of the conveyance motor MT1 is transmitted to the pre-processing rollers 211 and the returning member 280 via an unillustrated transmission mechanism. Therefore, the pre-processing rollers 211, the conveyance belts 212, the knurled belts 214, and the returning member 280 are rotationally driven in synchronization by the conveyance motor MT1.

A lifting/lowering motor MT3 is coupled to the pivot shaft 232 of the discharge rollers 230, and as a result of the lifting/lowering motor MT3 being driven, the discharge rollers 230 move up and down between the contact position and the retracted position as described above. In addition, in the case of the present embodiment, the nip pressure of the pre-processing rollers 211 can be changed by driving the lifting/lowering motor MT3. That is, the lifting/lowering motor MT3 also functions as a nip pressure adjusting means (conveyance rotary member nip pressure switching mechanism) capable of adjusting the nip pressure by which the sheet is nipped between the pre-processing rollers 211 serving as first rotary members and the conveyance belts 212 serving as second rotary members. The pre-processing rollers 211 and the conveyance belts 212 correspond to first conveyance portions and pairs of conveyance rotary members that convey the sheet in the first conveyance direction (predetermined direction).

Figure 41A:
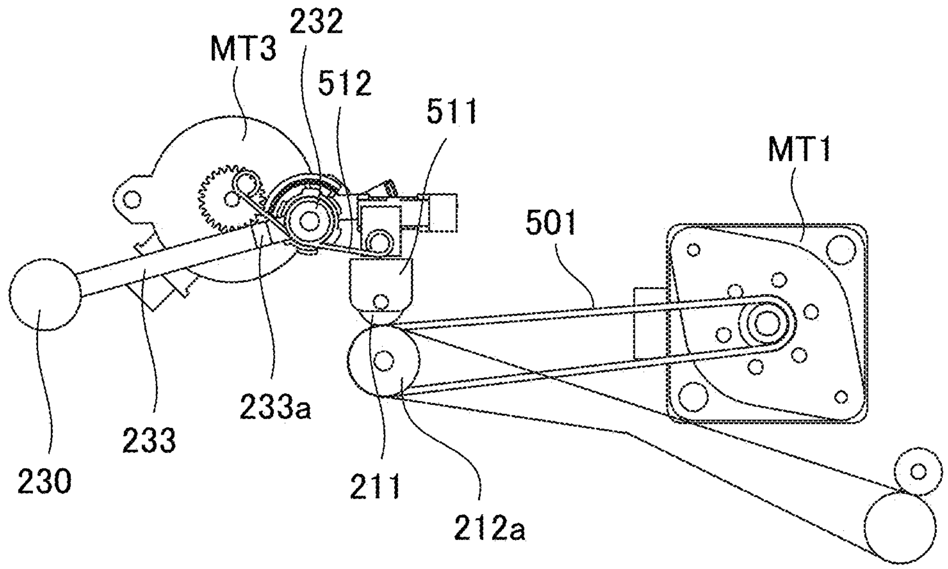
FIG. 41A is a side view of a first driving configuration illustrating a state in which a nip pressure of pre-processing rollers according to the second embodiment is in action.

FIGS. 41A and B illustrate this configuration. The pre-processing rollers 211 are held by roller holding portions

511, and the roller holding portions 511 are capable of moving in the up-down direction, that is, in a direction to move closer to and away from a portion of the conveyance belts 212 stretched over the rollers 212*a*. The roller holding portions 511 are urged in a direction to press the pre-processing rollers 211 against the conveyance belts 212 by torsion springs 512 serving as urging means. In addition, the torsion springs 512 are supported by the pivot shaft 232 of the discharge rollers 230, and pivot together with the pivot shaft 232.

Specifically, one end of the torsion spring 512 abuts the roller holding portion 511, and part of the torsion spring 512 on the other end side across the pivot shaft 232 abuts a projection portion 233*a* provided on a discharge arm 233 supporting the discharge roller 230. As a result of this, the torsion spring 512 is disposed between the roller holding portion 511 and the projection portion 233*a* in the state of being elastically stretched. When the pivot shaft 232 and the discharge arms 233 pivot together, the position of part of the torsion springs 512 on the other end side that is abutting the projection portions 233*a* changes, and the torsion springs 512 pivot together with the pivot shaft 232 about the pivot shaft 232. As a result of this, the force of the torsion springs 512 urging the roller holding portions 511 changes, and the nip pressure of the pre-processing rollers 211 can be changed.

Figure 41B:
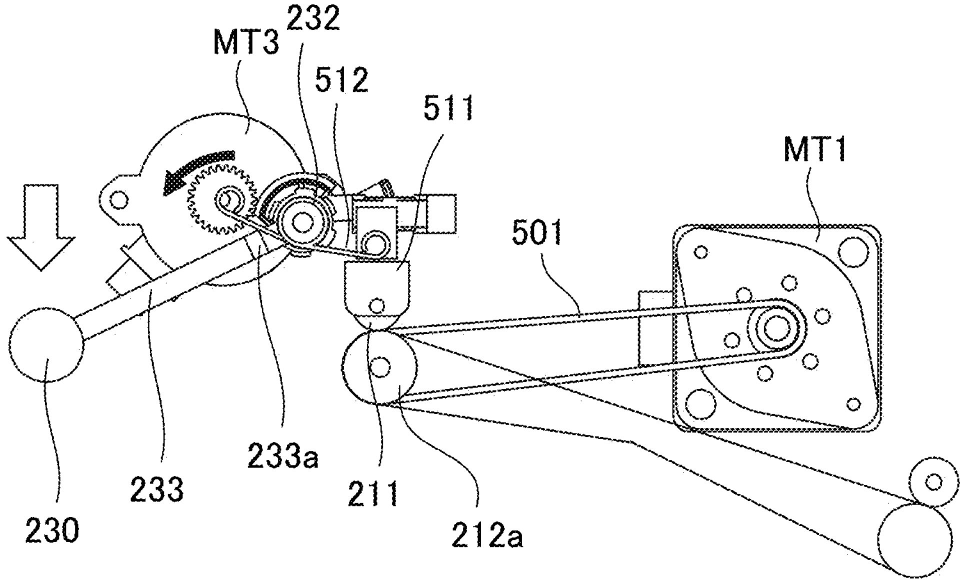
FIG. 41B is a side view of the first driving configuration illustrating a state in which the nip pressure of the pre-processing rollers according to the second embodiment is cancelled.

FIG. 41A illustrates a state in which the discharge rollers 230 are positioned at the retracted position. In this state, the roller holding portions 511 are urged by the torsion springs 512, and the pre-processing rollers 211 abut the conveyance belts 212 by a predetermined nip pressure (first pressure). In contrast, FIG. 41B illustrates a state in which the discharge rollers 230 are moving down toward the contact position. When the pivot shaft 232 pivots in a direction to move down the discharge rollers 230 toward the contact position by the driving of the lifting/lowering motor MT3, the torsion springs 512 also pivot together with this. Then, the urging of the roller holding portions 511 by the torsion springs 512 is cancelled, and the nip pressure of the pre-processing rollers 211 on the conveyance belt 212 becomes approximately 0 (second pressure lower than the first pressure). In other words, the pre-processing rollers 211 take a state in which the pre-processing rollers 211 abut the conveyance belts 212 by their own weight.

As described above, in the present embodiment, the nip pressure of the pre-processing rollers 211 on the conveyance belts 212 can be changed in accordance with the operation of moving up and down the discharge rollers 230 by driving the lifting/lowering motor MT3. Therefore, as described later, when performing the alignment operation by the alignment portion 270 in a state in which part of the sheet is still in the conveyance path 210, the nip pressure of the pre-processing rollers 211 can be made approximately 0 by lowering the discharge rollers 230. If the nip pressure of the pre-processing rollers 211 is approximately 0, the sheet can be moved in the width direction even when the sheet is nipped between the pre-processing rollers 211 and the conveyance belts 212.

To be noted, as illustrated in FIG. 40, a flag 513 is provided at an end portion of the pivot shaft 232, and this flag 513 can be detected by a nipping member HP position detection sensor SN2. The nipping member HP position detection sensor SN2 is a photo-interrupter including a light emitting portion and a light receiving portion, and when the flag 513 is positioned between the light emitting portion and the light receiving portion, detects the discharge roller (nipping member) 230 being positioned at the retracted position, that is, the home position, when the flag 513 is positioned between the light emitting portion and the light receiving portion.

Figure 42:
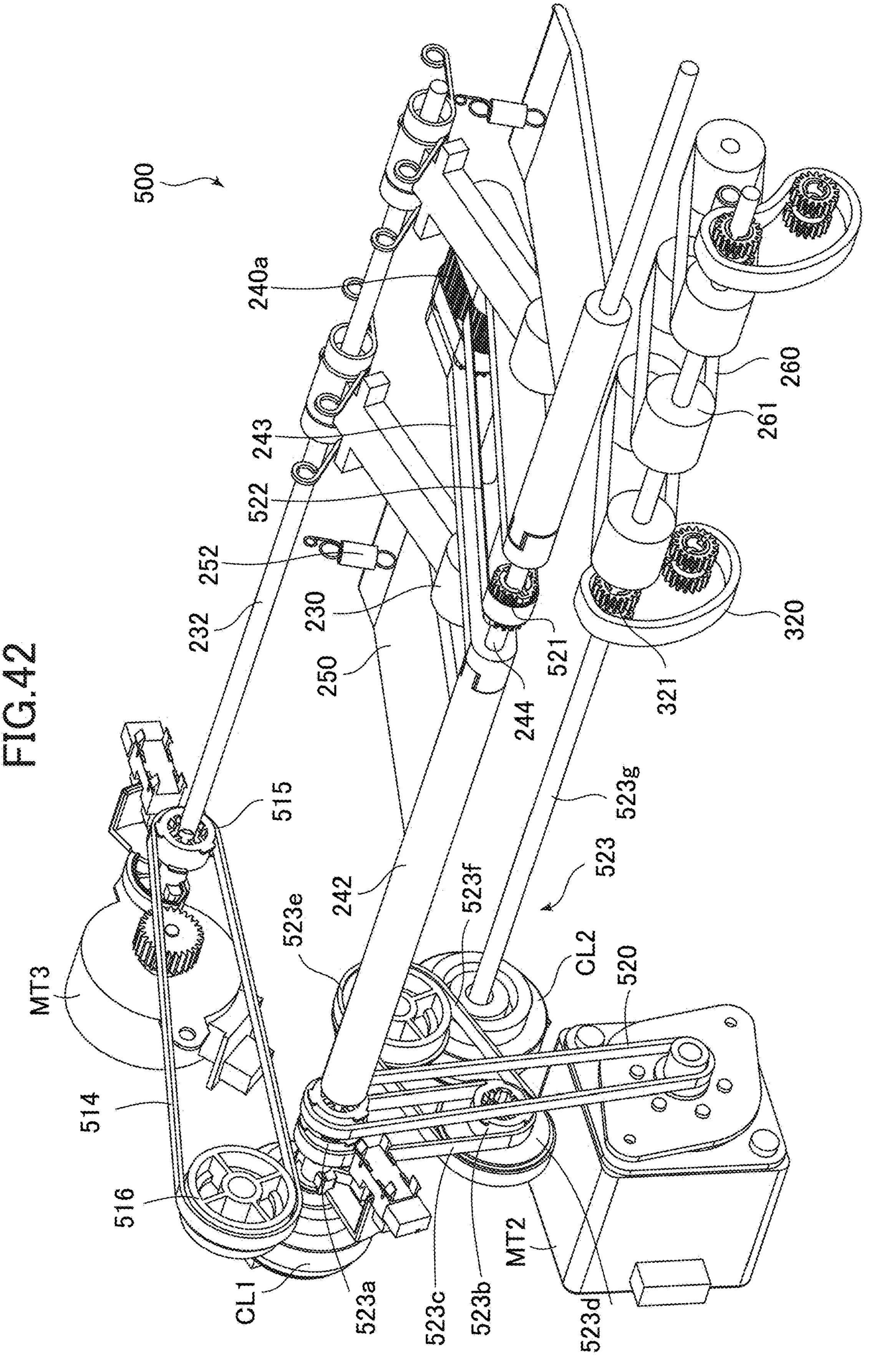
FIG. 42 is a perspective view of part of the driving configuration according to the second embodiment.
Figure 43:
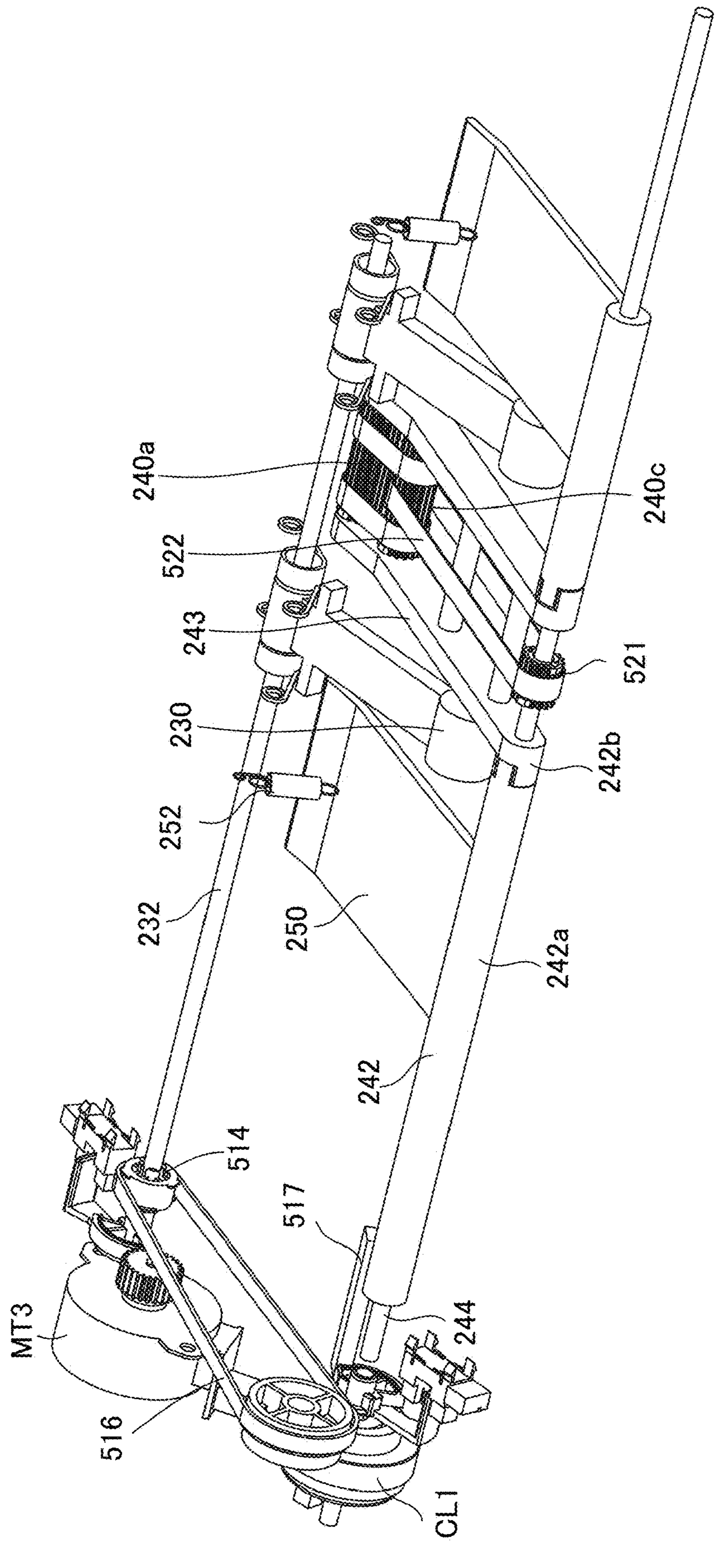
FIG. 43 is a perspective view of a driving configuration of the rake-in belts and trailing end dropping members according to the second embodiment.
Figure 44A:
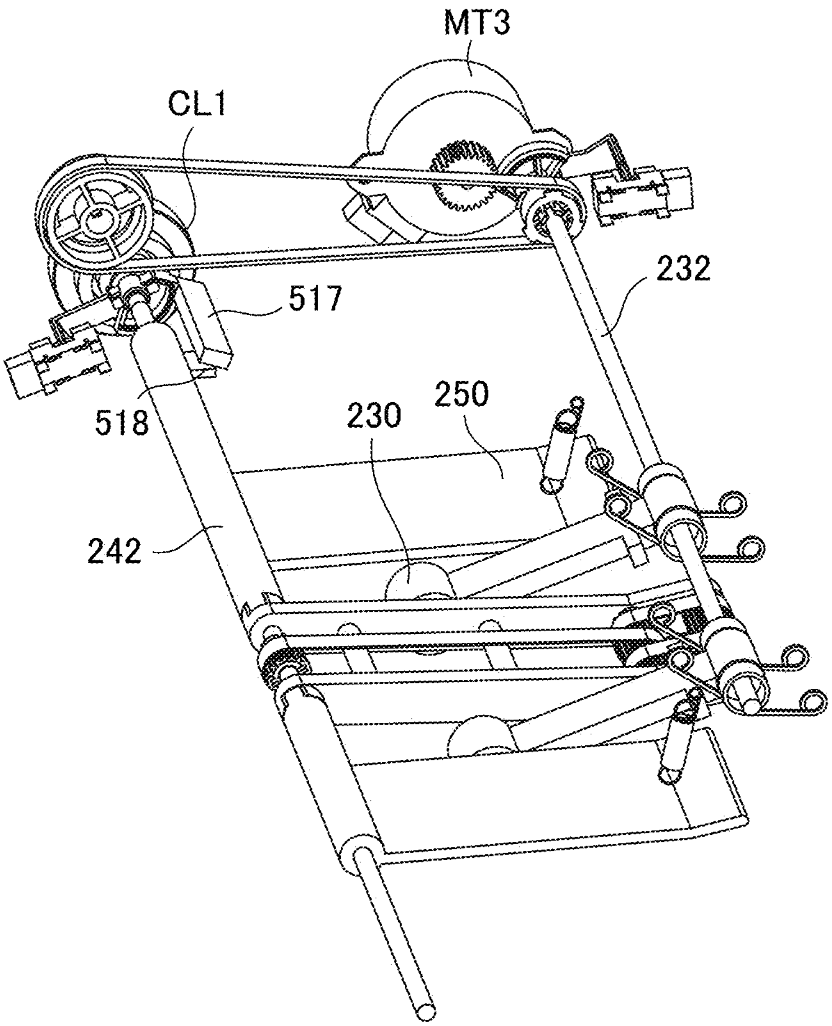
FIG. 44A is a perspective view illustrating the operation of discharge rollers according to the second embodiment, and is a diagram illustrating a state in which the discharge rollers are at a retracted position.

As illustrated in FIG. 42, the lifting/lowering motor MT3 is coupled to the pivot shaft 242 of the rake-in portion 240 and the trailing end dropping members 250 via a transmission belt 514 and an electromagnetic clutch CL1. That is, the transmission belt 514 is looped over a pulley 515 provided on the pivot shaft 232 of the discharge rollers 230 and a pulley 516 drive-coupled to the electromagnetic clutch CL1 via a gear and the like. The electromagnetic clutch CL1 is coupled to the pivot shaft 242. As illustrated in FIGS. 43, 44A, and the like, the coupling between the electromagnetic clutch CL1 and the pivot shaft 242 is established by engagement between a lifting/lowering lever 517 provided on the electromagnetic clutch CL1 and a protrusion portion 518 provided to protrude from the pivot shaft 242.

That is, the lifting/lowering lever 517 is fixed to an output shaft of the electromagnetic clutch CL1, and swings about the pivot center of the pivot shaft 242 as a result of rotation of the output shaft. The protrusion portion 518 is provided at a position where the protrusion portion 518 is capable of engaging with the lifting/lowering lever 517 below the lifting/lowering lever 517. Therefore, the lifting/lowering lever 517 engages with the protrusion portion 518 when swinging, and the pivot shaft 242 provided with the protrusion portion 518 pivots. In the present embodiment, as will be described later, since the rake-in arm 243 and the trailing end dropping members 250 are urged upward by tension springs 252, the protrusion portion 518 is also urged to abut the lifting/lowering lever 517 positioned above. Therefore, in the case where the lifting/lowering motor MT3 is driven in a normal direction in a state in which the electromagnetic clutch CL1 is ON, the rake-in portion 240 and the trailing end dropping members 250 move downward by the engagement between the lifting/lowering lever 517 and the protrusion portion 518. In contrast, in the case where the lifting/lowering motor MT3 is driven in a reverse direction, the lifting/lowering lever 517 swings upward, and the protrusion portion 518 is moved up following the lifting/lowering lever 517 by the tension spring 252. That is, by driving the lifting/lowering motor MT3 in the reverse direction, the rake-in portion 240 and the trailing end dropping members 250 can be moved up.

To summarize the above, in a state in which the electromagnetic clutch CL1 is ON, since the drive from the pulley 516 is coupled to the pivot shaft 242 side, the pivot shaft 242 pivots by the drive of the lifting/lowering motor MT3, and the rake-in portion 240 and the trailing end dropping members 250 move up and down. In contrast, in the case where the electromagnetic clutch CL1 is OFF, the drive transmission between the pulley 516 and the pivot shaft 242 is disconnected, therefore the pivot shaft 242 does not pivot even if the lifting/lowering motor MT3 is driven, and only the discharge rollers 230 move up and down in this case.

To be noted, although the trailing end dropping members 250 are provided with the tension springs 252. The tension springs 252 are coupled to the distal end side of the trailing end dropping members 250 at one ends thereof and to a frame of an upper surface of the apparatus that is not illustrated at the other ends thereof, and urge the trailing end dropping members 250 upward, that is, toward the first position. Therefore, the trailing end dropping members 250 are urged upward.

Here, as illustrated in FIG. 43, the pivot shaft 242 is disposed around a drive shaft 244 for driving the rake-in belt 240*a* that will be described later so as to be relatively rotatable with respect to the drive shaft 244. The drive shaft 244 is not coupled to the electromagnetic clutch CL1, and the pivot shaft 242 is capable of rotating separately from the drive shaft 244. In addition, the pivot shaft 242 includes a first portion 242*a* to which the root end portion (supported portion, which does not have to be an end portion of the member, and a portion projecting to an opposite side to the distal end side of the member with respect to the supported portion may be included) of the trailing end dropping members 250 is fixed and a second portion 242*b* to which the root end portion (supported portion, which does not have to be an end portion of the member, and a portion projecting to an opposite side to the distal end side of the member with respect to the supported portion may be included) of the rake-in arm 243 of the rake-in portion 240 is fixed, and the first portion 242*a* and the second portion 242*b* are coupled to each other to be rotatable together. Therefore, the rake-in arm 243 moves up together with the trailing end dropping members 250 in the case where the trailing end dropping members 250 are moved up by the urging force of the tension springs 252.

For example, if the electromagnetic clutch CL1 is turned off after moving the rake-in portion 240 and the trailing end dropping members 250 to the second position, the trailing end dropping members 250 and the rake-in portion 240 are quickly moved up toward the first position by the tension spring 252. That is, the rake-in portion 240 and the trailing end dropping members 250 can be moved up by just turning the electromagnetic clutch CL1 off without driving the lifting/lowering motor MT3. For example, to receive the next sheet, upward movement by the urging force of the tension springs 252 by turning off the electromagnetic clutch CL1 is quicker than movement by the driving of the lifting/lowering motor MT3. Therefore, in the case of the present embodiment, the next sheet can be quickly received on the processing tray 220, which enhances the productivity.

Figure 44B:
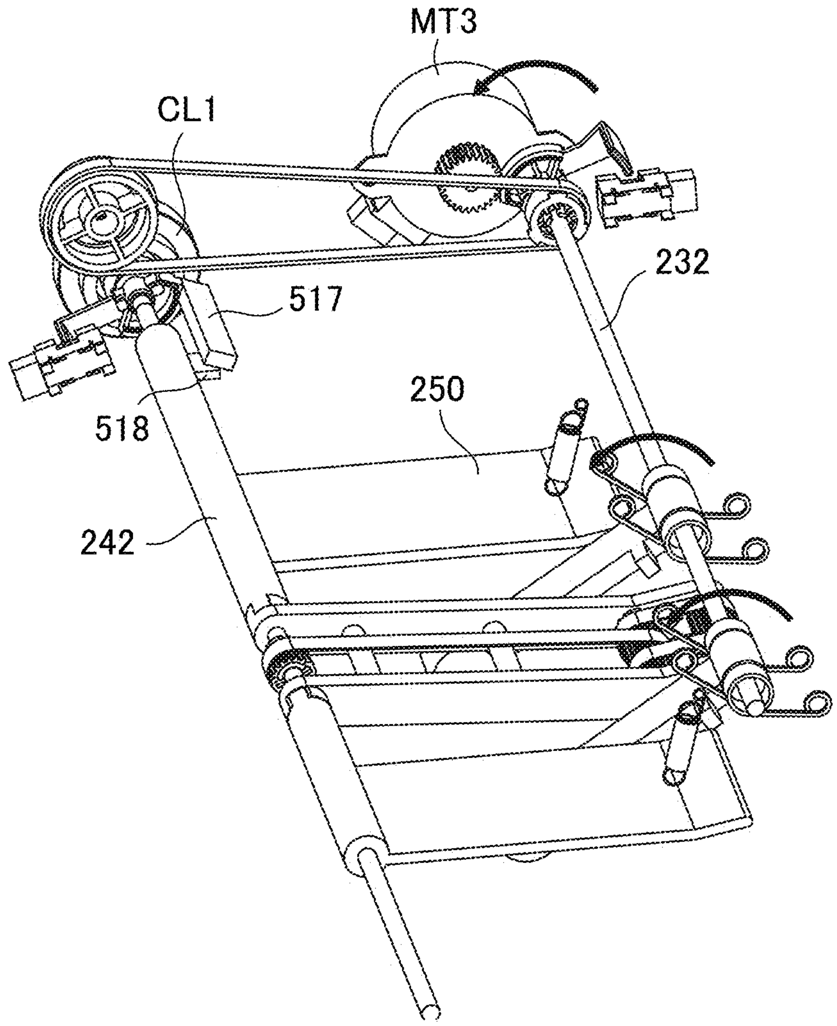
FIG. 44B is a perspective view illustrating the operation of the discharge rollers according to the second embodiment, and is a diagram illustrating a state in which the discharge rollers are at a contact position.
Figure 45A:
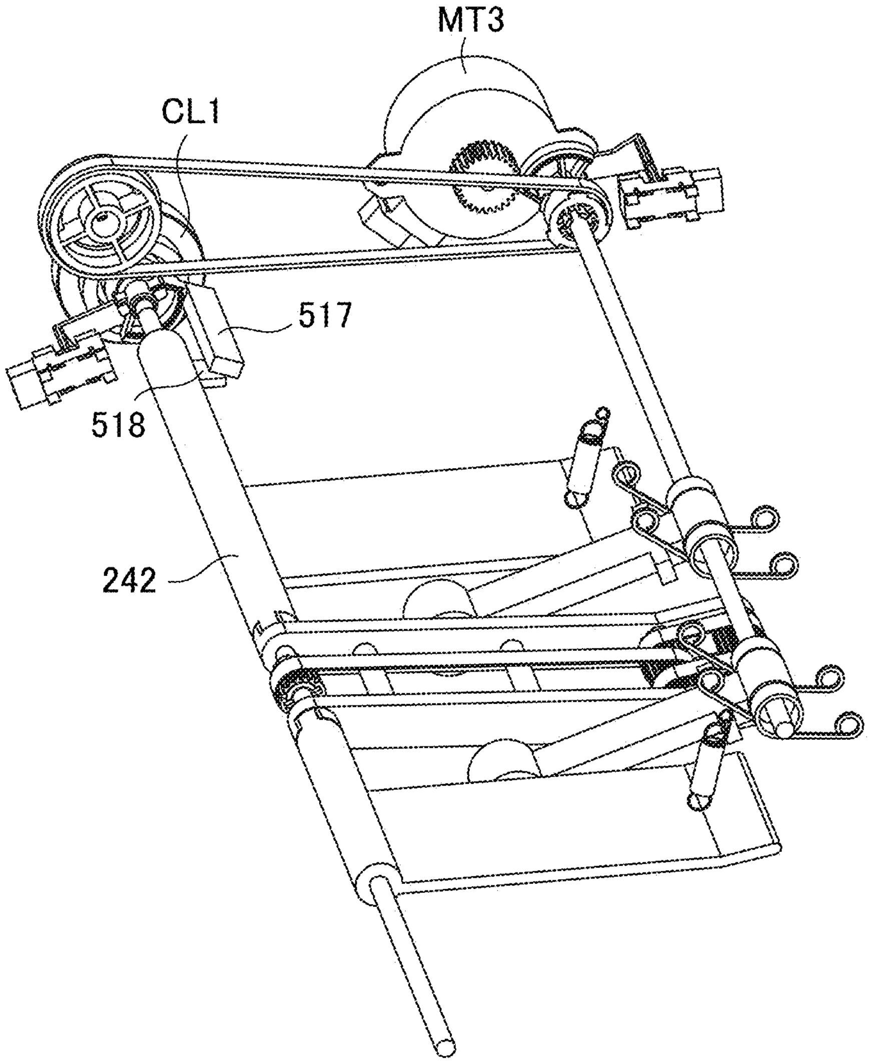
FIG. 45A is a perspective view illustrating the operation of the rake-in belts and trailing end dropping members according to the second embodiment, and is a diagram illustrating a state in which the rake-in belts and the trailing end dropping members are at a first position.

Here, the lifting/lowering operation of the discharge rollers 230, the rake-in portion 240, and the trailing end dropping members 250 will be described with reference to FIGS. 44A to 46B. First, FIGS. 44A and 45A illustrate a state in which the discharge rollers 230 are positioned at the retracted position and the rake-in portion 240 and the trailing end dropping members 250 are positioned at the first position. When the lifting/lowering motor MT3 is driven in the state of FIG. 44A while the electromagnetic clutch CL1 is still OFF, only the discharge rollers 230 move down from the retracted position toward the contact position as illustrated in FIG. 44B.

Figure 45B:
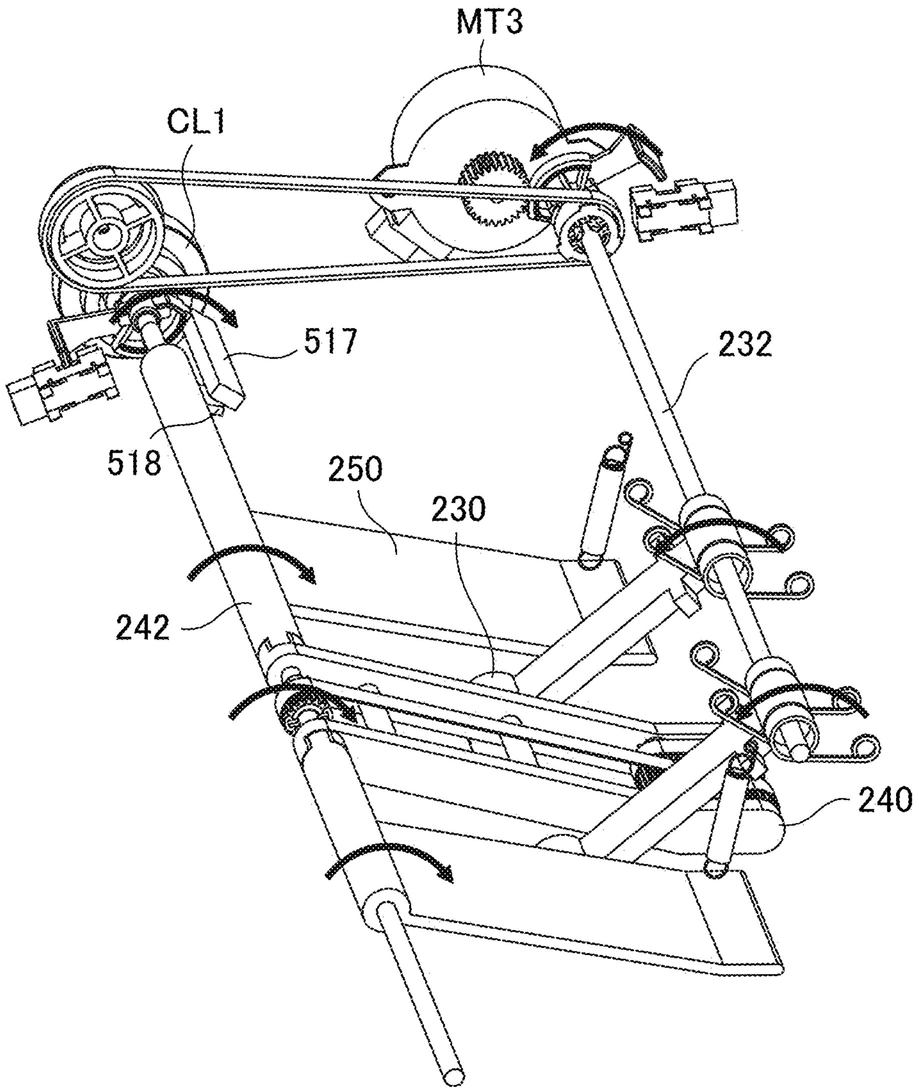
FIG. 45B is a perspective view illustrating the operation of the rake-in belts and the trailing end dropping members according to the second embodiment, and is a diagram illustrating a state in which the rake-in belts and the trailing end dropping members are at a second position.
Figure 46A:
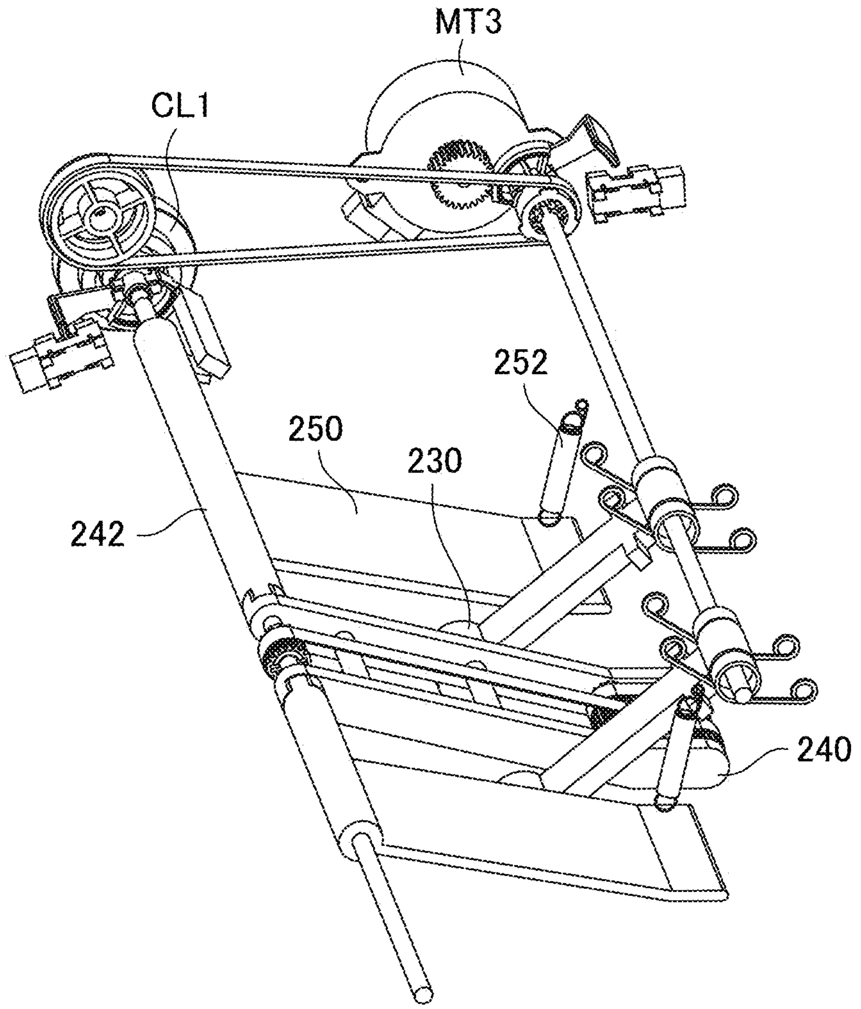
FIG. 46A is a perspective view illustrating the operation of the rake-in belts and the trailing end dropping members according to the second embodiment, and is a diagram illustrating a state in which the rake-in belts and the trailing end dropping members are at the second position.
Figure 46B:
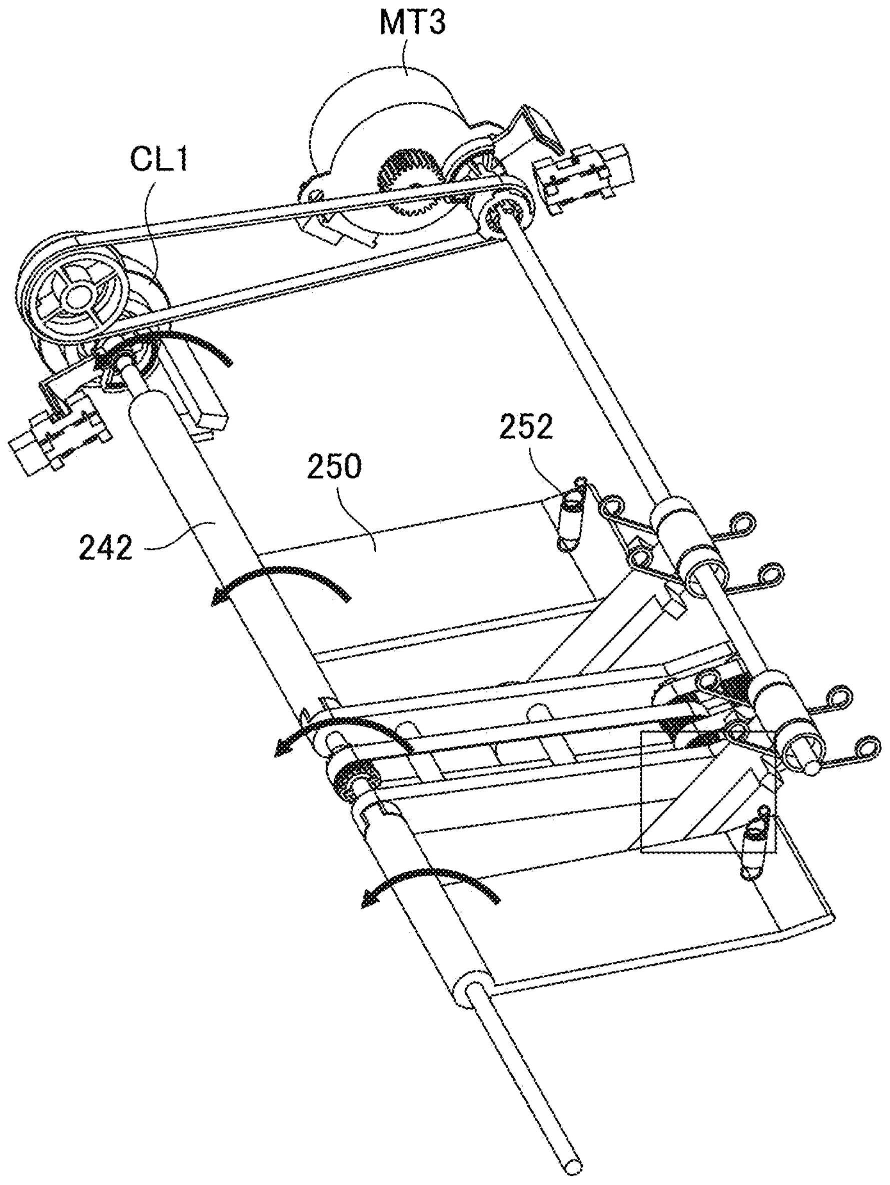
FIG. 46B is a perspective view illustrating the operation of the rake-in belts and the trailing end dropping members according to the second embodiment, and is a diagram illustrating a state in which the rake-in belts and the trailing end dropping members have returned to the first position from the second position.

In contrast, when the electromagnetic clutch CL1 is turned on and the lifting/lowering motor MT3 is driven in the state of FIG. 45A, as illustrated in FIG. 45B, the discharge rollers 230 move down toward the contact position, and the rake-in portion 240 and the trailing end dropping members 250 also move down toward the second position. Next, when the electromagnetic clutch CL1 is turned off in a state of FIG. 46A in which the discharge rollers 230 are at the contact position and the rake-in portion 240 and the trailing end dropping members 250 are at the second position, as illustrated in FIG. 46B, the rake-in portion 240 and the trailing end dropping members 250 move up by the tension spring 252 while the discharge rollers 230 remain at the contact position. As described above, in the present embodiment, by controlling the ON/OFF timing of the electromagnetic clutch CL1, the lifting/lowering timings of the discharge rollers 230 and the rake-in portion 240 and the trailing end dropping members 250 can be made different.

Figure 47:
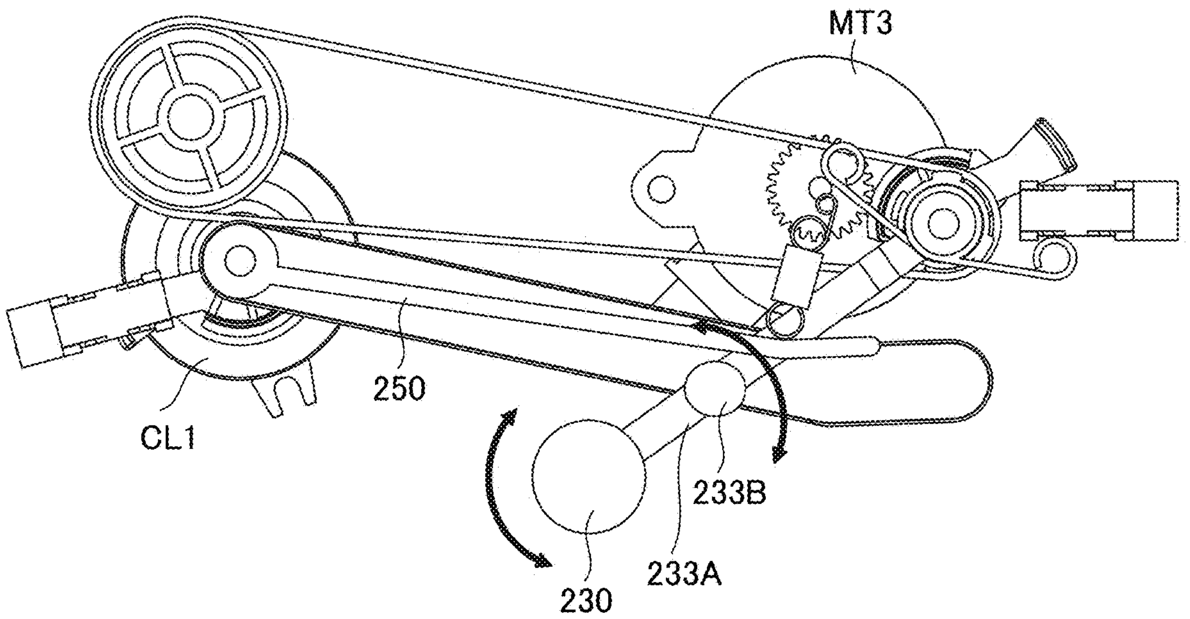
FIG. 47 is a diagram for describing another example of a support configuration of the discharge rollers according to the second embodiment.

To be noted, as illustrated in FIG. 47, a pivot shaft 233B may be provided in the middle of discharge arm 233A of the discharge rollers 230 such that the distal end side thereof with respect to the pivot shaft 233B is pivotable, and the distal end side may be urged downward by a spring. In this case, the rake-in portion 240 and the trailing end dropping members 250 can come into contact with the sheet on the processing tray 220 even if the rake-in portion 240 and the trailing end dropping members 250 move down after the discharge rollers 230.

That is, in a state in which the discharge rollers 230 are at the contact position, when the electromagnetic clutch CL1 is turned on and further the lifting/lowering motor MT3 is driven, the discharge rollers 230 move down from the contact position. If a configuration as illustrated in FIG. 47 is employed, in the case where the discharge rollers 230 attempt to move further downward, the distal end side of the discharge arms 233A pivots about the pivot shaft 233B, and thus the movement of the discharge rollers 230 can be allowed. Therefore, even if the rake-in portion 240 and the trailing end dropping members 250 move down after the discharge rollers 230, the rake-in portion 240 and the trailing end dropping members 250 can move down to a position at which contact with the sheet on the processing tray 220 is possible.

As illustrated in FIG. 42, the drive of a conveyance motor MT2 can be transmitted to the drive shaft 244 for driving the rake-in belt 240*a* via the transmission belt 520. A pulley 521 is provided at a position on the drive shaft 244 interposed between the rake-in arm 243, and a driving belt 522 is looped over the pulley 521 and a roller 240*c* (FIG. 43) stretching the rake-in belt 240*a*. When the conveyance motor MT2 is driven, the drive shaft 244 is rotated via the transmission belt 520, and the roller 240*c* is rotationally driven via the pulley 521 provided on the drive shaft 244 and the driving belt 522. Further, the rake-in belt 240*a* stretched by the roller 240*c* is rotationally driven. As described above, since the drive shaft 244 is capable of relatively rotating with respect to the pivot shaft 242, the drive shaft 244 idles with respect to the pivot shaft 242 by the drive of the conveyance motor MT2.

In addition, the drive shaft 244 and the stretch rollers 261 that rotationally drive the discharge belts 260 are coupled via a drive transmission portion 523. The drive transmission portion 523 includes the pulley 523*a* provided on the drive shaft 244, a first intermediate pulley 523*b*, a first transmission belt 523*c* looped over the pulley 523*a* and the first intermediate pulley 523*b*, a second intermediate pulley 523*d* that integrally rotates with the first intermediate pulley 523*b*, an electromagnetic clutch CL2, a pulley 523*e* drive-coupled to the electromagnetic clutch CL2 via a gear and the like, a second transmission belt 523*f* looped over the second intermediate pulley 523*d* and the pulley 523*e*, and a drive shaft 523*g* drive-coupled to the electromagnetic clutch CL2. The stretch rollers 261 are provided on the drive shaft 523*g*.

Therefore, when the conveyance motor MT2 is driven, the first transmission belt 523*c* and the second transmission belt 523*f* rotate. Further, in the case where the electromagnetic clutch CL2 is ON, the drive of the conveyance motor MT2 is transmitted to the drive shaft 523*g*, the stretch rollers 261 rotate, and the discharge belts 260 are rotationally driven. In contrast, in the case where the electromagnetic clutch CL2 is OFF, drive is not transmitted to the drive shaft 523*g* even when the conveyance motor MT2 is driven, and the discharge belts 260 do not rotate.

In addition, in the present embodiment, the drive shaft 523*g* is coupled to also a roller 321 that drives the discharged sheet rake-in belt 320. That is, the roller 321 is provided on the drive shaft 523*g*, and rotates together with the stretch rollers 261 as a result of the rotation of the drive shaft 523*g*. Therefore, when the electromagnetic clutch CL2 is ON and the conveyance motor MT2 is driven, the roller 321 rotates, and the discharged sheet rake-in belt 320 is also rotationally driven. In contrast, in the case where the electromagnetic clutch CL2 is OFF, the discharged sheet rake-in belt 320 does not rotate even when the conveyance motor MT2 is driven.

FIG. 48 illustrates the relationship between each motor and each element. The columns illustrated in FIG. 48 indicate, from the left, the number, the name of the motor, whether or not a clutch is provided between the motor and a driven part driven by the motor, the driven part, the operation, the state and operation direction of the clutch during normal rotation, the state and operation direction of the clutch during reverse rotation, and remarks. In FIG. 48, the conveyance motors MT1 and MT2, and the lifting/lowering motor MT3 are as described above. As can be seen from FIG. 48, the conveyance motor MT1 drives the rollers (conveyance rollers) 212*a* that drive the conveyance belts 212, the pre-processing rollers 211, and the returning member 280. That is, in the present embodiment, the same drive source is used for the conveyance belts 212, the pre-processing rollers 211, and the returning member 280.

In addition, the conveyance motor MT2 drives the drive shaft 244 for driving the rake-in belt 240*a*, the stretch rollers 261 that drive the discharge belts 260, and the drive shaft 523*g* for driving the discharged sheet rake-in belt 320. That is, in the present embodiment, the same drive source is used for the rake-in belt 240*a*, the discharge belts 260, and the discharged sheet rake-in belt 320. Further, the lifting/lowering motor MT3 performs lifting/lowering of the discharge rollers (nipping members) 230, changing of the nip pressure of the pre-processing rollers 211, and lifting/lowering of the rake-in portion 240 and the trailing end dropping members 250. That is, in the present embodiment, the lifting/lowering of the discharge rollers 230, the lifting/lowering of the rake-in portion 240 and the trailing end dropping members 250, and changing of the nip pressure of the pre-processing rollers 211 are performed by the same drive source.

In the present embodiment, in addition to these, a lifting/lowering motor MT4 for lifting/lowering the returning member 280, an alignment plate moving motor MT5 for moving the alignment plate 271 on the front side in the width direction, an alignment plate moving motor MT6 for moving the alignment plate 271 on the rear side in the width direction, an STP moving motor MT7 for moving the stapling unit 400 to change the stapling position, an STP clinching motor MT8 for driving the stapling unit 400 to staple the sheet bundle, and a lifting/lowering motor MT9 for lifting/lowering the stacking tray 300 are provided.

[Control Configuration of Sheet Processing Apparatus]

Figure 49:
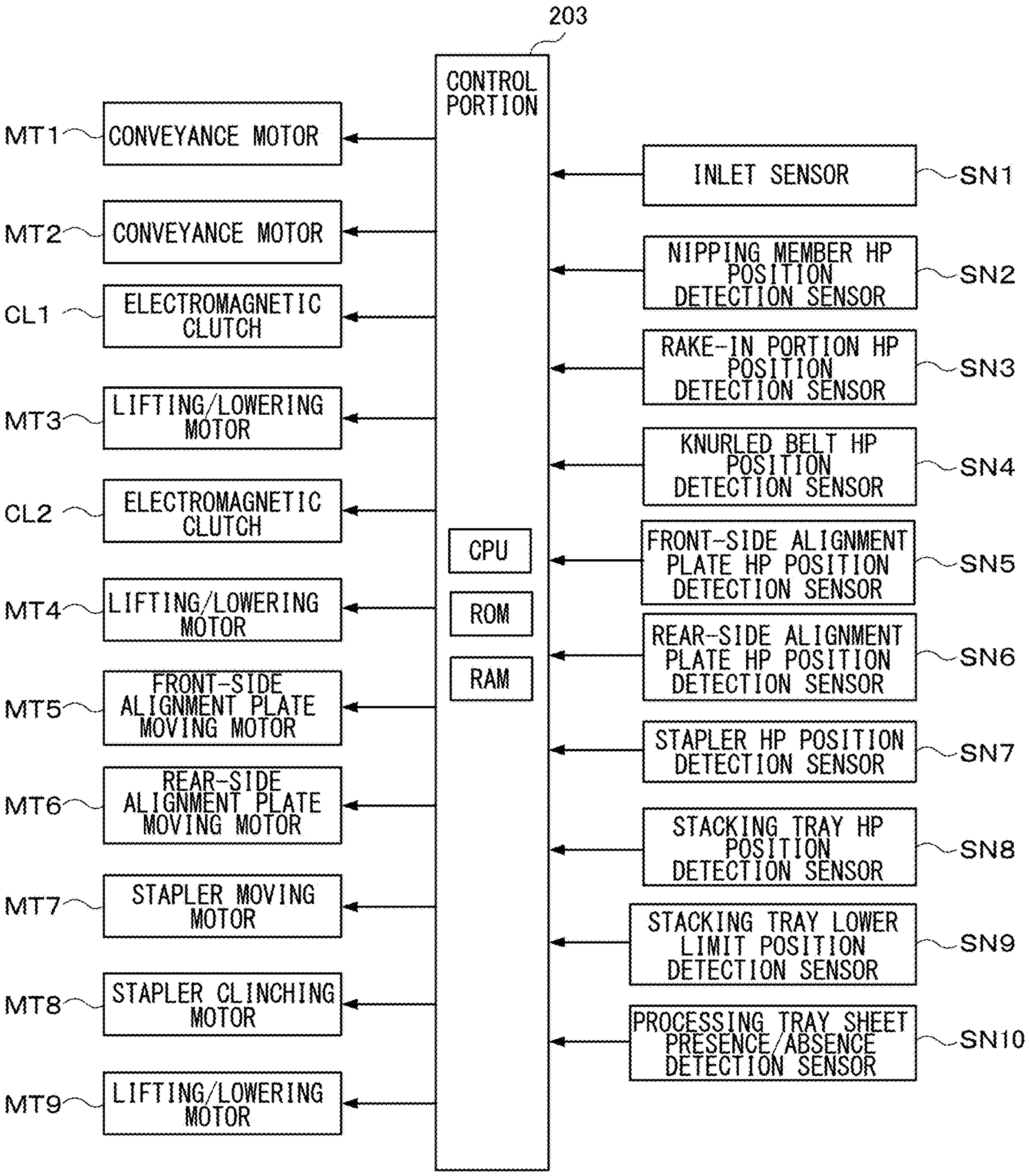
FIG. 49 is a block diagram illustrating a control configuration of the sheet processing apparatus according to the second embodiment.

The control configuration of the sheet processing apparatus 200 will be described with reference to FIG. 49 and FIG. 14 described above. FIG. 49 is a block diagram illustrating driving elements, such as motors and clutches, and sensors that the sheet processing apparatus 200 include. The signal of each of these sensors is input to a control portion 203 serving as a control means, and each driving element is controlled by the control portion 203. The control portion 203 is communicably connected to a control portion that the image forming apparatus 100 includes, and performs overall control of the sheet processing apparatus 200.

The control portion 203 configured in this manner includes a central processing unit (CPU), a read only memory (ROM), and a random access memory (RAM). The CPU performs control of each portion while reading out a program corresponding to a control procedure stored in the ROM. In addition, the RAM stores work data and input data, and the CPU performs control on the basis of the program and the like described above with reference to data stored in the RAM.

Each motor, clutch, and the like illustrated in FIG. 49 is as described above. In contrast, each sensor will be described with reference to FIG. 37B. First, an entrance sensor SN1 is provided in the conveyance path 210, and detects the leading end of the sheet conveyed to the conveyance path 210. A nipping member HP position detection sensor SN2 is provided around the pivot shaft 232 as described above, and detects that the discharge rollers (nipping members) 230 are at the retracted position (home position). A rake-in portion HP position detection sensor SN3 is provided around the pivot shaft 242, and detects that the rake-in portion 240 and the trailing end dropping members 250 are at the first position (home position). A knurled belt HP position detection sensor SN4 detects the position (home position) of the returning member 280 retracted from the processing tray 220.

A front alignment plate HP position detection sensor SN5 and a rear alignment plate HP position detection sensor SN6 respectively detect that the alignment plate 271 on the front side and the alignment plate 271 on the rear side are at positions (home position) separated from the sheet placed on the processing tray 220 in the width direction. A stapler HP position detection sensor SN7 detects that the stapling unit 400 is at the home position. A stacking tray HP position detection sensor SN8 detects the home position of the stacking tray 300. A stacking tray lower limit position detection sensor SN9 detects a lower limit position of the stacking tray 300. A processing tray sheet presence/absence detection sensor SN10 detects presence or absence of the sheet on the processing tray 220. The control portion 203 performs each control that will be described later, on the basis of the signal of each of these sensors.

Next, the flow of control of each mode of the present embodiment will be described with reference to FIG. 14 described above. In the present embodiment, a straight discharge mode in which the sheet delivered to the sheet processing apparatus 200 is discharged onto the stacking tray 300 as it is without being subjected to the predetermined process, a shift mode in which the sheet delivered to the sheet processing apparatus 200 is moved in the width direction (shifting operation) and discharged onto the stacking tray 300, and a stapling mode in which the sheet delivered to the sheet processing apparatus 200 is subjected to stapling as the predetermined process and discharged onto the stacking tray 300 are provided. Each of these modes is selected by the user.

In addition, in the shift mode, there are a case where the shifting operation is performed on a sheet of a large size whose length in the conveyance direction of the sheet (predetermined direction) is larger than a predetermined length, and a case where the shifting operation is performed on a sheet of a small size whose length in the predetermined direction is equal to or less than the predetermined length. The predetermined length is, for example, a size of a so-called A4 longitudinal in which a paper sheet of the A4 size is fed in the longitudinal direction (direction in which the longitudinal direction is the conveyance direction). In addition, in the shift mode, a productivity-prioritized mode in which productivity is prioritized, and an alignment-prioritized mode in which alignment of the sheet is prioritized are executable.

The productivity-prioritized mode serving as a first mode (first shift discharge process) is a mode in which the alignment of the sheet in the width direction is performed by the alignment portion 270 in the state of hanging down from the conveyance path 210 toward the processing tray. The alignment-prioritized mode serving as a second mode (second shift discharge process) is a mode in which the alignment of the sheet in the width direction is performed by the alignment portion 270 on a sheet not to be subjected to the stapling process by the stapling unit 400 in the state of being placed on the processing tray 220.

When the control is started, the control portion 203 determines which of the straight discharge mode, the shift mode, and the stapling mode is selected for the discharge mode (S1). In the case where the straight discharge mode is selected, sheets delivered to the sheet processing apparatus 200 are discharged as they are onto the stacking tray 300 one by one without performing the predetermined process (S2).

In S1, in the case where the shift mode is selected, whether the sheet size is a large size or a small size is determined (S3). In the case of the small size, whether or not the productivity is prioritized is determined (S4). In the case where the productivity is prioritized, the sheet discharged from the conveyance path 210 is discharged onto the stacking tray 300 by performing the shifting operation in a state in which part of the sheet remains in the conveyance path 210 without performing the shifting operation on the processing tray 220 (S5). In the case where the productivity is not prioritized in S4, the sheet discharged from the conveyance path 210 is raked onto the processing tray 220, is subjected to the shifting operation on the processing tray 220, and is discharged onto the stacking tray 300 (S6). Also in the case of the large size in S3, proceeding to S6 occurs.

In the case where the stapling mode is selected in S1, the sheet discharged from the conveyance path 210 is raked in and aligned on the processing tray 220, and thus a sheet bundle is formed on the processing tray 220 (S7). Then, the stapling process is performed on the sheet bundle (S8). Then, the sheet bundle subjected to the stapling process is discharged onto the stacking tray 300 (S9).

The operation of the sheet processing apparatus 200 in each mode described above will be described with reference to FIGS. 50A to 74B.

[Straight Discharge Mode]

Figure 50A:
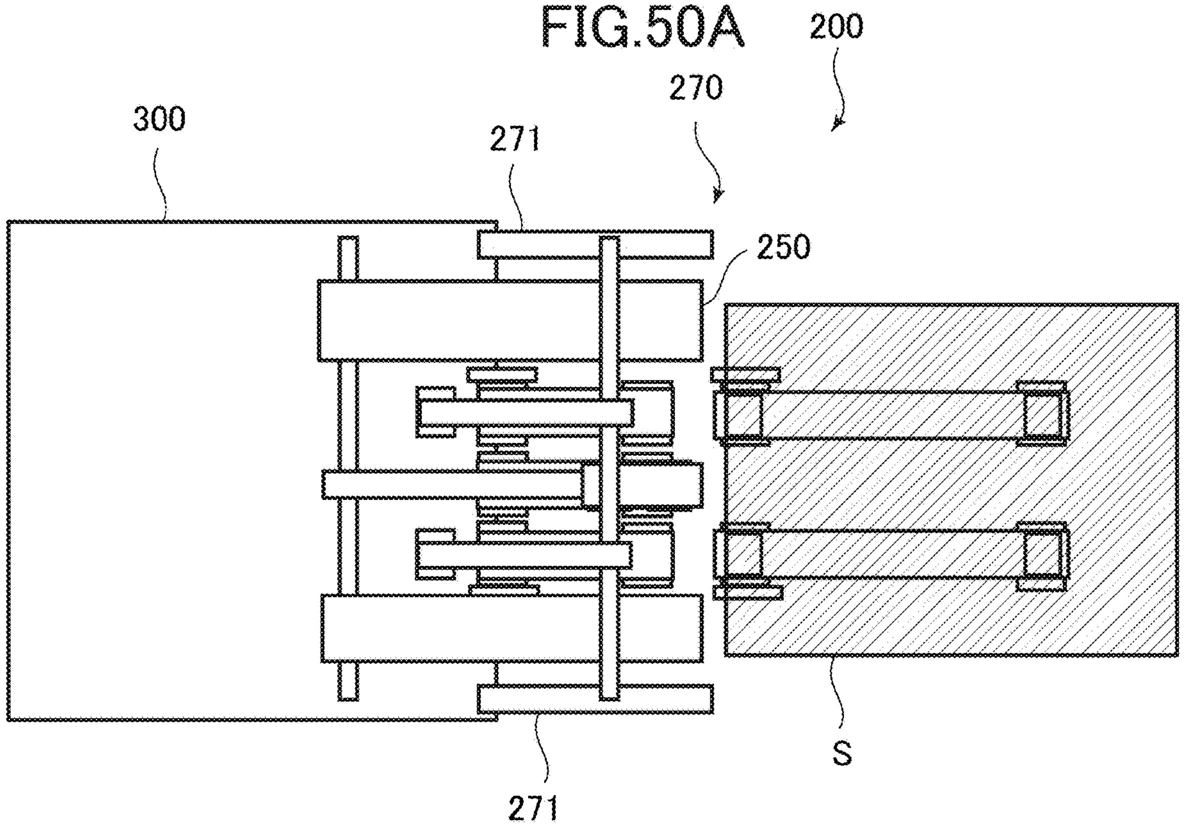
FIG. 50A is a schematic view of the sheet processing apparatus as viewed from above illustrating a state in which the leading end of the sheet has reached the pre-processing rollers in a straight discharge mode according to the second embodiment.
Figure 50B:
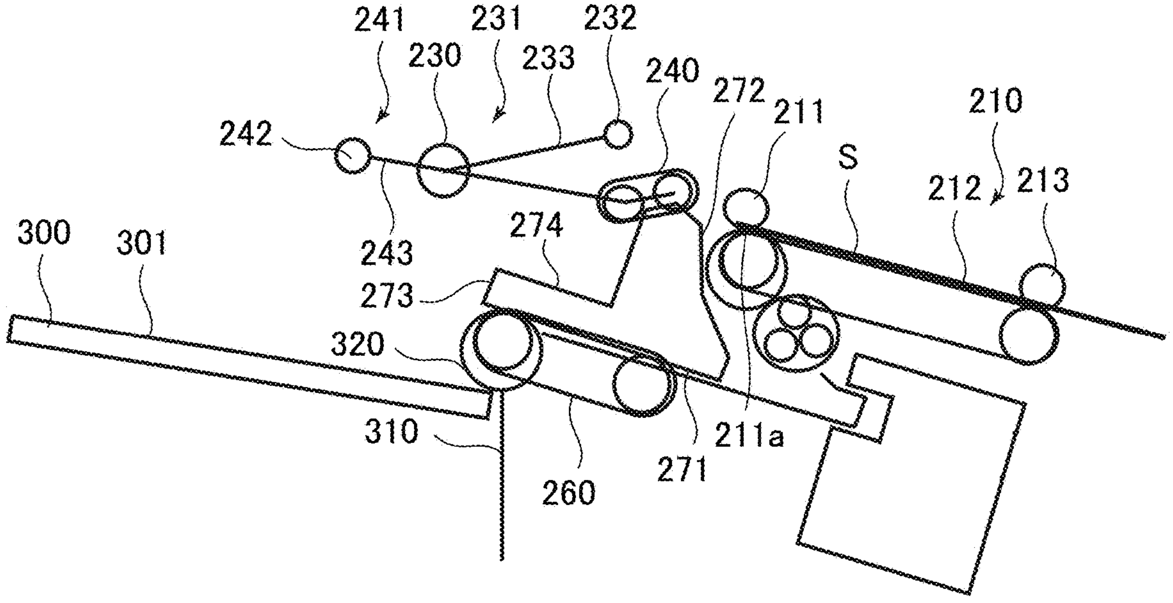
FIG. 50B is a schematic view of the sheet processing apparatus as viewed from the side illustrating the state in which the leading end of the sheet has reached the pre-processing rollers in the straight discharge mode according to the second embodiment.
Figure 51A:
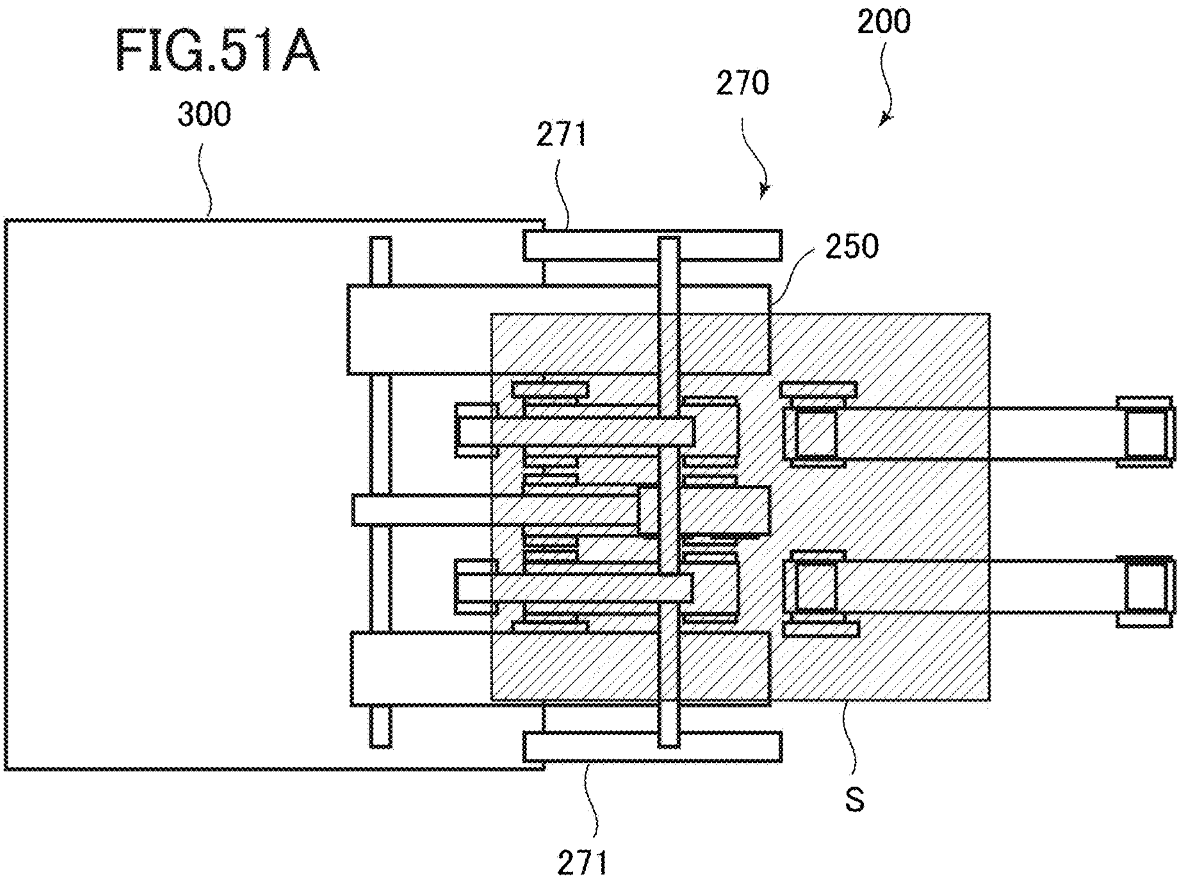
FIG. 51A is a schematic view of the sheet processing apparatus as viewed from above illustrating a state after the leading end of the sheet has passed the pre-processing rollers in the straight discharge mode according to the second embodiment.
Figure 51B:
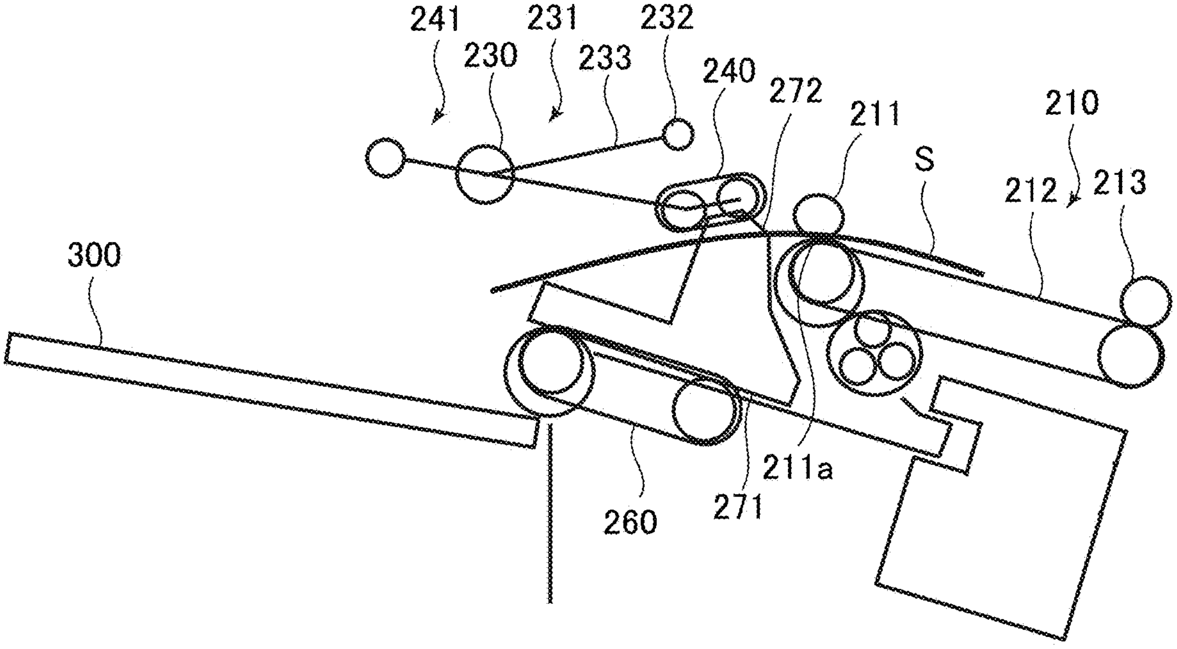
FIG. 51B is a schematic view of the sheet processing apparatus as viewed from the side illustrating the state after the leading end of the sheet has passed the pre-processing roller in the straight discharge mode according to the second embodiment.

The straight discharge mode will be described with reference to FIGS. 50A to 53B. As illustrated in FIGS. 50A and B, in a state in which the sheet S is conveyed to the conveyance path 210, the discharge rollers 230 are positioned at the retracted position, and the rake-in portion 240 and the trailing end dropping members 250 are positioned at the first position, respectively. Next, as illustrated in FIGS. 51A and B, the sheet S is discharged from the pre-processing nip portion 211*a* between the pre-processing rollers 211 and the conveyance belts 212 positioned at a downstream end of the conveyance path 210 in the predetermined direction. Also in this state, the discharge rollers 230 are positioned at the retracted position, and the rake-in portion 240 and the trailing end dropping members 250 are positioned at the first position, respectively.

Figure 52A:
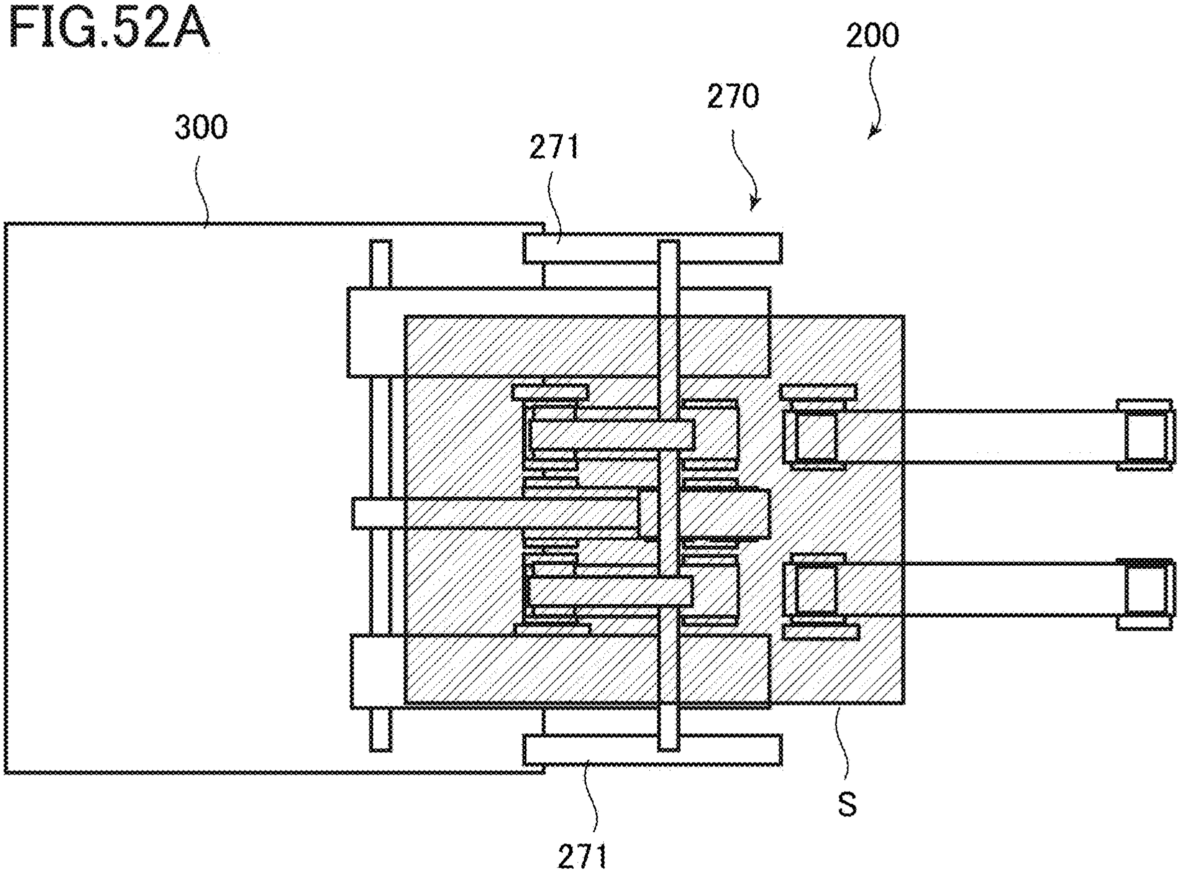
FIG. 52A is a schematic view of the sheet processing apparatus as viewed from above illustrating a state in which the sheet is nipped between the discharge rollers and discharge belts in the straight discharge mode according to the second embodiment.
Figure 52B:
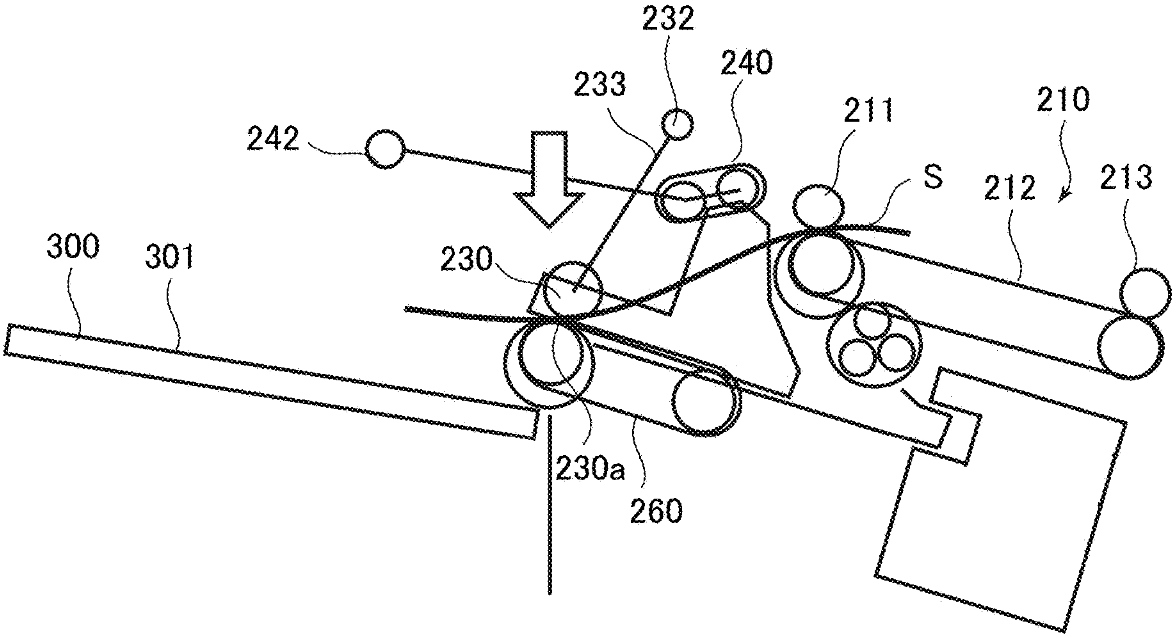
FIG. 52B is a schematic view of the sheet processing apparatus as viewed from the side illustrating the state in which the sheet is nipped between the discharge rollers and the discharge belts in the straight discharge mode according to the second embodiment.
Figure 53A:
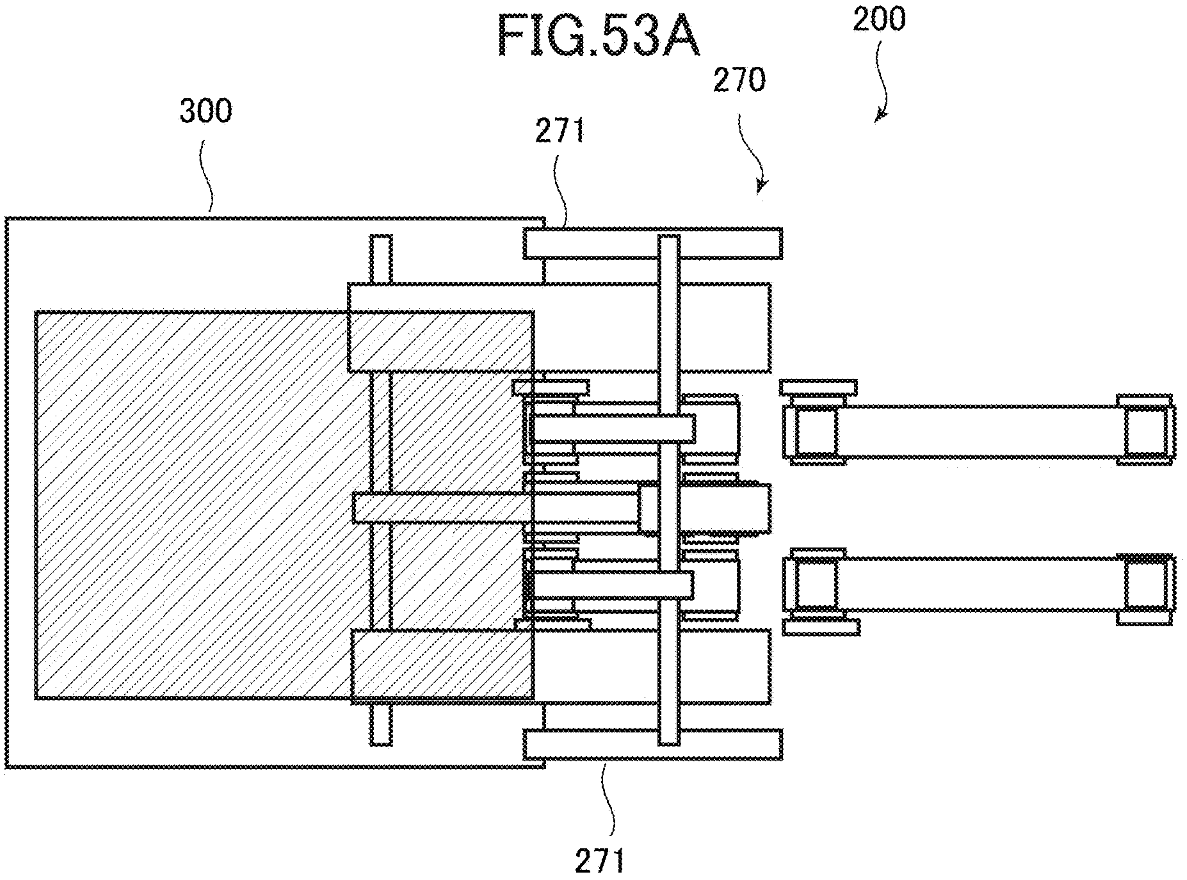
FIG. 53A is a schematic view of the sheet processing apparatus as viewed from above illustrating a state in which the sheet has been discharged onto a stacking tray in the straight discharge mode according to the second embodiment.
Figure 53B:
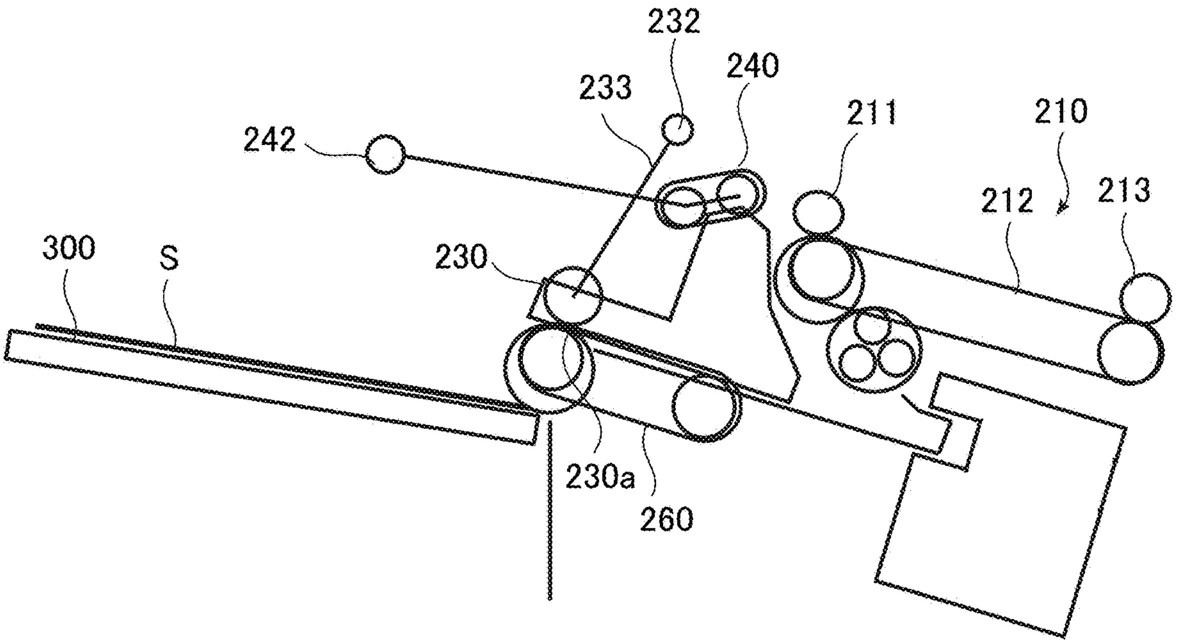
FIG. 53B is a schematic view of the sheet processing apparatus as viewed from the side illustrating the state in which the sheet has been discharged onto the stacking tray in the straight discharge mode according to the second embodiment.

When the sheet S is conveyed by a predetermined amount from the pre-processing nip portion 211*a*, as illustrated in FIGS. 52A and B, the discharge rollers 230 move down to the contact position, and the sheet S is nipped between the discharge rollers 230 and the discharge belts 260. At this time, the trailing end of the sheet S has not passed the pre-processing nip portion 211*a*. Therefore, the sheet S is nipped in the discharge nip portion 230*a* between the discharge rollers 230 and the discharge belts 260 and the pre-processing nip portion 211*a*. To be noted, as described above, when the discharge rollers 230 move down to the contact position, the nip pressure of the pre-processing rollers 211 becomes approximately 0. Therefore, the sheet S is mainly nipped and conveyed by the discharge rollers 230 and the discharge belts 260, and as illustrated in FIGS. 53A and B, directly discharged onto the stacking tray 300 without being placed on the processing tray 220.

[Shift Mode (Productivity-Prioritized)]

Figure 54A:
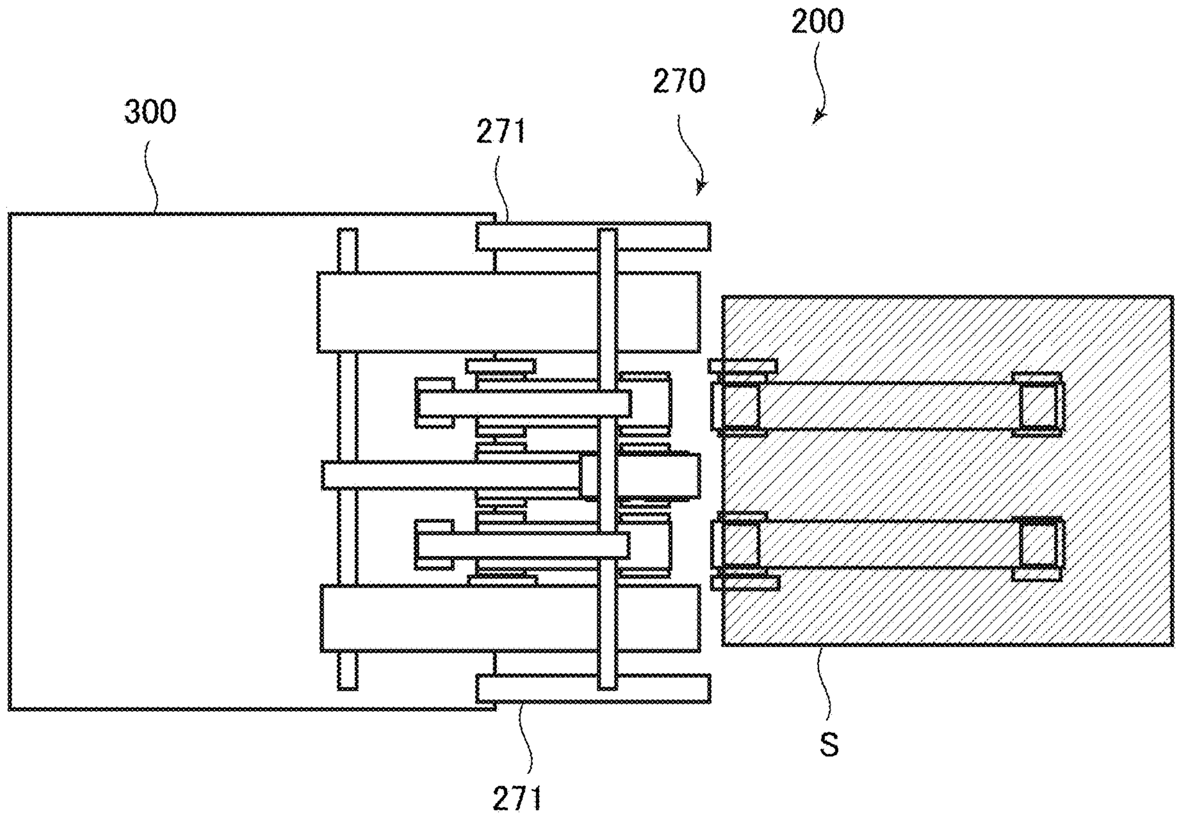
FIG. 54A is a schematic view of the sheet processing apparatus as viewed from above illustrating a state in which the leading end of the sheet has reached the pre-processing rollers in a shift mode (productivity-prioritized) according to the second embodiment.
Figure 54B:
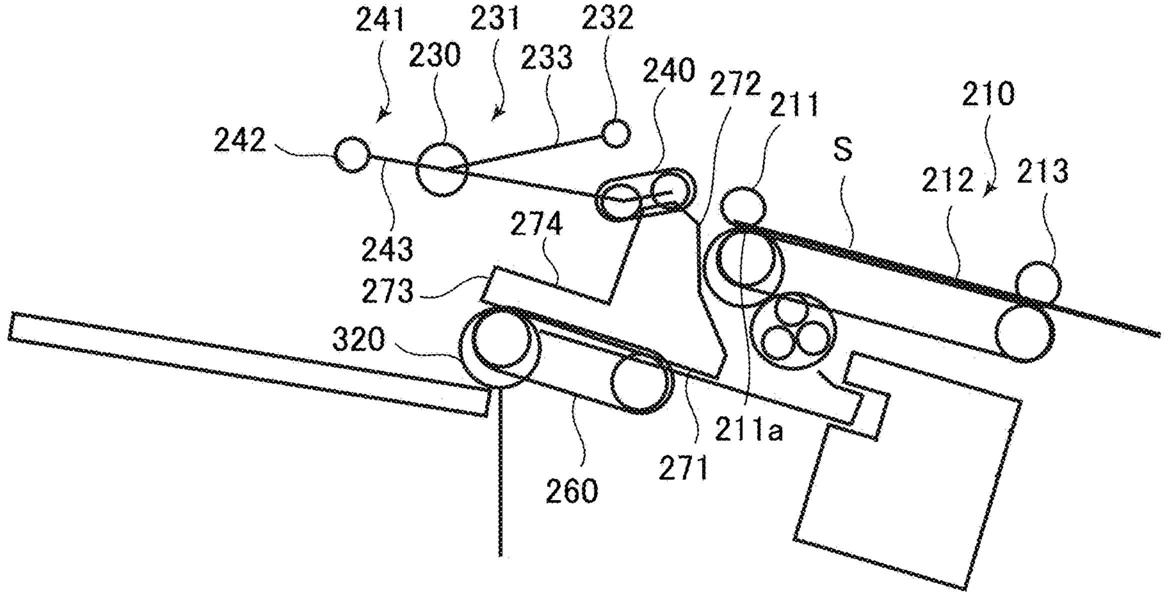
FIG. 54B is a schematic view of the sheet processing apparatus as viewed from the side illustrating the state in which the leading end of the sheet has reached the pre-processing rollers in the shift mode (productivity-prioritized) according to the second embodiment.
Figure 55A:
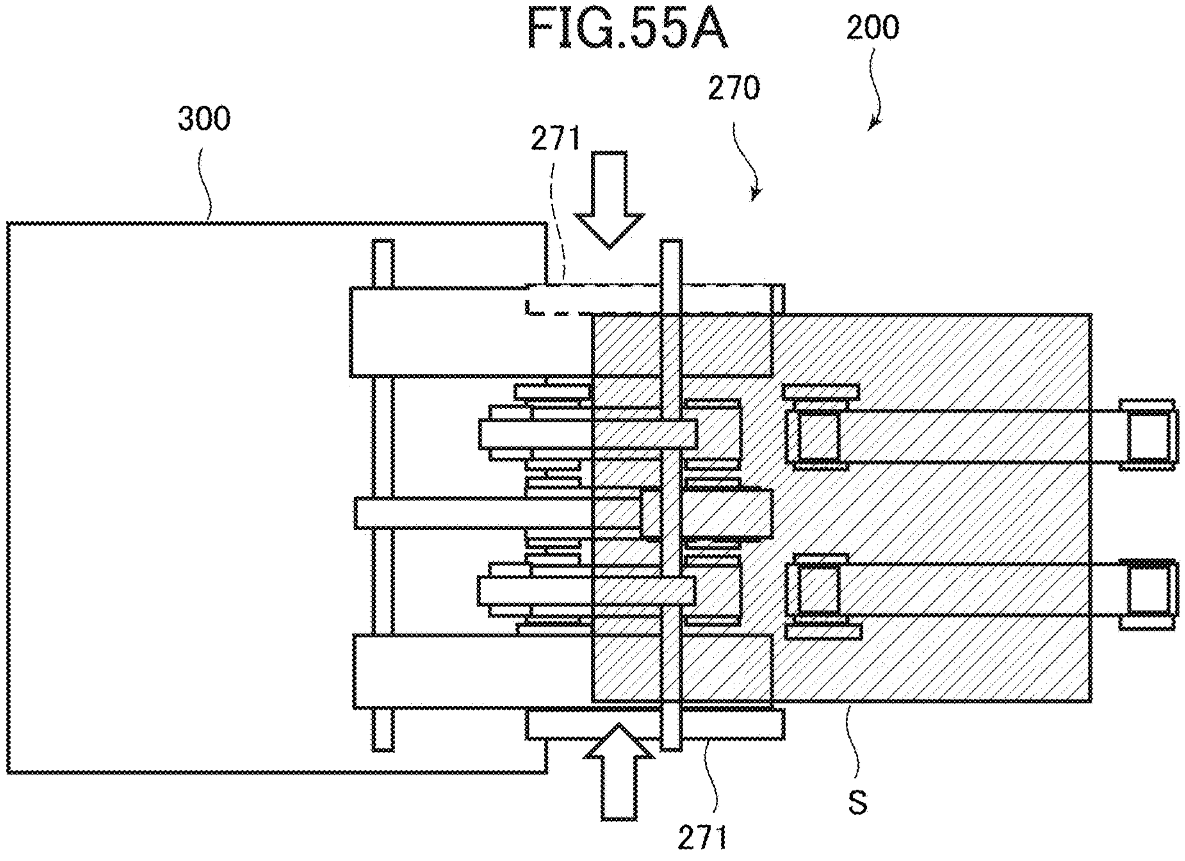
FIG. 55A is a schematic view of the sheet processing apparatus as viewed from above illustrating a state after the leading end of the sheet has passed the pre-processing rollers in the shift mode (productivity-prioritized) according to the second embodiment.
Figure 55B:
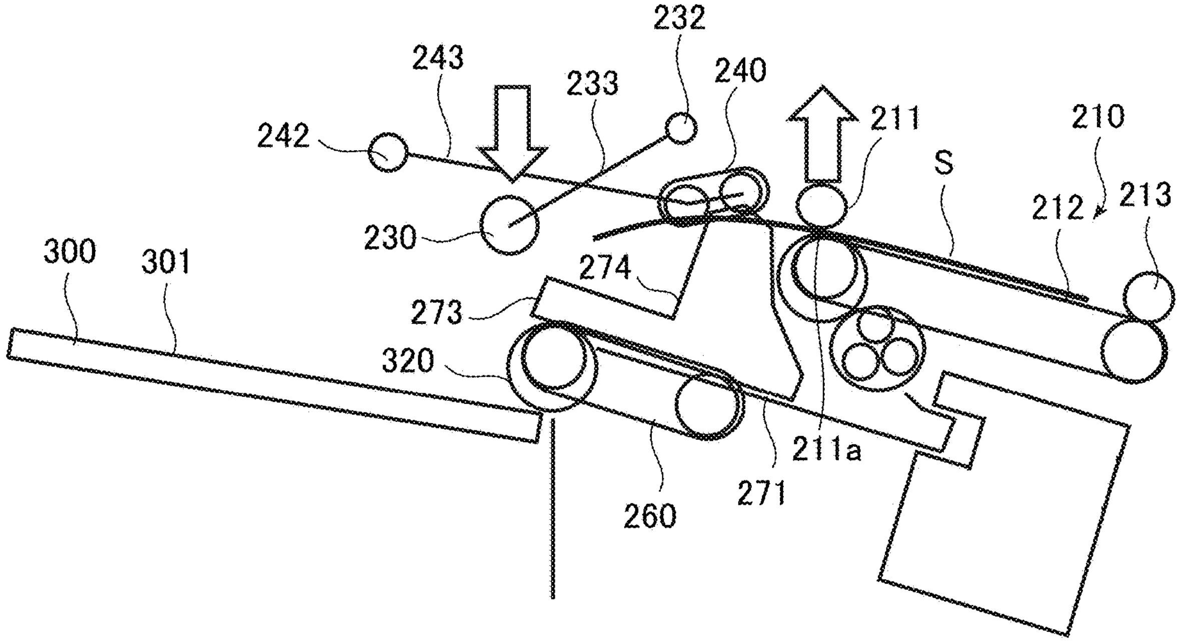
FIG. 55B is a schematic view of the sheet processing apparatus as viewed from the side illustrating the state after the leading end of the sheet has passed the pre-processing rollers in the shift mode (productivity-prioritized) according to the second embodiment.

The productivity-prioritized mode (switchbackless shift discharge process) in the shift mode will be described with reference to FIGS. 54A to 58B. As illustrated in FIGS. 54A and B, in a state in which the sheet S is conveyed to the conveyance path 210, the discharge rollers 230 are positioned at the retracted position, and the rake-in portion 240 and the trailing end dropping members 250 are positioned at the first position, respectively. Next, as illustrated in FIGS. 55A and B, the nip pressure of the pre-processing rollers 211 is changed from a first pressure (first nip pressure) to a second pressure (second nip pressure) after the downstream end (leading end) of the sheet S in the sheet conveyance direction has passed the pre-processing nip portion 211*a* between the pre-processing rollers 211 and the conveyance belts 212 and the upstream end (trailing end) of the sheet S in the sheet conveyance direction has passed the nip portion between the upstream rollers 213 serving as third rotary members and the conveyance belts 212. That is, the nip pressure is changed to approximately 0. To be noted, the change start timing from the first pressure to the second pressure may be before the upstream end in the sheet conveyance direction passes the nip portion between the upstream rollers 213 and the conveyance belts 212, and the change to the second pressure may be completed after the upstream end in the sheet conveyance direction has passed the nip portion between the upstream rollers 213 and the conveyance belts 212.

In the present embodiment, after the trailing end of the sheet S has passed the entrance sensor SN1 on the conveyance path 210, the discharge rollers 230 start moving down and move toward the guide position. As a result of this, the nip pressure of the pre-processing rollers 211 becomes approximately 0. In addition, after the trailing end of the sheet S has passed the entrance sensor SN1 on the conveyance path 210, the front and rear alignment plates 271 respectively start moving toward the edges of the sheet S in the width direction. In this state, the sheet S is hanging down toward the processing tray 220 from the conveyance path 210, and the edges in the width direction of this hanging-down portion abut the first abutment portions 272 of the alignment plates 271, and thus the alignment in the width direction is performed. At this time, since the nip pressure of the pre-processing rollers 211 is approximately 0, the alignment of the sheet is smoothly performed by the alignment plates 271. That is, when the alignment portion 270 performs alignment of the sheet hanging down from the conveyance path 210 in the width direction, the nip pressure of the pre-processing rollers 211 is adjusted to approximately 0.

Figure 56A:
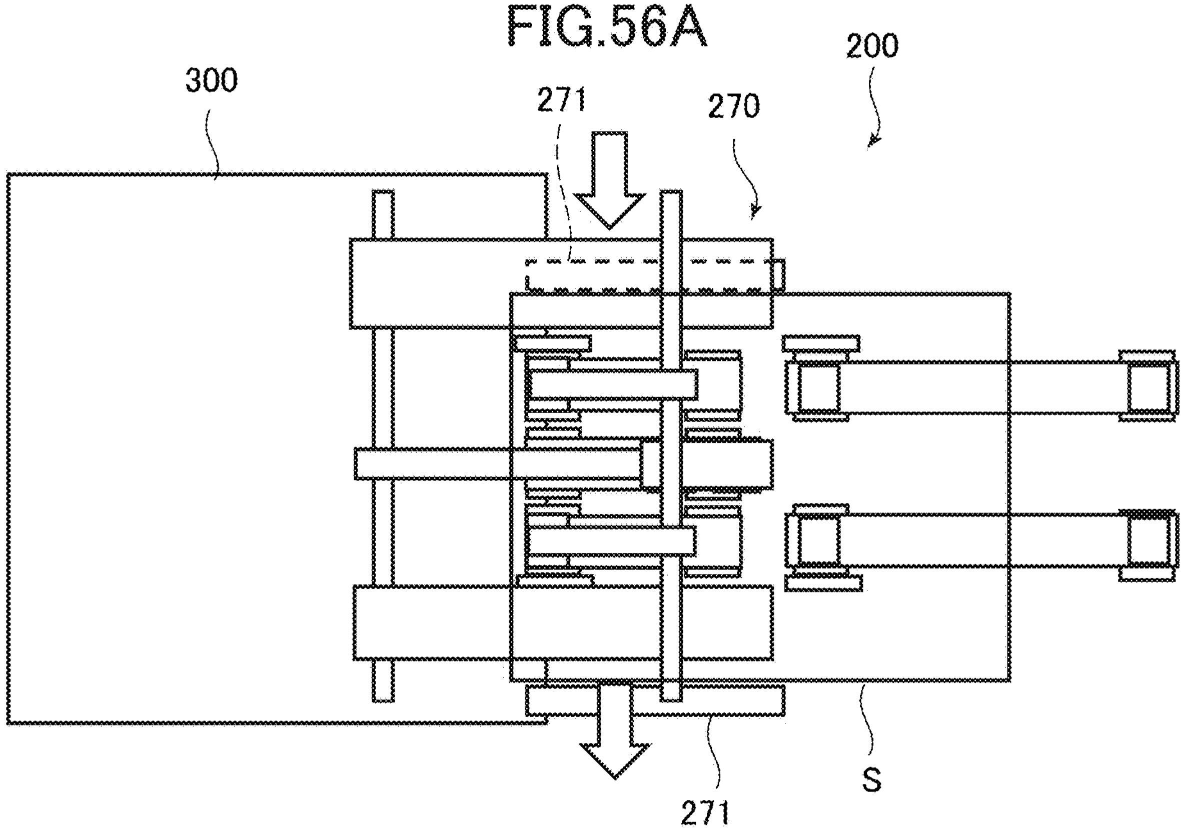
FIG. 56A is a schematic view of the sheet processing apparatus as viewed from above illustrating a state in which the sheet is shifted in the shift mode (productivity-prioritized) according to the second embodiment.
Figure 56B:
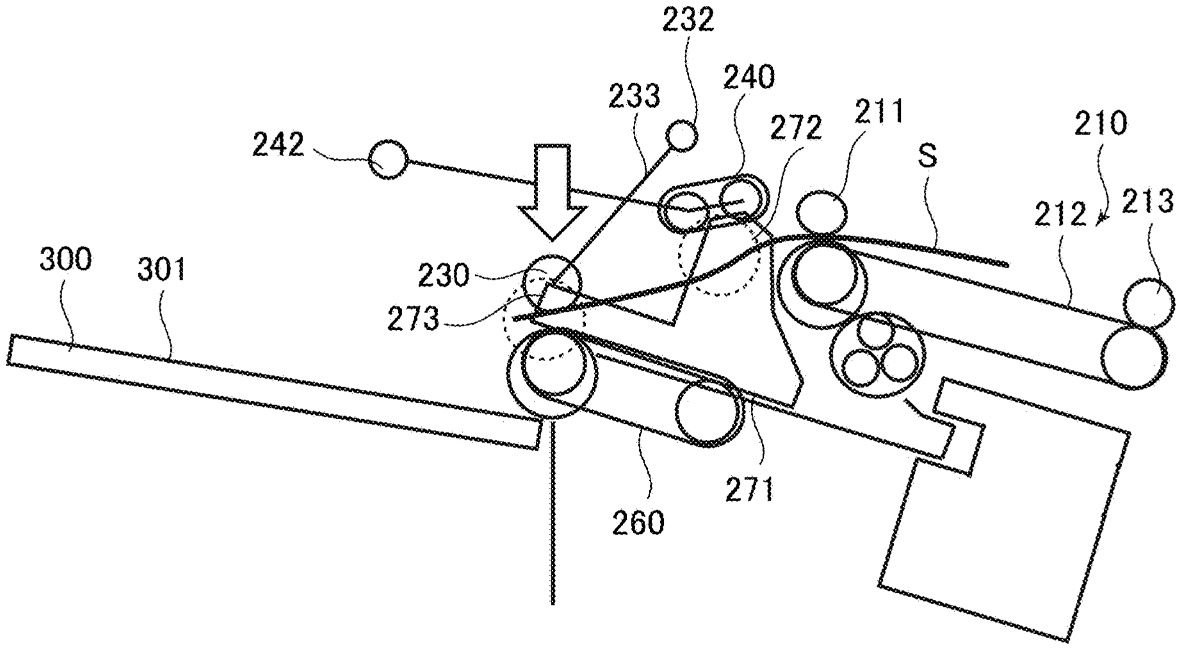
FIG. 56B is a schematic view of the sheet processing apparatus as viewed from the side illustrating the state in which the sheet is shifted in the shift mode (productivity-prioritized) according to the second embodiment.

Next, when the sheet S is further conveyed, as illustrated in FIGS. 56A and B, the leading end of the sheet S is guided downward by the discharge arm 233 of the discharge rollers 230 moved to the guide position (in the middle of movement). Then, at a timing when the leading end of the sheet S passes the downstream end of the discharge belts 260 in the predetermined direction, the upper surface of the sheet S is pressed by the discharge rollers 230. To be noted, the conveyance of the sheet S at this time is performed by the conveyance belts 212 because the nip pressure of the pre-processing rollers 211 is approximately 0. Since the sheet S is on the conveyance belts 212 by its own weight, and a certain contact area is secured between the sheet S and the conveyance belts 212, the sheet S can be conveyed downstream in the predetermined direction by the conveyance belts 212.

As illustrated in FIGS. 56A and B, by pressing down the leading end side of the sheet S in the width direction by the discharge rollers 230, the edges in the width direction of the leading end side of the sheet S oppose the second abutment portions 273 of the alignment plates 271. In addition, the trailing end of the sheet S has not passed the pre-processing nip portion 211*a*. In the productivity-prioritized mode, in this state, the first abutment portions 272 and the second abutment portions 273 of the pair of alignment plates 271 are caused to abut the edges of the sheet in the width direction, and the sheet S is shifted in a desired direction. That is, in the productivity-prioritized mode of the present embodiment, the first abutment portions 272 and the second abutment portions 273 that are two abutment portions of the pair of alignment plates 271 separated in the predetermined direction are caused to abut the edges in the width direction of the sheet S in a state in which the sheet S is hanging down from the conveyance path 210 without placing the sheet S on the processing tray 220. At this time, the first abutment portions 272 abut a portion of a sheet S hanging down from the conveyance path 210 and warped, and the second abutment portions 273 abut the leading end side of the sheet S. Then, the sheet S is shifted in the width direction (shift direction) by moving the pair of alignment plates 271 in a desired direction.

Figure 57A:
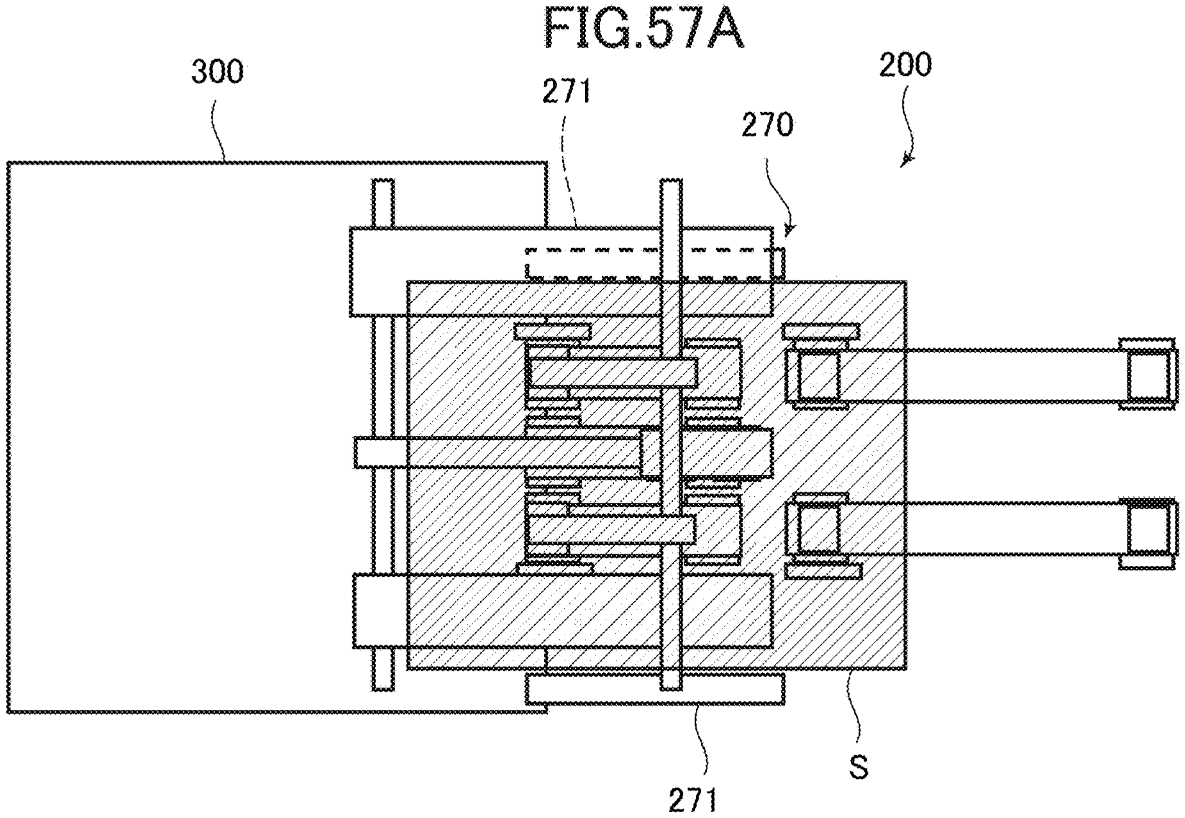
FIG. 57A is a schematic view of the sheet processing apparatus as viewed from above illustrating a state in which the shift of the sheet is completed in the shift mode (productivity-prioritized) according to the second embodiment.
Figure 57B:
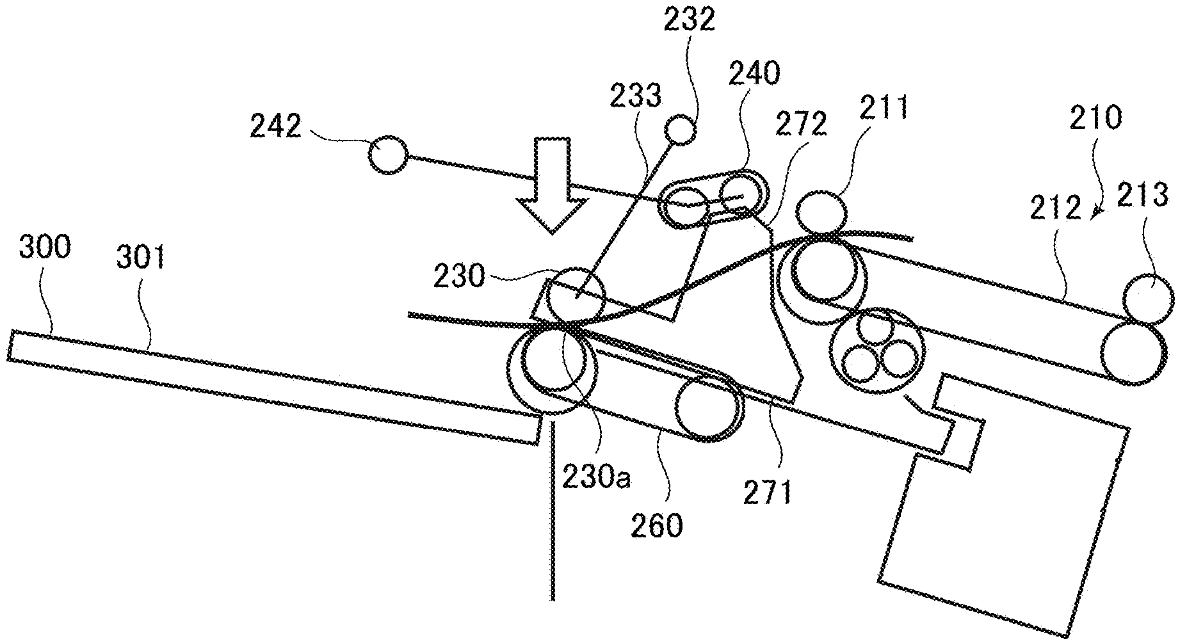
FIG. 57B is a schematic view of the sheet processing apparatus as viewed from the side illustrating the state in which the shift of the sheet is completed in the shift mode (productivity-prioritized) according to the second embodiment.
Figure 58A:
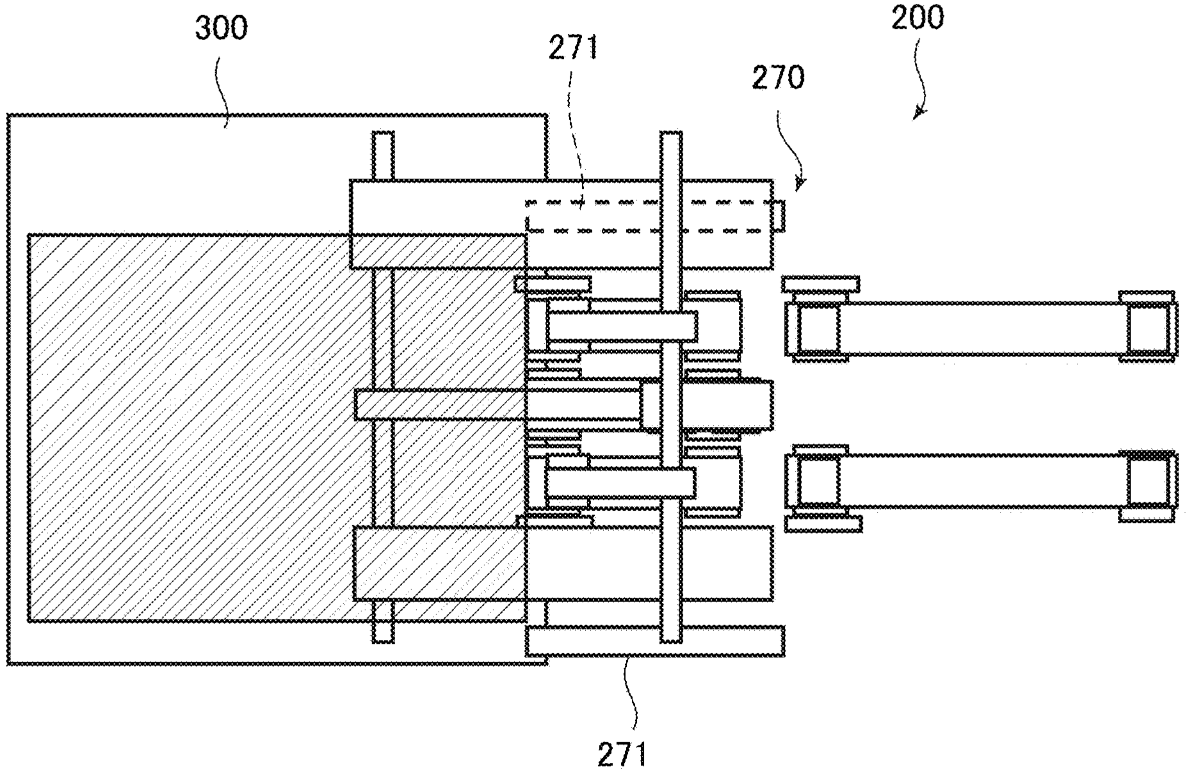
FIG. 58A is a schematic view of the sheet processing apparatus as viewed from above illustrating a state in which the sheet has been discharged onto the stacking tray in the shift mode (productivity-prioritized) according to the second embodiment.
Figure 58B:
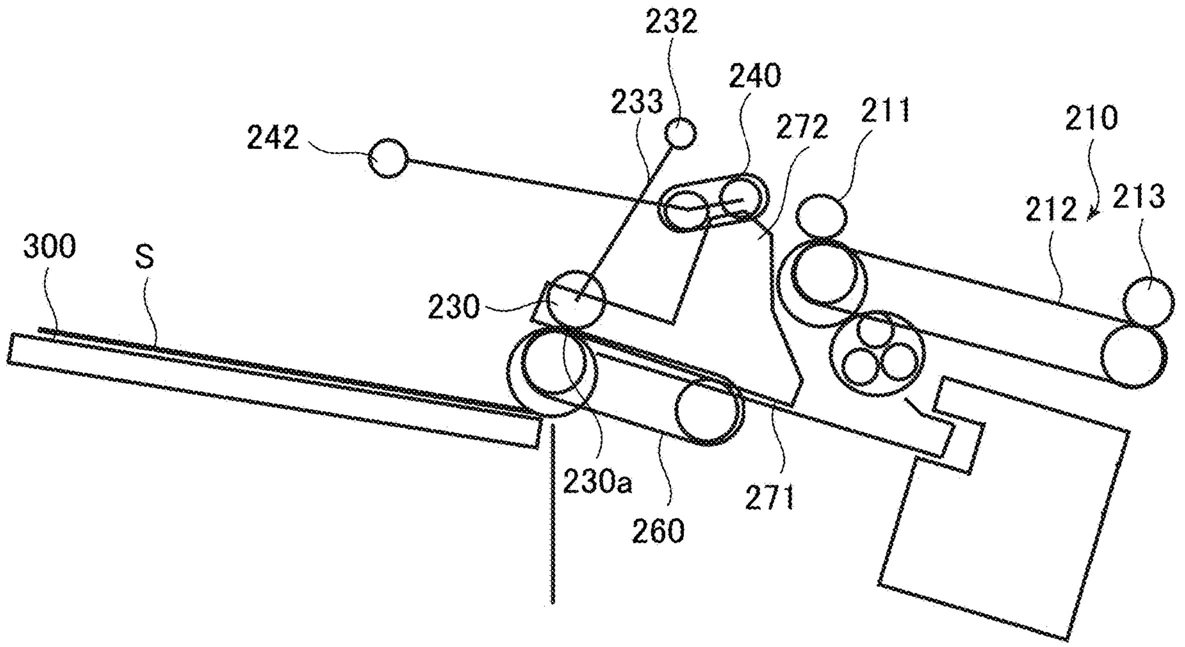
FIG. 58B is a schematic view of the sheet processing apparatus as viewed from the side illustrating the state in which the sheet has been discharged onto the stacking tray in the shift mode (productivity-prioritized) according to the second embodiment.

When the movement of the sheet S in the width direction (shifting operation) is completed, as illustrated in FIGS. 57A and B, the discharge rollers 230 are moved down from the guide position to the contact position, and the sheet S is nipped between the discharge rollers 230 and the discharge belts 260. Then, the sheet S is mainly conveyed by the discharge rollers 230 and the discharge belts 260, and the sheet S is discharged onto the stacking tray 300 as illustrated in FIGS. 58A and B. At this time, the sheet S discharged onto the stacking tray 300 is raked in by the discharged sheet rake-in belts 320, and further the trailing end of the sheet S is pressed.

In the case of the productivity-prioritized mode configured as described above, since there is no operation of placing the sheet S on the processing tray 220, the shifting operation of the sheet S can be performed more quickly than in the case of on the processing tray 220. In addition, during the shifting operation, since the alignment plates 271 are caused to abut in a state in which the sheet S is hanging down and warped, the alignment and shifting operation of the sheet can be performed in a state in which the stiffness of the sheet S is higher, and the alignment and shifting operation can be performed in a state in which warpage is not likely to occur in the sheet.

In addition, in the present embodiment, by moving the discharge rollers 230 to the guide position, the leading end side of the sheet S is pressed down so as to be able to abut the second abutment portions 273 of the alignment plates 271 more reliably. As a result of the alignment plates 271 abutting the two edges in the width direction of the sheet S separated in the predetermined direction, the shifting operation of the sheet S can be performed in a more stable state. That is, the sheet can be moved in the width direction while suppressing the skew of the sheet during the shifting operation.

To be noted, the productivity-prioritized mode is preferably applicable to a sheet of a small size, but may be executed on a sheet of a large size. In addition, for example, in the case where the length of the sheet in the predetermined direction is small, the shifting operation may be performed by causing only the first abutment portions 272 to abut the edges of the sheet in the width direction.

In addition, in the example described above, in the first shift discharge process, the shifting operation is performed in a state in which the nip pressure of the pre-processing rollers 211 is set to a second nip pressure lower than the first nip pressure. To be noted, the shifting operation may be performed in a state in which the pre-processing rollers 211 are separated from the conveyance belts 212. For example, the configuration for moving the pre-processing rollers 211 by the lifting/lowering motor MT3 may be caused to function as a conveyance rotary member moving member that moves the pre-processing rollers 211 and the conveyance belts 212 to a separated position where the pre-processing rollers 211 and the conveyance belts 212 are separated from each other from the nipping position where the sheet is nipped between the pre-processing rollers 211 and the conveyance belts 212. Further, the shifting operation may be performed in a state in which the pre-processing rollers 211 are at the separated position.

[Shift Mode (Alignment-Prioritized)]

Figure 59A:
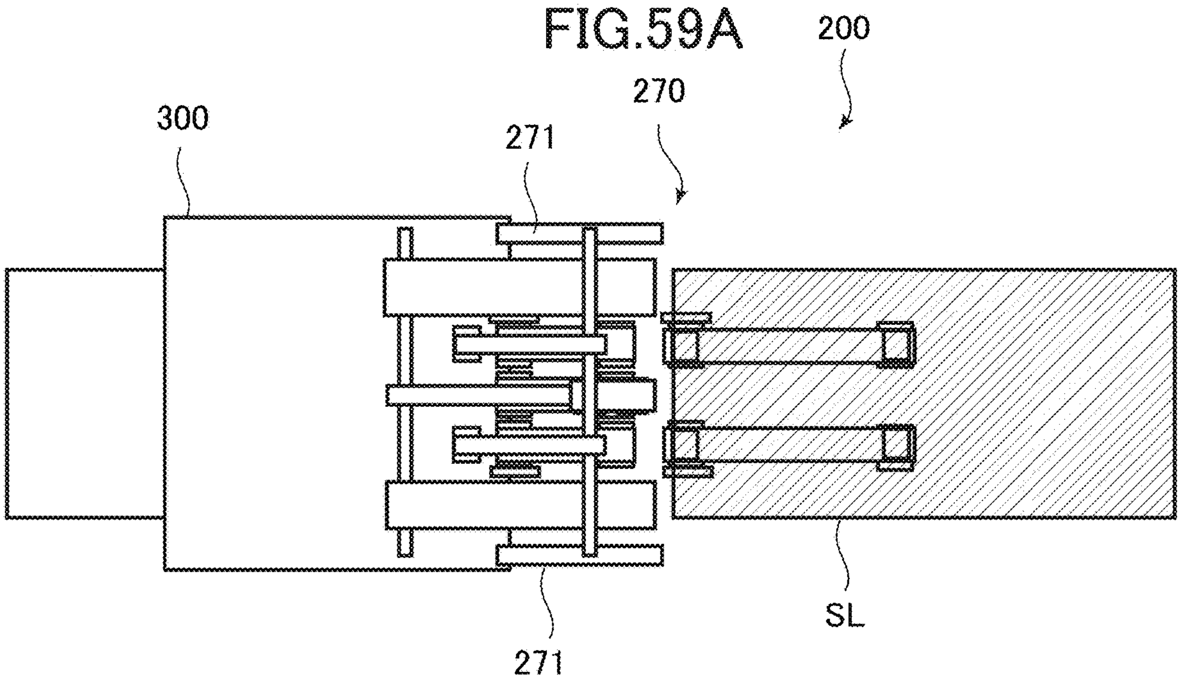
FIG. 59A is a schematic view of the sheet processing apparatus as viewed from above illustrating a state in which the leading end of the sheet has reached the pre-processing rollers in a shift mode (alignment-prioritized) for a large sheet according to the second embodiment.
Figure 59B:
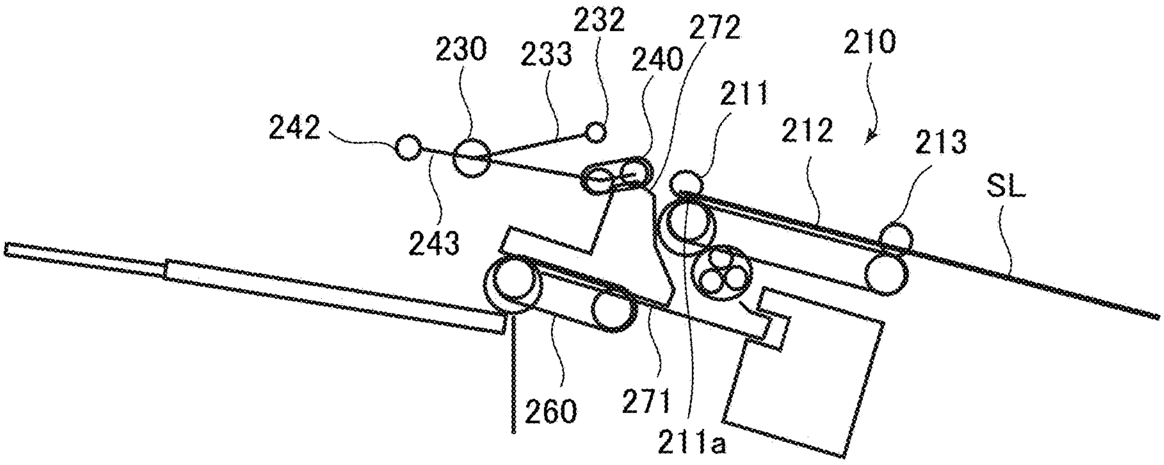
FIG. 59B is a schematic view of the sheet processing apparatus as viewed from the side illustrating the state in which the leading end of the sheet has reached the pre-processing rollers in the shift mode (alignment-prioritized) for a large sheet according to the second embodiment.

The alignment-prioritized mode (switchback shift discharge process) in the shift mode will be described with reference to FIGS. 59A to 65B. To be noted, although the alignment-prioritized mode may be performed on a sheet of a small size, a case of performing the alignment-prioritized mode is performed on a sheet of a large size will be described herein. As illustrated in FIGS. 59A and B, in a state in which a sheet SL is conveyed to the conveyance path 210, the discharge rollers 230 are positioned at the retracted position, and the rake-in portion 240 and the trailing end dropping members 250 are positioned at the first position, respectively.

Figure 60A:
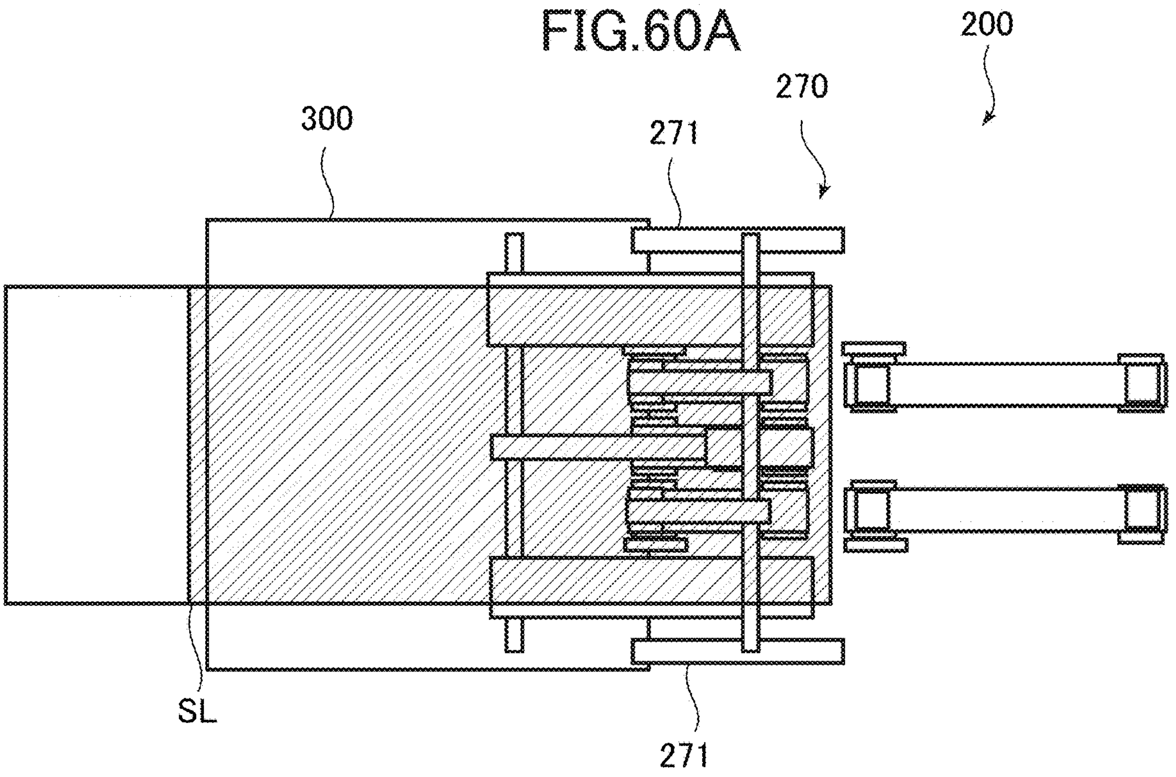
FIG. 60A is a schematic view of the sheet processing apparatus as viewed from above illustrating a state after the trailing end of the sheet has passed the pre-processing rollers in the shift mode (alignment-prioritized) for a large sheet according to the second embodiment.
Figure 60B:
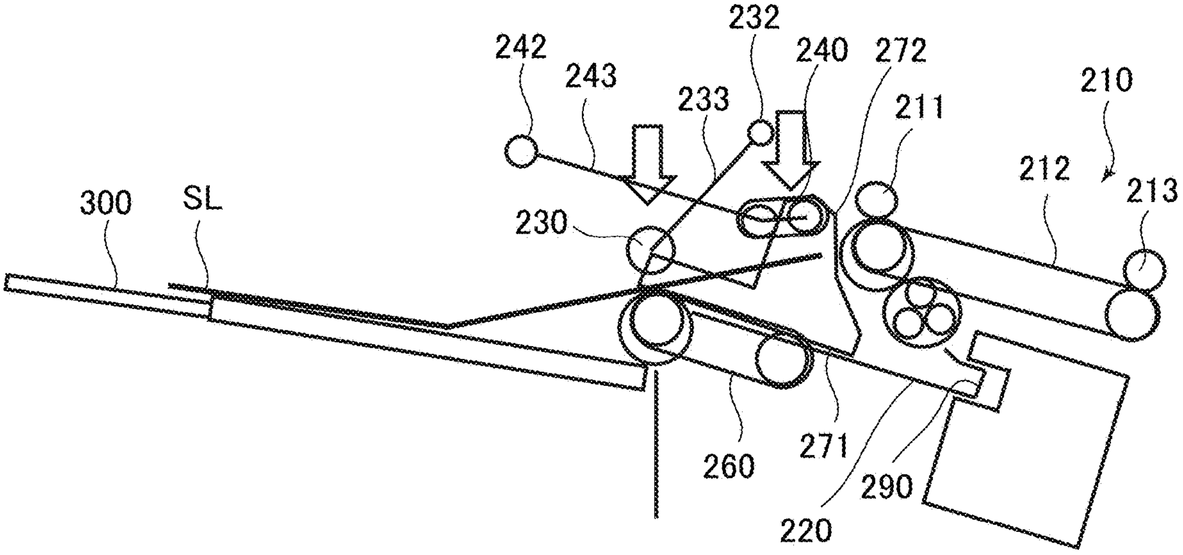
FIG. 60B is a schematic view of the sheet processing apparatus as viewed from the side illustrating the state after the trailing end of the sheet has passed the pre-processing rollers in the shift mode (alignment-prioritized) for a large sheet according to the second embodiment.

As illustrated in FIGS. 60A and B, when the trailing end of the sheet SL passes the pre-processing nip portions 211*a*, the discharge rollers 230, the rake-in portion 240, and the trailing end dropping members 250 start moving down. To be noted, the descent start timing of the discharge rollers 230, the rake-in portion 240, and the trailing end dropping members 250 may be before the trailing end of the sheet SL passes the pre-processing nip portion 211*a*. In either case, it suffices as long as the timing is such that the trailing end of the sheet SL passes the pre-processing nip portion 211*a* when dropping the trailing end of the sheet SL toward the processing tray 220 by the rake-in portion 240 and the trailing end dropping members 250.

Figure 61A:
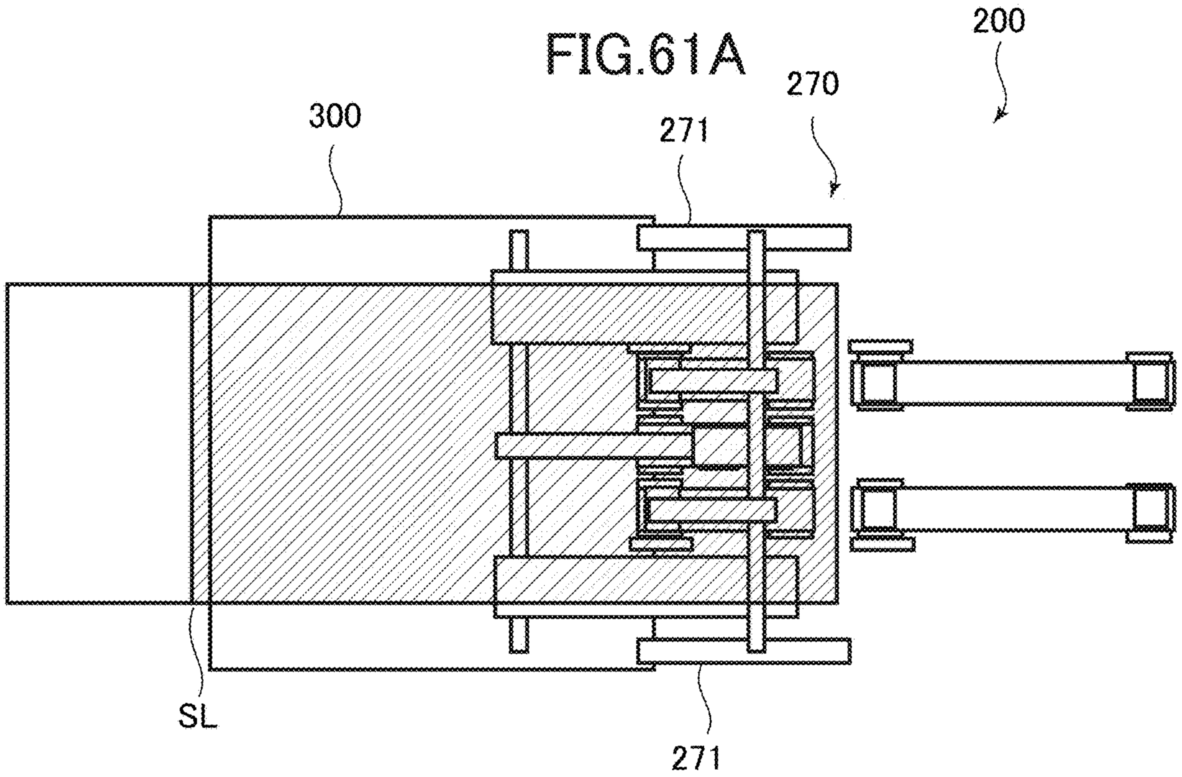
FIG. 61A is a schematic view of the sheet processing apparatus as viewed from above illustrating a state in which the sheet is nipped between the rake-in belts, the discharge rollers, and the discharge belts in the shift mode (alignment-prioritized) for a large sheet according to the second embodiment.
Figure 61B:
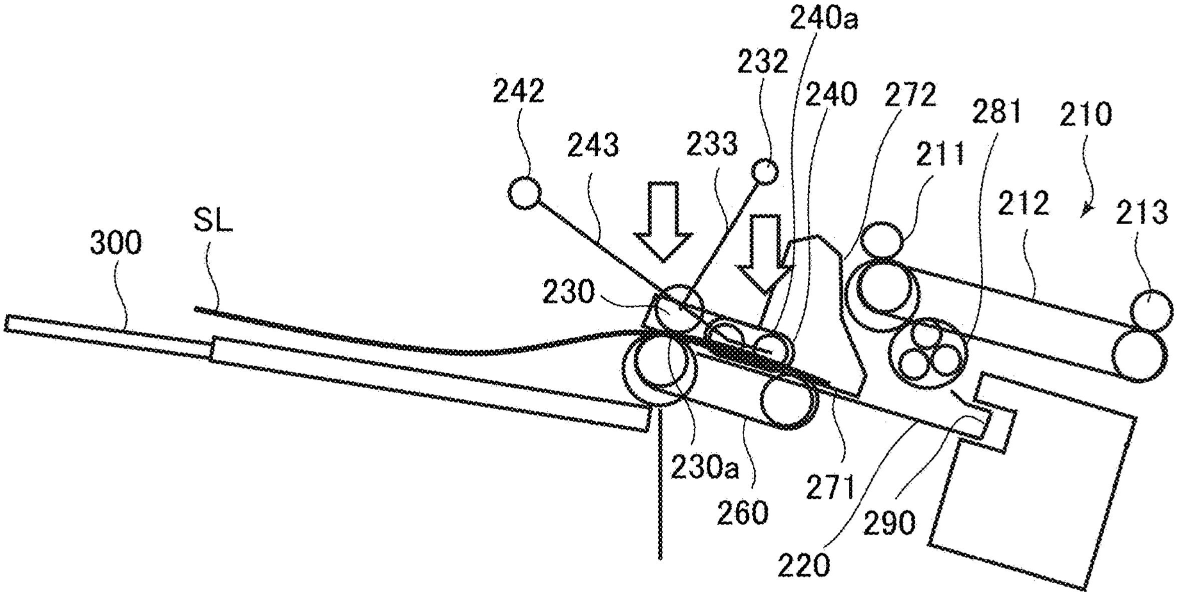
FIG. 61B is a schematic view of the sheet processing apparatus as viewed from the side illustrating the state in which the sheet is nipped between the rake-in belts, the discharge rollers, and the discharge belts in the shift mode (alignment-prioritized) for a large sheet according to the second embodiment.

As illustrated in FIGS. 61A and B, the discharge rollers 230 move down to the contact position, and the rake-in portion 240 and the trailing end dropping members 250 move down to the second position. As a result of this, the sheet SL discharged from the conveyance path 210 is nipped between the discharge rollers 230 and the discharge belts 260, and is placed on the processing tray 220 by dropping the trailing end thereof toward the processing tray 220 by the rake-in portion 240 and the trailing end dropping members 250. At this time, the sheet SL is nipped also between the rake-in belt 240*a* of the rake-in portion 240 and the discharge belt 260.

Figure 62A:
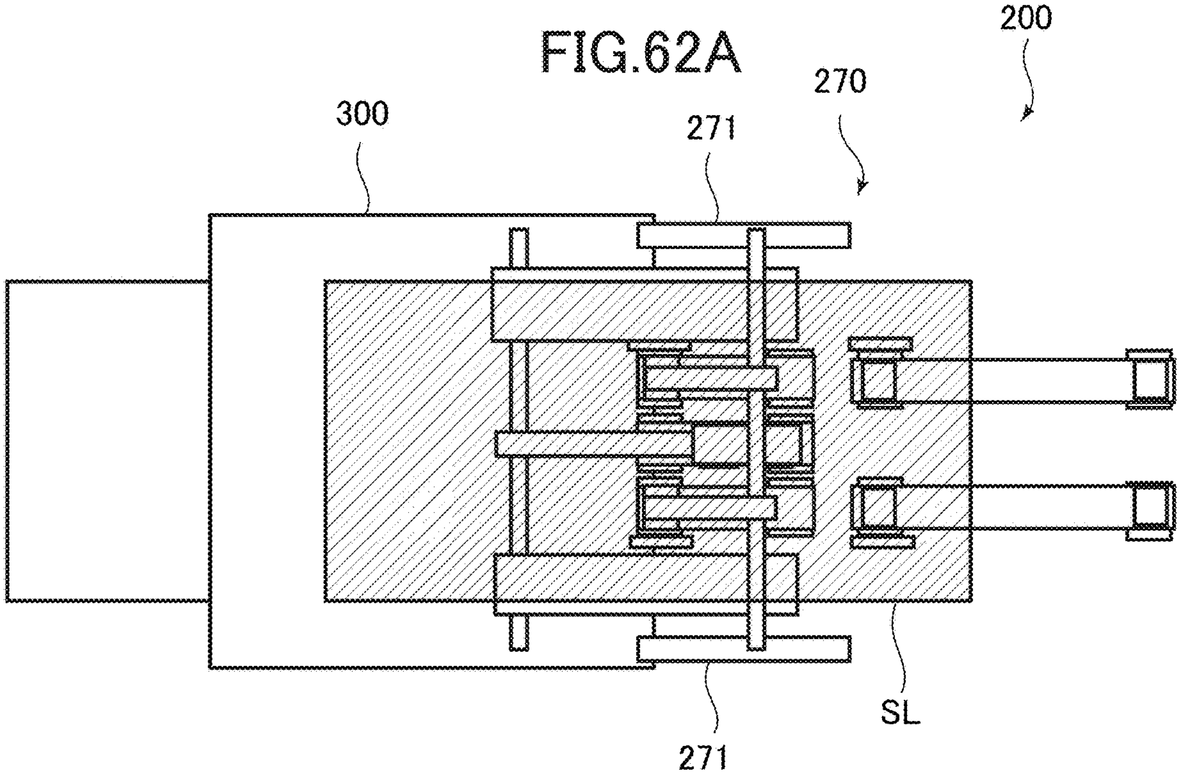
FIG. 62A is a schematic view of the sheet processing apparatus as viewed from above illustrating a state in which the sheet is caused to abut a trailing end regulating member in the shift mode (alignment-prioritized) for a large sheet according to the second embodiment.
Figure 62B:
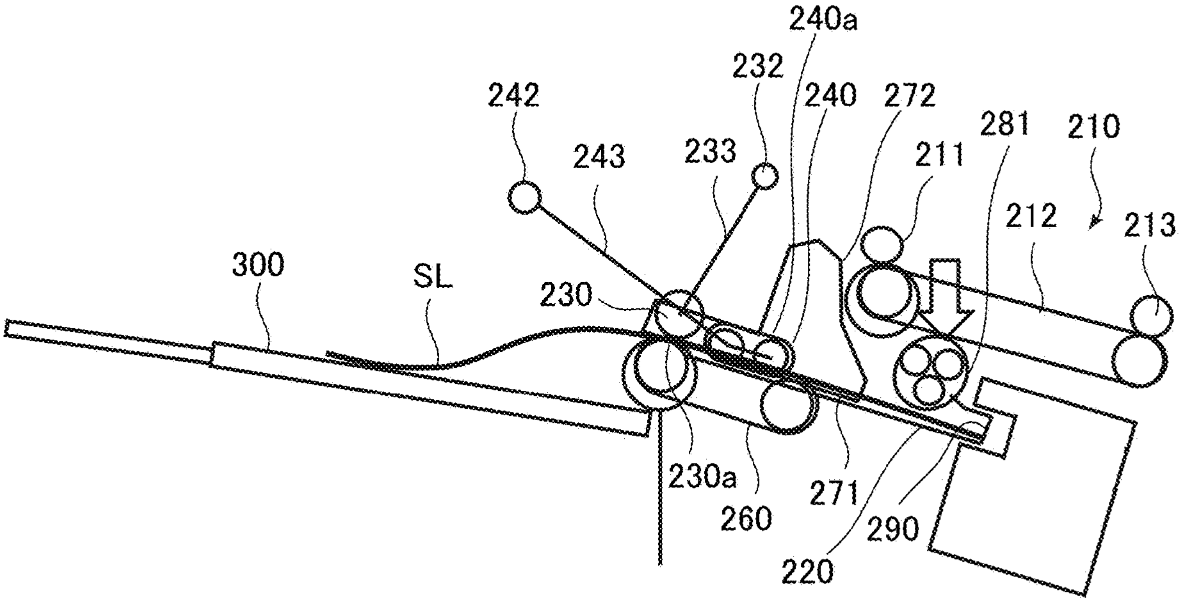
FIG. 62B is a schematic view of the sheet processing apparatus as viewed from the side illustrating the state in which the sheet is caused to abut the trailing end regulating member in the shift mode (alignment-prioritized) for a large sheet according to the second embodiment.

Next, as illustrated in FIGS. 62A and B, the rake-in belt 240*a* and the discharge belt 260 are each rotated in a reverse direction, and thus the sheet SL placed on the processing tray 220 is conveyed toward the trailing end regulating member 290. At this time, the returning member 280 moves down, and the knurled belt 281 of the returning member 280 abuts the upper surface of the trailing end side of the sheet SL. Then, by rotating the knurled belt 281, the sheet SL is further conveyed, and the trailing end of the sheet SL is caused to abut the trailing end regulating member 290. As a result of this, the sheet SL is aligned in the predetermined direction.

Figure 63A:
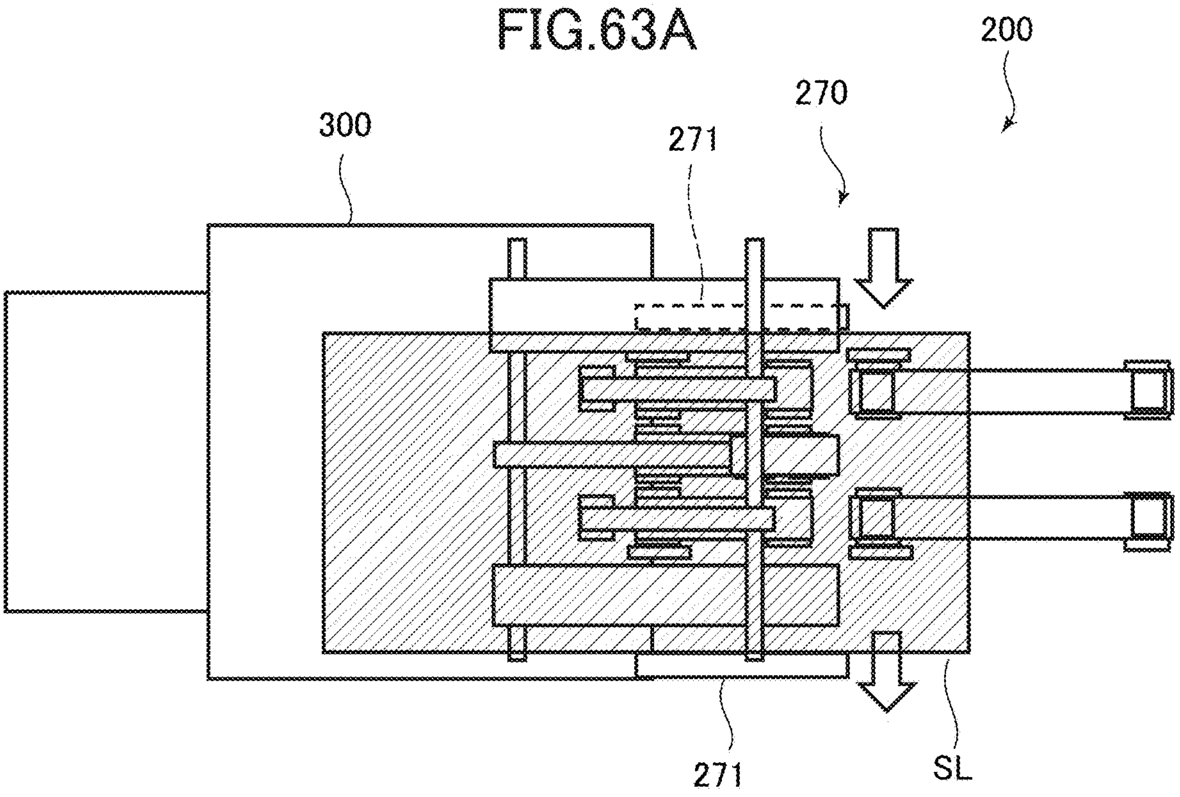
FIG. 63A is a schematic view of the sheet processing apparatus as viewed from above illustrating a state in which the sheet is shifted in the shift mode (alignment-prioritized) for a large sheet according to the second embodiment.
Figure 63B:
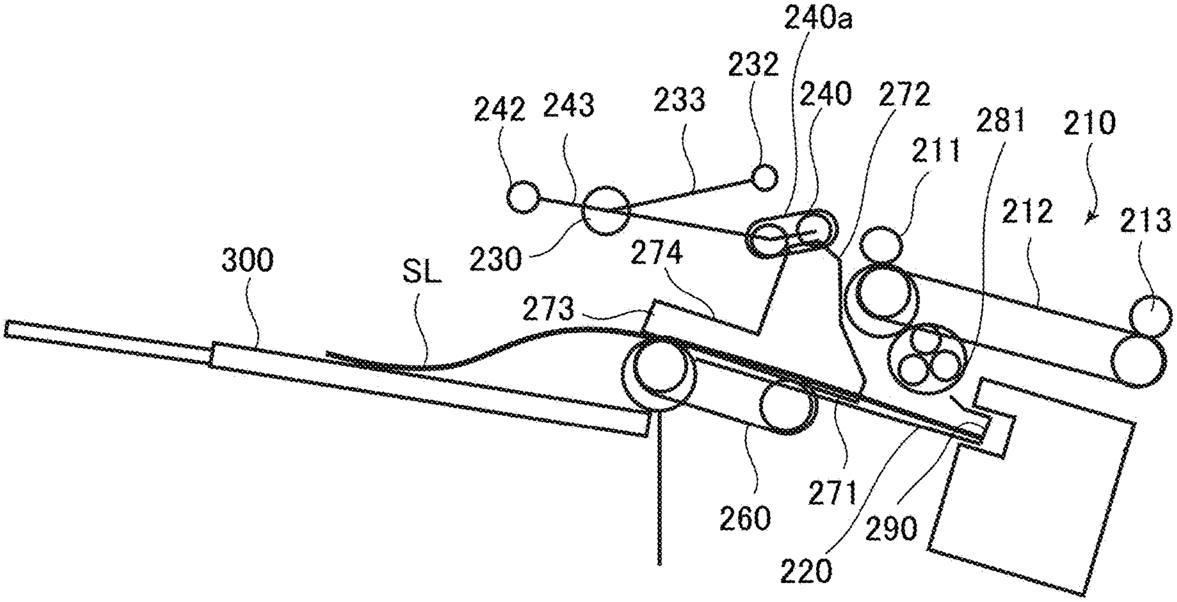
FIG. 63B is a schematic view of the sheet processing apparatus as viewed from the side illustrating the state in which the sheet is shifted in the shift mode (alignment-prioritized) for a large sheet according to the second embodiment.

Next, as illustrated in FIGS. 63A and B, the returning member 280 is moved up while the discharge rollers 230 are moved up to the retracted position, and the rake-in portion 240 and the trailing end dropping members 250 are moved up to the first position, respectively, and thus these members are retracted from the upper surface of the sheet SL. In this state, the alignment and shifting operation of the sheet SL in the width direction is performed by moving the front and rear alignment plates 271 in the width direction (shift direction). At this time, since the sheet SL is placed on the processing tray 220, the sheet SL abuts the second abutment portions 273 of the alignment plates 271. The second abutment portions 273 are disposed to extend from a lower portion of the first abutment portions 272 to a position downstream of the first abutment portions 272 in the predetermined direction, and abut the edges of the sheet SL in the width direction in a relatively wide region in the predetermined direction. In addition, the second abutment portions 273 abut the edges of the sheet SL in the width direction in a state in which the leading end of the sheet SL placed on the processing tray 220 is projecting more on the stacking tray 300 side than the downstream end of the processing tray 220 in the predetermined direction.

Figure 64A:
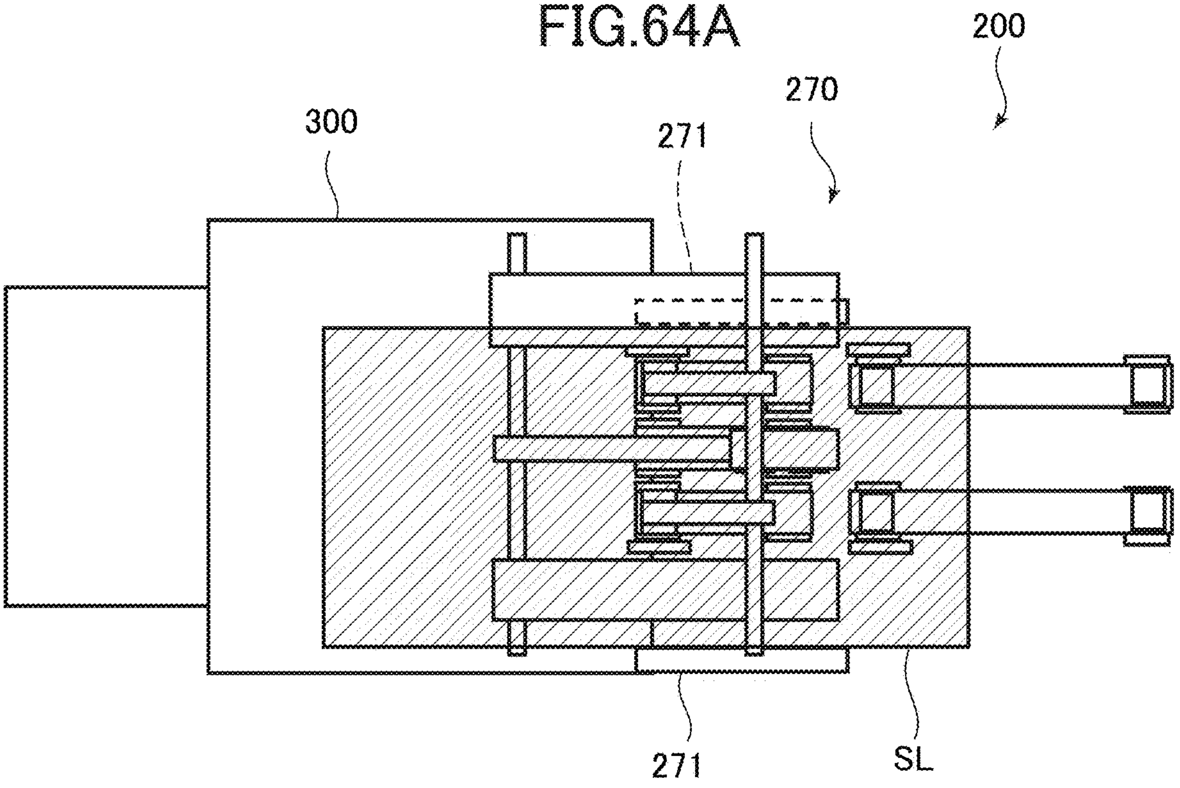
FIG. 64A is a schematic view of the sheet processing apparatus as viewed from above illustrating a state in which the shift of the sheet is completed in the shift mode (alignment-prioritized) for a large sheet according to the second embodiment.
Figure 64B:
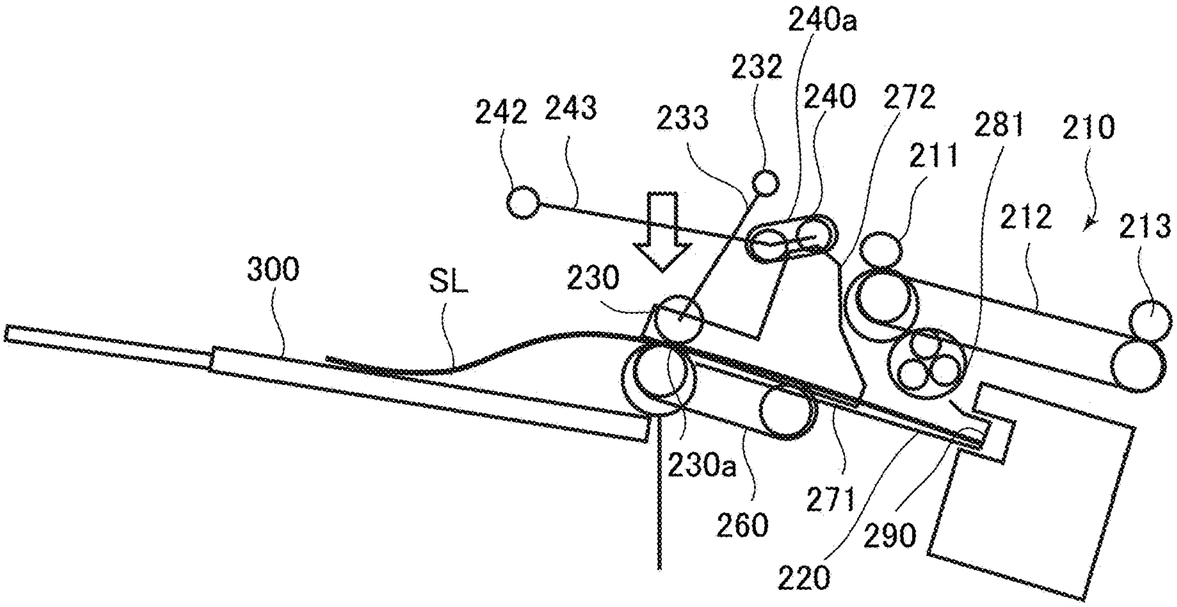
FIG. 64B is a schematic view of the sheet processing apparatus as viewed from the side illustrating the state in which the shift of the sheet is completed in the shift mode (alignment-prioritized) for a large sheet according to the second embodiment.
Figure 65A:
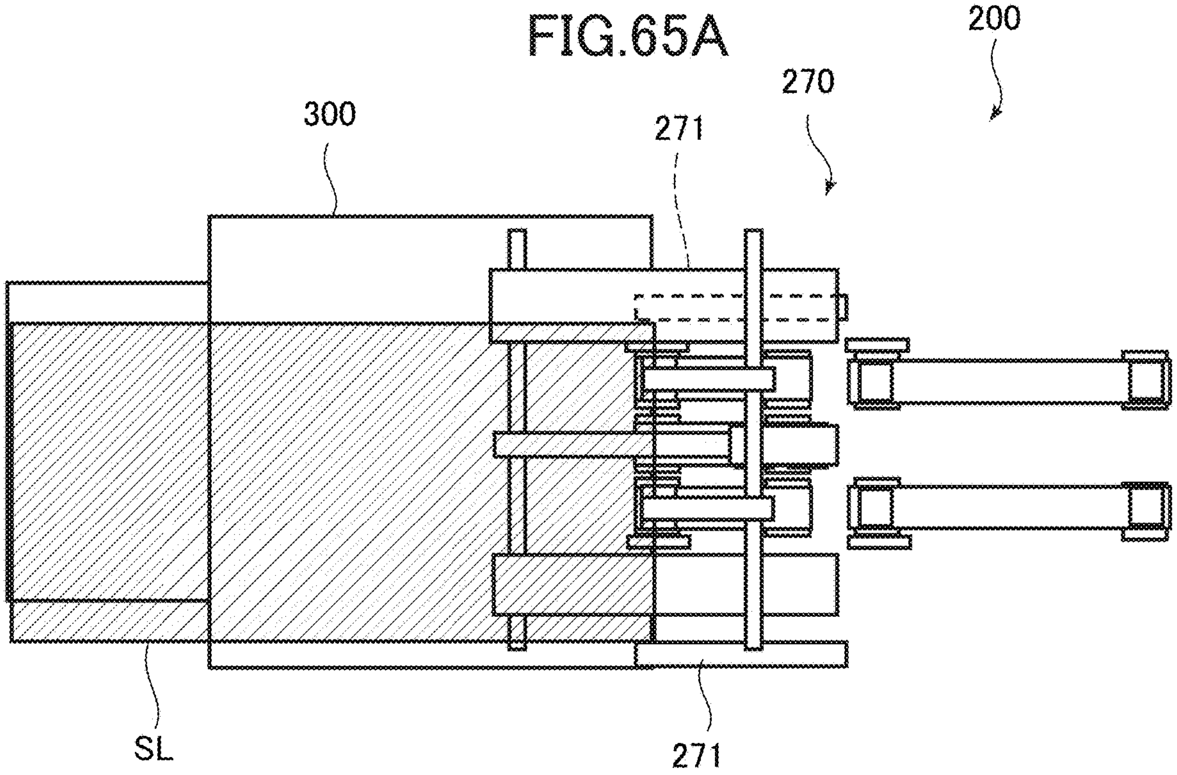
FIG. 65A is a schematic view of the sheet processing apparatus as viewed from above illustrating a state in which the sheet has been discharged onto the stacking tray in the shift mode (alignment-prioritized) for a large sheet according to the second embodiment.
Figure 65B:
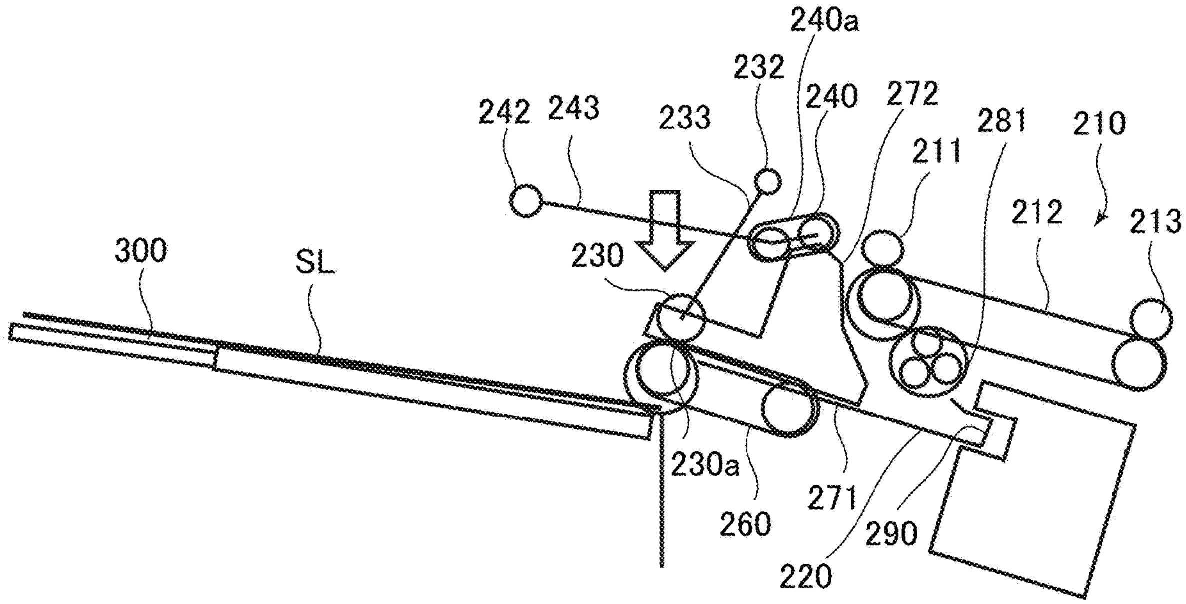

When the shifting operation of the sheet SL is completed, as illustrated in FIGS. 64A and B, the discharge rollers 230 are moved down to the contact position, and the sheet SL is nipped between the discharge rollers 230 and the discharge belts 260. Then, by rotating the discharge belts 260 in the normal direction, as illustrated in FIGS. 65A and B, the sheet SL is discharged from the processing tray 220 onto the stacking tray 300. At this time, the sheet SL discharged onto the stacking tray 300 is raked in by the discharged sheet rake-in belts 320, and further the trailing end of the sheet SL is pressed.

As described above, in the alignment-prioritized mode, since the sheet SL is subjected to the alignment and the shifting operation on the processing tray 220, the alignment of the sheet SL can be improved more than in the productivity-prioritized mode. Particularly, in the alignment-prioritized mode, the shifting operation is performed by placing the sheet SL on the processing tray 220, causing the trailing end of the sheet SL to abut the trailing end regulating member 290, and further causing the entirety of the second abutment portions 273 in the predetermine direction to abut the edges of the sheet SL in the width direction. The length of the entirety of the second abutment portions 273 in the predetermined direction is larger than the total length of the first abutment portions 272 and part of the second abutment portions that abut the sheet in the productivity-prioritized mode, and the alignment plates 271 can be caused to abut the edges of the sheet in the width direction in a wider region in the alignment-prioritized mode.

In addition, whereas the shifting operation is performed in a state in which the sheet is hanging down from the conveyance path 210 in the productivity-prioritized mode, in the alignment-prioritized mode, since the shifting operation is performed in a state in which the sheet is placed on the processing tray 220, the shifting operation of the sheet can be performed in a more stable state. Further, since the leading end of the sheet SL projects more to the stacking tray 300 side than the processing tray 220, the leading end side of the sheet SL is hanging down onto the stacking tray 300 and is warped. Therefore, the shifting operation of the sheet SL can be performed in a state in which the stiffness is higher than in a state in which the sheet SL is not warped. For the reasons described above, in the alignment-prioritized mode, the alignment of the sheet SL can be improved as compared with the productivity-prioritized mode.

To be noted, in the alignment-prioritized mode, since there is an operation of temporarily placing the sheet on the processing tray 220, the process takes more time than in the productivity-prioritized mode. However, in the case of a sheet of a large size, processing in the image forming apparatus 100 also takes time. Therefore, in the case where the alignment-prioritized mode is executed on a sheet of a large size, the shifting operation can be performed with a productivity appropriate for the productivity of the image forming apparatus 100, and further the alignment of the sheet can be improved. To be noted, even in the case of a sheet of a large size, the productivity-prioritized mode as described above may be executed.

[Stapling Mode]

Figure 66A:
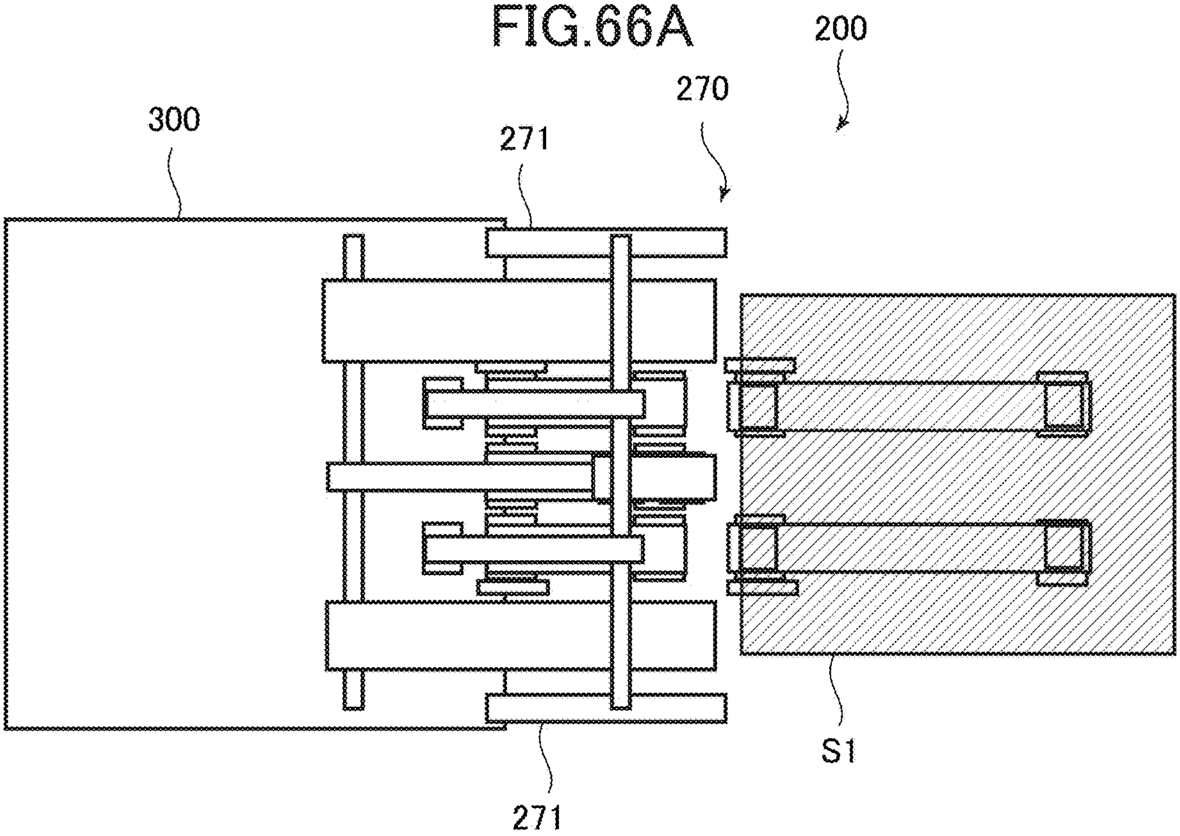
Figure 66B:
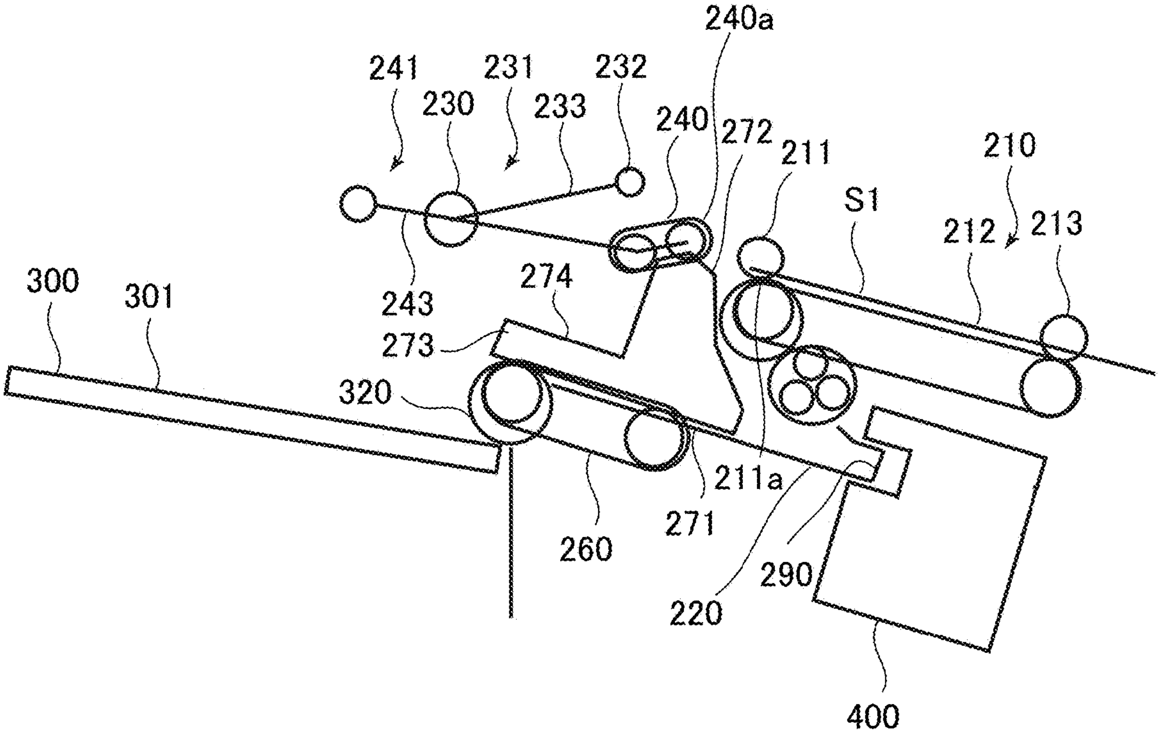

The stapling mode will be described with reference to FIGS. 66A to 74B. As illustrated in FIGS. 66A and B, in a state in which the first sheet S1 is conveyed to the conveyance path 210, the discharge rollers 230 are positioned at the retracted position, and the rake-in portion 240 and the trailing end dropping members 250 are positioned at the first position, respectively. When the trailing end of the sheet S1 passes the pre-processing nip portion 211*a*, similarly to FIGS. 60A and B described above, the discharge rollers 230, the rake-in portion 240, and the trailing end dropping members 250 start moving down, and similarly to FIGS. 61A and B, the discharge rollers 230 move down to the contact position, and the rake-in portion 240 and the trailing end dropping members 250 move down to the second position. That is, the sheet S1 discharged from the conveyance path 210 is placed on the processing tray 220, and the sheet S1 is nipped between the discharge rollers 230 and the discharge belts 260 and also between the rake-in belt 240*a* of the rake-in portion 240 and the discharge belt 260. To be noted, the descent start timing of the discharge rollers 230, the rake-in portion 240, and the trailing end dropping members 250 may be before the trailing end of the sheet S1 passes the pre-processing nip portion 211*a*.

Figure 67A:
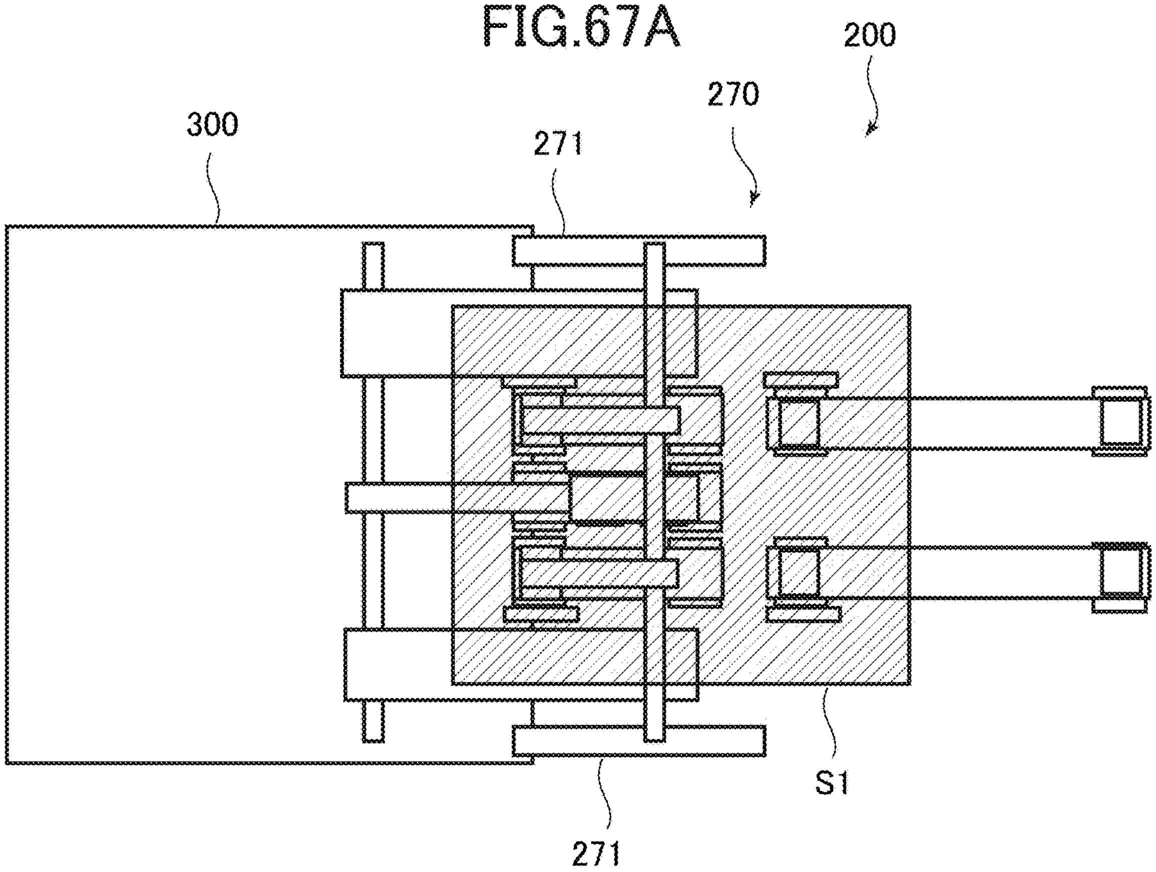
Figure 67B:
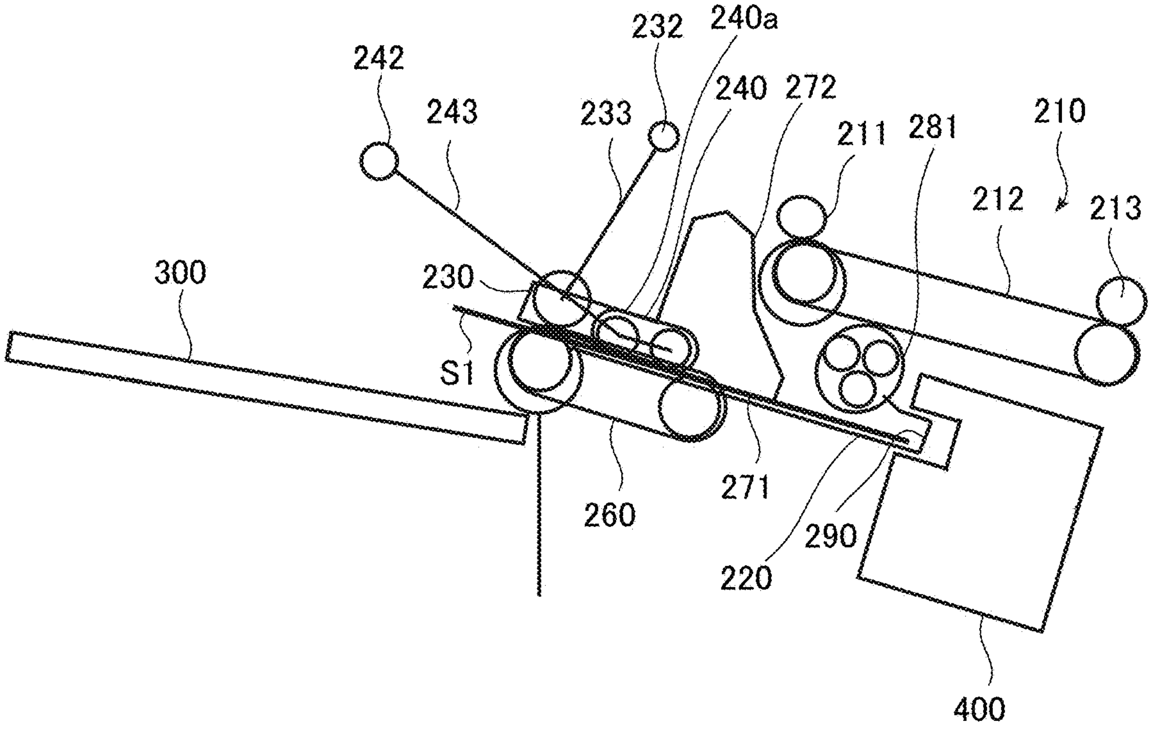

Next, as illustrated in FIGS. 67A and B, the rake-in belt 240*a* and the discharge belt 260 are each rotated in the reverse direction, and thus the sheet S1 placed on the processing tray 220 is conveyed toward the trailing end regulating member 290. At this time, the returning member 280 moves down, and the knurled belt 281 of the returning member 280 abuts the upper surface of the trailing end side of the sheet S1. Then, by rotating the knurled belt 281, the sheet S1 is further conveyed, and thus the trailing end of the sheet S1 is caused to abut the trailing end regulating member 290. As a result of this, the sheet S1 is aligned in the predetermined direction.

Figure 68A:
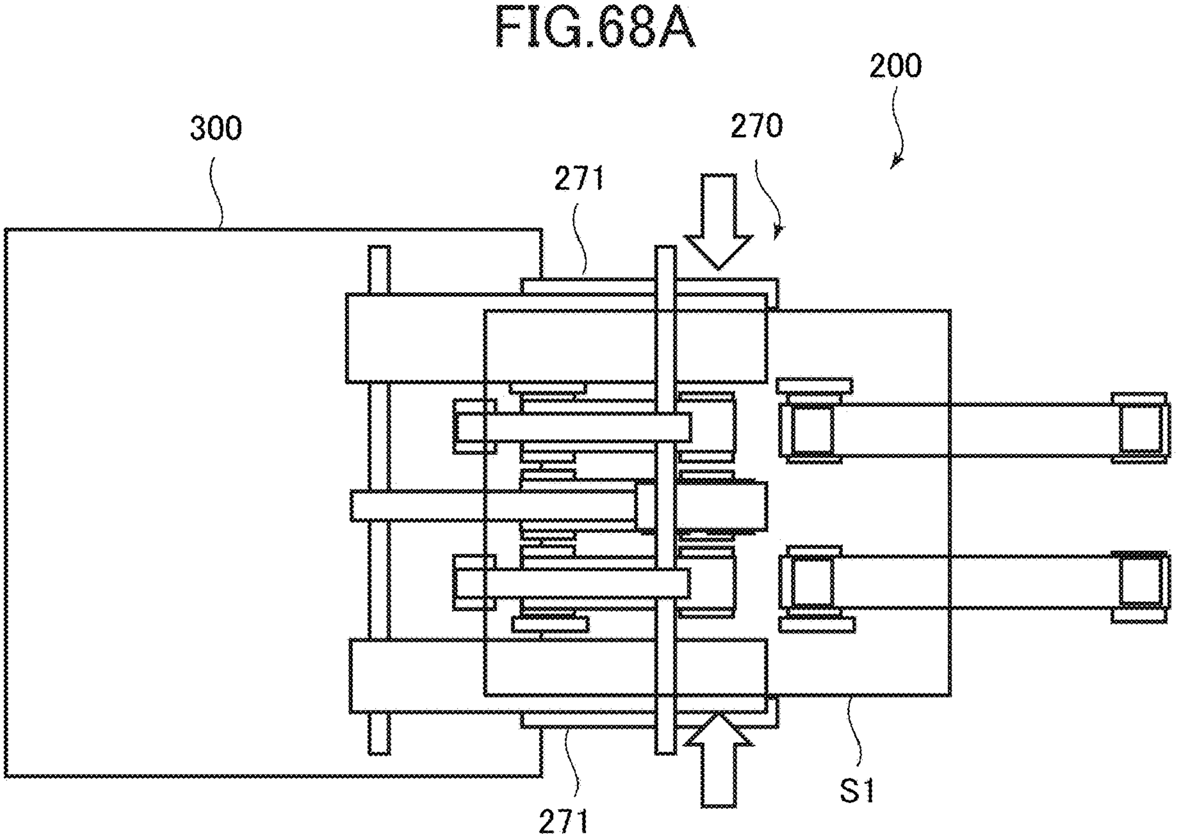
Figure 68B:
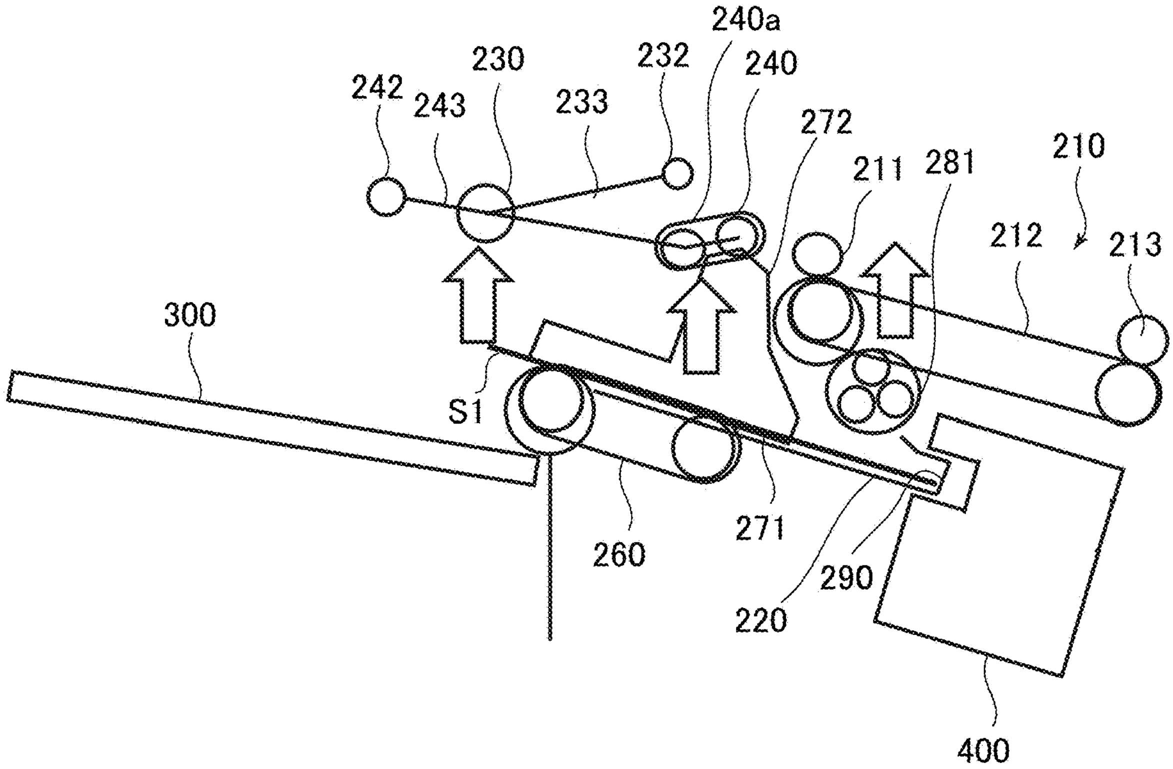

Next, as illustrated in FIGS. 68A and B, the returning member 280 is moved up while moving up the discharge rollers 230 to the retracted position and the rake-in portion 240 and the trailing end dropping members 250 to the first position, respectively, and thus these members are retracted from the upper surface of the sheet S1. In this state, the sheet S1 is aligned in the width direction by moving the front and rear alignment plates 271 in the width direction. At this time, since the sheet S1 is placed on the processing tray 220, the sheet S1 abuts the second abutment portions 273 of the alignment plates 271. The same as the alignment-prioritized mode applies up to this point.

Figure 69A:
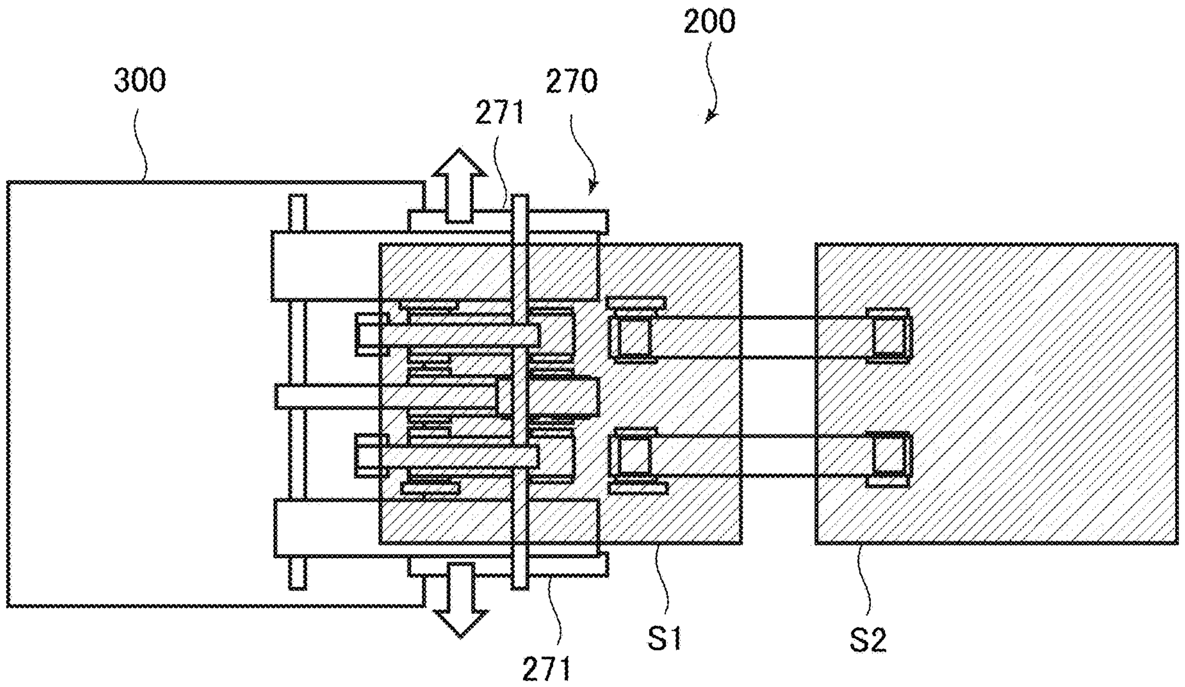
Figure 69B:
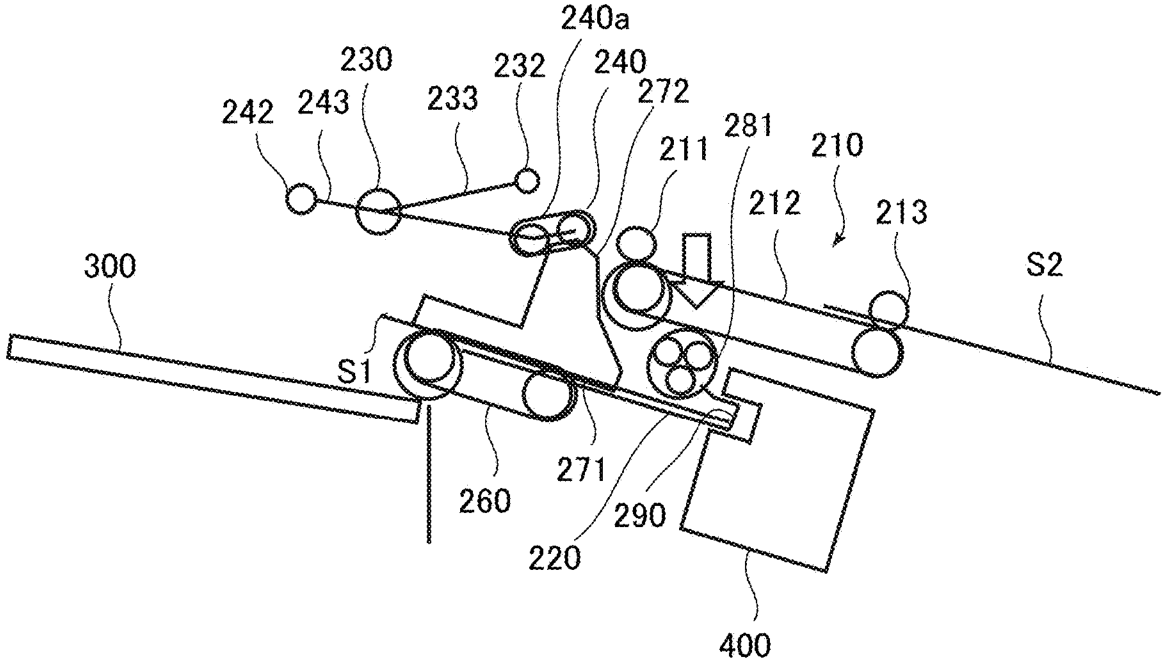

Next, as illustrated in FIGS. 69A and B, to prepare for the second sheet, the returning member 280 is moved down, and the trailing end of the sheet S1 is nipped between the knurled belt 281 and the processing tray 220. As a result of this, even when the second sheet is conveyed onto the processing tray 220, displacement of the first sheet S1 can be suppressed. In this state, the second sheet S2 discharged from the conveyance path 210 is placed on the sheet S1 placed on the processing tray 220, in a similar manner to the case of placing the first sheet S1 on the processing tray 220 as described above.

Figure 70A:
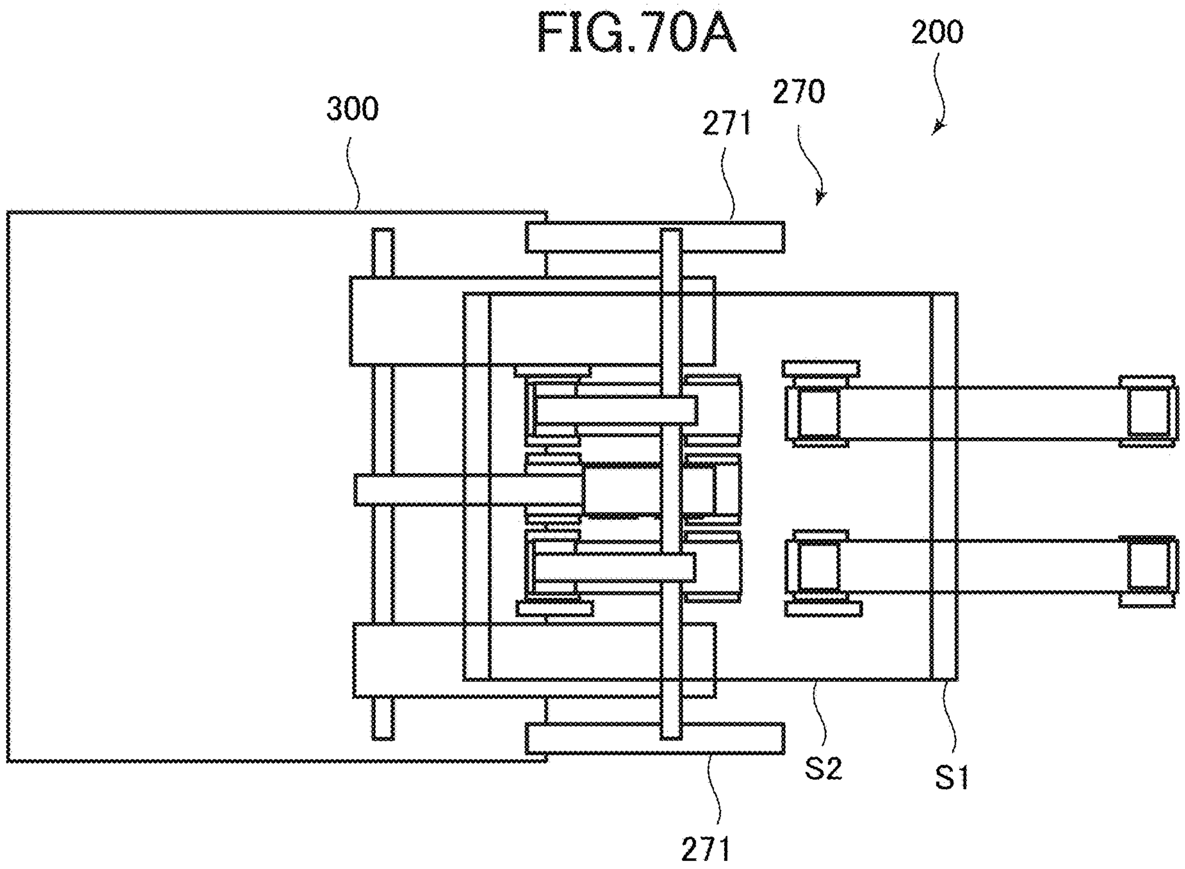
Figure 70B:
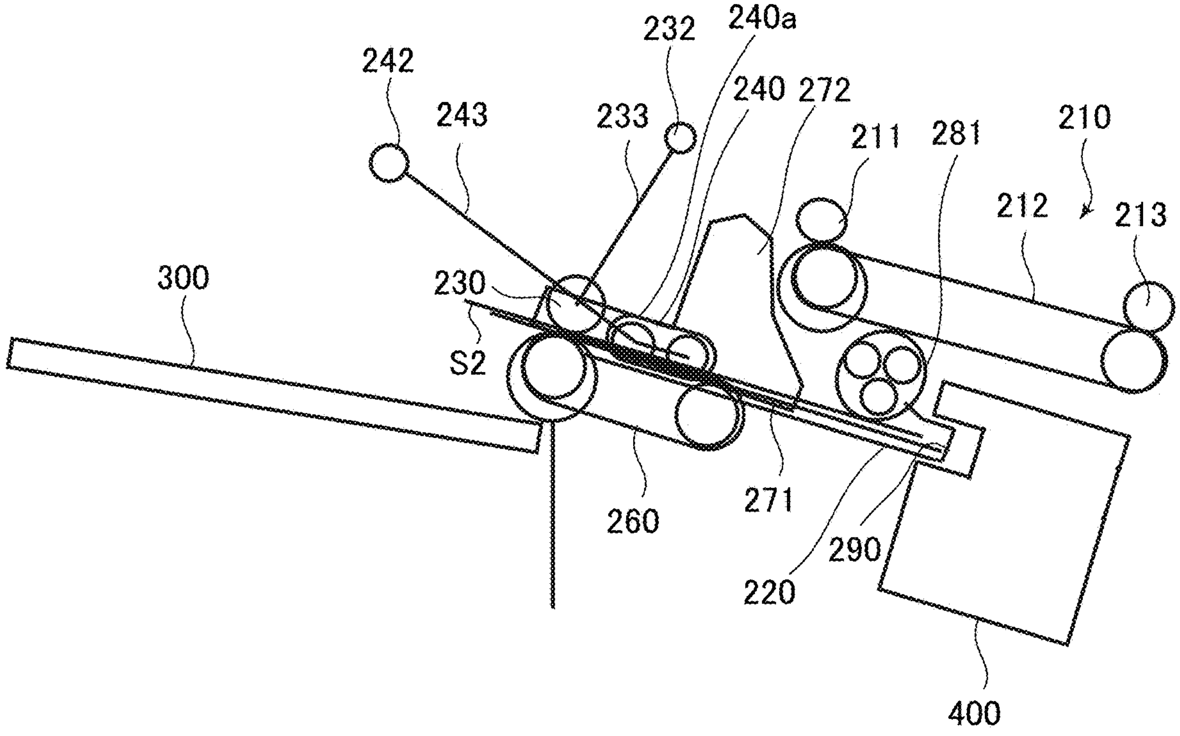

Then, as illustrated in FIGS. 70A and B, the rake-in belt 240*a* and the discharge belts 260 are each rotated in a reverse direction, and thus the second sheet S2 placed on the processing tray 220 is conveyed toward the trailing end regulating member 290. At this time, the returning member 280 temporarily moves up, and moves down at a timing at which the trailing end of the sheet S2 reaches the returning member 280. Then, the knurled belt 281 of the returning member 280 abuts the upper surface of the trailing end side of the sheet S2. By rotating the knurled belt 281, the sheet S2 is further conveyed, and thus the trailing end of the sheet S2 is caused to abut the trailing end regulating member 290. As a result of this, the sheet S2 is aligned in the predetermined direction. In the case where the sheet placed on the processing tray 220 is the second sheet or a later sheet, only the rake-in belt 240*a* is rotated in the reverse direction without rotating the discharge belt 260, and thus the trailing end of the sheet is caused to abut the trailing end regulating member 290 similarly to the first sheet. To be noted, also in the case of causing the trailing end of the first sheet to abut the trailing end regulating member 290, only the rake-in belt 240*a* may be rotated without rotating the discharge belt 260.

Next, as illustrated in FIGS. 71A and B, the returning member 280 is moved up while moving up the discharge rollers 230 to the retracted position and the rake-in portion 240 and the trailing end dropping members 250 to the first position, respectively, and thus these members are retracted from the upper surface of the sheet S2. In this state, the sheet S2 is aligned in the width direction by moving the front and rear alignment plates 271 in the width direction. As described above, the operation of placing the sheet on the processing tray 220 and aligning the sheet on the processing tray 220 is performed for the number of sheets based on input job information, and thus a sheet bundle ST is formed on the processing tray 220.

After the sheet bundle ST is formed, as illustrated in FIGS. 72A and B, the stapling unit 400 is driven, and thus the stapling process is performed on the sheet bundle ST. After the stapling process is performed, as illustrated in FIGS. 73A and B, the front and rear alignment plates 271 are retracted from the edges of the sheet bundle ST in the width direction, the discharge rollers 230 are moved down to the contact position, and the rake-in portion 240 is moved down to the second position, respectively. As a result of this, the sheet bundle ST is nipped between the discharge rollers 230 and the rake-in belt 240*a* and the discharge belts 260. Then, by driving the discharge belts 260 and the rake-in belt 240*a*, the sheet bundle ST is discharged from the processing tray 220 onto the stacking tray 300 as illustrated in FIGS. 74A and B.

As described above, in the present embodiment, the discharge of the sheet bundle ST is performed by driving the rake-in belt 240*a* in addition to the conveyance by the discharge rollers 230 and the discharge belts 260. Particularly, since the rake-in belt 240*a* is configured such that the stretched surface of the belt comes into contact with the upper surface of the sheet bundle ST, the conveyance force of the sheet bundle ST is larger. Therefore, the sheet bundle ST can be discharged from the processing tray 220 more reliably.

Here, to increase the conveyance force of the sheet, increasing the abutment pressure (nip pressure) of the discharge rollers 230 on the discharge belts 260 can be considered. To be noted, in this case, the strength of the configuration that supports the discharge rollers 230 needs to be secured, which increases the size of the apparatus. In addition, in the case where the discharge rollers 230 are caused to abut the sheet strongly, there is a possibility that offset occurs. Therefore, in the present embodiment, the discharge of the sheet is assisted by the rake-in belt 240*a* by causing the rake-in belt 240*a* to abut the sheet in addition to the discharge rollers 230.

Therefore, the nip pressure of the discharge rollers 230 does not need to be increased more than necessary, thus increase in the size of the apparatus can be suppressed, and occurrence of offset can be also suppressed. In addition, the rake-in belt 240*a* has a function of conveying the sheet on the processing tray 220 toward the trailing end regulating member 290, and just the rotation direction of the rake-in belt 240*a* is switched between when conveying the sheet toward the trailing end regulating member 290 and when discharging the sheet. Therefore, the size of the apparatus can be reduced more than in the case where elements having respective functions are separately provided.

[Discharge Operation of Sheet]

The discharge operation of the sheet onto the stacking tray 300 in the present embodiment will be described with reference to FIGS. 75A to 79B. First, as illustrated in FIGS. 75A and B, the sheet S is nipped and conveyed between the discharge rollers 230 and the discharge belts 260, and is thus discharged onto the stacking tray 300. At this time, the stacking tray 300 is at a first stacking position. The first stacking position is the home position in the case where no sheet is stacked on the stacking tray 300, and is, in the case where the sheet is stacked, a position determined in accordance with the amount of stacked sheet thereof.

Next, the stacking tray 300 moves down from the first stacking position to a second stacking position such that the stacking tray 300 reaches the second stacking position after the downstream end (leading end) in the predetermined direction of the sheet S discharged by the discharge rollers 230 and the discharge belts 260 comes into contact with the sheet placement surface 301 of the stacking tray 300 or a sheet placed on the sheet placement surface 301. In the present embodiment, as illustrated in FIGS. 76A and B, the stacking tray 300 starts moving down from the first stacking position toward the second stacking position after the trailing end of the sheet S has passed the discharge nip portion 230*a* between the discharge rollers 230 and the discharge belts 260. The discharged sheet rake-in belt 320 is looped over the roller 321 in a warped state. Therefore, the discharged sheet rake-in belt 320 is slightly pushed up by a sheet placed on the stacking tray 300 in a state in which the stacking tray 300 is at the first stacking position. Even if the stacking tray 300 moves down from the first stacking position to the second stacking position in this state, since the discharged sheet rake-in belt 320 is in contact with the sheet on the stacking tray 300 until the warpage of the discharged sheet rake-in belt 320 is cancelled, the sheet pressing effect of the discharged sheet rake-in belt 320 continues in a predetermined section from the start of the descent of the stacking tray 300.

When the sheet S is discharged from the discharge nip portion 230*a*, as illustrated in FIGS. 77A and B, the discharged sheet rake-in belt 320 abuts the upstream end (trailing end) of the sheet S discharged by the discharge rollers 230 and the discharge belts 260 while rotating, and thus guides the trailing end of the sheet S toward the stacking tray 300.

As described above, the discharged sheet rake-in belt 320 is a knurled belt, and a roller that drives the discharged sheet rake-in belt 320 is also provided on a drive shaft 261*a* of the stretch rollers 261 that drive the discharge belts 260. Therefore, the discharged sheet rake-in belt 320 rotates in synchronization with the discharge belts 260. In addition, the discharged sheet rake-in belt 320 is provided such that at least part thereof projects more downstream in the predetermined direction than the erecting surface 310 and more downward than the sheet placement surface of the processing tray 220. Therefore, as a result of the discharged sheet rake-in belt 320 rotating, the trailing end of the sheet S having passed the discharge nip portion 230*a* is guided to the stacking tray 300 by being raked off the discharged sheet rake-in belt 320. That is, as in trajectories of the sheet indicated by a dot line and a broken line in FIG. 77B, the trailing end of the sheet S is raked off by the discharged sheet rake-in belt 320. As a result of this, the trailing end of the sheet S is made less likely to remain in the discharge nip portion 230*a*.

Next, the stacking tray 300 moves up from the second stacking position to the first stacking position such that the stacking tray 300 reaches the first stacking tray after the upstream end of the sheet S in the predetermined direction is discharged onto the sheet placement surface 301 or a sheet placed on the sheet placement surface 301. In the present embodiment, as illustrated in FIGS. 78A and B, the stacking tray 300 starts moving up from the second stacking position toward the first stacking position after the trailing end of the sheet S is discharged onto the stacking tray 300. As a result of the stacking tray 300 moving up from the second stacking position to the first stacking position, the discharged sheet rake-in belt 320 presses the upper surface of a trailing end portion of the sheet S discharged onto the stacking tray 300.

Next, as illustrated in FIGS. 79A and B, the discharged sheet rake-in belt 320 conveys the sheet S on the stacking tray 300 having moved up from the second stacking position to the first stacking position toward the erecting surface 310 serving as a stacking-side regulating means. That is, as a result of the discharged sheet rake-in belt 320 rotating, the sheet S on the stacking tray 300 is raked in, and thus the trailing end of the sheet S is caused to abut the erecting surface 310. At this time, the discharged sheet rake-in belt 320 may be configured to abut the upper surface of the sheet S in a rotating state, or may be configured to rotate after abutting the upper surface of the sheet S. That is, when the stacking tray 300 moves up from the second stacking position to the first stacking position, the rotation of the discharged sheet rake-in belt 320 may be started at least before the stacking tray 300 reaches the first stacking position, or the rotation of the discharged sheet rake-in belt 320 may be started after the stacking tray 300 has reached the first stacking position. In either case, the rotation of the discharged sheet rake-in belt 320 is stopped at a timing after the trailing end of the sheet S has abutted the erecting surface 310.

In the case of the present embodiment, the upper surface of the sheet S discharged onto the stacking tray 300 is pressed by the discharged sheet rake-in belt 320 as described above. In addition, for this, the stacking tray 300 is configured to be capable of moving up and down to the first stacking position and the second stacking position, and the timing of the descent from the first stacking position and the timing of the ascent from the second stacking position are controlled in accordance with the discharge of the sheet as described above. Further, the upper surface of the trailing end portion of the sheet discharged onto the stacking tray 300 is pressed by the discharged sheet rake-in belt 320 provided at a downstream end in the predetermined direction of the processing tray 220.

As a result of this, even if the next sheet is discharged onto the sheet S placed on the stacking tray 300, displacement of the sheet S can be suppressed. To be noted, depending on the angle of the stacking tray 300, after the leading end of the next sheet has come into contact, the trailing end of the sheet S that has been previously discharged may be pressed by the discharged sheet rake-in belt 320. That is, in the case where the sheet placement surface 301 of the stacking tray 300 is inclined with respect to the horizontal surface such that the downstream side thereof in the predetermine direction is higher and this angle is large, this sheet is not likely to be displaced even if the leading end of the next sheet comes into contact with the upper surface of the sheet that has been already placed. Therefore, in such a case, discharge of the next sheet may be performed such that the leading end of the next sheet comes into contact with the sheet S before the stacking tray 300 on which the sheet S is placed reaches the first stacking position.

In either case, in the present embodiment, the discharged sheet rake-in belt 320 has a function of pressing the trailing end of the sheet S discharged onto the stacking tray 300, and a function of raking off such that the trailing end of the sheet S does not remain in the discharge nip portion 230*a*. Therefore, in the case of the present embodiment, the cost can be reduced more than in the case where mechanisms having these functions are provided separately.

In addition, also in the case of the present embodiment, in the case of performing the stapling mode, the first shift discharge process, and the second shift discharge process, each process is performed by the front-side alignment plate moving motor MT5 and the rear-side alignment plate moving motor MT6 that are common drive sources, and the alignment plates 271 that are common. Therefore, the cost can be reduced as compared with a configuration in which different alignment plates and drive sources are needed for respective processes, and further, for predetermined sheets, the productivity can be improved by the first shift discharge process. To be noted, the first shift discharge process can be also applied to all the sheets shifted and discharged without performing the binding process similarly to the first embodiment.

Also in the case of the present embodiment as described above, in the case of forming a shifted sheet bundle on the stacking tray 300 (stacking portion) without performing a binding process, a sheet bundle constituted by a plurality of sheets is formed on the stacking tray 300 by repeatedly executing the shift discharge process and the rake-in process on a plurality of sheets. Similarly to the first embodiment, the shift discharge process is a switchbackless shift discharge process, and a case in which sheets are discharged one by one from the processing tray 220 is also included therein even in the case of a switchback shift discharge process. In addition, as described above, the rake-in process is a process of conveying the sheet discharged onto the stacking tray 300 in a third conveyance direction by the discharged sheet rake-in belts 320. As a result of this, also in the present embodiment, the alignment of a sheet bundle in the case of forming an unbound sheet bundle moved in the shift direction on the stacking tray 300 can be improved.

Third Embodiment

A third embodiment will be described. The present disclosure is also applicable to configurations illustrated in FIGS. 80, 81, and 82A to 83B. To be noted, members similar to the first embodiment will be denoted by the same reference signs, and description thereof will be omitted.

The sheet processing apparatus illustrated in FIG. 80 is one in which the elements of the upper discharge rollers 230A and the lower discharge rollers 230B are removed from the mechanical configuration of the first embodiment, and a push-out member 291 is added as a discharge portion instead. In this sheet processing apparatus, the sheet S conveyed in the first conveyance direction (direction from the right to the left in the drawing) by the pre-processing rollers 211A and 212A (first conveyance portion) and placed on the processing tray 220 is conveyed in the second conveyance direction (direction from the left to the right in the drawing) by the rake-in paddles 240A and the knurled belt 281 of the returning member 280 (collectively second conveyance portion), and thus the trailing end of the sheet S is caused to abut the trailing end regulating member 290 serving as an abutment portion. Then, a sheet bundle is formed by aligning the sheet S in the width direction by the pair of alignment plates 271A, receiving the next sheet S, and repeating the operation described above, and the stapling process is performed on the sheet bundle by the stapling unit 400. Then, the push-out member 291 engages with the trailing end (upstream end portion in the first conveyance direction) of the sheet bundle and moves in the first conveyance direction, and thus the sheet bundle is discharged onto the stacking tray 300.

In the case of performing the first shift discharge process (switchbackless shift discharge process) by the sheet processing apparatus configured in this manner, the pre-processing rollers 211A and 212A convey the sheet S in the first conveyance direction, and when the trailing end of the sheet S has passed the pre-processing nip portion 211*a* of the pre-processing rollers, the sheet S is shifted in the shift direction by the pair of alignment plates 271A (at this time, the rake-in paddles 240A may be slightly moved down such that the trailing end side of the sheet S abuts the pair of alignment plates 271A), and then the sheet S is discharged onto the stacking tray 300 by the push-out member 291.

Further, in the case of performing the second shift discharge process (switchback shift discharge process), the pre-processing rollers 211A and 212A convey the sheet S in the first conveyance direction, and when the trailing end of the sheet S has passed the pre-processing nip portion 211*a* of the pre-processing rollers and the sheet S is placed on the processing tray 22, the rake-in paddles 240A and the knurled belt 281 convey the sheet S in the second conveyance direction, and thus the trailing end of the sheet S is caused to abut the trailing end regulating member 290 serving as an abutment portion. Then, the sheet S is shifted in the shift direction by the pair of alignment plates 271A, and then the sheet S is discharged onto the stacking tray 300 by the push-out member 291.

The sheet processing apparatus illustrated in FIG. 81 is one in which an element of the push-out member 291 is added to the mechanical configuration of the first embodiment. In this sheet processing apparatus, the sheet S conveyed in the first conveyance direction (direction from the right to the left in the drawing) by the pre-processing rollers 211A and 212A (first conveyance portion) and placed on the processing tray 220 is conveyed in the second conveyance direction (direction from the left to the right in the drawing) by the rake-in paddles 240A and the knurled belt 281 of the returning member 280 (collectively second conveyance portion), and thus the trailing end of the sheet S is caused to abut the trailing end regulating member 290 serving as an abutment portion. Then, a sheet bundle is formed by aligning the sheet S in the width direction by the pair of alignment plates 271A, receiving the next sheet S, and repeating the operation described above, and the stapling process is performed on the sheet bundle by the stapling unit 400. Then, the push-out member 291 engages with the trailing end (upstream end portion in the first conveyance direction) of the sheet bundle and moves in the first conveyance direction to push out, and by moving the upper discharge rollers 230A and the lower discharge rollers 230B to the nipping position in this state and rotating at least one of the upper discharge rollers 230A and the lower discharge rollers 230B, the sheet bundle is discharged onto the stacking tray 300.

In the case of performing the first shift discharge process (switchbackless shift discharge process) by the sheet processing apparatus configured in this manner, the sheet S is conveyed by the pre-processing rollers 211A and 212A in the first conveyance direction to be passed onto the upper discharge rollers 230A and the lower discharge rollers 230B, and when the trailing end of the sheet S has passed the pre-processing nip portion 211*a* of the pre-processing rollers, the upper discharge rollers 230A and the lower discharge rollers 230B are moved to the separated position, the sheet S is shifted in the shift direction by the pair of alignment plates 271A, and then the sheet S is discharged onto the stacking tray 300 by moving and rotating the upper discharge rollers 230A and the lower discharge rollers 230B to and at the nipping position.

Further, in the case of performing the second shift discharge process (switchback shift discharge process), the pre-processing rollers 211A and 212A convey the sheet S in the first conveyance direction, and when the trailing end of the sheet S has passed the pre-processing nip portion 211*a* of the pre-processing rollers and the sheet S is placed on the processing tray 220, the rake-in paddles 240A and the knurled belt 281 convey the sheet S in the second conveyance direction, and thus the trailing end of the sheet S is caused to abut the trailing end regulating member 290 serving as an abutment portion. Then, the sheet S is shifted in the shift direction by the pair of alignment plates 271A in a state in which the upper discharge rollers 230A and the lower discharge rollers 230B are at the separated position, and then the sheet S is discharged onto the stacking tray 300 by the push-out member 291. At this time, the sheet S may be discharged onto the stacking tray 300 by only the push-out member 291, or the sheet S may be pushed out halfway by the push-out member 291, and then the sheet S may be discharged onto the stacking tray 300 by the upper discharge rollers 230A and the lower discharge rollers 230B.

Also in the sheet processing apparatus illustrated in FIGS. 80 and 81 as described above, the alignment of the stapling process, the first shift discharge process, and the second shift discharge process can be realized at a low cost by the common alignment plates 271A.

In addition, the sheet processing apparatus illustrated in FIGS. 82A to 83B is one in which a second trailing end dropping member 234 that moves in an interlocked manner with the movement of the upper discharge rollers 230A is added to the mechanical configuration of the first embodiment. The second trailing end dropping member 234 is pivotably provided on the pivot shaft 2301 of the upper discharge rollers 230A. The distal end (end portion on the upstream side in the first conveyance direction) of the second trailing end dropping member 234 is positioned above the lower surface of the discharge arm 2302 in the vertical direction when the upper discharge rollers 230A are at the retracted position as illustrated in FIG. 82A. Further, the distal end of the second trailing end dropping member 234 pivots in such a direction as to move away from the discharge arm 2302, that is, closer to the processing tray 220 as the upper discharge rollers 230A move toward the nipping position as illustrated in FIG. 82B.

The second trailing end dropping member 234 operates in an interlocked manner with the pivoting of the upper discharge rollers 230A as described above. This mechanism will be described with reference to FIGS. 83A and B. FIGS. 83A and B are schematic diagrams illustrating the relationship between the discharge arm 2302 supporting the upper discharge rollers 230A and the second trailing end dropping member 234. A pivot shaft 234*a* of the second trailing end dropping member 234 is coaxially provided with a rotation shaft 230A1 of the upper discharge rollers 230A, and is relatively rotatable with respect to the rotation shaft 230A1. Therefore, the pivot shaft 234*a* does not rotate even when the upper discharge rollers 230A rotate. A pulley 234*b* is fixed to the pivot shaft 234*a*, and when the pulley 234*b* rotates, the pivot shaft 234*a* also rotates, and the second trailing end dropping member 234 whose root end portion (supported portion, does not have to be an end portion of the member, and a portion projecting to an opposite side to the distal end side of the member with respect to the supported portion may be included. The end portion on the downstream side in the first conveyance direction) is fixed to the pivot shaft 234*a* also pivots.

On the upstream side of the discharge arm 2302 in the first conveyance direction, a pulley 234*c* is fixed to be coaxial with the pivot shaft 2301. The pulley 234*c* is relatively rotatable with respect to the pivot shaft 2301, and does not rotate even when the pivot shaft 2301 rotates. An endless belt 234*d* is looped over the pulley 234*b* and the pulley 234*c*. When the discharge arm 2302 pivots about the pivot shaft 2301, the relative position of the pulley 234*b* changes with respect to the pulley 234*c*, the belt 234*d* rotates, and the pulley 234*b* is rotated by the rotation of the belt 234*d*. Further, the pivot shaft 234*a* rotates together with the pulley 234*b*, and thus the second trailing end dropping member 234 swings in the up-down direction.

In FIG. 83A, the upper discharge rollers 230A are positioned at the home position, and at this time, the second trailing end dropping member 234 is in a posture approximately parallel to the discharge arm 2302. This position will be referred to as an upper position of the second trailing end dropping member 234. When the discharge arm 2302 is pivoted downward about the pivot shaft 2301 to move the upper discharge rollers 230A from this position to the nipping position, as illustrated in FIG. 83B, the belt 234*d* travels in an arrow P direction, and the pulley 234*b* and the trailing end dropping member 234 rotate in an arrow Q direction about the pivot shaft 234*a*. That is, the distal end of the trailing end dropping member 234 moves from the upper position illustrated in FIG. 83A to the lower position illustrated in FIG. 83B. As described above, the second trailing end dropping member 234 move in an interlocked manner with the pivoting of the discharge arm 2302 so as to be positioned at the upper position in a state in which the upper discharge rollers 230A are positioned at the home position, and at the lower position in a state in which the upper discharge rollers 230A are positioned at the nipping position.

The second trailing end dropping member 234 that operates as described above can position the side edges of the trailing end side of the sheet S to be easier to abut the pair of alignment plates 271A, by pressing the trailing end side of the sheet S from above when performing the first shift discharge process. In addition, since the sheet S is warped on the trailing end side of the sheet with respect to the discharge nip portion 230*a*, and the sheet S is shifted by the pair of alignment plates 271A abutting the warped portion, the shifting operation can be performed in a state in which the stiffness of the sheet S is higher.

FIG. 82A illustrates a state in which the upper discharge rollers 230A are at the retracted position and the sheet is received. Since the distal end of the second trailing end dropping member 234 is positioned above the lower surface of the discharge arm 2032 in the vertical direction, the leading end of the sheet S does not enter a gap between the discharge arm 2302 and the second trailing end dropping member 234 to be jammed. When the leading end of the sheet S has passed the gap between the upper discharge rollers 230A and the lower discharge rollers 230B, as illustrated in FIG. 82B, the upper discharge rollers 230A are moved to the nipping position to perform the conveyance until the trailing end of the sheet S passes the pre-processing nip portions 211*a*. At this time, the second trailing end dropping member 234 moves from the upper position to the lower position in an interlocked manner with the movement of the upper discharge rollers 230A, and thus the trailing end of the sheet S is dropped from above to below. As described above, in the first shift discharge process, since the trailing end dropping members 250A are not operated, the sheet S can be reliably dropped onto the processing tray 220 in the first shift discharge process by providing the second trailing end dropping member 234 configured in this manner. Further, the alignment plates 271A can be caused to reliably abut the sheet S in the shifting operation of the sheet S by the pair of alignment plates 271A that will be described next.

When the sheet S is dropped onto the processing tray 220 by the second trailing end dropping member 234, as illustrated in FIG. 82C, the upper discharge rollers 230A are moved to the separated position, and the sheet S is moved in the shift direction by the pair of alignment plates 271A. To be noted, in FIG. 82C, although the second trailing end dropping member 234 does not abut the upper surface of the sheet S in a state in which the upper discharge rollers 230A are at the separated position, the upper surface of the sheet may be pressed by the second trailing end dropping member 234 to such an extent that a load is not put on the shifting operation performed by the pair of alignment plates 271A.

To be noted, in the first embodiment described above, a configuration in which the trailing end dropping members 250A cannot move to the lower position when the upper discharge rollers 230A move down to the nipping position or the separated position is employed, and in this case, the first shift discharge process can be performed more stably by providing the second trailing end dropping member 234, but the trailing end dropping members 250A may be in a separate driving system, and the trailing end dropping members 250A may be positioned at the lower position in the shifting operation of the sheet. In addition, if the second trailing end dropping member 234 is configured in a different driving system than the pivoting of the upper discharge rollers 230A, the trailing end dropping members 250A may be omitted.

In addition, the second trailing end dropping member 234 is pivotably provided on the pivot shaft 2301 of the upper discharge rollers 230A, but may be provided on a different member, or may be configured to be individually movable. That is, it suffices as long as the trailing end side of the sheet can be dropped downward to such a position that the side edges of the trailing end side of the sheet can abut the pair of alignment plates 271A in the shifting operation of the sheet by the pair of alignment plates 271A.

As described above, also in the case of the present embodiment illustrated in FIGS. 80 to 83B, in the case of forming a shifted sheet bundle on the stacking tray 300 (stacking portion) without performing a binding process, a sheet bundle constituted by a plurality of sheets is formed on the stacking tray 300 by repeatedly executing the shift discharge process and the rake-in process on a plurality of sheets. Similarly to the first embodiment, the shift discharge process is a switchbackless shift discharge process, and a case in which sheets are discharged one by one from the processing tray 220 is also included therein even in the case of a switchback shift discharge process. In addition, as described above, the rake-in process is a process of conveying the sheet discharged onto the stacking tray 300 in a third conveyance direction by the discharged sheet rake-in paddles 320A. To be noted, the discharged sheet rake-in paddles 320A may be replaced by the discharged sheet rake-in belts 320 described in the second embodiment. Also in the present embodiment, the alignment of a sheet bundle in the case of forming an unbound sheet bundle moved in the shift direction on the stacking tray 300 can be improved.

In addition, although an example in which the pair of alignment plates 271A (271) move in the state of nipping the two edges in the width direction of the sheet in the first shift discharge process (switchbackless shift discharge process) has been described in each embodiment described above, the following operations are applicable. (1) to (5) below describe the operations of the pair of alignment plates in a state in which the sheet has been conveyed in the first conveyance direction by the pre-processing rollers 211A and the shifting operation by the pair of alignment plates 271A can be started. As described above, the alignment plate on the upstream side in the shift direction will be referred to as a first shifting portion, and the alignment plate on the downstream side in the shift direction will be described as a second shifting portion.

The first shifting portion and the second shifting portion are moved in such a direction as to approach each other to first nip the edges of the sheet in the width direction of the sheet, and then the first shifting portion and the second shifting portion are simultaneously moved in the shift direction to shift the sheet. (2) The first shifting portion is moved in the shift direction in a state in which the second shifting portion is stopped, and thus the sheet is caused to abut the second shifting portion. Then, the first shifting portion and the second shifting portion are simultaneously moved in the shift direction to shift the sheet. (3) The movement speed of the first shifting portion is set to be higher than the movement speed of the second shifting portion, and the first shifting portion and the second shifting portion are both moved in the shift direction. A state in which the sheet is nipped between the first shifting portion and the second shifting portion is taken before the completion of the shifting operation, and the shifting of the sheet is completed in this state. (4) The second shifting portion is moved to the first shifting portion side in a state in which the first shifting portion is stopped, and is thus caused to abut the edge of the sheet on the second shifting portion side. Then, the first shifting portion is moved in the shift direction to nip the two edges of the sheet by the first shifting portion and the second shifting portion, and in this state, the first shifting portion and the second shifting portion are moved in the shift direction to shift the sheet. (5) The second shifting portion is moved to the first shifting portion side in a state in which the first shifting portion is stopped, and thus the sheet is caused to abut the first shifting portion. Then, the first shifting portion and the second shifting portion are moved in the shift direction to shift the sheet.

In addition, although a mode in which the shift direction is both the direction from the rear side toward the front side and the direction from the front side toward the rear side, and both the pair of alignment plates 271A (271) move in the shift direction has been described in each embodiment described above, one of the alignment plates 271A may be fixed and the other may be moved toward the fixed alignment plate. In this case, the moving alignment plate serves as the first shifting portion, and the driving motor for moving the first shifting portion serves as a first driving portion. In this case, in the stapling process, the width alignment of the sheet is performed by moving the sheet toward the fixed alignment plate by using the movable alignment plate serving as the first shifting portion, and the position determined in this manner serves as a binding position. In addition, also in the first and second shift discharge processes, the sheet is one-side shifted and discharged onto the stacking tray 300 by moving the sheet toward the fixed alignment plate by using the movable alignment plate serving as the first shifting portion. Then, the sheet that is one-side-shifted and discharged and the straight-discharged sheet can be combined to classify the sheets discharged onto the stacking tray 300.

Fourth Embodiment

A fourth embodiment will be described with reference to FIG. 86. In each embodiment described above, a case where the movement of the sheet in the shift direction is performed by the alignment plates has been described. In contrast, in the present embodiment, the sheet is shifted by moving the pre-processing rollers 211A and 212A in the shift direction in a state in which the sheet is nipped by the pre-processing rollers 211A and 212A serving as a first conveyance portion and a pair of conveyance rotary members. The other elements and functions are similar to those of each embodiment described above. Therefore, in the description below, elements for moving the pre-processing rollers 211A and 212A in the shift direction will be described, and description and illustration of the other elements and functions will be omitted.

As illustrated in FIG. 86, the sheet processing apparatus of the present embodiment includes a shifting mechanism (rotary member shifting mechanism) 700 that moves the pre-processing rollers 211A and 212A in the shift direction. The shifting mechanism 700 serving as a shifting portion includes a bracket 701, a rack 702, a pinion 703, and a motor 704 and shifts the sheet in the shift direction intersecting with the first conveyance direction.

The bracket 701 supports the rotation shaft 211A1 of the pre-processing roller 211A and the rotation shaft 212A1 of the pre-processing roller 212A. The rack 702 is fixed to the bracket 701, and the rack 702 is engaged with the pinion 703. The pinion 703 is fitted with the drive shaft of the motor (stepping motor) 704 capable of rotating in the normal direction and the reverse direction. The motor 704 is attached to a motor attachment stage 706 fixed to an apparatus frame 705. Therefore, by rotating the motor 704 in the normal direction and the reverse direction, the pre-processing rollers 211A and 212A can be shifted by a designated movement amount in either of the left and right directions illustrated in FIG. 86 (see arrows) together with the rotation shafts 211A1 and 212A1.

The shifting mechanism 700 configured in this manner moves the sheet in the shift direction by moving the pre-processing rollers 211A and 212A in a state in which the sheet is nipped by the pre-processing rollers 211A and 212A. Also in the case of the present embodiment, in the case of forming a shifted sheet bundle on the stacking tray 300 (stacking portion) without performing a binding process, similarly to each embodiment described above, a sheet bundle constituted by a plurality of sheets is formed on the stacking tray 300 by repeatedly executing the shift discharge process and the rake-in process on a plurality of sheets. However, the shift discharge process of the present embodiment is a process of shifting the sheet by the shifting mechanism 700 and discharging the sheet shifted by the shifting mechanism 700 onto the stacking tray 300 by the upper discharge rollers 230A and the lower discharge rollers 230B (or the discharge rollers 230 and the discharge belts 260, or the push-out member 291). Also in the present embodiment, the alignment of a sheet bundle in the case of forming an unbound sheet bundle moved in the shift direction on the stacking tray 300 can be improved.

To be noted, although the pair of conveyance rotary members that shifts the sheet by the shifting mechanism 700 is the pre-processing rollers 211A and 212A, the pair of conveyance rotary members may be the upper discharge rollers 230A and the lower discharge rollers 230B. In this case, the sheet is moved in the shift direction by moving the upper discharge rollers 230A and the lower discharge rollers 230B in the shift direction in a state in which the sheet is nipped by the upper discharge rollers 230A and the lower discharge rollers 230B.

To be noted, in the case of shifting the upper discharge rollers 230A and the lower discharge rollers 230B as described above, when the discharged sheet rake-in paddles 320A (or the discharged sheet rake-in belts 320) are shifted together with the upper discharge rollers 230A and the lower discharge rollers 230B, there is a possibility that the discharged sheet pressed by the discharged sheet rake-in paddles 320A (or the discharged sheet rake-in belts 320) on the stacking tray 300 is displaced.

Therefore, in the case of employing a configuration in which the upper discharge rollers 230A and the lower discharge rollers 230B are shifted, the rotation shafts of the upper discharge rollers 230A and the lower discharge rollers 230B and the rotation shaft of the discharged sheet rake-in paddles 320A (or the discharged sheet rake-in belts 320) are relatively movable in the rotational axis direction. As a result of this, the discharged sheet rake-in paddles 320A (or the discharged sheet rake-in belts 320) do not move in the shift direction even in the case where the upper discharge rollers 230A and the lower discharge rollers 230B are moved in the shift direction. Therefore, even in the case where the upper discharge rollers 230A and the lower discharge rollers 230B are shifted to shift the sheet, a situation in which the discharged sheet pressed by the discharged sheet rake-in paddles 320A (or the discharged sheet rake-in belts 320) on the stacking tray 300 is displaced can be suppressed.

Other Embodiments

Although a configuration in which the sheet processing apparatus 200 or 200A is disposed in the in-body space 130 of the image forming apparatus 100 is employed in each embodiment described above, the configuration of the sheet processing apparatus of the present embodiment may be, for example, a configuration of being attached to a side surface of the image forming apparatus. In addition, the sheet processing apparatus may have a configuration of being controlled by a control portion included in the sheet processing apparatus.

In addition, the disclosure of the present embodiment includes the following configurations.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

The invention claimed is:

1. A sheet processing apparatus comprising:
- a first conveyance portion configured to convey a sheet in a first conveyance direction;
- a placement portion on which the sheet conveyed by the first conveyance portion is placed;
- an abutment portion that an upstream edge in the first conveyance direction of the sheet on the placement portion is caused to abut;
- a second conveyance portion configured to convey the sheet in a second conveyance direction in which the upstream edge in the first conveyance direction of the sheet on the placement portion moves toward the abutment portion;
- a shifting portion configured to move in a shift direction intersecting with the first conveyance direction in a state of abutting one edge following the first conveyance direction of the sheet conveyed by the first conveyance portion, and thus move, in the shift direction, the sheet conveyed by the first conveyance portion;
- a driving portion configured to drive the shifting portion to move the shifting portion in the shift direction;
- a processing portion configured to perform a binding process on a plurality of sheets that are positioned at a binding position by being conveyed in the second conveyance direction by the second conveyance portion to cause a downstream edge thereof in the second conveyance direction to abut the abutment portion and then being moved in the shift direction by the shifting portion;
- a stacking portion that is disposed downstream of the placement portion in the first conveyance direction and on which the sheet conveyed by the first conveyance portion is stacked; and
- a discharge portion configured to discharge, onto the stacking portion, the sheet conveyed by the first conveyance portion, wherein the sheet processing apparatus is capable of executing:
- a binding discharge process in which the binding process is performed on the plurality of sheets by the processing portion and the plurality of sheets subjected to the binding process are discharged onto the stacking portion by the discharge portion, the plurality of sheets being positioned at the binding position by repeating a process in which, after the sheet is conveyed in the first conveyance direction by the first conveyance portion, the sheet conveyed by the first conveyance portion is conveyed in the second conveyance direction on the placement portion by the second conveyance portion to cause a downstream edge of the sheet in the second conveyance direction to abut the abutment portion, and the sheet is moved in the shift direction and positioned at the binding position by driving the shifting portion by the driving portion; and a sorting discharge process including stacking an unbound first sheet bundle by repeating a plurality of times a process in which, after the sheet is conveyed in the first conveyance direction by the first conveyance portion, the sheet conveyed by the first conveyance portion is moved in the shift direction by the shifting portion by driving the shifting portion by the driving portion without conveying the sheet in the second conveyance direction by the second conveyance portion, and the sheet moved in the shift direction by the shifting portion is discharged to a shift position on the stacking portion by the discharge portion one by one, and stacking an unbound second sheet bundle by repeating a plurality of times a process in which the sheet conveyed by the first conveyance portion is discharged one by one to a position displaced upstream in the shift direction from the shift position on the stacking portion by the discharge portion without being conveyed the sheet in the second conveyance direction by the second conveyance portion.

2. The sheet processing apparatus according to claim 1, wherein the discharge portion is a pair of discharge rotary members at least one of which rotates while nipping the sheet conveyed in the first conveyance direction by the first conveyance portion, wherein the sheet processing apparatus further comprises a discharge rotary member moving member configured to move at least either one of the pair of discharge rotary members between a nipping position where the sheet conveyed in the first conveyance direction by the first conveyance portion is nipped by the pair of discharge rotary members and a separated position where the pair of discharge rotary members are separated from each other, and wherein in the sorting discharge process, the sheet is moved in the shift direction by the shifting portion in a state in which the sheet conveyed in the first conveyance direction by the first conveyance portion is between the pair of discharge rotary members and the pair of discharge rotary members are positioned at the separated position by the discharge rotary member moving member.

3. The sheet processing apparatus according to claim 2, wherein the discharge rotary member moving member is capable of moving at least either one of the pair of discharge rotary members to a retracted position where the pair of discharge rotary members are further away from each other than at the separated position, and wherein in the sorting discharge process, the pair of discharge rotary members are positioned at the retracted position by the discharge rotary member moving member when the sheet is conveyed in the first conveyance direction from the first conveyance portion, and then the pair of discharge rotary members are positioned at the separated position by the discharge rotary member moving member before moving the sheet in the shift direction by the shifting portion.

4. The sheet processing apparatus according to claim 1, wherein the shifting portion is a first shifting portion, wherein the driving portion is a first driving portion, wherein the sheet processing apparatus further comprises:

a second shifting portion capable of moving in the shift direction in a state of abutting another edge following the first conveyance direction of the sheet conveyed in the first conveyance direction by the first conveyance portion; and a second driving portion configured to drive the second shifting portion to move the second shifting portion in the shift direction, and wherein in the sorting discharge process, the first shifting portion and the second shifting portion move in the shift direction in a state of nipping, from both sides in the shift direction, the sheet conveyed in the first conveyance direction by the first conveyance portion.

5. The sheet processing apparatus according to claim 1, wherein the sheet processing apparatus is further capable of executing a switchback shift discharge process in which, after the sheet is conveyed in the first conveyance direction by the first conveyance portion, the sheet conveyed in the first conveyance direction by the first conveyance portion is conveyed in the second conveyance direction on the placement portion by the second conveyance portion to cause the downstream edge of the sheet in the second conveyance direction to abut the abutment portion, and the sheet conveyed in the first conveyance direction by the first conveyance portion is moved in the shift direction by the shifting portion by driving the shifting portion by the driving portion, and the sheet moved in the shift direction by the shifting portion is discharged onto the stacking portion by the discharge portion without performing the binding process by the processing portion.

6. The sheet processing apparatus according to claim 5, wherein in a case of shifting the sheet in the shift direction and discharging the sheet without performing the binding process on the sheet conveyed in the first conveyance direction by the first conveyance portion, the sorting discharge process is performed on a first sheet whose length in the first conveyance direction is a first length, and the switchback shift discharge process is performed on a second sheet whose length in the first conveyance direction is a second length larger than the first length.

7. The sheet processing apparatus according to claim 1, wherein the discharge portion is a pair of discharge rotary members at least one of which rotates while nipping the sheet conveyed in the first conveyance direction by the first conveyance portion, and wherein the shifting portion is provided to extend from an upstream side to a downstream side in the first conveyance direction with respect to the pair of discharge rotary members.

8. The sheet processing apparatus according to claim 7, wherein the shifting portion includes a curl pressing portion that is provided at a position downstream of a nip position where the sheet is nipped by the pair of discharge rotary members in the first conveyance direction and above the nip position in a vertical direction, and configured to press a leading end of the sheet conveyed in the first conveyance direction by the first conveyance portion and curled upward.

9. The sheet processing apparatus according to claim 1, wherein the discharge portion is a pair of discharge rotary members at least one of which rotates while nipping the sheet conveyed in the first conveyance direction by the first conveyance portion, and wherein the sheet processing apparatus further comprises a rake-in portion having a rotation shaft provided between, in a vertical direction, a nip portion of the pair of discharge rotary members and a stacking-side abutment portion provided on an upstream side of the stacking portion in the first conveyance direction, and configured to convey the sheet discharged onto the stacking portion in a third conveyance direction in which the upstream edge of the sheet in the first conveyance direction moves toward the stacking-side abutment portion by rotating in contact with an upper surface of the sheet discharged onto the stacking portion.

10. An image forming system comprising:

an image forming apparatus including an image forming portion configured to form an image on a sheet; and a sheet processing apparatus, wherein the sheet processing apparatus comprises:

a first conveyance portion configured to convey a sheet in a first conveyance direction;

a placement portion on which the sheet conveyed by the first conveyance portion is placed;

an abutment portion that an upstream edge in the first conveyance direction of the sheet on the placement portion is caused to abut;

a second conveyance portion configured to convey the sheet in a second conveyance direction in which the upstream edge in the first conveyance direction of the sheet on the placement portion moves toward the abutment portion;

a shifting portion configured to move in a shift direction intersecting with the first conveyance direction in a state of abutting one edge following the first conveyance direction of the sheet conveyed by the first conveyance portion, and thus move, in the shift direction, the sheet conveyed by the first conveyance portion;

a driving portion configured to drive the shifting portion to move the shifting portion in the shift direction;

a processing portion configured to perform a binding process on a plurality of sheets that are positioned at a binding position by being conveyed in the second conveyance direction by the second conveyance portion to cause a downstream edge thereof in the second conveyance direction to abut the abutment portion and then being moved in the shift direction by the shifting portion;

a stacking portion that is disposed downstream of the placement portion in the first conveyance direction and on which the sheet conveyed by the first conveyance portion is stacked; and a discharge portion configured to discharge, onto the stacking portion, the sheet conveyed by the first conveyance portion, wherein the sheet processing apparatus is capable of executing:

a binding discharge process in which the binding process is performed on the plurality of sheets by the processing portion and the plurality of sheets subjected to the binding process are discharged onto the stacking portion by the discharge portion, the plurality of sheets being positioned at the binding position by repeating a process in which, after the sheet is conveyed in the first conveyance direction by the first conveyance portion, the sheet conveyed by the first conveyance portion is conveyed in the second conveyance direction on the placement portion by the second conveyance portion to cause a downstream edge of the sheet in the second conveyance direction to abut the abutment portion, and the sheet is moved in the shift direction and positioned at the binding position by driving the shifting portion by the driving portion; and a sorting discharge process including stacking an unbound first sheet bundle by repeating a plurality of times a process in which, after the sheet is conveyed in the first conveyance direction by the first conveyance portion, the sheet conveyed by the first conveyance portion is moved in the shift direction by the shifting portion by driving the shifting portion by the driving portion without conveying the sheet in the second conveyance direction by the second conveyance portion, and the sheet moved in the shift direction by the shifting portion is discharged to a shift position on the stacking portion by the discharge portion one by one, and stacking an unbound second sheet bundle by repeating a plurality of times a process in which the sheet conveyed by the first conveyance portion is discharged one by one to a position displaced upstream in the shift direction from the shift position on the stacking portion by the discharge portion without being conveyed the sheet in the second conveyance direction by the second conveyance portion, wherein the sheet processing apparatus is capable of executing the binding discharge process and the sorting discharge process on the sheet on which the image has been formed by the image forming portion.

* * * * *